United States Patent
Oehrle et al.

(10) Patent No.: US 9,569,729 B1
(45) Date of Patent: Feb. 14, 2017

(54) ANALYTICAL SYSTEM AND METHOD FOR ASSESSING CERTAIN CHARACTERISTICS OF ORGANIZATIONS

(71) Applicants: Richard Oehrle, Pacific Grove, CA (US); Steven Lee Roberts, Half Moon Bay, CA (US); Elizabeth B Charnock, Half Moon Bay, CA (US); Katya Saint-Amand, Edinburgh (GB); Laurent Jean-Marc Guillaume Dupont, Paris (FR)

(72) Inventors: Richard Oehrle, Pacific Grove, CA (US); Steven Lee Roberts, Half Moon Bay, CA (US); Elizabeth B Charnock, Half Moon Bay, CA (US); Katya Saint-Amand, Edinburgh (GB); Laurent Jean-Marc Guillaume Dupont, Paris (FR)

(73) Assignee: Chenope, Inc., Half Moon Bay, CA (US)

( * ) Notice: Subject to any disclaimer, the term of this patent is extended or adjusted under 35 U.S.C. 154(b) by 0 days.

(21) Appl. No.: 15/215,570

(22) Filed: Jul. 20, 2016

(51) Int. Cl.
  *G06F 17/00* (2006.01)
  *G06F 17/20* (2006.01)
  *G06N 7/00* (2006.01)
  *G06Q 10/06* (2012.01)

(52) U.S. Cl.
  CPC ............ *G06N 7/005* (2013.01); *G06Q 10/063* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 7,143,091 B2 * | 11/2006 | Charnock | ......... | G06F 17/30716 |
| 7,386,439 B1 * | 6/2008 | Charnock | ......... | G06F 17/30699 |
| | | | | 704/9 |
| 7,421,660 B2 * | 9/2008 | Charnock | ......... | G06F 17/30713 |
| | | | | 707/999.003 |
| 7,493,468 B2 * | 2/2009 | Burns | ................... | G06F 9/3802 |
| | | | | 712/13 |
| 7,519,589 B2 * | 4/2009 | Charnock | ............... | G06Q 30/02 |
| 7,756,695 B2 * | 7/2010 | O'Niell | ............... | G06F 17/5027 |
| | | | | 703/14 |
| 8,250,338 B2 * | 8/2012 | Burns | ................... | G06F 9/3802 |
| | | | | 712/13 |

(Continued)

OTHER PUBLICATIONS

Predicting service metrics for cluster-based services using real-time analytics Rerngvit Yanggratoke; Jawwad Ahmed; John Ardelius; Christofer Flinta; Andreas Johnsson; Daniel Gillblad; Rolf Stadler Network and Service Management (CNSM), 2015 11th International Conference on Year: 2015 pp. 135-143, DOI: 10.1109/CNSM.2015.7367349 IEEE.*

(Continued)

*Primary Examiner* — Michael B Holmes

(57) ABSTRACT

A computer readable medium for analyzing and predicting the future behavior of organizations is disclosed. An embodiment of this invention is comprised of one or more repositories of data which involve comments or other actions by actors with some kind of relationship to a target organization, a repository of metadata relating to this data, a repository of updatable models of organizations, a natural language parsing engine, and an engine for generating and comparing the organizational models.

30 Claims, 51 Drawing Sheets

(56) References Cited

U.S. PATENT DOCUMENTS

| | | | | |
|---|---|---|---|---|
| 8,819,021 B1* | 8/2014 | Charnock | ......... | G06F 17/30657 |
| | | | | 707/737 |
| 8,887,286 B2* | 11/2014 | Dupont | ................... | G06F 21/00 |
| | | | | 726/25 |
| 9,213,978 B2* | 12/2015 | Melamed | .......... | G06F 17/30684 |
| 9,413,891 B2* | 8/2016 | Dwyer | ................ | H04M 3/5175 |

OTHER PUBLICATIONS

Learning about Social Learning in MOOCs: From Statistical Analysis to Generative Model Christopher G. Brinton; Mung Chiang; Shaili Jain; Henry Lam; Zhenming Liu; Felix Ming Fai Wong IEEE Transactions on Learning Technologies Year: 2014, vol. 7, Issue: 4 pp. 346-359, DOI: 10.1109/TLT.2014.2337900 IEEE.*

Statistical and domain analytics for informed study protocols Nicholas R. Wheeler; Laura S. Bruckman; Junheng Ma; Ethan Wang; Carl K. Wang; Ivan Chou; Jiayang Sun; Roger H. French Energytech, 2013 IEEE Year: 2013 pp. 1-7, DOI: 10.1109/EnergyTech.2013.6645354 IEEE Conference Publications.*

Spatially Aware Term Selection for Geotagging Olivier Van Laere; Jonathan Quinn; Steven Schockaert; Bart Dhoedt IEEE Transactions on Knowledge and Data Engineering Year: 2014, vol. 26, Issue: 1 pp. 221-234, DOI: 10.1109/TKDE.2013.42 IEEE Journals & Magazines.*

* cited by examiner

ANALYTICAL SYSTEM AND METHOD FOR ASSESSING CERTAIN CHARACTERISTICS OF ORGANIZATIONS

This application claims priority to U.S. Provisional Patent Application No. 62/231,894, with a filing date of Jun. 20, 2015 and the disclosure of which is incorporated herein by reference in its entirety.

DESCRIPTION

Field of the Invention

The present invention relates to the analysis of disparate types of data that are associated with an organization and its individual members—and other types of insiders—with the aim of gaining an understanding of that organization's culture, character, overall engagement, overall energy, and other characteristics. It can be applied to any type of organization. Additionally, the invention relates to the making of predictions on the basis of these attributes and any changes to them that are observable over time.

Background

Organizations ranging from corporations to terrorist and criminal groups have grown both larger and more international in recent years owing to the many kinds of advances in communications. These changes have made such organizations more difficult to accurately assess, whether from an internal executive perspective or an outsider one. Military commanders generally have the ability to directly observe the performance of their adversaries on the battlefield, and as a result can reasonably make broader inferences about their discipline, training, and funding accordingly—well beyond those units that they can directly observe. However, in most other contexts—such as business—only anecdotal evidence about competitors, or target investments is available.

Somewhat ironically, the view from the corner office of one's own organization is often far from clear as well. Top executives tend to be surrounded by those with similar backgrounds, experiences, and opinions. Subordinates may be afraid to disagree with or contradict their leaders. Under such circumstances, gaining an accurate understanding of the functioning of the organization's front lines—which are often staffed with people of disjoint demographic characteristics from the senior management (e.g. younger, less educated, lower socio-economic level, etc,) possibly even in other countries, is no small task. Indeed, even just having a realistic grasp of what those occupying the lower echelons of the organization understand is difficult.

Yet study after study indicates a clear and meaningful correlation between metrics such as "employee engagement" and a variety of key business metrics such as customer loyalty, operating income, and earnings per share. Thus having greater transparency into the functioning of these large organizations has great value.

Simple means for ascertaining aspects of organizational state of mind such as morale often provide little in the way of real value. Career or job seeking sites such as Glassdoor.com and Indeed.com present a more negative picture of reality than is actually the case—no surprise given that the employee reviews that appear on them are usually written by people who are contemplating a job change. Further, as any good marketer knows, unhappy customers are 10× more likely to comment publicly than are happy customers and employees are no different. This dynamic only encourages HR and PR departments to try to game the system by creating counterbalancing narratives in their own anonymous posts.

Internally conducted surveys also have limitations. Most are oriented towards getting positive or negative responses on individual topics such as salary, career advancement prospects and so on. Employees may not truly believe that these surveys are anonymous and will thus often respond with what they believe the "correct" answers are. Thus the survey responses provide a more positive picture of how employees feel than is actually the case. In addition, the survey questions may not get at the driving factors in any employee's head; otherwise put, what is important to the asker of the questions may be much less so to the responders, and vice-versa.

Making the picture even more complicated is the fact that social media posts which are tied to current employees are likely to skew positive; just as most people only post flattering pictures of themselves on social media, few are going to publicly proclaim their job boring or worse. It would be poor self-marketing. And for members of terrorist groups, posting anything but very positive references to their organizations that are attributable to them could literally prove fatal.

In short, what people directly say—or don't say—depends far more on the context in which they are speaking than what it is that they actually feel or think. Thus in order to get an accurate, holistic assessment of an organization, many different sources of evidence (both direct and indirect, textual and non-textual) must be weighed, considered in a context-dependent manner and analyzed by a combination of very different kinds of technical approaches.

SUMMARY OF THE INVENTION

An analytics system specifically for assessing certain psychological characteristics of organizations is described. The system is comprised of raw data, metadata and derived model repositories, an NLP parsing engine, and a model computation engine for generating and updating the organizational models.

In one aspect of the present invention, the analytics system derives metadata for individual records of employee/organization member behavior including labeling textual data with tags indicating the author's probable pragmatic intent and assigning informational values to each discourse chunk.

In another aspect of the present invention, the analytics system identifies non-member insiders and likewise derives metadata from the records associated with these authors, including labeling textual data with tags indicating the author's probable pragmatic intent and assigning informational values to each discourse chunk.

In another aspect of the present invention, the analytics system analyzes the level of sophistication or perspective with which a statement was written for the purpose of evaluating the credibility of the statement and of the author.

In a further aspect of the present invention, the analytics system identifies and categorizes actionable suggestions and observation about the organization made on the part of credible insiders.

In a further aspect of the present invention, the analytics system measures changes over time in any aspect of the metadata, and accounts for ephemeral and other temporal anomalies.

In a further aspect of the present invention, the analytics system makes comparisons across organizations for purposes of benchmarking.

In a further aspect of the present invention, the analytics system assesses the culture, character and stability of the organization, both at a point in time and over time.

In a yet further aspect of the present invention, the analytics system assesses the overall commitment or engagement level and energy of the organization.

In a yet further aspect of the present invention, the analytics system leverages its assessment of the organization in order to make predictions on its stability and general trajectory and to compare it to other organizations.

OVERVIEW

Figure 1:
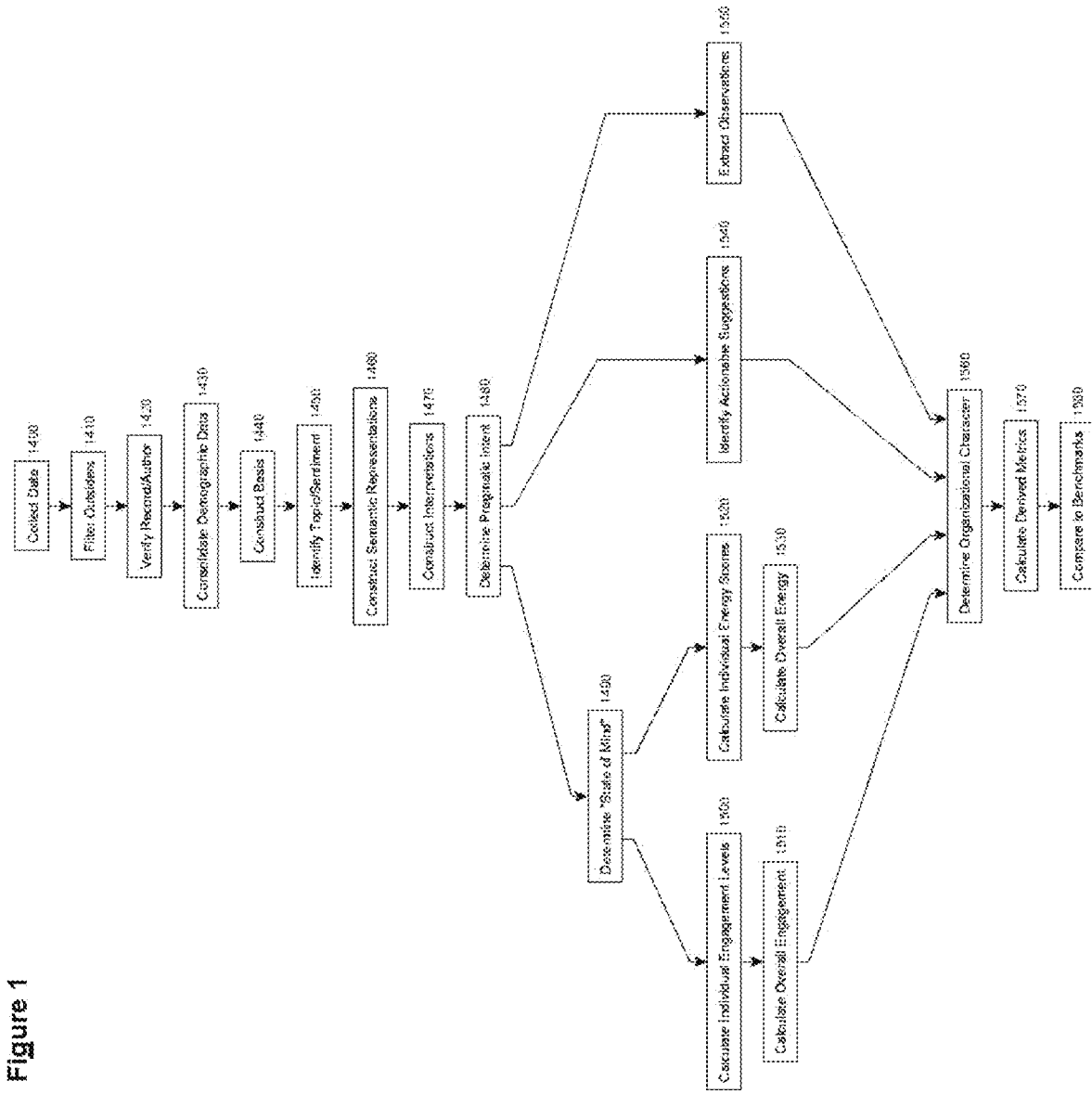
FIG. 1 is a block diagram which illustrates a system architecture.

The present invention comprises a system for analyzing various key aspects of an organization's[200] psychological state such as its morale and the commitment level of its members[290]/employees[320]. Organizations[200], regardless of kind, ultimately can't sustain themselves if their members' [290] interest can't be sustained. Eventually, a paycheck can be replaced—or even upgraded; a group who gains members[290] at the point of a gun will eventually be threatened by a group with greater or equal force at their disposal.

Organizational Character[480] is the set of abstract traits [485] that govern the actions of the organization[200] in any given set of circumstances[530]. Organizational character [480] is an excellent predictor of what will occur when the organization[200] is confronted with significant adversity—or opportunity. Accurately assessing organizational character[480] is valuable in contexts raging from investment in (or purchase of) a company[210], market assessment—and of course a variety of military, intelligence and law enforcement scenarios.

The difficulty however is that there is no straightforward way to assess organizational character[480], or related items such as the strength of the current leadership[440], or the commitment level[1375] of the members[290]. Certainly there is no shortage of comments made in both public and private forums. However, statements—or observers—that are objective, truthful, and knowledgeable are usually few and far between. Thus a naïve analysis of comments—or for that matter any analysis of only comments—has several major drawbacks:

The context in which the comment was made greatly impacts the incentives of what to say and not say—and how. Incentives commonly include fear, currying favor, revenge [25055], catharsis, promotion of a belief, the hope of obtaining a particular outcome, and gratitude. Which incentives are the likely drivers depends largely on the context. To take an obvious example, fear is unlikely to be a limiting factor in an anonymous online review, but can easily be one in an internal setting. Otherwise put, pragmatic intent[25010] cannot be accurately assessed independent of the surrounding context[1200].

Any comment or statement must be correctly interpreted relative to the author's[250] frame of reference and perspective[400]. For example, to a minimum wage employee, a supervisor making a few dollars an hour above the minimum may be "senior management."

In public forums, the author[250] may have little or no actual relationship to the target organization[200], and may or may not have the or role that they are claiming.

Likewise, gaming of public forums with the aim of manipulating public perception is becoming increasingly commonplace.

In both private and public forums, what is not said—and who is not saying anything—is often at least as important as what is explicitly stated.

Actions speak louder than words. An over-reliance on comments is dangerous for this reason. Words that reference personal actions are more valuable than those which only express opinions. For example, a terrorist talking about having gone to visit others in a terrorist group[220] or making plans to do so is far more meaningful than pages of rants about infidels. Likewise, an employee talking about specific interviews for another job is more valuable than someone indicating that he wished he could leave his current job.

Each of these drawbacks can be mitigated by the creation and maintenance of a model[1340] which considers many types of evidence, and which handles each piece of evidence in its proper real world context in order to assess the character[480] of an organization[200]. By many types of evidence, we mean to include not just textual data[1215] but images[1235], online behavior, any proof of changes in lifestyle which are related to membership in the organization [200], work habits, etc.

A related difficulty involves determining how fundamentally committed an organization's[200] members[290] are to it. Relationships between employees[320] and employers [210] are often quite complex for example. There are many different aspects both to the organization[200] and to any individual's relationship to it. For example:

An individual might appreciate his immediate colleagues, but distrust and/or dislike higher management. Or vice-versa.

Someone may have a high degree of attachment to an abstract perception of the organization[200] and/or its mission—regardless of whether the abstraction seems to align with the day-to-day realities.

Someone might assess a bright future for themselves—and for the organization[200] generally, even if the present circumstance are not that great. Likewise someone can sense a general decline in the organization[200] even if the present circumstances are entirely satisfactory. Yahoo offers a great example of this last: an estimated ⅓ of its workforce voluntarily departed once it became the subject of much negative scrutiny even despite high salaries, abundant perks such as free meals, high retention bonuses, and a well-recognized brand name.

Someone might place a high value on discrete aspects of the organization[200] such as its level of prestige or particular concrete benefits, and may care far less about anything else.

Very rare indeed are the situations in which absolutely all aspects are perceived as being positive, or negative. Indeed, nothing but single sentiment[1305] statements over a wide range of dimensions suggests either a lack of objectivity [3050], a lack of sincerity[3060], or both.

It is also the case that there are always trade-offs involved in the decision to join—and stay—in any organization[200], and in selecting Organization X over Organization Y. Simply observing a well-understood tradeoff, such as the fact that smaller businesses generally offer fewer benefits than do larger ones, or that law enforcement can be a dangerous profession, are not in themselves complaints so much as statements of fact. What is actually important is what the given individuals value, what the organization[200] values, and how well these align. Thus while it may be quite easy to pick out topic[1300] sentiment[1305] pairs (e.g. "good management", or "horrible salary") it remains quite a leap to get to commitment level or engagement[460] from there.

Members[290] of an organization[200] who are reasonably committed or better will typically exhibit certain behaviors online—assuming that they have a significant online presence. Many of these behaviors do not involve making any evaluative or explicitly promotional statements about their organization[200]. For example, they will have online profiles that identify themselves as a member[290]. They will post pictures that directly or indirectly promote[25065] their organizations[200]. They will post information such as job openings, product launches, promotional events, and so on. Given an appropriate opening, they will routinely talk about some aspect of their job or their work, such as what they are currently working on (unless enjoined from doing so by the nature of their jobs.)

Likewise, members[290] who are losing their commitment to their organization[200] will gradually associate themselves with it less and less, rather than spend time talking about it. Additionally, especially in the case of employment relationships, updating of profile (or résumé) content and pictures, the creation of new online profiles, uncharacteristic flurries of new "friends" or other online connections, or a flurry of new types of activities—especially joining multiple new unrelated organizations—all are signals that a de-commitment process is underway.

The invention described herein provides a framework for properly evaluating evidence obtained from these very contextually different sources, for evaluating the credibility [410] of different individuals, and overall cultural characteristics and character[480] of an organization[200] as well as trends in the commitment level and other behaviors of the organizational members[290].

DETAILED DESCRIPTION OF THE INVENTION

FIG. 1 is a flowchart of one embodiment in which data are first collected from a variety of sources, including but not limited to social media[25020], blog sites[25020], career and other community, industry, or special interest sites [25030] or portals, as well as internal organization records such as email, employee portals and, internal application data, databases, employee interviews and surveys[25015], and message boards. Almost all embodiments will collect and store time and date stamp[18090] information for all records. Any reliable method of collection that is appropriate for the data in question is acceptable including, but not limited to, web crawling, integration via an API, or static dumps.

Data from publicly available web sources will be discarded—or not initially collected—depending on the collection mechanism being used by the particular embodiment, if the individual post does not directly reference a target organization[200] unless there is an explicit connection to a target organization[200] in the actor[240] or actor identity[260] profile. In the case of an individual comment, many embodiments may opt to perform further filtering at this stage, trying to chop out items[6200] that are likely not made by insiders[270] (e.g. "My friend just bought a Toyota." as opposed to "At Toyota, we have upgraded our quality control system.") This can be done based on a combination of what is defined in the internal knowledge model[1340] (e.g. "quality control system" is thing that is internal to the organization, whereas buying a car is generally an action taken by outsiders) as well as use of specific linguistic constructions (e.g. "At [ORG] first-person-pronoun.") Any standard topic-based or parsing method may be used for this purpose; as is discussed in more detail further in this application, the goal is not perfection but rather to eliminate obvious noise on the part of the minimally informed and those being incented to create a particular impression.

Virtually all embodiments will seek to filter out any actor[240] or actor identity[260] that is either an outsider [280] to the organization[200] in question or someone who does not directly interact with the organization[200] on an ongoing basis. For example, we do not wish to confound comments made by those with direct, operational knowledge of the organization[200] (such as employees[320]) with customers, shareholders, or others who may have an impression but who do not have any direct exposure to the company[210] which would allow them to validate or alter their impression. We wish to avoid confounding posts made by members[290] of one terrorist group[220] with those made by members[290] of a different and opposing terrorist group[220] who may be seeking to discredit or destabilize it.

It should be noted that not every member[290] will include membership[290] information in all—or for that matter, any—of their profiles. However, those that do needn't reference the organization[200] by name in their comments so long as it can reasonably be inferred. For example, someone whose Twitter profile lists them as a Chenope employee[320] can refer to Chenope as "my job" or "my company" in a current comment without ambiguity. Many embodiments may choose to perform additional text processing steps at this point such as syntactic, semantic and discourse analysis for this reason.

Once an actor[240] or actor identity[260] has been determined to correspond to a member[290] of a target organization[200], whether by scanning a profile or other means, such as web crawling for résumés which combine user handles with current organization[200] affiliation and role, all of their posts and activity, regardless of direct topical relevance will be collected and stored by most embodiments. Most embodiments will likewise do this for clearly identified former members[330], though some may set a threshold for how far back in time to go.

For internal data, each data source[18170] is parsed into content created by individual actors[240], then individual records for each distinct post, message, response, or other record. In most embodiments, internally provided data will be treated as "verified"[19060] or correct. This is in sharp contrast to public, self-reported data[14020] that most embodiments will assign a probability of accuracy to. This is described in a subsequent section of this application.

Figure 2:
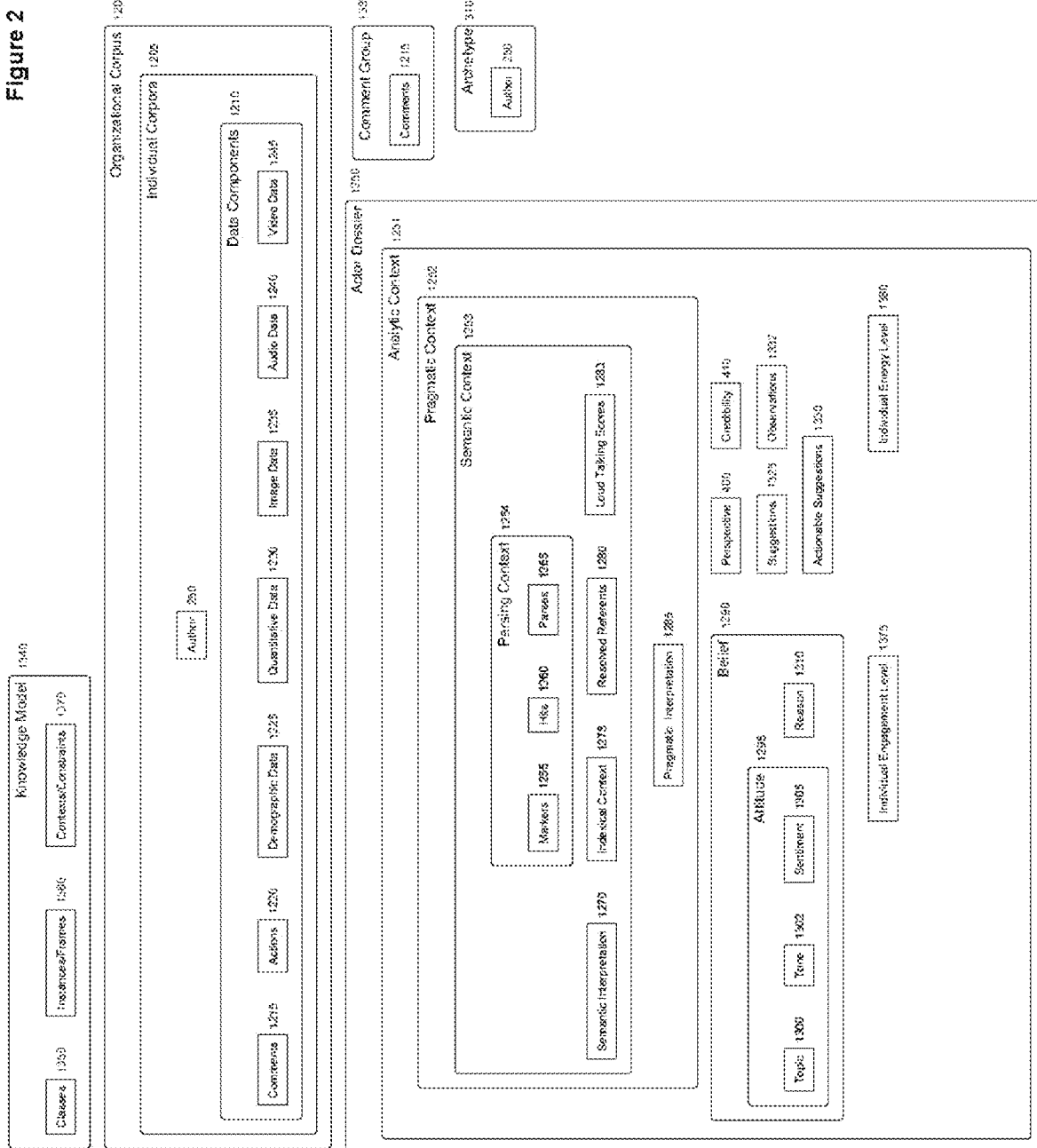
FIG. 2 is a block diagram which illustrates a system architecture model.

For both types of data, the context[1370] is stored along with each record[18000]. In most embodiments, there are two levels of context. By situational context[pic1570] we mean the incentives that are associated with a given channel, such as self-promotion[25035] on a dating site[25025]. In some instances, a given media or channel may be associated with more than one incentive—for example, there may be both positive and negative incentives. In employee engagement surveys[25015] for example, common incentives for providing a text response include all of the following: currying favor, providing constructive suggestions[25050], venting[25045], dropping hints[25060], and trying to put a colleague—usually a supervisor—in a bad light. In most embodiments, such information is part of the system's internal model[1340] that may optionally be modified by users. FIG. 2 depicts an example of this. However some embodiments could choose to machine learn these incentives on an empirical basis.

By "adjacent context"[18110] we mean the literal, immediate context in which a comment is being made. This could be the text of a question being responded to, a field name in an online form, a post or thread on some kind of forum to which the author[250] is responding. This information is stored since without it, it can often be impossible to correctly interpret the meaning or tone of a comment. Most embodiments will store the inferred polarity[24000] of the adjacent context[18110]. For example, if a comment is made in response to the question "What do you think the management of product line Xis doing best?" the question is providing both the (management of a particular product line) and a polarity[24000] (positive.)

Figure 3:
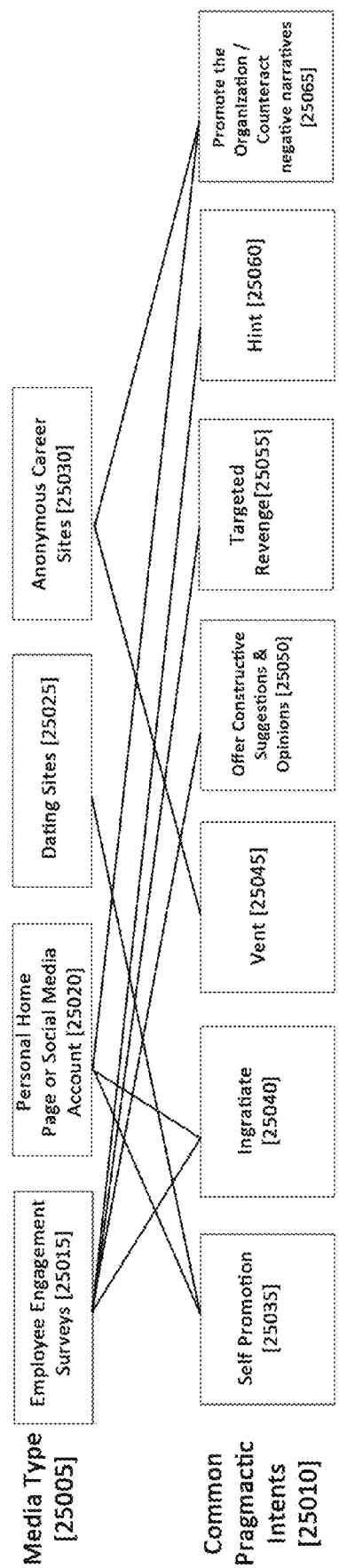
FIG. 3 is a block diagram which illustrates incentives associated with example media channels.

Demographic data[1225] about each actor[240] from internal organization records is stored so that distinctions can be made between members[290] occupying different roles in the organization[200]. In the case of online actor identities[260], self-reported[14020] demographic information[14020] is stored, though labeled as self-reported [14020] (and therefore potentially unreliable.) Self-reported data[14020] can be of any format in which the author[250] is asserting any kind of demographic data[1225] about herself. This include, but is not limited to various kinds of online posts[14000] and biographical summaries such as user profiles and résumés[14010]. Derived demographic data[1225] may also be created by some embodiments, either to fill in attributes[420] with no current values, or in preference to the self-reported data[14020]. This is depicted in FIG. 3.

In particular, some example usages of the demographic data[1225] in various embodiments include but are not limited to the following:

Assist in both filling out and assigning a probability of truthfulness to the information that will be contained in the author's[250] profile in the system. For example, if an author[250] claimed to have been a former executive at a large corporation[210], but his posts demonstrated poor spelling or grammar, a "low education" demographic tag [19050] might be assigned and stored. Likewise, someone claiming to be from North Africa for disinformation purposes but whose comments in Arabic reflected Syrian Arabic could be tagged as "Syrian." The set of tags[19050] that is appropriate will depend on the specific embodiment and use case. However, common ones include, but are not limited to: fluency, grammatical and spelling correctness, vocabulary complexity, phrasal complexity, perspective[400], tone [1302], n-gram comparisons, topic[1300] mixture and polarity[24000] mixture. In most embodiments, a tag resolver [19040] component has the function of detecting incompatible or highly unlikely tags[19050] co-occurring for the same actor[240]. This can be done either/both on a statistical basis and/or a heuristic one and/or a machine learning one—or any mixture of these.

Almost all embodiments will equate the presence of an unusual set of tags with a lower probability of the self-reported data being accurate. Likewise, almost all embodiments will consider that the larger the number of tags in the set that are consistent with data from verified insiders[270] of the same demographic characteristics[420], the greater the probability of truthfulness of the self-reported data [14020]. In either event, almost all embodiments will seek to combine the tags obtained from analysis of the self-reported data[14020] with any data that can be located from third party sources[14030] in order to make a determination of truthfulness on the self-reported data. For example, if an author[250] claims to have had a particular role in a given organization, ideally there will be publicly available information from a third party source[14060]—in the best case, information emanating from the organization[14050] itself—that will either support or refute this claim. (Note that as a practical matter, finding refuting evidence is very often difficult, since the same person may easily have held different roles in the same organization[200] during different periods of time. Thus, a reference to the individual having held a lower position at time t does not mean that he did not subsequently hold a higher one.) Most embodiments will consider the credibility of the third party source in scoring such evidence. While any number of existing methods can be used, most embodiments will consider data from the organization[200] in question and government records as the most authoritative sources.

a. Lastly, it should be noted that even an unusual set of tags and a lack of third party references[14060] does not necessarily mean that the self-reported information [14020] is untrue—it just means that it is less probable that it is true. In fact, in the case of actor identities[260] (rather than named persons) no third party references will be obtainable. Thus almost all embodiments will pass such outlier cases to a queue for manual review. Cases that are adjudicated to be probably real by a qualified user will then be fed back to whatever exact mechanism is being used to evaluate the probabilities for future use. The key point is to leverage as many vectors as possible to eliminate content from authors [250] who are very unlikely to be who or what they are claiming to be.

As input to the author's[250] sincerity[3060] calculation: many embodiments will not cause a low probability being assessed of author[250]'s self-reported data[14020] to also mean that the author[250] is not legitimately an insider[270] (assuming that there is evidence that points to him being so.) For example, some authors[250] may decide to give themselves a promotion so that their comments are taken more seriously. Otherwise put, someone who has probably lied in one respect will be deemed to be less trustworthy generally in many embodiments.

To interpret the author's[250] text. For example, a statement such as "Management has really deteriorated in the past years" will be evaluated in terms of the author's region, division, or subdivision (according to the default scoping rules applied by the particular embodiment) and the length of time that the author[250] has been affiliated with the organization[200].

The text[1215] of all items[6200] that pass through the filter are then parsed and evaluated for the pragmatic intent [25010] of each statement. Pragmatic intent[25010] analysis differs from traditional topic[1300]/sentiment[1305] analysis in that its focus on what is meant rather than what is said. Thus either or both the topic[1300] and sentiment[1305] may be referenced very indirectly. For example "I have to go dumpster diving for dinner" when stated by someone who is currently employed clearly has the intention of making a negative comment about pay. This is despite the fact it contains neither a reference to pay (or money) nor any kind of negative polarity[24000] term nor any instances of negation.

The system leverages its internal knowledge base[1340] to identify the author's[250] pragmatic intent[25010] to the extent possible. Pragmatic intent[25010] also must be interpreted in the context of the specific medium or channel in which a statement appears. For example, on a dating site, someone might brag about his high paying job, while on an internal employee satisfaction survey, he might complain that his salary is woefully inadequate. To this end, most embodiments support labeling of data sources[18170] according to their type from a situational context[18100] perspective.

Each item[6200] is evaluated by a series of components in an interpretation process which evaluates its probable intended meaning and informational value[22020]. For example, a statement such as "All the management at Company X is lousy." with no further clarification is in reality a reference to some subset of the management, as opposed to each of the potentially thousands of managers at a given company. Some embodiments may choose to treat such a reference as being bound to the location of the author[250] (if known), while others may choose to treat it as being bound to the smallest organizational unit[437] that contains the actor[240]. Still other embodiments may choose to interpret the on the basis of other similar comments; for example, if such negative comments are strongly clustered around a given departmental manager, that will be the selected.

Independently of the particular scope handling, such a non-specific statement begun with a universal quantifier indicates a low conceptual sophistication level of the author[250], or what we term a limited perspective[400]. The author[250] may truly believe his statement—the pragmatic intent[25010] is quite clear—but the value of that statement with respect to understanding the quality of management at that organization[200] is very low. Most embodiments will act accordingly, tagging the author[250] as having a negative sentiment[1305] towards his management, and a minimal perspective[400]. However, no direct negative inferences about the inherent goodness of the management will be made as a result by most embodiments, given the minimal perspective[400]. Many embodiments will however consider metrics on the perspective scores[1320] of members[290] at different levels as a reflection of management's capability.

Figure 4:
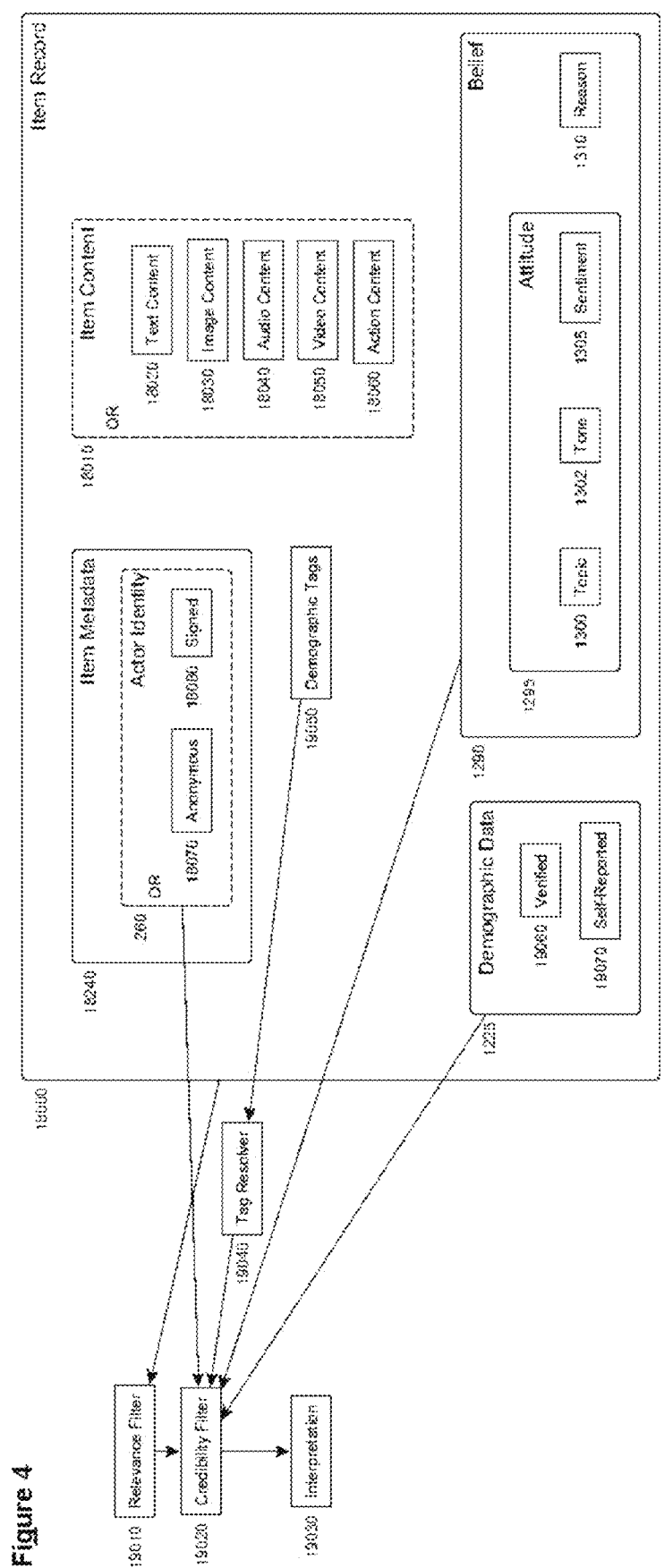
FIG. 4 is a block diagram which illustrates one embodiment of item record that is used in the system.

At this step, the informational value[22020] of the statements[22005] in each item[item1470] is determined. In most embodiments, informational value[22020] has two components: specificity[22010] and unexpectedness or novelty as seen in FIG. 4. Specificity[22010] can be thought of as self-completeness; can a statement[22005] be completely and correctly interpreted on its own, without any other context or external knowledge. Different embodiments may different tacks on how to measure specificity[22010]. Unexpectedness[22030] can be thought of as expressing a new— or at least fairly rare—element in the knowledge model[1340] that can be constructed. This may be many kinds of things, including but not limited to: a new kind of knowledge object, a new instance of an existing knowledge object, a new relationship, the refutation of a commonly made observation[1332], attitude[1295], or belief[1290]. Some embodiments may accept only novel elements while others will create a definition and threshold for what constitutes sufficient "rarity." Note that as part of the interpretation process most embodiments will extract actionable suggestions[1330] and observations[1332].

Next the collection of items[6200] is evaluated for meta-properties. By meta-property we mean the state of mind of the author[250] rather than the surface intent of his statements. The determination of meta-properties often requires an analysis of all available items[6200] for a given target organization[200]. For example, statements such as "I have the best job ever—and I have the best manager ever! We make the best products in the world!" are very likely to be fear-driven if they are heavily concentrated among low wage earners and are unusual among other demographic groups[12060]. Thus most embodiments support the meta-property of sincerity[3060], described in a subsequent section, to capture this situation. However, if such statements are fairly commonplace across a given organization[200], they may in fact just be sincere exuberance. Thus, each individual comment must be assessed within the broader context of all comments.

Non-textual member[290] data, as well as text data[1215] that doesn't pertain to the organization[200] at all, must be evaluated before the full analysis begins. Most embodiments will interpret textual tags on non-textual data such as images[1235], video[1245] and audio[1240] to determine whether the data is related to the member's[290] organization[200] or not. Some embodiments will go further, for example doing speech to text conversion, or analyzing the content of an image[18030] or video[1445]. However some of the most important data involves actions[1220] taken by the member[290] such as initiating or accepting a "friend" or similar invitation, or changing some aspect of one or more of his online profiles. Any such data may be either internal or public in nature.

The purpose of this additional data is to assess the members'[290] general state of mind, in particular their levels of engagement[460] and energy[1380]. Engaged members[290] on the whole display certain behaviors. These include, but are not limited to:

Making lots of day-to-day specific comments for improvement, also referred to in this application as "actionable suggestions"[1330]

Provide assistance and encouragement to other members[290]; responding quickly and in detail to requests from other members[290]

Act as brand ambassadors promoting their organization[200] publicly, its events, products, and philosophies, and helping to recruit new members[290]

Frequently mention the organization[200] online, including posting pictures and videos that involve it. More generally, display a desire to associate themselves publicly with the organization[200]

Will devote significant time and focus to the organization[200]

Almost all embodiments will construct behavioral baselines[1830] for each member[290] with whatever internal and public data is available. Most embodiments will factor in event-related spikes and troughs into the baseline[1830] calculation. For example, if a corporation[210] has a major new product launch, one could expect many members[290] to publicly make reference to it. By contrast, if a member[290] who had spent considerable time recruiting no longer is doing so, a possible explanation is that the organization[200] is not seeking new members[290] in a particular area or type. However, if other comparably situated members[290] are still recruiting, it is likely a choice on the part of the individual member[290].

Figure 5:
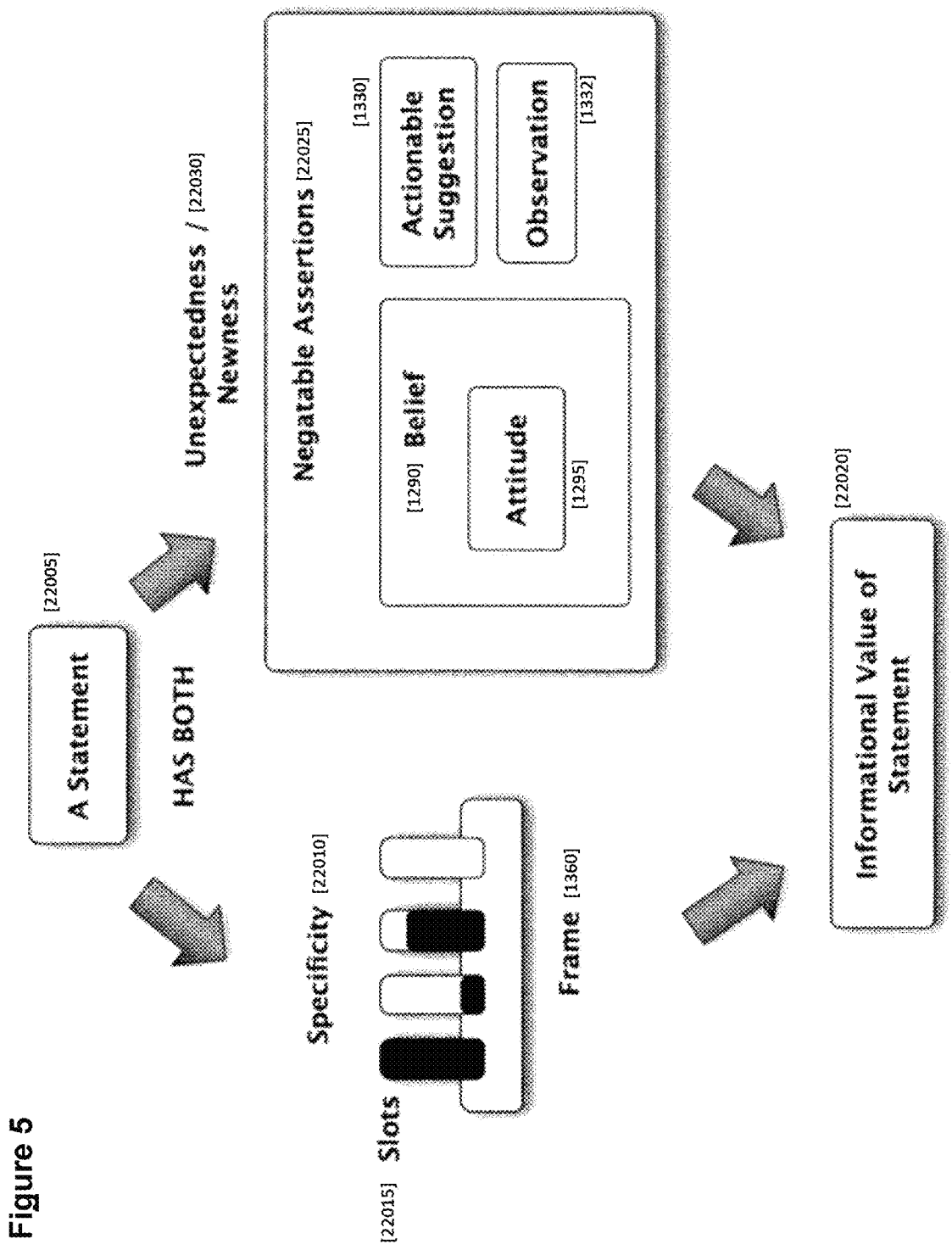
FIG. 5 is a block diagram which illustrates how informational value of statements in data items may be determined.

Likewise, some embodiments will factor in any evidence of life events, such as the birth of a child, as such events will change behavior but are not linked to engagement[460]. Evidence of such life events can be collected from social media and other publicly available web data, or alternately from personnel or similar records. Most embodiments will consider seasonality, and will likewise treat limited term absences as the probable side-effect of a vacation or other distraction. Some embodiments may collect data with the aim of confirming or disputing this hypothesis, using either or both personnel records and/or text and/or images posted on social media that clearly indicate a vacation or some other type of absence-causing event. A high level representation of this is in FIG. 5.

In almost all embodiments, a change in more than one of these measures, absent a life event or other explanation (e.g. no jobs to fill), will be seen as an engagement[460] signal. These less conscious signals may, or may not, correspond to the textual data[1215].

Members[290] whose engagement[460] is decreasing will exhibit a decrease in these positive behaviors[1850]. However, they are likely to start engaging in "exit" behaviors [1860] that most embodiments will seek to trap and place in the baseline[1830] measurement. Such behaviors include, but are not limited to:

Updating pictures and text in online profiles; updating résumés if appropriate to the organization[200] type.

Bursts[6350] or spikes in the number of social media "friend" and similar invitations initiated, and to a lesser extent, accepted that are not primarily other insiders[270]. These bursts[6350] become an even stronger source of evidence when there is statistically measurable change in the number of members[290] exhibiting the same behavior.

Conversely, a noticeable diminishing of the amount of messaging and other contact with other insiders[270]

Similarly, joining multiple new unrelated organizations [200] or seeking out other brick & mortar networking opportunities Statistically meaningful change in behavior w.r.t. when they are on social media, both hours of the day and volume of posts/content in non-work or organization-related contexts.

A marked change in both the raw number of posts and the percentage of posts that are in any way related to the organization[200], for example, the disillusioned executive who stops touting his employer[210] but is posting large numbers of photos of his family, their vacations, etc.

The lack of content—or action[1220]—is thus just as important as its presence.

A significant challenge is posed by the fact that data of the various kinds (e.g. contemporaneous internal data, survey data, publicly available online data, etc) may be plentiful, sparse, or simply non-existent for any given insider[270]. For some types of data, sparse is functionally the same as non-existent (e.g. there isn't enough data to construct a meaningful baseline.) Plus in any given situation, one or more types of data may not be available for analysis at all. Further, the quantities and distribution of data available are likely to vary widely by sub-population within an organization[200].

Most embodiments will deal with these data availability issues by aggregating data at the archetype[310] level, an archetype[310] being a group of insiders[270] who have been determined to share at least two or more attitudes [1295] or beliefs[1290], and who often also have demographic traits[420] in common. Especially since almost all embodiments will only aggregate data within the given time window specified by the particular configuration and embodiment (since, for example, what was a common belief[1290] last year may no longer be this year,) aggregating data across different types of media helps provide more data to model. Certain embodiments may go as far to combine data from similar archetypes[310] across different organizations[200] that have been defined as "comparable." Note that not all insiders[270] or even members[290] will fall into an archetype[310]. However, since the primary purpose is to paint a picture at the organizational level, such aggregation is helpful in capturing the most common viewpoints.

Most importantly perhaps, the inherent design of the system is such that it does not rely on any single type of data or medium. Indeed, all information is extracted—with appropriate contextual information—so that it can be normalized, at which the point the originating data source no longer has importance.

Almost all embodiments will then combine the action [1220]-related data with textual data—if such was collected—in order to determine individual engagement levels [1375], which are then rolled up to overall engagement level[460] metrics for the organization[200]. Finally, overall engagement[460] and, in most embodiments, most or all of the other measures described in this application, are used to calculate the presence and strength of different organizational character traits[485], as well as assess the overall strength of character of the organization[200]. Many embodiments will use this metrics for purposes of benchmarking[8030] and making predictions[9020]. Most embodiments will perform these steps on a continuous basis, assuming that there are types of data available for continuous collection.

Introduction to Key Concepts

Actor[240]: An actor[240] is an identifiable person. An online identity that is not clearly linkable to an identifiable person will be referred to as an actor identity[260].

Insider[270]: An Insider[270] is defined as an actor[240] who has direct, significant, operational contact over a period of time with a target organization[200]. An insider[270] can be a member[290] of the target organization[200] but can also be someone outside the organization[200] who interacts with it directly on an ongoing basis such as an ally, a trading partner, a services provider, supplier and so on, depending on the type of organization[200] in question. In some embodiments, even someone who has the opportunity to regularly eavesdrop and otherwise observe the organization [200] may be considered to have insider[270] status—for example, a villager pressed into servicing or otherwise dealing with an occupying terrorist force. In many embodiments, a former member[330] will be considered an insider [270] for a window of time after their departure from the organization[200]; in most of these embodiments, this window will be extended based on any evidence of ongoing contact with current members[290] and/or the organization [200]. An outsider[280] is an actor[240] who lacks such access to the target organization[200], but is either/both asserting that they do have such access and/or is commenting on the organization[200].

Perspective[400]. Because insiders[270] will have widely varying levels of understanding and knowledge, both about the world in general and the specific workings of their organizations[200], their statements cannot be assigned equal weight in terms of actual real world value. Otherwise put, while each member[290] may be the best expert on his own feelings, the objective value of their assertions about their organizations[200] will vary widely. The notion of perspective[400] captures this element of understanding. For example, a more experienced member[290] may understand that certain processes, though cumbersome, are required for regulatory or liability reasons whereas a less experienced member[290] may just express annoyance and dissatisfaction with the process.

However even members[290] with the same level of experience and education and even job type may have widely different levels of perspective[400], the differences reflecting their relative engagement levels[460], observational and analytical abilities. Nor does having a high position—or a low one—guarantee anything about perspective[400]. Perspective[400] is evaluated on the basis of the corpus of text[1205] authored by each insider[270]. Because someone can have a deep understanding of one area of an organization[200] but little to nothing about other areas of it, perspective[400] in almost all embodiments is a complex data structure that reflects knowledge—and lack of knowledge—about distinct areas. However, for certain usages, most embodiments will condense perspective[400] into a scalar value perspective score[1320].

Knowledge Model[1340]: In order to evaluate the completeness of an insider's[270] perspective[400] on a target organization[200], it is necessary to compare it to a reasonable model of how organizations[200] function. This includes the main forces that operate on an organization [200] of the relevant type, such as regulatory pressures, potential liability and so on in the case of corporations. Most embodiments will provide modifiable default knowledge models[1340] for broad types of organizations[200] including but not limited to corporations[210], terrorist groups [220], criminal organizations[220]. Many embodiments may opt to use their knowledge models[1340] to store many more kinds of data as well instead of having separate repositories for each type of data that is utilized by the system.

The knowledge model[1340] implements an ontology of types, properties and interrelationships of the data objects that are relevant for an organization[200]. For instance, the data object "manager" is a member of the organization[200], "responsible" is a property of a manger, "responsible" is a relation between the manager level and the class of its functions, where the class could further have instance objects: "assign tasks", "negotiate sales deals" etc.

Credibility[410]: Credibility[410] in this context is a measure for understanding the trustworthiness of an author [250] and consequently her statements. In many embodiments, credibility[410] is a composite of the perspective score[1320], an objectivity score[3050], a sincerity score [3060], and a substance score[3040]. In many embodiments, observation[1332] and actionable suggestions[1330] may also be deemed to have a level of credibility[410] associated with them.

Engagement[460]: The notion of engagement[460] in this document is according to the standard definition in Human Capital Management: the degree of psychological commitment that members[290] have to their organization[200]. However we propose new methods of assessing engagement [460].

It should be noted that the notion of "employee engagement," or how engaged an employee[320] is with their employer[210] or job, or how psychologically committed to it there are, is far more important now than back in the days when many people spent their entire career in the same organization. Frequent job changes no longer are stigmatized, and indeed in many industry sectors are quite commonplace. Employee engagement goes hand in hand with retention, which is critical in market sectors such as software or biotech in which the loss of even a small number of the wrong people to a competitor can inflict millions of dollars of damage or worse.

Energy[1380]: Whereas engagement[460] is a measure of a member's[290] psychological commitment to their organization[200], energy[1380] relates to the member's[290] sense of the organization's[200] trajectory or future. A member[290] may not be especially committed to an organization[200] that he believes is likely to be successful; conversely someone may remain highly committed to an organization[200] that is struggling. Most embodiments will assess energy[1380] according to measures such as proportion of references to the past as opposed to the present and future, various measures relating to the types and kinds of references to competitor organizations[470], and what proportion of author[250] statements lies where on the member [290] equivalent of the Maslow pyramid of needs[26000].

Figure 6:
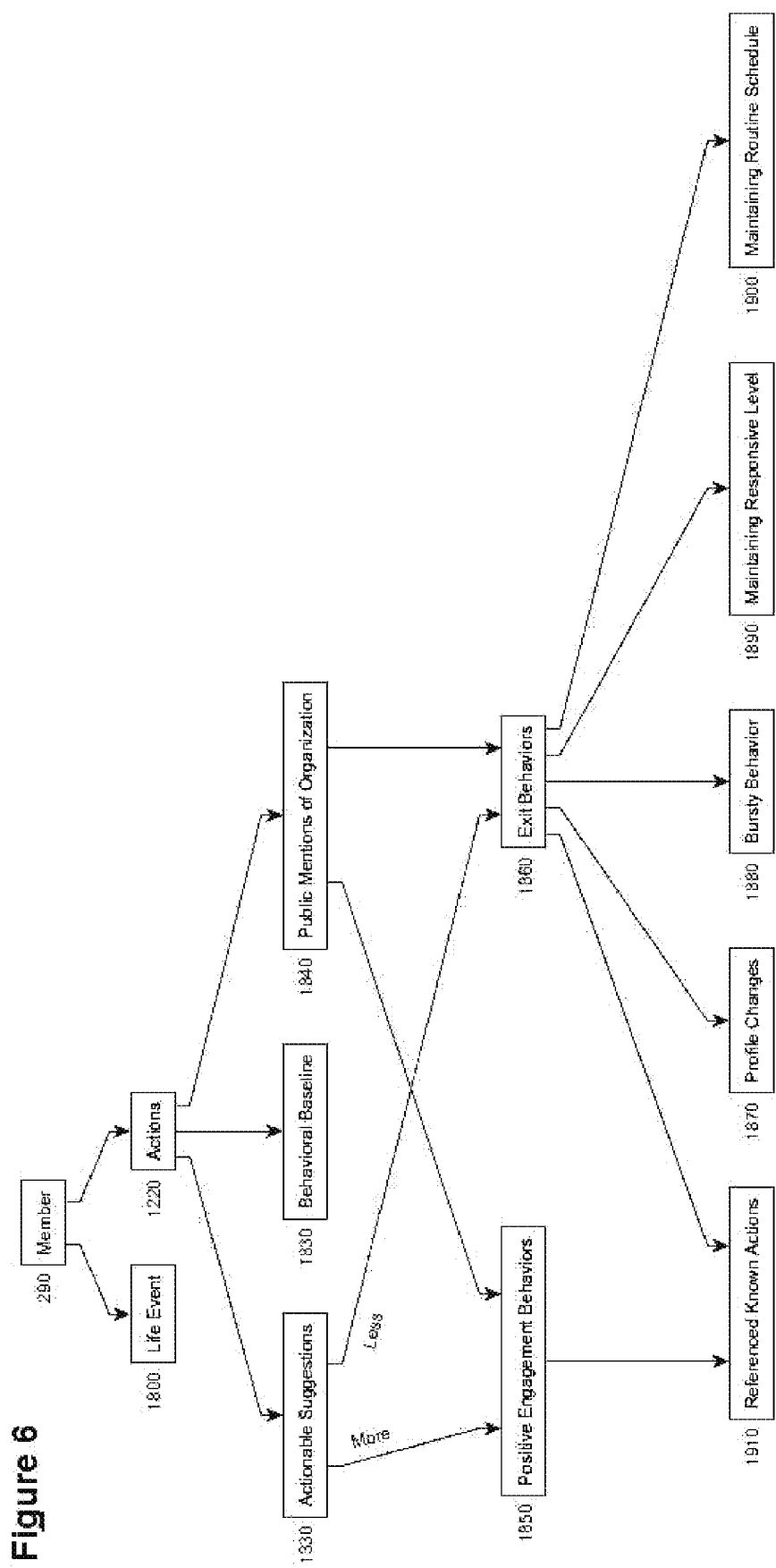
FIG. 6 is a block diagram which illustrates actions definitions which may be assessed under embodiments of the invention.

Organization[200]: An organization[200] is any group of people which has the notions of membership, chain of command, and objectives or goals. Organizations[200] frequently contain multiple, distinct sub-organizations[437]. Generally sub-organizations[437] are located in different regions[433] and/or sectors[430] from one another. In most embodiments, the user will determine which sub-organizations[437] to call out separately, which will be stored in the internal knowledge base[1340]. The features of an organization[200] in a default embodiment are depicted in FIG. 6.

Organizational Character[480]: Organizational Character [480] is the set of abstract traits[485] that govern the actions of the organization[200]. It differs from culture[500] in that culture[500] is what insiders[270] experience in dealing with the organization[200]—how people behave day-to-day—which is heavily influenced by the set of real world circumstances[530] that impact the organization[200] during any given time period. The strength of organizational character[480] in many embodiments is the degree to which one or more abstract character traits[485] either positively or negatively manifest themselves in the population of members[290]; many character dimensions have traits[485] at their two distinct poles (e.g. highly transparent vs. highly secretive or opaque.) Here too, many embodiments may opt to weigh different traits[485] differently. Some embodiments will factor in variance by sub-organization[437]; a large degree of variance by department or unit suggests a weaker character strength[495]. Likewise, many embodiments will factor in the degree of variance over time and circumstances [530]; organizations[200] with stronger characters[480] will demonstrate a smaller degree of variance in the face of changing circumstances[530] than will otherwise comparable organizations[200] under comparable circumstances [530]. Some embodiments will opt to relativize the notion of strength of organization character[480] to other organizations[200] which share at least a subset of the same abstract traits[485].

Topic[1300]: We use this term in a way that is fully consistent with the standard usage in IR. Topics[1300] can be detected through any combination of ontological and data-driven approaches such as various types of topic clustering. Topics[1300] are generally hierarchical in nature, for example there are many different types of training, several different types of benefits, etc. However, flat topic categories are also possible. Since different organizations[200] and scenarios may benefit from different groupings of topics [1300] defined in the internal knowledge base[1340], some embodiments provide administrative users with tools to rearrange topics[1300] so as to be consistent with how these topics[1300] are understood by a given organization[200]. Some embodiments may allow for certain topics[1300] to have implicit polarities[24000] associated with them, especially when expressed with specific words (e.g. "terrorist attacks" can always be assumed to have a negative polarity [24000].) However, these can sometimes get flipped in a polarity[24000] as the result of a discourse update.

Figure 7:
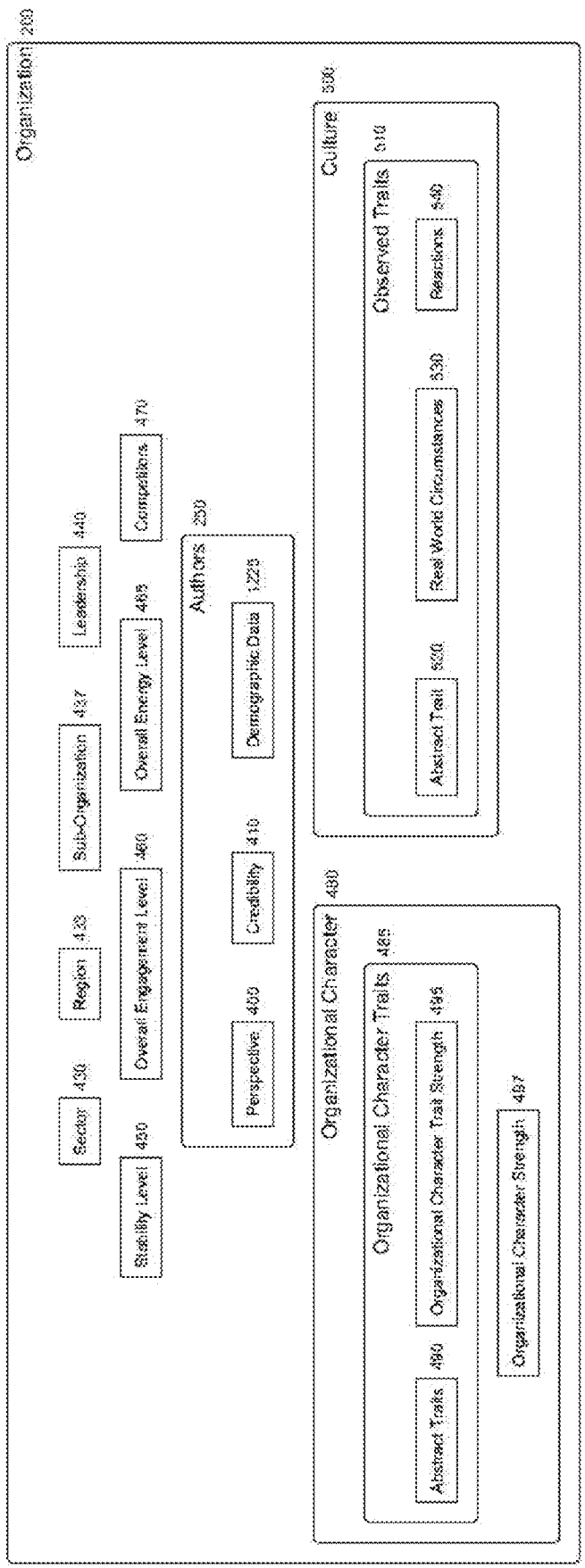
FIG. 7 is a block diagram which illustrates a concept of an organization model which may be assessed under embodiments of the invention.

Many embodiments will provide more than just a topical hierarchy for the topics[1300] in the knowledge base[1340]

for various uses. As depicted in FIG. 7, common additional classifications of topics[1300] include, but are not limited to:

Classes of importance[13000] (either as defined in the knowledge model[1340] or empirically based on the number of mentions or some other measure)

"Me" topics[7020] in which the author[250] would be a beneficiary of any proposed actions, likewise.

Abstract[7000] vs. concrete object topics[7010], as specified in the knowledge model[1340]

Highly specialized topics[7030], or those which require significant domain expertise to engage in conversation about, as defined in the knowledge model[1340] or in some embodiments the density of words that are out with the knowledge model[1340]

Sensitive topics[7040], or those that have been empirically observed to be the recipients of a larger than normal amount of politeness strategies and indirect references or have been tagged as such in the knowledge base[1340]

Sentiment[1305]: We define sentiment[1305] as a non-symmetric relation between a person or "agent" and a topic[1300]. In particular, the relation conveys the agent's beliefs[1290], attitudes[1295] or emotional tone[1302] towards a topic[1300] of his concern. Most embodiments do not require that both the agent and the topic[1300] are stated explicitly so long as they are inferable by using standard reasoning mechanisms.

Most embodiments will support the notion of sentiments [1305] at different levels. Specifically:

As reflected by a given sentence or statement (e.g. multiple sentences with cohesion in a discourse sense.)

As reflected overall in an individual response, "turn", or other kind of utterance[2600]

Towards a particular topic[1300] as expressed by individual authors[250]. This will also be referred to as attitude [1295].

That is associated with the entire individual corpus[3000] of individual authors[250]

An aggregate sentiment[1305] that is associated with one or more subgroups of insiders[270]. This can be indirect; for example if few or no members[290] of a given demographic type[12060] even mention a particular topic[1300], some embodiments might choose to associate a neutral sentiment [24010] with that topic[1300].

There is no fixed set of sentiments[1305] defined in most embodiments. Rather, the range of sentiments[1305] available differs by topic[1300]. The set of possible sentiments [1305] is quite large, especially when considered in the context of different languages and cultures[500]. Not all sentiments[1305] have polarity[24000]. For example, someone can legitimately express a sentiment[1305] of disinterest: "I really don't care what goes in Europe." The notion of polarity[24000] is used to express whether a given sentiment [1305] such as "frustrated" will be treated as positive, negative, or neutral in nature. Some embodiments may provide additional polarity[24000] options.

It should be noted that the sentiment[1305] of what we'll call "disappointment"[24040] plays a special role in this type of analysis, so most embodiments will implement it. By "disappointment"[24040] we mean a sense that whatever problem is being mentioned, the commenter[250] feels that he has this problem personally, and also possibly that he is in some sense being singled out for bad treatment and/or is worse situated than are the majority of his colleagues. This is a key distinction because members[290] react differently to unfavorable things based on whether they believe that it is "just how things are for everyone" or whether they believe that they are getting the short end of the stick for some reason.

Highly engaged employees may cite problem after problem because they are very focused on continuous improvement. A disengaged employee is less likely to frame thoughts as "problem and solution" but rather as a set of disappointments, violated expectations, or other negative emotions. As such, they are much likelier to use first person frequently—often singular but sometimes plural so as to make the view seem less individual—than are other commenters[250].

The disappointed[24040] comments often are focused more on the emotions of the author[250] than on whatever it is that is provoking that emotion. For example "I am very frustrated by the lack of adequate staffing in my area" and "I have personally witnessed issues due to understaffing" express a personal focus and so disappointment whereas "There does not seem to be sufficient staffing in many areas" is more of a clinical problem statement. (The reinforcement of 'I have personally witnessed' implicitly is conveying disappointment[24040].) While it is true that the latter may be a more polite way of expressing the former, the markers contained in the former should not be ignored when they are present.

In most embodiments, disappointment[24040] is thus detected via the use of first person and direct action verb in conjunction with negative polarity language. "I feel that we need more training" would not count as disappointed [24040], since the "I feel" is functionally superfluous. However, "Working 60 hours a week was not what I expected" would.

Figure 8:
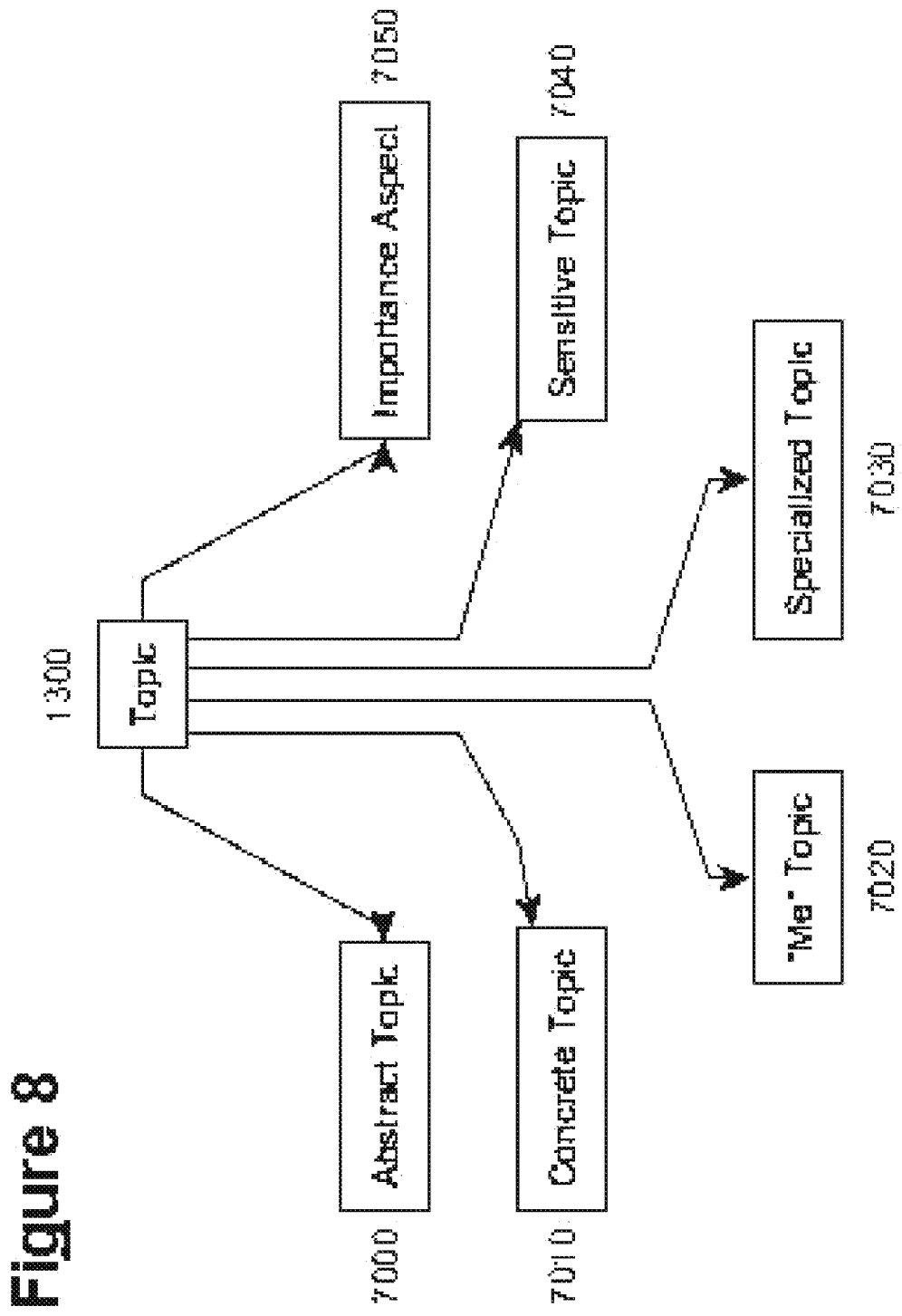
FIG. 8 is a block diagram of one embodiment of topic types and aspects.
Figure 9:
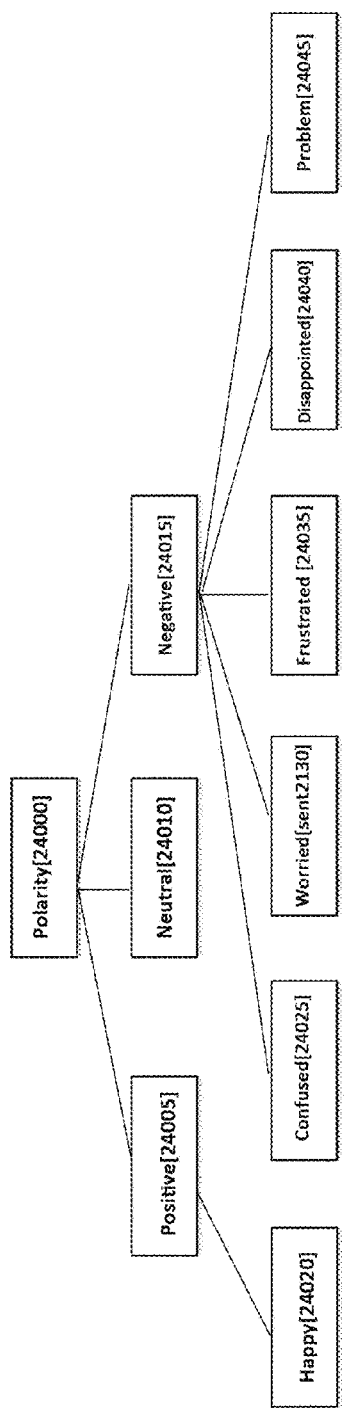
FIG. 9 is a block diagram of example sentiments that could be supported by the system.

While there is no fixed set of sentiments[1305], as indicated in FIG. 8, most embodiments will minimally have the following sentiments[1305] supported:

Happy[24020], or the expression of positive sentiments [1305]

Problem[24045], or the expression of a problem that asserted to be impacting the organization[200] in whole or in part; the author[250] himself may not personally be experiencing the problem or even have direct knowledge of it Disappointed[24040], or expression of a personal difficulty, directly experienced Neutral[24010], or a declarative statement without any meaningful positive or negative connotation.

Almost all embodiments will base their analysis of sentiment[1305] on the pragmatic intent[25010] of the author [250] rather than only doing the more standard analyzing of the polarities[24000] of individual words and phrases and whether or not they are negated. For example, an employee [320] stating "I often feel as if we are just rearranging the deck chairs" is effectively stating that leadership seems to have no plan to right a critical or even existential problem. Yet the statement directly mentions neither management nor a problem—nor does it contain any negative polarity[24000] adjectives.

Many embodiments will allow special identification of sentiments[1305] for specific topics[1300] including with custom post-processing. For example, if authors[250] reference leadership[440] more frequently as passive objects than action-oriented subjects, some embodiments would allow that to count as an aggregate sentiment[1305] of respect-negative. Further, normative and prescriptive comments also signal a negative sentiment[1305] in most embodiments, for example "It would be great if the onboarding training included a separate section on the BAX system." Such a statement is a polite and constructive way of suggesting that the training was lacking. Most embodiments' knowledge bases[1340] will contain a store of polarity[24000]-bearing metaphors taken from sports, movies, history, pop culture, etc.; some embodiments will try to machine learn such metaphors.

Almost all embodiments will adapt their strategies for detecting pragmatic intent[25010] to particular languages and cultures. For example, in some cultures, directly questioning the decision of a superior may not be considered acceptable behavior. Instead, perhaps comparative strategies are typically employed (e.g. "Other companies do X") or referential ones (e.g. "Last time this happened, we did X and were successful.") Such cultural knowledge resides in the system's internal knowledge base[1340].

It should be noted that some aspects of the above go well beyond the usual classes of sentiment analysis that are used on less complex problems such as consumer product reviews, movie and restaurant reviews, customer service requests and the like. This is because the relationship between a member[290] and his organization[200] is usually a complex, multi-faceted, interactive, ego-invested one that may span years. The member[290] has goals and aspirations for both the organization[200] and his role in it; the organization[200] likewise has goals and aspirations for its individual members[290]. These relationships are not just highly complex, but extremely important; for example, studies have shown that the relationship with an employer [210] of any duration is second in importance only to nuclear family ones.

Tone[1302]: We define tone as a property of text that, essentially, does not contribute content to the utterance [2600]. Unlike sentiment[1305], which is part of what was conveyed by the message, the tone[1302] is how the message is conveyed. In many embodiments, tone[1302] is assigned separately to each turn within a field (if present). For instance, in a survey[25015], tone[1302] will be assigned to each response to a question; in a forum or e-mail thread, tone[1302] will be assigned to each turn by most embodiments.

In speech, tone[1302] is often captured by para—linguistic features such as voice quality (e.g., loudness) or facial expression.

In text, tone[1302] is often captured by non-lexical cues. However, many embodiments will also use a combination of lexical cues and non-lexical ones. Non-lexical cues pertain to the form in which the message was delivered: uppercase letters, emoticons, non-typical use of punctuation marks, repetition of letters and/or words (e.g., 'I am sooo upset at my new manager'), including an unusual high number of typos or any other visually non-typical form of representation. Lexical cues include but are not limited to interjections ('wow', 'ugh'), discourse markers ('oh well'), parenthetical expressions (A: "When is the meeting?" B: "As I already said, it's at 2 pm"). Note also that these shall be treated by most embodiments as markers of tone[1302] if used syntax-independently—for instance the following two examples will not be treated equivalently:

"I'm upset at my new manager. Ugh!"
"Our new manger is quite ugh."

Whereas in (1) 'ugh' is used independently of the syntax of the main clause and so it is a tone[1302]-marker, in (2) it fills a grammatical role, it modifies the subject and it thus conveys the author's[250] sentiment[1305] towards the manager.

The current values for tone[1302] are marked—there is manifestation of lexical and/or non-lexical tone cues—and unmarked—no manifestation of either lexical or non-lexical tone cues. If marked, the tone[1302] could be either positive or negative. Other more specific values will be provided by some embodiments.

Most embodiments will also use the tone[1302] property (if marked) to detect sarcasm. Prior work on detecting sarcasm involves detecting conflicting sentiments[1305] assigned to a topic[1300]. However, since insiders' [270] beliefs[1290], attitudes[1295] and behaviors within an organization[200] are often quite complex, conflicting polarities occur fairly frequently (e.g., 'I'm quite happy with the company culture created by our director, but I do not like his recent redundancy policy'). Thus, most embodiments will assign a probability of sarcasm on the basis of a clash between the tone[1302] and the sentiment[1305] as shown in the table below.

| [114] | Tone: Marked | [115] | Sentiment    | [116] | Sarcasm |
|-------|--------------|-------|--------------|-------|---------|
| [117] | Positive     | [118] | Happy        | [119] | No      |
| [120] | Positive     | [121] | Problem      | [122] | Yes     |
| [123] | Positive     | [124] | Disappointed | [125] | Yes     |
| [126] | Positive     | [127] | Neutral      | [128] | No      |
| [129] | Negative     | [130] | Happy        | [131] | Yes     |
| [132] | Negative     | [133] | Problem      | [134] | No      |
| [135] | Negative     | [136] | Disappointed | [137] | No      |
| [138] | Negative     | [139] | Neutral      | [140] | No      |

Loud Talking[1283]: Loud talking[1283] refers to text that uses any method, lexical or otherwise, to emphasize its importance. Otherwise put, it makes use of both detected sentiments[1305] and tones[1302]. Depending on the medium, this can include the incorporation of emoticons, animated characters, or other graphics or audio clips. It includes any type of font treatment that is used to accentuate specific words or phrases including but not limited to bolding, italics, underline, color changes, or animation. It includes punctuation such as exclamation points and, in some contexts, such as surveys[25015] question marks. Repetition of words (e.g. "very, very bad"), phrases, or whole sentences, attitudes[1295] or beliefs[1290] is considered loud talking[1283], as is terse sentence structure (e,g. "Get. Off. My. Lawn.") Some embodiments may also consider curse words and the presence of highly negative surface markers as indicative of loud talking[1283].

Some embodiments will support speech input as well as text, using a speech-to-text converter, so as to make use of cues such the literal loudness of the person's voice. Likewise some embodiments will support video input, so as to capture facial expression and other body language and map specific movements to different polarities[24000].

loud talking[1283] is important because it is a means of conveying sentiment[1305] and degree of sentiment[1305], especially in populations who have limited vocabulary available with which to express themselves.

Attitude[1295]: An attitude[1295] in this document is the combination of a topic[1300] with one or more directly or indirectly expressed sentiments[1305]. For example, a corporate reorganization could be "ineffective," a new leader "disappointing," a new vision statement "inspiring" and so on. Attitudes[1295] can often be expressed in equivalent form as adjectives applied to the author[250] (e.g. "I am inspired", "I was disappointed")

Reason[1310]: A reason[1310] in this context refers to any clause, sentence or other expression that is written to provide support for an attitude[1295] that has been expressed, that forms part of the same discourse or narrative. Often, no reason[1310] will be provided by the commenter

[250]. Reasons[1310] are important for a few reasons. They provide input into the perspective[400] of a given author[250] and hence their credibility[410] in commenting about a given topic[1300]. In addition, the reason[1310] can actually further partition the attitude[1295] in some cases. For example, many commenters[250] may express displeasure with the management[440] over a recent set of layoffs. However, while some of these commenters[250] are displeased because too many people were laid off, other commenters[250] may be displeased because they believe that too much deadwood still remains. In other words, cases in which we have "attitude[1295] X because of Y" and "attitude[1295] X because of –Y" represent an important real-world special case that must be handled. Many embodiments will explicitly break attitudes[1295] up in such cases.

Belief[1290]: A belief[1290] is an expressed attitude[1295] in which the author[250] makes at least some attempt to explain the reasoning[1310] behind her attitude[1295], for example: "The new manager is bad because he is a poor listener." Another great example of this is in that criminal[220] or terrorist organizations[220], there will always be some contingent that believes that the current leaders are too quick to resort to violence, as well as a contingent who believes that they are too slow to do so. However, both contingents will express similar discontent over the leadership[440]—and indeed even about the same behavioral dimension. Yet the two groups have totally—and importantly—opposing views.

Specificity[22010]: Specificity[22010] is a property of a statement[22005] that bounds the number of possible valid interpretations of that statement[22005]. A statement[22005] which is optimally specific leaves no room for varying interpretations; every slot[22015] in the frame[1360] is definitively and fully occupied. In the default frame[1360]—when no specific frame[1360] currently exists in the knowledge model[1340]—all of the who, what, why, when and how slots[22015] would ideally be filled, such as in the following:

a. "By June 30, the accounts payable department must, by threatening to terminate services if need be, reduce the percentage of European receivables over $2M which are not paid in 60 days to no more than 15% so that we can reduce our borrowing fees by 8%"

This clearly states what must be done, by whom, with what outcome, and in what time frame. By contrast "It needs to be more fun to come to work" indicates a vague dissatisfaction, but with what or whom is unclear.

Relative to the internal knowledge model[1340], specificity[22010] involves referring to the lowest possible nodes[610] in the model[1340] to describes entities and other real world objects. Thus in some embodiments, the specificity score[120000] of a statement[1215] will be defined as M/N where:

a. M=sum(each available slot[22015] in the relevant frames[1360]×the value of what inhabits the slot[22015], and zero if the slot[22015] is empty)
b. N=sum(each available slot[22015] in the relevant frames[1360]×the value of the highest possible thing that is defined in the knowledge model[1340] that could inhabit the slot[22015])

Where the most specific possible entry for a given slot[22015] is assigned the highest score. For example, if the knowledge model[1340] defines a 5-tier hierarchy of bombs, the topmost of which is simply "explosive device", it might have a value of "1" where the most specific subtypes of bomb might have a value of "5", the exact scoring convention being left to the individual embodiment.

Informational Value[22020]: In a given context, certain attitudes[1295] and even beliefs[1290] are to be expected—for example, that a VP of Sales would publicly assert the superiority of his company's products on social media, or that employees express the desire for a higher salary. A key idea in the system is that such fully expected attitudes[1295] or beliefs[1290] have little individual information value[22020]. Otherwise put, while in instances such as the latter, it may be important to know the percentage of insiders[270] expressing a particular attitude[1295], the individual statements[22005] themselves do not warrant human review. Nor, for example, would anything, other than perhaps the statistic, be of interest to external analysts of the organization[200].

A statement[22005] is said to have informational value[22020] in most embodiments if it either or both has a sufficiently high degree of specificity[22010] and/or it reflects an attitude[1295], belief[1290], observation[1332] or actionable suggestion[1330] that in some way logically differs from the default expectation. It has a higher informational value[22020] if it is both highly specific and unexpected. For example, a company in which a noticeable number of employees said that they did not want to receive bonuses this year because they would prefer that the money be used to enable the company to be able to afford a particular thing X instead would be quite unusual—and quite specific as well—and so would have a high informational value[22020]. Conversely, a comment[1215] such as "Working here sucks" that is widely agreed with but absent any actionable complaint would have a very low informational value[22020].

By "unexpectedness" we mean simply that the statement[22005] is expressing a minority viewpoint and/or refuting a majority viewpoint. The extent to which a statement does this is its unexpectedness. Different embodiments may go about this somewhat differently, for example setting their own default thresholds for what counts as a minority viewpoint. However, it should be stressed that "minority" does not mean "unique"; in the above example, no unexpectedness value is lost if several or even dozens more people express the view that Asset X is worthless. It only starts to diminish at the point that the assertion would be considered common knowledge—or at least that the value of Asset X is being disputed is common knowledge. Because what is considered to count as "common knowledge" varies by use case, how exactly to handle it must be left to the discretion of the individual embodiment.

Most embodiments will implement the notion of information value[22020] because specificity[22010] and unexpectedness do not always go hand in hand. For example, if even a single credible insider[270] were to assert that "the value of Asset X is zero" the statement would be less specific than any of a number of statements that detailed different aspects of the value of Asset X, presumably assigning at least some portions a non-zero value. Yet, the less specific, contrarian statement[22005] in this case could have potentially higher real world informational value[22020].

In some embodiments, informational value[22020] also refers to any new element—a new word, phrase, concept, or relationship—being injected by an utterance[2600] that expands the content of the internal knowledge base[1340]. In most of these embodiments, words are scored lower than phrases, which are scored lower than concept or relationship; each embodiment is free to select its own scoring strategy. In practice, this is however very similar to specificity[22010], since the more specific an utterance[2600] is, the more likely it is to be accretive to the current knowledge model[1340].

Different embodiments may take different approaches in the computation of informational value[22020] as long as they implement the two-part approach of specificity and unexpectedness as described above.

Archetype[310]: An archetype[310] is formed if/when there are groups of authors[250] who share a subset of attitudes[1295] and/or, if available, beliefs[1290]. Such authors[250] could be said to be generally likeminded. In most embodiments, archetypes[310] will be created by clustering. The data fed into the clustering engine are of two types: author[250] demographics data[1225] (for example, title or function, level in the organization[200], tenure, geographic location, etc.) and extracted data (for example, attitudes[1295] and/or beliefs[1290]). Some embodiments may opt to first cluster the textual data, since not all archetypes[310] will correlate at all to demographic properties[420], especially given that the number of demographic dimensions[420] available is often quite limited.

In one embodiment, specifically for the purpose of handling a large number of features, an initial member[290] clustering pass is performed as follows: first, a member-feature matrix is constructed using as weight the frequency of topic[1300] matches and other integer features, the 0-1 value of binary attributes, and optionally some lexical similarity values such as term-frequency values of topical words or alternatively the distributional similarity values computed on the context surrounding each topical match. The member correlation matrix is computed and normalized from this member-feature matrix, then its dimensionality is reduced (both to speed up the rule mining algorithm performed in the next stage and to prune infrequent features) using a standard hierarchical agglomerative clustering algorithm, using e.g. as cluster distance the normalized sum of the correlations between all its member[290] pairs.

Most embodiments require more than one shared attribute[1295] or belief[1290] in order to form an archetype[310]; many will provide a threshold for the smallest number of shared attitudes[1295] or beliefs[1290] that can be considered for constructing archetypes[310]. Some embodiments may require that there be no directly opposing attitudes[1295] or beliefs[1290] within an archetype[310]. In such embodiments, the presence of a strong negative link will result in the cluster being broken into smaller clusters or pruned altogether if the resulting clusters would have too low a cardinality. Some embodiments will also similarly use observations and actionable suggestions.

Some embodiments may opt to only use beliefs[1290] as evidence for the construction of archetypes[310]; many embodiments will weigh shared beliefs[1290] more heavily than shared attitudes[1295.] Computing archetypes[310] on this basis provides a far greater degree of precision than merely tallying up simple sentiment[1305] by topic[1300]. To take a common example, most people in most countries express dissatisfaction with their elected officials. What is far more interesting is why, and with whom specifically they are discontented.

Suggestions[1325] play an important role in the interpretation of member[290] statements. As already noted, expressing an issue in the form of a suggestion[1325] can sometimes be a strategy for avoiding stating an awkward thing directly. Especially in certain contexts, such as surveys [25015], a non-specific suggestion is often just a means of venting and therefore can be used for sentiment[1305] detection—for example "Pay us decently!"

Actionable Suggestions[1330]: An important class of suggestions[1325] are actionable suggestions[1330]. These are suggestions[1325] of a specific nature that are almost certainly intended as constructive suggestions[25050] on the part of the author[250].

In order to be an actionable suggestion[1330], in most embodiments the statement must be all of the below:

Structured linguistically in the form of a suggestion. This varies by language, but in English, examples include "We could", "We might try", "We should", "If[x] were done," "[Y] could be improved by", use of imperatives "Change the [z} system so that . . . ", and so on.

Be specific enough to be actionable. For example "more training" clearly indicates a perception of a deficit in training but does not provide sufficient information to act upon (e.g. what type of training? For whom?) Different embodiments will handle these tests differently; some possible embodiments are discussed in the section on "Actionable Suggestions" including the use of frames[1360], Contain at least one statistically unusual clause, proper noun, or other component relative to the data available for the given target organization[200]. Suggestions[1325] that are very frequent within a data set are often not practical, tending to fall into the category of what could almost be considered slogans—for example "Keep all manufacturing for the [X] product line in the USA." Others are just tantamount to complaints, for example: "Double our pay!" In contrast, suggestions[1330] which are both specific enough to be actionable and real-world practical tend to be of fairly narrow scope—for example, "Relax the dress code for employees in rural locations so that they don't have to wear suits every day."

Pass tests for appropriateness of topic[1300] and tone [1302] as indicated by the particular embodiment.

Actionable suggestions[1330] are of obvious interest to employers[210] in their own right. They are also good indicators of engagement[460], because it is evidence of an employee[320] actively thinking of improvements. They are also interesting to outside observers, such as investors or intelligence analysts, because the fact that a particular class of suggestion[1330] is made with any frequency suggests potential weaknesses in the organization[200]. For example, if there are many suggestions[1330] about upgrading technical equipment more frequently, it can reasonably be inferred that the existing technical equipment is generally out of date.

Observation[1332]: An observation[1332] has the same type of content as does an actionable suggestion[1330], and the same constraints with respect to specificity[22010], but is not linguistically structured as a suggestion[1325]. Observation[1332] are simply statements of fact, at least fact as perceived by the given author[250]. They will often have neutral polarity[24000] accordingly. The informational value[22020] of an observation[1332] thus lies purely in its specificity[22010]. For example, the statement that "Many of the best people have left" has lower informational value [22020] and specificity[22010] than "All of the senior people who worked on the advanced prototype have left in the last 6 months and gone to our main competitor."

Textblock[21030]: Textblocks[21030] are snippets of text which are distinctive enough that even when repeated with errors or changes, they still retain their essence enough to be identifiable. In the system being documented in this application, textblocks[21030] are used to identify textual patterns of conformity and fear, to help identify phony posts [3100], and also to identify people who have been exposed to very specific types of content such as terrorist messaging.

Comment Group[1335]: In most embodiments, a comment group[1335] is a self-similar set of insider[270] comments where the self-similarity involves either or both the expression of shared attitudes[1295] and/or beliefs[1290].

Data Source[18170]

Most embodiments will accept a wide variety of data sources[18170] as input. Indeed, any channel or system used with any frequency by insiders[270] and/or which are likely to contain direct observations[1320] about the organization[200] and/or its members[290], and which are accessible, should be considered valid.

Figure 10:
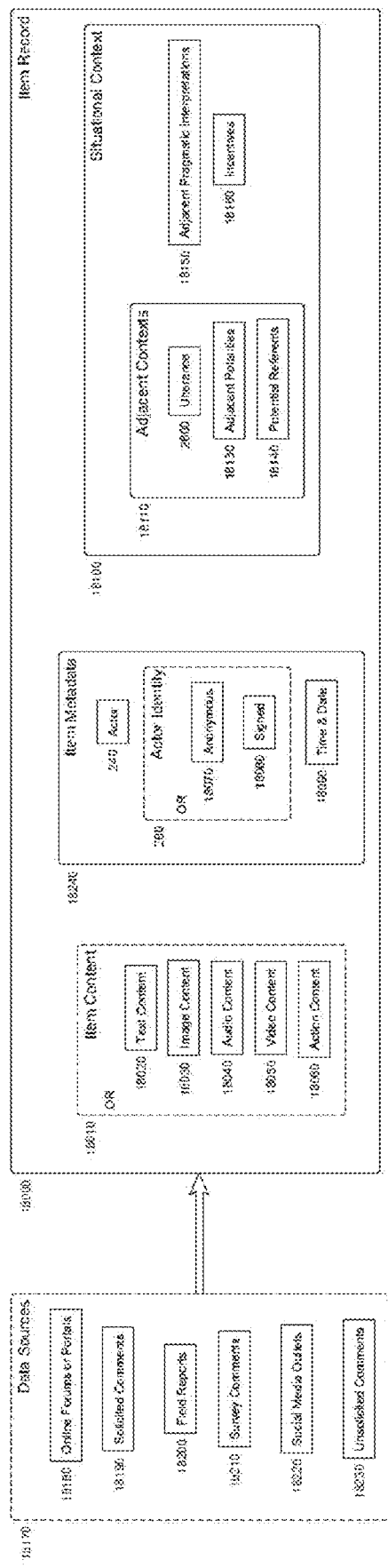
FIG. 10 is a block diagram showing example types of data sources and different modalities by which data can be communicated.

In the following two sections we consider the different types of data sources and the different modalities via which the data can be communicated. This is illustrated in FIG. 10.

Data Source[18170] Types

Most embodiments will take as input both data internal to the organization[200] and data external to the organization[200].

Data Sources[18170] Internal to Organization[200]

Some types of data internal to the organization include, but certainly are not limited to, the following:

Surveys: Any kind of member[290] survey, such as employee engagement[460] and satisfaction surveys[25015].

Member[290] Suggestions[1325]: data from any system that captures suggestions[1325] or ideas for improvement from members[290]

HR data: In the case of corporations[210], this includes but is not limited to employee[320] reviews, exit interviews, candidate follow-ups, candidate interview notes, leadership assessment interviews.

CRM, supplier and third party data: Any system in which non-member insiders[300] communicate with the organization[200] and/or with one another may contain worthwhile observations[1332] about the organization[200] is valid input. Some embodiments may also consider customer data, partner data and data from other types of outsiders[280] who have had some minimal contact with the organization[200].

Internal comment forums: Many organizations[200] offer portals and other mechanisms for their members[290] to voice their opinions on different issues.

Communications: Member[290] communications including but not limited to any kind of text messages, emails, voicemails.

Data Sources[18170] External to Organization[200]

These include, but are not limited to, the following:

Career sites[25030]: In the case of corporations[210], career sites that solicit reviews from employees[320] offer commentary that can be contrasted with internal survey data.

Industry/Special Interest portals & communities: Many industries have online communities in which members[290] of different organizations[200] talk to one another. Likewise, there are online forums for terrorists that are organization-agnostic.

Social media[25020]: There are two distinct types of social media data sources[18170]: signed[18080] and anonymous[18070].

Personal Blogs, Home Pages and Other Long Format Sources of Publicly Available Online Content Third Party Interview Notes: In some circumstances, members[290] and former members[330] may be interviewed by third parties such as media, researchers, and law enforcement. These notes should be considered valid input.

Data Source[18170] Modalities

Although the prevailing way of communicating information relevant for the organization[200] will often be by text, most embodiments will consider multimodal data captured via various communication modalities.

Most embodiments will consider data delivered via any combination of the following communication channels:

Keyboard: textual data and pictorial representations. This also includes pauses between the keystrokes, deletions, substitutions.

Audio: recordings of spoken messages, these could be monologues or could be interactions between one or more interlocutors.

Video: provides co-verbal behavior, which includes gaze, facial expressions, head and hand gestures, posture shifts, etc.

Touchscreen: multi-touch gestures or stylo-based input

The motivation for doing so is two-fold. First, many more interviews and other solicitations of data are being captured in video format these days. Likewise, terrorist and criminal organizations often make use of videos and images to spread their messages, and it is desirable to capture artifacts such as textblocks[21030] that if found in an author's[250] individual corpus[3000] may suggest exposure to these videos. Likewise, mobile technologies with multimodal interfaces are become more ubiquitous. Second, communication is more than words and a lot of insightful information is often expressed by non-verbal channels. For instance, tone[1302] is often captured by purely acoustic properties of the spoken message; a hand gesture can often deny a previously made statement.

The recognition of any of these modalities, if available, would happen via well-established systems for recognition (e.g., speech to text conversion) and if desired these can be optionally augmented with additional information which includes but is not limited to:

Speech properties: prosody, information-structural properties, disfluencies

Co-verbal behavior (gaze, facial expressions, body movements): properties relating to its form and meaning.

Multimodal Integration [27035]

Figure 11:
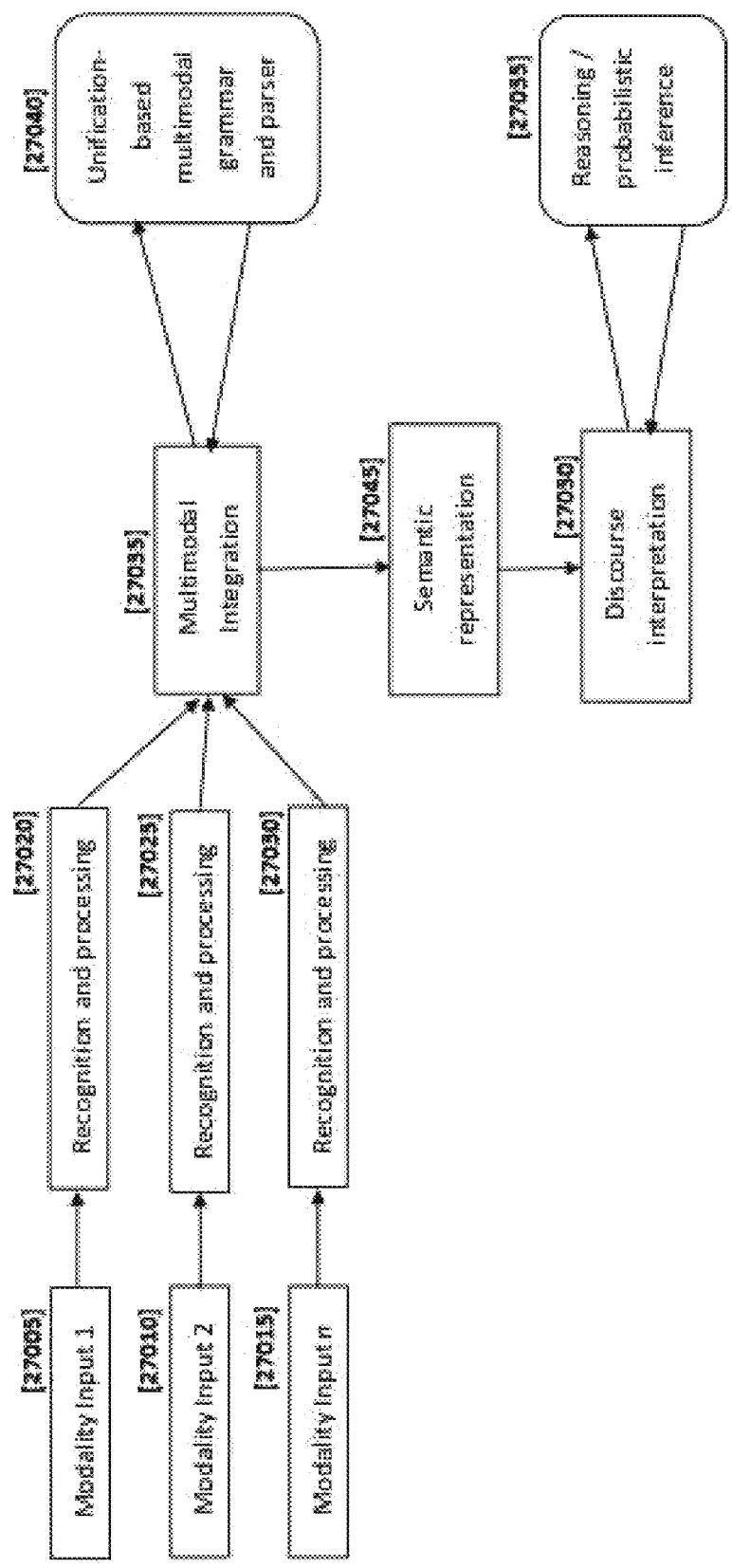
FIG. 11 is a block diagram of one embodiment of multimodality model.
Figure 12:
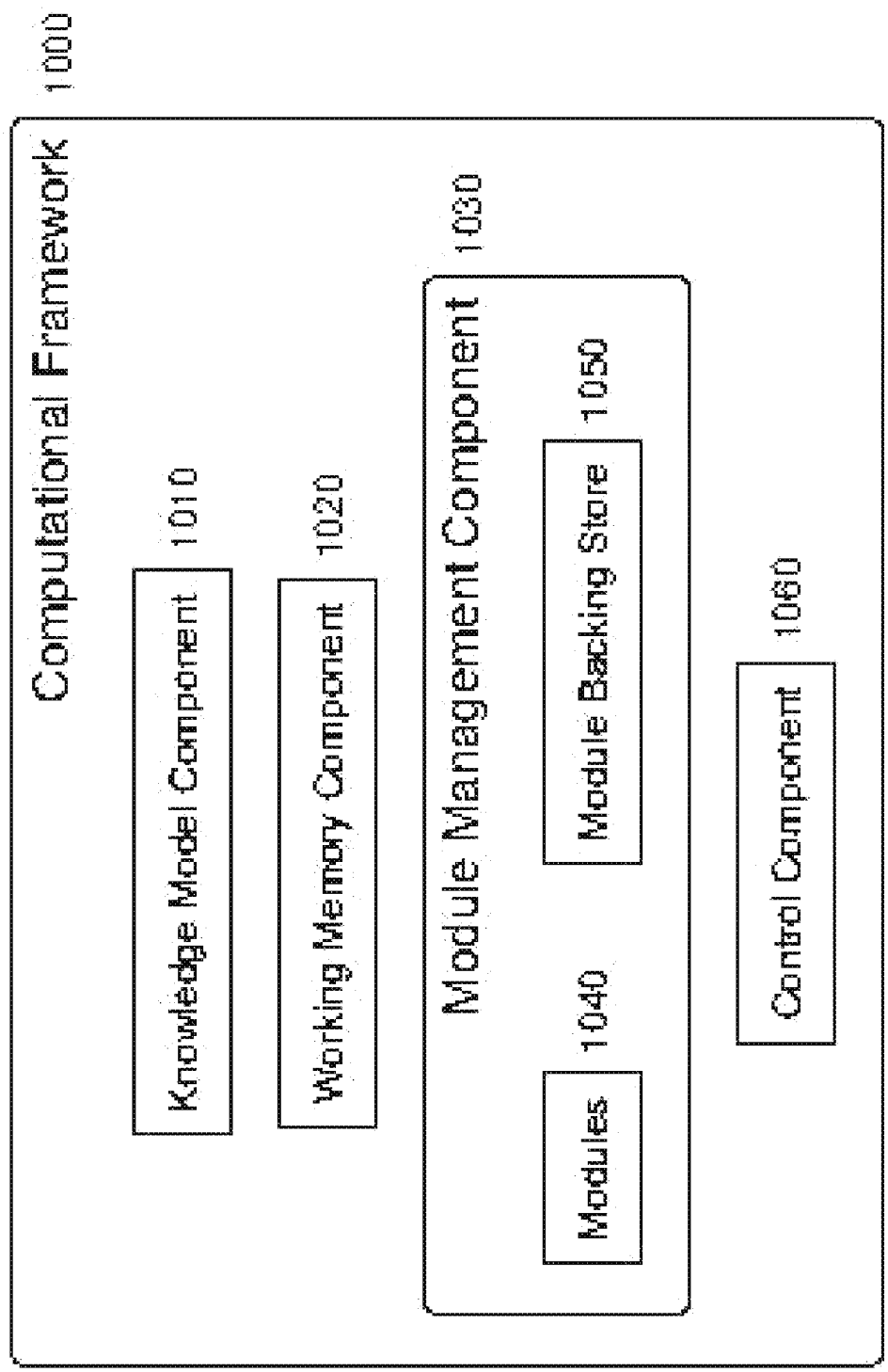
FIG. 12 is a block diagram which illustrates a system architecture for embodiments of the invention.

Integrating these multiple modalities into a single representation presents one of the main challenges. Most embodiments will take the novel approach of integrating the different modalities into a single parse tree that maps to a unified meaning representation. An embodiment of this is represented in FIG. 11. In particular, most embodiments will employ a unification-based grammar where any sources of input, say speech and gesture, are combined together within the multimodal grammar where the right hand side of the rul's te schema corresponds to the speech daughter and the gesture daughter (feature structures are introduced in the 'Computational Framework' section.)

A well-established approach to multimodal integration is to consider when one modality was performed relative to the other: if they happened within the same temporal interval, this means they are semantically related. In comparison, most embodiments will not only consider the relative timings but they will also consider purely linguistic features as constraints on multimodal integration. For instance, prosodic prominence is strongly correlated with gesture performance; change of the topic of the conversation is often signaled by a posture shift. To illustrate multimodal integration, let us assume an audio-video input containing the following multimodal message:

a. My BOSS is great.

b. Hand with a horizontal palm facing downwards waves to the right and left in a so-so gesture.

The data source recognition component would provide the following information: the prosodic prominent item is "boss" (indicated by uppercase), the speech phrase synchronous with the gesture is "my boss is great" (indicated by underlining); the form and movement of the gesture. A rule schema for integrating the multimodal content would look like this:

ParseRule [lhs: [overlap<#1,#2>pros: $^3$ content:<#4#5>]
  i. rhs: ([cat: spoken_phrase pros:prominence$^{\$3}$ content:#4 time:#2]]
  ii. [cat: hand_gesture time: #1 content: #5]
  iii.)
b.]

Note that this rule schema involves integrating a spoken phrase to a hand gesture under temporal and prosodic constraints: the former one involves temporal overlap between the two modalities and the latter one means that the spoken phrase should feature prosodically prominent element. The rule allows integration with an entire spoken phrase that also features the prosodically prominent word or with a single word that carries the prosodic prominence. The left-hand side of the rule which features the combined entity shows its content is done by appending the content of the gesture to the content of the speech—in this way, no information gets lost in composition and this can be further used for interpreting the entire multimodal action. Here for instance, the gesture neutralizes the positive polarity[24000] conveyed in speech. The whole multimodal phrase thus would receive a neutral polarity[24000] about management—an interpretation that can be only obtained by considering the semantics coming from the gesture and relating it with the semantics of the speech phrase.

Computational Framework

For the sake of consistency this section describes a reference framework which will be assumed when discussing the implementation of various system modules[1040], in a preferred embodiment. However, this is not intended to be restrictive; valid embodiments may use other implementation strategies that are equally viable. However, the implementation strategy chosen by an embodiment should have a method of implementing the general requirements laid out below.

The overall system implements a large number of diverse specialized modules[1040], with complex interwoven control strategies. In many cases the decisions made within and between modules[1040] are knowledge-driven, meaning that they are dependent on both knowledge that is contained in a knowledge model[1340] about factors including, but not limited to, the structure and characteristics of the target organizations[200], the behavior and characteristics of its insiders[270], and general heuristics concerning individual and organizational behavior patterns. In embodiments in which data is being continuously added to the system, such as data from public websites, various of the results will be refined or amended based on the arrival of new data. Even when a static data set is used, interactions between modules[1040] may also have the effect of causing previously calculated results to be refined or amended. For example in determining actionable suggestions[1330], early on possible suggestions may be identified based on syntactic and semantic structure, which later are further annotated or filtered out when aggregated data is available to be used to determine specificity, novelty, usefulness of the suggestions.

Therefore the computational framework in most embodiments has three main functions:

A central structured memory store, or working memory [1020], containing data objects which represent the state of ongoing computations, including the end results, partial or otherwise.

A core library and interfaces for registering modules [1040] and their interaction with the framework. For example all modules[1040] need access to working memory [1020], and need to be able to read and create data objects.

A control component for managing the modules[1040], i.e. their configuration, activating them when there is data available, maintaining any internal state if necessary. Modules[1040] interact with each other by reading from and writing to the central memory store.

This architectural pattern is commonly known as a blackboard system. In addition we define a second working memory[1020] area referred to as the knowledge model [1340]. An embodiment of the system may implement this as an area within the central memory store, or not. It is discussed as a separate system component in order to clearly distinguish between data objects representing external knowledge from data objects generated by the system during computation.

The structure of data objects in working memory[1020] is determined by modules[1040] at run-time. At a minimum these data objects should be able to represent sets of feature value pairs[2650], where values[2670] are either composite or simple. Composite values[2670] can themselves be a set of feature value pairs[2650]. Simple values[2670] represent conventional types such as Booleans, integer or floating point numbers, strings and so on. It is generally useful, but not strictly necessary, to have a wider range of value types, such as lists or arrays of values, fixed length tuples, sets, or number ranges in data objects. Most current high-level programming languages, such as Python, typically have dynamic dictionaries and arrays provided as built in types and minimally meet this definition. In the main embodiment, data objects are represented as feature structures[2640]. Note that feature structures[2640] are one of a number of composite value types, the whole set of these value types will be referred to as feature structure values[2640], as feature structures[2640] are the central type around which the others are organized. Feature structures[2640] and unification form the basis of many linguistic theories and computational linguistics systems for handling natural language, such as NLTK. The main embodiment additionally implements a type system over feature structures and related values, along with operations such as subsumption and unification. The type system and associated operations provide feature structures[2640] with several advantages for the computations required by the system. The use of feature structure values[2640] will be expanded on below.

The working memory[1020] implementation will be responsible for storing data objects in a way that allows for retrieval of the objects via pattern matching. Most embodiments will use pattern matching rules to decide when modules[1040] should be activated in response to addition of new data objects or changes to existing data objects in working memory[1020], though there may be additional criteria applied after matching. The minimal requirement for pattern matching is the presence of an empty value [2670] that can match against non-empty values. It is better if the empty value(s) can be typed, so that it will only match against values[2670] of the appropriate type. It is very useful to define a subsumption relation over data objects, as pattern matching can be defined as subsumption. In this approach, a pattern is just a data object, any object from working memory[1020] that it subsumes is a match for the pattern. Note that in this case an empty value [2670] (or its equivalent) is a value [2670] that subsumes all other values[2670] of its type. There will generally be an additional empty value [2670] type that subsumes all other values, generally called "Top". Implementation strategies for pattern matching abound, embodiments may use other strategies, so long as they can support the various operations described here.

The system must also deal with incomplete, ambiguous and uncertain data in a uniform manner across all modules [1040]. "Ambiguity" here means that a desired value may be one of (potentially many) different alternatives. Ambiguity in this sense is linguistically motivated. For example, a sentence may have multiple different parses, with one of them more likely to be correct given the surrounding context. "Uncertainty" refers to a value that is based on imperfect or questionable information. For example, an individual coming from a war-torn or impoverished area may not know their actual age; at best they will have an approximate guess. "Real world" data is obviously an initial source for all these issues. However, any and all of these issues may be encountered by modules[1040] during processing. For example, an initial syntactic parse for a sentence will likely contain several alternative analyses. In this case it is part of the design of the system, where downstream modules[1040] will eliminate possible parses as they derive their own results. Given this, the system will deal with external and internal sources of partial information, ambiguity and uncertainty in the same ways. Below we will expand these definitions for the main embodiment using typed feature structure values[2670], other embodiments will have to provide implementations of similar strategies. It should be noted that including uncertainty in results can greatly complicate computations, thus many embodiments may choose to ignore it by resolving such questions on intake of source data.

Incomplete data is by far the most common case, which will almost always be dealt with by the use of underspecification. The overall computational strategy is in fact to generate partial and ambiguous results and then perform additional computations to refine those results by winnowing down the possibilities. An empty value [2670] is also ambiguous in this sense as it can be filled in with any value [2670] of the correct type. However, the system often knows what form a complete result should take, even if it does not have concrete instances of all sub-parts of the result. The strategy used in underspecification associates this information with data objects containing partial results, essentially as additional constraints on the data object. Some specific methods for this will be described below. When other modules[1040] attempt to refine those partial results, they must check that the additions or modifications conform to the constraints carried by those objects. As noted above, ambiguity and underspecification are somewhat interchangeable. In some cases an ambiguous result, or a subset of the alternatives, may be collapsed down to an underspecified result, by replacing alternative values[2670] with an empty value. This may be desirable over generating a large number of different alternative results and forcing later stage modules[1040] to test against all of them. This collapsing should only be done if the data that would have been contained in the ambiguous forms can be generated by other means. In this sense underspecification can be seen as a form of lazy computation, where we may be able to avoid unnecessary work by waiting to see if other work later on can rule it out.

In some embodiments, such those that perform an ongoing monitoring process, modules[1040] will compute their results incrementally. The measures described above, while related and possibly useful in incremental computations, don't actually address the core problem. The question of incrementality becomes important when implementing data clustering or similar functionality. It is highly desirable for modules[1040] to be stateless, as any results derived for an incoming data item are then immediately available for other modules[1040] to work on. However in a process such as data clustering, we cannot simply update working memory [1020] for every new item that comes in. For example with data clustering, individual items may not be placed into clusters until new items arrive that are similar and a cluster can be formed, only then will a cluster be entered into working memory[1020]. This is one of the cases where modules[1040] need to retain internal state between activations, there is not always partial state that can be put into working memory[1020]. In other cases, specialized internal state may be important for efficiency reasons.

Data Representation

Figure 13:
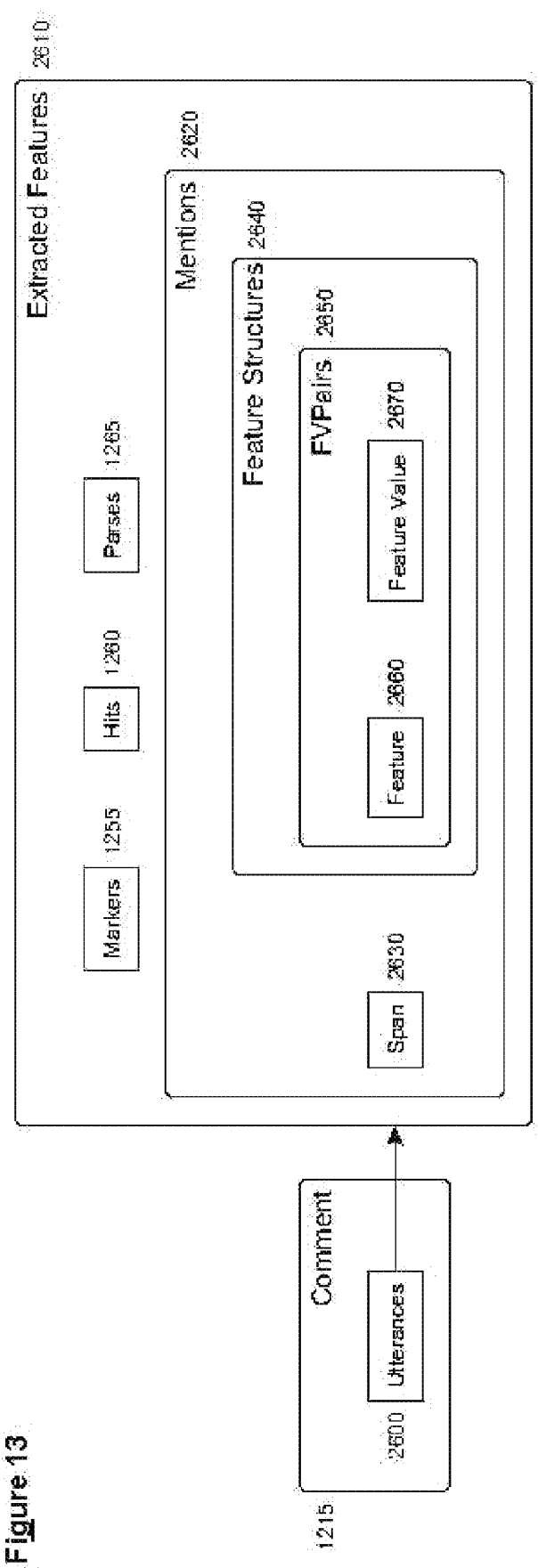
FIG. 13 is a block diagram which illustrates a feature model.
Figure 14:
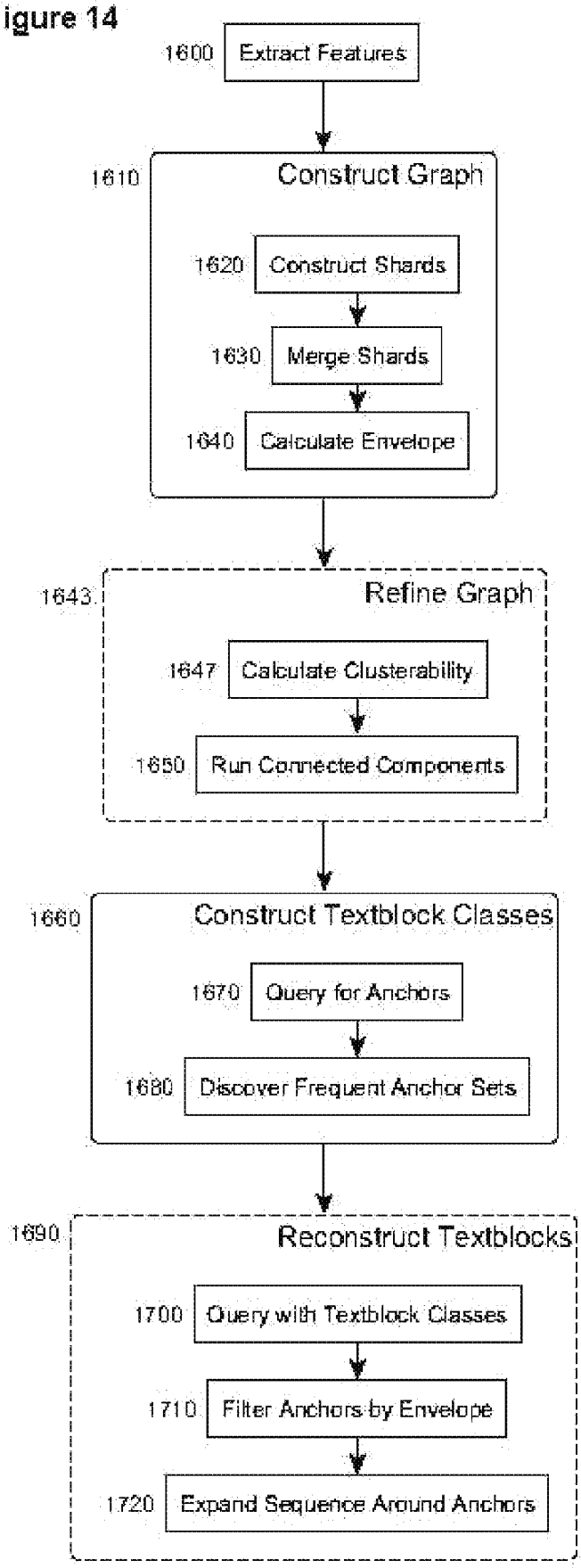
FIG. 14 is a block diagram which illustrates text block process flow.
Figure 15:
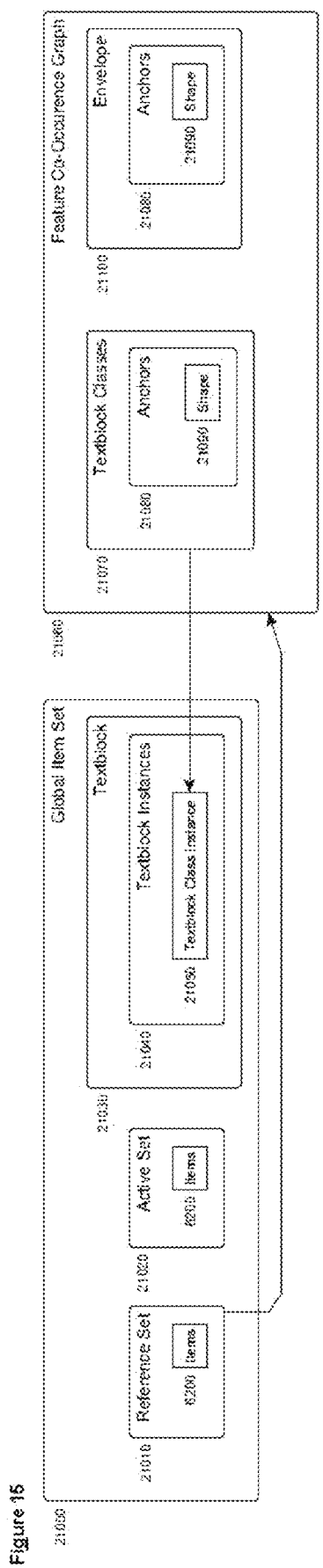
FIG. 15 is a block diagram which illustrates a textblock model.
Figure 16:
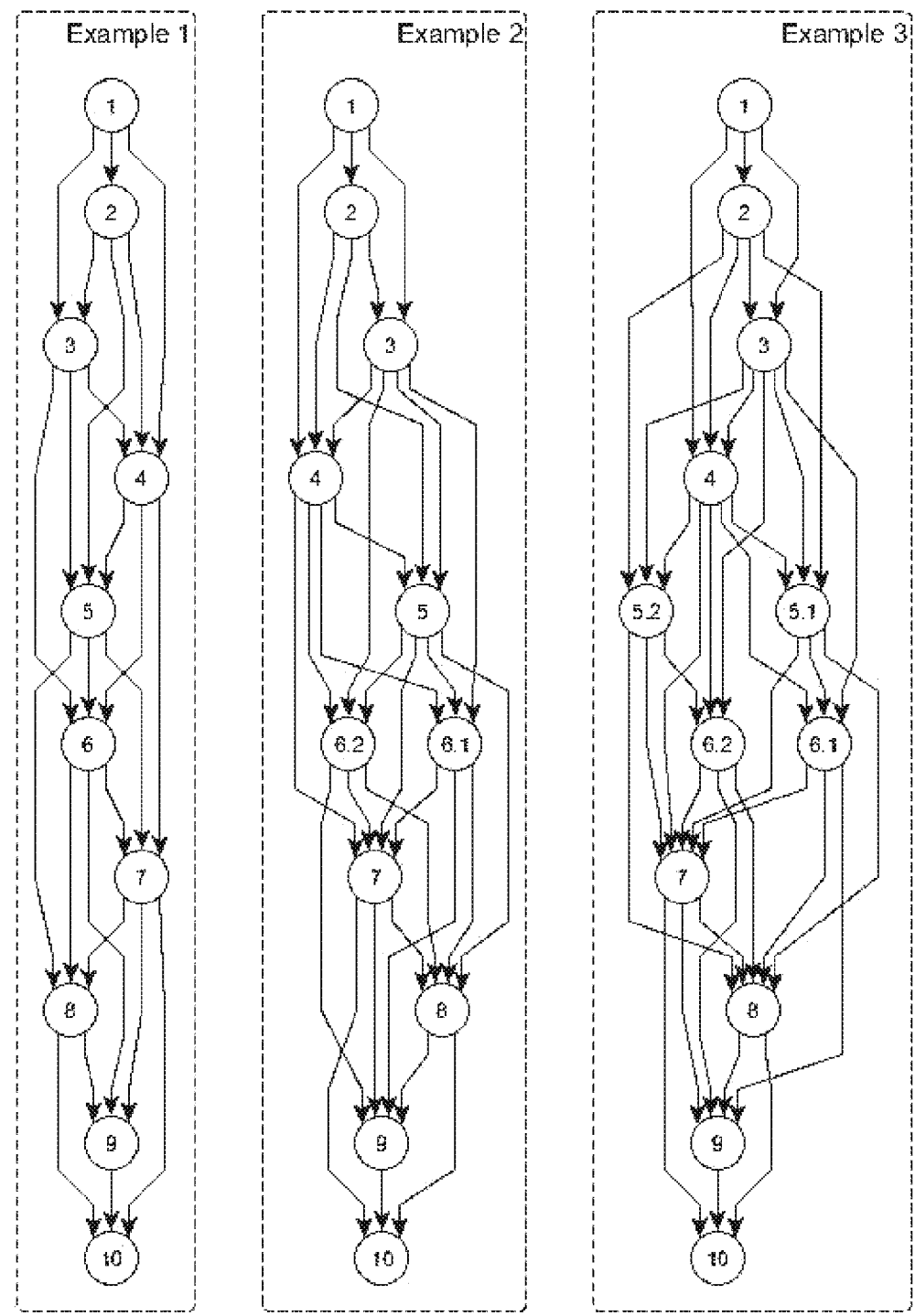
FIG. 16 is a block diagram which illustrates examples of how textblocks are detected.

A brief overview of feature structure values[2670], as shown in FIG. 13, is provided here to introduce basic concepts and the notation used in examples.

The basic feature structure[2640] is simply a set of attribute-value [2670] pairs, for example:

[cat: #NP agr: [number: #sg person: #3rd]]

In this case the example contains a nested value [2670] which itself is a feature structure[2640]. The value types that will be used in examples throughout this document are:

STRUCT, a feature structure: [a: 1 b: 2]
TUPLE, a fixed length list of values: (1 2 3)
LIST, a list of values[2670] of arbitrary length: <1 2 3>
CHOICE, a set of values: {1 2 3}
SYM, a predefined symbolic value: #symbol
STR, a string value: "string"
INT, an integer value: 1
FLT, a floating point value: 2.5

This is not intended to be a complete list, however these types occur quite frequently in the literature as "extended feature structures". Note that CHOICE will be used throughout to represent ambiguous values, where the goal of computations is to narrow the set of possible values[2670] down to a single choice. When a CHOICE value[2670] is narrowed to one choice, then it will be replaced with the contained value, e.g. a CHOICE value[2670] {1} will be replaced with the INT value[2670] 1.

Values[2670] in a composite type can be accessed by specifying a path. In the feature structures[2640]:

[cat: #NP agr: [number: #sg person: #3rd]]

the path @cat.number refers to the value[2670] #sg. For other composite types, paths can use the index of the value[2670] in a similar way, for example in:

[rhs: (#NP #VP)]

the path @rhs[0] refers to the value[2670] #NP. The CHOICE type is a special case, as the alternatives are not required to be ordered in any way. We will assume that each alternative is labeled in a way similar to re-entrancy and paths will refer to those labels.

Additionally feature structure values[2670] may be "re-entrant", meaning that the value[2670] appears in more than one location within a containing feature structure value [2670]. Re-entrancy will be indicated with a superscript of the form $^{\$N}$, for N a positive integer: [agr: $^{\$1}$[number: #sg] subj: [agr: $^{\$1}$]]

The superscript essentially labels a value[2670]. If the superscript occurs without a following value[2670], then it is labeling an empty value[2670] (see below). The set of values[2670] within a structure[2640] with the same label are unified (see below) into one value[2670] which is the value[2670] used at each location of the label. Re-entrancy is the key feature that distinguishes feature structures[2640] from other sorts of commonly used representations of data.

Because of re-entrancy, feature structures[2640] can be used in many different and quite powerful ways.

Each of the types described above has an empty value, which will be denoted with the type name, for example:
[number: SYM]
An additional type, TOP, is the root data type, including all possible value[2670] instances. Empty values[2670] are useful for the subsumption and unification operations as well as indicating the presence of a feature[2660] even if the value[2670] is not yet known.

Informally subsumption is defined as a partial order on feature structure values[2670]. If A and B are two feature structure values[2670], then A subsumes B, written as $A \subseteq B$, if the following conditions hold:

If A is a simple (e.g. atomic) value, then B is either an simple value[2670] of the same basic type and equal value, or A is an empty value[2670] of the same type, or A is a CHOICE where the relation holds for at least one of the values[2670] contained in A.

If A and B are composite values[2670] other than CHOICE and of the same basic type, then every path in A exists in B and for each path in A, the value[2670] retrieved from A subsumes the value[2670] retrieved from B.

If A and B are composite values[2670] and either one of them is CHOICE then the condition above is reversed, i.e. every path in B must exist in A, and for every path in B the value[2670] retrieved must be subsumed by the value[2670] retrieved from A.

If paths in A are reentrant the same paths in B must be reentrant (again reversed if either are CHOICE).

Basically if B is more specific than A then it is subsumed by A. The way to think of this is that a feature structure[2640]:
[agr: [number: #sg]]
only specifies the number, another feature structure
[agr: [number: #sg person: #$3^{rd}$]]
is more specific. The set of sentences that could be described with the first feature structure[2640] is a superset of the set of sentences that could be described with the second feature structure[2640].

There are several different schemes for type systems associated with feature structure values[2670]. The notation introduced here does not make a commitment to any of those schemes, rather it is intended to be able to talk about type in an informal way in examples. The type symbols introduced above are the basic types, in addition there are declared types, which are subsumed by one of the basic types. Declared types will be referred to with the typedef notation, for example:
Typedef ParseRule=[lhs: STRUCT rhs:TUPLE]
Defines the type ParseRule, all instances of that type must be subsumed by the value[2670] associated with the type. Different embodiments may use different schemes for deciding type-subtype relationships, including keeping track of the declared relationships separately from relationships inferred by subsumption. An instance of a declared type is indicated by immediately preceding the value[2670] with the type name:
ParseRule [lhs: [cat: #S] rhs: ([cat: #NP] [cat: #VP])]

Informally unification is defined as the combination of information from two feature structure values. If A and B are two feature structure values, then the unification of the two values, written as $A \cup B$, is the most general feature structure C such that $A \subseteq C$ and $B \subseteq C$. Most general means that there is no other feature structure value[2670] X such that $A \subseteq X \subseteq C$ or $B \subseteq X \subseteq C$. For example:
[agr: [number: #sg]]$\cup$[agr: [person: #$3^{rd}$]]
   a. is equal to [agr: [number: #sg person: #$3^{rd}$]]
When there is an inconsistency unification fails, as for:
[agr: [person: #$3^{rd}$]]$\cup$[agr: [number: #sg person: #$1^{st}$]]
   a. is equal to FAIL.
As TOP designates the topmost or most general value, FAIL designates the bottommost or most specific value. Note that re-entrancy of values[2670] in one of the two operands may require values[2670] in the other operand to be unified, in this way unification can be used to implement constraints on structures, for example:
ParseRule [
   a. lhs: [cat: #s]
   b. rhs: ([cat: #NP agr: [number: #sg]] [cat: #VP agr: [person: #$3^{rd}$])
   c.]
unified with:
[lhs: [agr: $^{\$1}$] rhs: ([agr: $^{\$1}$] [agr: $^{\$1}$])]
results in a value[2670] with the agreement features unified:
ParseRule [
   a. lhs: [cat: #S agr: $^{\$1}$[number: #sg person: #$3^{rd}$]]
   b. rhs: ([cat: #NP agr: $^{\$1}$] [cat: #VP agr: $^{\$1}$])
   c.]
When unifying over CHOICE values, the unification operation is tried on each of the alternatives, and the combinations that are not FAIL are retained. In this way unification can be used to winnow down ambiguous results, for example:
{[number: #sg person: #$3^{rd}$] [number: #pl person: #$2^{nd}$]}
unified with:
[person: #$2^{nd}$]
effectively eliminates one of the alternatives, leaving:
{[number: #pl person: #$2^{nd}$]}
which can be simplified to:
[number: #pl person: #$2^{nd}$]

Note that when two choice values[2670] are unified, in a logical sense, all combinations of alternatives between the two are attempted, which could result in a larger number of alternatives in the result. However if the values[2670] are similar, then often either the value[2670] on one side subsumes the other (as in the example above), or many of the resulting values[2670] are identical and thus only need be represented once in the resulting CHOICE value. In practice, there are implementation techniques that can shortcut these comparisons during unification. Nevertheless CHOICE values[2670] must be used with care. The most important point is that feature structure values[2670]+ unification provide a method for representing ambiguity that is completely orthogonal to modules[1040]. As long as module[1040] implementations use unification operations, ambiguity can be introduced and resolved at any point without modifying the modules[1040] themselves. This is an extremely useful property, in practice an embodiment may define multiple extended value[2670] types with the intent of embedding different control flow mechanisms within the general unification operation. For example, an embodiment may define a RANGE type for working with query hits (see below). The minimal set defined here is quite powerful as it stands, for example the TUPLE and CHOICE types used with re-entrancy could be used to provide AND/OR logic based constraints, similar to the constraint example above.

The requirements for underspecification described in the introduction essentially come for free in this model. Underspecification is simply the use of a more general instance that subsumes different possible results. The notion of carrying extra constraints along with an underspecified value[2670] can be implemented using re-entrancy techniques of the sort described above.

Different embodiments may choose to implement uncertainty in a variety of ways. The simplest way may be include floating point values in various data objects and require modules[1040] to explicitly update those values and/or pass them through to resulting data objects. However, this means that if even one module[1040] does not handle or pass uncertainty values through, the information may be lost. It is generally more desirable to embed handling of uncertainty into the feature structure value[2670] representation and unification operation. In this case there may be a check against the current certainty factors before reporting any results but otherwise no module[1040] needs to be aware that certainty factors are present unless designed to perform some additional manipulation of certainty factors. Valid embodiments may use methods including:

Create a value[2670] type, lets say UNC, that stores a collection of values[2670] where each value[2670] is paired with a certainty factor. When unifying 2 UNC's the uncertainty factors are updated by, for example, retaining the max of the 2 factors. Different certainty update methods may be needed depending on which computation the values[2670] are merged in. This is discussed in more detail below.

Modify the representation of composite value[2670] types so that each step in the paths describing the composite value[2670] can be labeled with a certainty factor (recall from above that each value[2670] contained in a composite object can be reached via a path). Modify unification and subsumption operations to use those factors.

Modify the representation of composite value[2670] types so that each reference to a value[2670] includes a certainty factor. A possible consequence of this is that no unification can ever truly fail; if there are conflicting values, the result is a set containing both values, each with a lower certainty factor. In this way every value[2670] becomes similar to a CHOICE value. A more conservative approach would be to evaluate unification as normal and then update certainty values for successful unifications.

The goal of these approaches is to make the handling of uncertainty orthogonal to other operations, so that the specific meaning and handling of certainty factors can be left to the discretion of the particular embodiment. However, as noted above, different updating rules may be required for dealing with different situations. One method for providing this used by some embodiments are to use an additional set of type annotations placed on a value[2670] that specify the update rule to use when a new value[2670] is created via unification. This is not without downsides—for example there is the possibility of type annotations clashing. However for our purposes it is sufficient just to show such a scheme is possible. For example, reusing the constraint example from above:

ParseRule [
  a. lhs: [cat: #s]
  b. rhs: ([cat: #NP agr: [number: #sg]] [cat: #VP agr: [number: #sg])
  c.]
unified with:
[lhs: [agr: $^{\$1}$UNC_MAX] rhs: ([agr: $^{\$1}$] [agr: $^{\$1}$])]
results in a value[2670] with the max values of the two agreement features from the first operand:
ParseRule [
  a. lhs: [cat: #S agr: $^{\$1}$[number: #sg]]
  b. rhs: ([cat: #NP agr: $^{\$1}$] [cat: #VP agr:$^{\$1}$])
  c.]

The purpose of this section has been to show a scheme whereby issues such as the introduction of ambiguity and eventual resolution can be handled in a way that individual modules[1040] do not need to explicitly implement functionality to handle it. The isolation of this functionality to feature structure values[2670] and subsumption/unification allows for these processes to be controlled by the declaration of constraints and rules in the central knowledge model [1340]. This also simplifies the description of the individual modules[1040] elsewhere in this document, if those modules [1040] need to directly participate (e.g. the parser generating ambiguous parses) it will be called out, otherwise it can be assumed that these processes are being resolved within the framework.

Knowledge Model Component[1010]

The knowledge model[1340] defines types, properties and interrelationships between the data objects needed for the computations performed by all modules[1040] in the system. Essentially this implements an ontology. In most embodiments, data objects will fall into one of several broad categories:

The class hierarchies that describe data objects in the system, both any instances used in the knowledge model [1340] as well as those written to and read from working memory[1020] by modules[1040]. The data objects used in working memory[1020] encode the state of various computations.

Axioms of the system, usually these are represented as logical propositions. Axioms tend to represent relationships between classes of objects and are not intended for any specific module.

Patterns associated with modules[1040] used to determine when new or changed data objects are available to trigger additional computation by a module[1040]. When data objects recognized by a module[1040] become available, that module[1040] becomes eligible for activation.

Constraints are generally specific to individual modules [1040] Constraints specify additional conditions that must be satisfied before some operation is performed. For example there may be additional constraints on the activation of a module[1040] based on its internal state. Constraints may also apply to internal operations performed by a module[1040]. The point is that these constraints are declared in the knowledge model[1340] to configure the behavior of a module[1040].

Rules may be specific to a module[1040] or used to govern the interaction between modules[1040]. Rules consist of condition, consequent pairs (i.e. if X then Y). Rules of this form are very general and can be used in roles including specifying syntax rules used in parsing, various data transformations, prioritizing the execution of modules and so on.

In the preferred embodiment all elements of the knowledge model[1340] are represented as feature structures [2640]:

A class is defined by a feature structure[2640], the class representative. The members of the class are all the feature structures[2640] subsumed by the class representative. The class name becomes the type of a typed feature structure [2640]. Thus the representation of the class hierarchy is achieved.

Pattern matching is simply defined as subsumption of typed feature structure values[2670]. Any typed feature structure value[2670] can be used as a pattern, and any other typed feature structure values[2670] subsumed by that object are considered matched by the pattern.

Axioms can be represented by typed feature structure values[2670], the exact scheme depends on how axioms are implemented; most embodiments will use a form of predicate logic. For example, the responsibilities at a given level of management might be denoted with a predicate of the form:
  a. Responsible(MGT_LEVEL FUNCTION).
  b. This predicate asserts a relationship between members of MGT_LEVEL and FUNCTION classes. There are two basic strategies for representing such a predicate, as a list or tuple value[2670] or as a feature structure value. Most embodiments will define classes to represent predicates, using the class name as the predicate name, ie:
  c. typedef Responsible (MGT_LEVEL FUNCTION)
  d. typedef Responsible[agent: MGT_LEVEL theme: FUNCTION]
  e. The axioms stored in the knowledge model[1340] will typically assert relations between classes of objects, rather than specific instances. However the classes will be more specific (i.e. the axiom must be a member of named predicate class), for example we could have instances:
  f. Responsible(First_Line_Mgr Assigning_Tasks)
  g. Responsible(Group_Mgr Mediate_Between_Groups)
  h. In order to be valid First_Line_Mgr must be subsumed by MGT_LEVEL, and so on. In this example, such a predicate might be used to check whether a statement agrees with the known responsibilities for different roles, possibly while determining an individual's perspective[400]. This checking can be implemented straightforwardly with unification. If an interpretation of a statement contains a more specific instance of the 'Responsibility' predicate, then it can be considered accurate if it is subsumed by one of the axiom instances in the knowledge model[1340]. In practice axioms may be more complex, representing inference rules, quantification over predicate arguments and so on. These can all be translated into feature structures[2640], keeping in mind how unification will interact with the representation.

Rules in their most basic form have two parts, a condition consisting of a set of tests and a set of conditions. There are many different forms of rules, for different purposes, for example context free grammar syntax rules consist of a left hand side symbol and a right hand side sequence of symbols, for example: S→NP VP (read as a sentence consists of a noun phrase followed by a verb phrase). Inference rules might consist of a left hand side that matches against objects in working memory[1020] and the right hand side represents a new object or objects to be placed in working memory [1020]. In some cases rules may have more component parts, for example in a continuous monitoring system rules might have the form: On EVENT If X then Y (i.e. an inference rule that is evaluated only if some external event occurs). Here we just note that rules can be translated into feature structures in the obvious way:
  a. Rule [on: EVENT if: PATTERN then: OBJECT]
  b. Where subsumption on EVENT and PATTERN values [2670] can be used for pattern matching, and OBJECT may be placed in working memory[1020] if they match. Note that the use of re-entrancy makes this representation much more powerful, for example we could write a syntax parsing[2410] rule in this way:
  c. Rule [
    i. lhs: S [subj: $^{\$1}$ pred: $^{\$2}$]
    ii. rhs: ($^{\$1}$NP[head: [agr: $^{\$3}$] $^{\$2}$VP[head:[agr: $^{\$3}$]])
    iii.]
  d. This is just an elaboration on the syntax rule example above. It still relates an S constituent to a sequence of NP and VP constituents. However, now the constituents are represented as feature structures[2640]. The rule specifies how we can build a feature structure[2640] representing a sentence during parsing, where the lhs value[2670] is the feature structure, constructed from representations of the NP and VP constituents. Furthermore the rule adds a restriction that the agreement feature of the NP and the VP constituents must unify with each other. During parsing, the parser will be able to apply this rule whenever it finds NP and VP constituents in sequence, by packaging them up in a feature structure[2640] [rhs: (NP VP)] and unifying it against the rule value. If unification fails, then it must look for some other way to parse the sentence. If unification succeeds, the parser can take the lhs feature of the resulting value[2670] as its representation of the sentence. This is equivalent to a common technique used in unification-based approaches to parsing natural languages (reference). There are many ways that such a rule can be structured, usually as a set of unification equations. For this example there might be 3 equations each describing one of the re-entrancies in addition to the original S→NP VP rule. The point here is that the use of re-entrancy allows complex rules with many parts to be mapped into a single typed feature structure value.

Textblock[21030] Construction

A textblock [21030] is a set of text sequences that can each be traced to an original base version. The process of constructing textblocks [21030] seeks to capture variations of this base version as generated by operations including:
  Edits to a text that create a successive version, edits include reordering text, deleting or adding relatively small amounts of text, replacing terms or phrases.
  Reuse of the base version as a template or boilerplate. In this case modifications will tend to occur in the same places across the different uses.
  Summarization or shortening of the text. In this case if the changes are too radical the chances of detecting such a version are low Note that the method described here does not attempt to determine which is the original, as this will require additional methods. This notion of textblock [21030] is distinct from grouping text sequences related by near duplication, fuzzy string matching and other such mechanisms. Textblocks [21030] are much more selective than the groups generated by these other methods.

Note that the text sequence in an individual textblock instance [21040] is nearly always a subsequence from a source document. The length can be as short as a phrase or utterance of at least several words up to a quite long sequence, though it is rare to see more than a few paragraphs as a text block. In most embodiments the subsequence will consist of a list of contiguous substrings with gaps between them. The subsequences are kept generally compact in order to maintain coherence of the textblock [21030] and as one of the guards against detection of spurious correlations.

General Method

At a high level the method proceeds via the following steps:
  Map item [6200] text content into a sequence or sequences of feature structure values [2640]. In the simplest case, say for a language that is highly word order dependent such as English, the values [2640] could just be strings corresponding to the tokens in the text. It may be desirable to use additional features [2640], such as parts of speech. In languages that are not as dependent on word order, features [2640] will be selected for their utility in later constraints. When working with multi language data sets, the system most likely need to be able to identify the language used in any sequence. This may be encoded in the feature structures [2640] themselves or via some additional data structure (i.e. a list of language, range pairs over the item contents).

Construct patterns, called anchors [21080], corresponding to distinctive sequences in a set of source items [6200] comprising a reference set [21010]. These patterns may be subject to additional constraints, for example that the underlying sequences correspond to valid syntactic constituents, such as phrases or clauses, of the language used for the sequence. Even in languages that are heavily word order dependent, the patterns will have to be flexible with respect to the ordering of sequence elements. There are multiple methods for achieving this, from building a set of patterns representing different orderings of the elements in the anchor pattern, to matching mechanisms that just rely on the co-occurrence of pattern elements within a certain distance.

Discover groups of co-occurring anchor [21080] matches that appear across multiple items [6200] of the reference set [21010]. Each of these groups define a textblock class [21070].

Query an active set [21020] of items for matches against the textblock classes [21070]. In order to match a textblock class [21070], an item [6200] must contain matches for the anchor [21080] patterns in the class. Depending on the method used for constructing the classes [21070], all anchor [21080] patterns may not be required. For example if the classes [21070] are derived through clustering, then any matched set of anchors [21080] that would fall within the cluster are sufficient. Some embodiments may use additional constraints on class [21070] matches. For example some embodiments may require that the anchor [21080] matches occur within a relatively compact region of the item's [6200] feature sequence, so that all the anchor matches are close together. Some embodiments may use a uniqueness constraint which requires that there be no (or very few) additional anchors from outside the class within the region that the class anchor matches occur in. The prior example of using cluster membership is one potential method of implementing such a constraint, as additional anchor matches may make another class a better match.

Reconstruct textblock instances [21040], i.e. the actual text sequences in the textblock instance [21040]. The simplest method is to report a contiguous sequence containing all the anchor [21080] matches in the class instance [21050]. However its desirable to include some additional elements from before and after the first and last anchors in the sequence. Since a textblock instance [21040] need not be contiguous a better approach is to include sequences of relevant elements surrounding the anchor [21080] matches. In some embodiments the same calculation used to identify distinctive sub-sequences can be used to recover relevant elements.

Embodiment

The main embodiment described here takes as a starting point the reference embodiment describe in the overall computational framework section. In the embodiments described here, the textblock process will be implemented in three separate modules. The first module constructs textblock classes [21070], i.e. it implements the first three steps in the process described above. The second module queries for class instance [21050] matches, and the third reconstructs textblock instances [21040]. The definition of the reference [21010] and active [21020] sets used in an embodiment depends heavily on the use case. When analyzing a static dataset, for example a single company survey, or a dataset that is added to at some interval, for example a dataset built on quarterly surveys, the reference [21010] and active [21020] sets might be defined as the same set, all items [6200] in the corpus. However, for example, in embodiments where there is ongoing monitoring of social media data sources in combination with survey data, the reference set [21010] might be the survey comments and the active set [21020] might be the social media comments.

Feature Extraction [1600]

In principle any feature structure value [2640] in working memory [1020] that describes specific terms (or specific subsequences) in the text can be used in the feature mapping stage. In most embodiments feature structure values [2640] will be created to describe sequences of word-level units called n-grams [1620] (a term in common linguistic usage). The goal is to expand the space of different possible values. In English for example, the word "the" is extremely common, and could therefore make it more difficult to spot distinctive passages, whereas a combination of terms, such as a 3-gram "the only large", will occur at a lower frequency. In general, the right level of specificity will have to be discovered empirically, as it is very dependent on which features [2640] are chosen to represent the text of an item. Note that while the notion of textblock [21030] is intended for natural language text, in principle any data that could be converted to a sequence of feature structure values [2640] could be used with this method. In addition, an embodiment is free to apply additional filtering to drop some of the features from the list, examples include:

Filtering feature structure values [2640] via pattern matching. For example if one of the features [2640] used is the part of speech for the associated token or tokens, it could be used to filter out function words and other non-information dense terms.

The use of text anchors. In English, for example, common function words such as articles, connectives, prepositions and so forth could be designated as anchors, then the module only maps feature structure values for a sequence of terms directly following those anchors. This has the advantage of easily identifying meaningful written text in content that may mix natural language with lists of numbers or other kinds of content.

Initial Construction of Graph [1610]

The embodiment described here approaches the problem as a graph problem. The approach uses an attributed, directed graph. This graph relates feature values [2640] generated from the last step via weighted edges. In most embodiments Edge weights represent simple frequency counts.

The overall strategy generates a graph that is biased towards building a recognizable type of shape [21090], the definition will be provided below, for distinctive sequences. The module implements an algorithm that can recognize connected groups of nodes that are similar to this shape. After constructing a graph that incorporates all items from the reference set, the module searches for instances of the shape [21090] that will then be used as the basis for the anchor [21080] patterns.

The graph is constructed by adding a set of edges for each feature structure value [2640] in an item's [6200] sequence. An edge is added from this feature structure [2640] to each following feature structure value [2640] within a set distance. In other words it's a simple sliding window.

This simple construction results in an easily recognizable shape [21090] when applied to a single sequence (Figure P, example 1). The shape [21090] will be recognized if the value of some measure over a connected set of nodes in the graph matches a target value. One such measure will be described below. In this case we can define a target value for this measure as the value obtained from applying the measure to an idealized graph, in this case the construction mentioned above as applied to a single sequence of values. A connected set of nodes is said to have the desired shape [21090] if the measure calculated for all nodes in the set fall within a range of the target value. Of course we are interested in the maximal sets that meet these conditions. The sliding window construction is chosen because of its properties when a graph is built over a large set of sequences. There are two fundamental cases, when two sequences are similar, say they diverge in one position, then the resulting graph will have two nodes with the same neighbourhood (Figure P, example 2). This has the effect of degrading the shape [21090] somewhat but it should still produce measurements that are close to the ideal shape [21090]. When the two sequences are very dissimilar, then they won't share any of the same vertices and will thus produce two distinct connected components in the graph, each of which is the ideal shape [21090]. If two sequences "cross each other" i.e. they share some of the same vertices then the shape [21090] will be degraded within a small region of the shared nodes, the width of the sliding window used when constructing the graph. When the same vertex occurs multiple times within a sequence this can cause the shape [21090] to loop back on itself, and where it crosses itself the shape [21090] property will similarly be degraded. The regions of the graph where the shape [21090] property is maintained represent distinctive sequences. The graph is weighted so that if we have a large number of highly similar sequences, and a small number of diverging sequences, we can still build a measure that recognizes the shape.

Note that the graph construction phase can be distributed and/or parallelized fairly easily. Graphs can be independently constructed [1620] over subsets of the data and then merged [1630], similarly to mergesort.

Refine Graph [1650]

Once the graph is constructed, it is refined [1640] by marking nodes that are part of a shape [21090]. Since the graph will be quite large, shape recognition must scale well. Ideally we would like a computation that can be performed with a bounded amount of work for each node in the graph.

One such measure is weighted clusterability [1640]. Clusterability of a target node is basically a measure of the interconnectedness of the set of all neighbors of the target node. A clusterability of 1 means that every node in the target node's neighbourhood is connected to every other node in the neighbourhood. The weighted version of this measure, normalizes the weights on edges in the neighbourhood to the maximum edge weight found in the neighbourhood. In other words if the maximum edge weight in the neighbourhood is 10, then a fully interconnected neighbourhood will have a weight of 10 on all edges in the neighbourhood. Also, note that when a node has a large neighbourhood, we can with a high degree of certainty reject as it will be extremely unlikely that the neighbourhood clusterability will match the target number. A node with a high degree will be at a site with a large number of variations and/or crossings with other sequences. Even if it were to match the target clusterability value, almost by definition its not part of a distinctive sequence.

Two related measures are the dilation and bandwidth of a graph. They are both based on numbering the nodes of the graph with distinct integers. The dilation is the maximum pairwise difference of head and tail of each edge in the graph. The bandwith is the smallest max dilation in a graph that can be achieved by renumbering the vertices. Note that in the simplest case (Figure P, example 1) we know what the bandwidth and max dilation, because of the construction method of the graph. Assuming that every vertex in the items sequence is unique, the max dilation is simply the width of the sliding window. When a divergent sequence is added as in (Figure P, example2), we know that the dilation is increased by 1. Similarly if a sequence that diverges in two locations is merged in, the dilation goes up by two. When a graph is computed over a large dataset the resulting graph is not going to be ordered this nicely, and calculating bandwidth is a known np-hard problem. However it will be possible to calculate the bandwidth on subgraphs representing distinctive sequences fairly easily. Because of the construction of the graph we can use a heuristic to choose a likely correct order. If we have assigned a node an index, say N, then the node in its neighbourhood that has the greatest overlap with node N's neighbourhood is likely the best choice. For any node, if there are multiple next nodes that satisfy this criterion, then number all of them in an arbitrary order. An algorithm to do this numbering would be implemented as a breadth first search, starting with the first node and adding and numbering any next nodes that satisfy this criterion when a node is expanded. Note that there may be multiple "first" nodes, i.e. nodes with no incoming edges. This is easily handled by entering the list as the initial state of the breadth first search. Some embodiments may choose to explore alternate orderings based on ordering choices made when multiple next nodes satisfy the criterion (this can be implemented by adding backtracking to the search). The notion of bandwidth will be useful when defining an envelope [21100] of additional nodes around the anchor component below. The algorithm will be modified to consider nodes that are outside of the subgraph. The search will be initialized with nodes from within an anchor however as each target node is examined, all nodes in the target nodes original neighbourhood will be considered, and those whose original neighborhoods, overlap the most with the target node's original neighbourhood will be used as the optimal choice. The envelopes [21100] of different anchors may overlap (in fact this is desired), so a union-find algorithm will be employed to merge envelopes [21100] when they are found to overlap. A further expansion of the algorithm is to consider edge weights.

In order to define the subgraphs mentioned above, we will simply run a connected components algorithm [1650] over the nodes that are designated as part of a shape [21090]. Each connected component represents an anchor [21080].

In a distributed version of the method, embodiments may use the bandwidth measure from above during the merging of subgraphs [1630]. The idea is that at early stages it is still feasible to compute (or estimate) bandwidth on the whole graph and this will allow for aggressive filtering of the graphs. There is an obvious relationship between bandwidth and the likelihood that a graph will end up matching a shape, as every time variant sequences are merged in the bandwidth increases. Therefore, at every merge of subgraphs, we calculate bandwidth and remove portions of the graph where the dilation is too large. The removed portions will have to be tracked with a blacklist which is redistributed to processes performing graph merges. When the graphs resulting from these merges are then merged again, it should still be feasible to calculate bandwidth on the merged graph, because of the aggressive filtering. In practice this would mean that the size of the graphs would be drastically reduced and therefore the computational cost of later steps will also be reduced. However this would come at the cost of maintaining a large blacklist to be redistributed to merging processes. In practice, the later stages are much more costly and therefore any delays inserted by maintaining the blacklist are merited.

Construction of Textblock Classes [1660]

Once the anchors [21080] have been identified, the textblock classes [21070] can be found. The first step is to be able to query [1670] item data based on the anchors [21080]. There are multiple strategies for converting these graph structures into search patterns. The most straightforward strategy is to simply use the subgraph as the pattern. The subgraph has a set of initial nodes as identified above, and a sequence that matches a path from a first node in the subgraph to a final node (e.g. a node with no outgoing edges), is considered to match the anchor. However, in practice we have found this to be more restrictive than necessary, and have obtained good results by allowing for a looser match. The most extreme example would be to collect all nodes in the graph into an unordered set and to match any contiguous sequence composed of elements from that set. One embodiment will use the envelopes [21100] described above to filter out some combinations of anchors. In this strategy, anchors [21080] that occur within an envelope [21100] are kept if they are adjacent in the item. This allows for some flexibility of ordering without completely eliminating constraints. Embodiments will choose a strategy for matching anchors based on their individual use cases.

The use of the reference [21010] and active [21020] sets will also be dependent on use case. Its valid to use either or both of the active [21020] and reference [21010] sets for building textblock classes [21070]. Most typically, the reference [21010] set will be used for discovering classes [21070] which are then later matched against the active [21020] set.

The construction process [1660] amounts to finding [1670] sets of anchors [21080] that frequently co-occur [1680]. In some embodiments, if a set of anchors [21080] co-occurs very frequently it may considered less interesting or of questionable validity and be filtered out. Embodiments can use any method that finds frequent, maximal combinations of anchors [21080]. One such method is frequent itemset mining with an algorithm such as Apriori. This is a well studied problem in data mining and there are many known algorithms. Another method is the use of data clustering. As a general rule, its best not to restrict the order in which the anchors [21080] occur. However an embodiment may choose to be more restrictive, and those restrictions will have to be incorporated into the algorithm chosen. For example, as noted previously, the anchor set will typically be constrained to be compact. However, some embodiments may allow for extreme cases where content from an original source is broken up and scattered throughout an item. A compactness criterion can be implemented by comparing the length of the total span, from the beginning of the first anchor [21080] instance to the end of the last, against the length of the matched anchors [21080] (with the intent of minimizing the size of the gaps between anchor [21080] matches).

Reconstruct Textblocks [1690]

Once a match [1700] for a textblock class [21070] is found, the actual textblock instances [21040] will have to be reconstructed [1690]. This is because the anchors [21080] only match the most distinctive snippets within a textblock instance [21040]. The remainder of the text that is conserved across the different textblock instances [21040] for a class [21070] will have to recalculated. In some use cases this may not be necessary, but if the textblock is to be displayed or further work is to be done with the whole of the textblock [21030] content a method is required for determining the additional text shared across members of the class [21070]. Embodiments may use several methods for doing this, from simply designating the entire span of text containing anchor [21080] matches as a textblock instance [21040], to more sophisticated approaches. One approach uses the expanded envelopes [21100] as computed using bandwidths above to expand on the anchor matches, including any part of the surrounding sequence that would have been matched by the envelope [21100]. Another approach would be to include parts of the sequence surrounding anchor matches that occur in other items matched by the textblock [21030] class. Another embodiment may use this approach with approximate of fuzzy matching to find similar sequences. The general idea behind these embodiments is that if material occurs throughout the items [6200] matched by a textblock class [21070], its validly part of the individual textblock instances [21040]. This material was simply not distinctive enough to have been returned as (part of) an anchor [21080].

Interpretation

In most embodiments, all the data objects computed for each actor[240] identified in input sources are stored in an actor dossier[1250]. In the preferred embodiment the actor dossier[1250] is simply a feature structure[2640] containing the computed values. Similarly all the actor dossiers[1250] are contained in an organization[200] object, which in turn contains all the computed values[2670] at an organizational level. Different sections of this document refer to aspects of the context, such as adjacent context[18110] or situational context[18100]. These can be thought of as simply descriptors for particular values; in a more general sense any and all the results computed can provide context for later computations.

Figure 17:
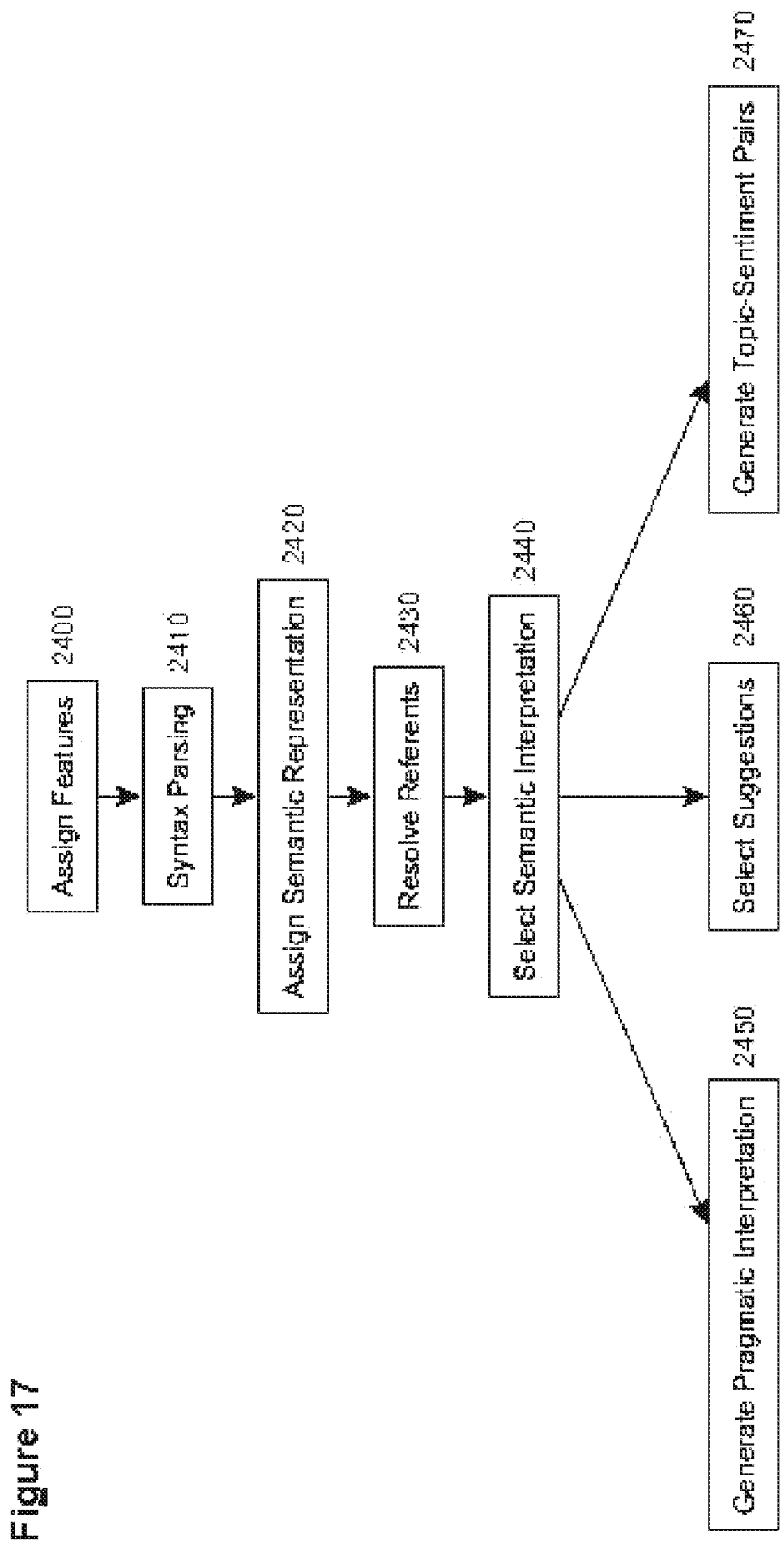
FIG. 17 is a block diagram which illustrates semantic interpretation process flow.

The general strategy, as illustrated in FIG. 17, is one of continual construction and refinement of results as different modules[1040] become active. In this sense, any results computed in an earlier pass that can be used to fill in missing values[2670] or add specificity to a value provides context. For example indexical expressions such as "I", "they", "its not very good" or even something like "the management" can potentially be resolved to some piece of contextual information. Obviously "I" will be dereferenced as the author[250] of the item[18000], but in some cases, such as comments[1215] taken from a public forum, the author[250] may not be immediately apparent and may only be resolved if the author[250] is identified elsewhere, "they" will likely resolve to a referent[2430] in a nearby utterance[2600]. Similarly, "it's not very good," if given as the answer to a question might be resolved to the topic[1300] that is the target of the question, the level of management indicated by "the management" may be based on both the author's[250] perspective[430], and matching the topic[1300] its used in conjunction with to general knowledge about the roles and responsibilities of different management positions in the knowledge model[1340].

The process of interpreting utterances[2600] for semantic meaning and pragmatic intent[25010] is central to the system as most modules[1040] are based on using these results. Even in cases where the overall semantics or pragmatic intent[25010] is not required it is important that this process be completed for the sake of resolving ambiguities, filtering out utterances[2600] that at a shallow level appear to be relevant to some module[1040] but turn out to be part of a larger unit or otherwise have a meaning or purpose that makes them invalid, and other similar issues. When describing the different stages of this process each will be described in terms of an available context, reflecting the increasing amounts of computed results that become available at later stages in the process. In some embodiments this process will be implemented by a series of modules[1040], one for each of the context levels described here.

The Parsing Context[1254]

The term "parsing" is used somewhat broadly here as it is meant to cover syntactic parsing[2410], queries in a form such as used in information retrieval, and the identification of simple keyword "markers"[1255]. The reasons for this are two-fold. First some modules[1040] don't need the full breakdown of an utterance[2600] provided by parsing [2410], meaning that in some embodiments parsing[2410] may only be attempted on utterances[2600] that pass some kind of pre-screening test, in order to save computational resources. Second, the authors may come at all perspective [430] levels depending on the organization[200] they are associated with (if insiders[270]) or the data source[18170] content is collected from. Data sets may contain everything from single word answers to abbreviated text messages to more formal and correct written language. In many cases authors[250] are providing text in more than one language, or in a specific language dialect. If the organization[200] spans multiple nations and/or is very large, the data set will likely contain a mix of all of these things. In this environment its useful to have fallback mechanisms that can be utilized to produce useful results even when a less robust mechanism such as syntactic parsing[2410] fails due to non-standard or "incorrect" use of language.

The first step in parsing[2410] splits text content into utterances[2600]. Conventionally an utterance[2600] refers the smallest unit of speech. It is a continuous piece of speech beginning and ending on a clear boundary and which satisfies some additional conditions for completeness. We use the term in a broader sense here to emphasize that the content may not always contain conventional, complete or well-formed sentences. However, the use of the term here retains the idea of being the smallest complete and useful units of text. Ideally, the system will be able to find sentences when they are present. In terms of implementation, standard approaches for identifying sentences can be used, but will likely have to be supplemented with other systems to cover a wider set of utterance[2600] types. Possible approaches that will be used by some embodiments include but are not limited to rule-based, and stochastic approaches such as maximum entropy models.

In some embodiments a parsing[2410] approach may be used that does not strictly require utterance[2600] boundaries, such as a shallow parser or a chunk parser. The reference implementation uses a dependency grammar based parser implemented so as to find maximal dependency structures in the input. The reference implementation uses a dependency-grammar-based approach as it is also well suited to languages with free word order, and is therefore more widely applicable than a constituency based system. These dependency structures need not cover the entire input; there may be gaps where no structure is assigned. This parser does not need utterance[2600] boundaries, but will use the information as additional constraints if it is available. The grammar rules are stored in the knowledge model[1340]. The parser produces results as feature structures[2640], with dependency links represented as individual features[2660]. The parser employs additional constraints used during the construction of dependency structures to add additional features [2660] used as the basis of semantic[1270] and pragmatic interpretations[1285].

Different embodiments may use a range of different text querying methods, the most straightforward being a query engine implementing Boolean text queries. A preferred implementation uses a query engine (discussed in U.S. Pat. No. 8,887,286 called CQE.) The CQE engine implements a superset of the simple logical operations (AND, OR, NEAR, etc. . . . ) implemented in standard Boolean queries. Note that the parser mentioned above is based on similar implementation method, and is in fact an extension to CQE. In order to be able to use $3^{rd}$ party ontologies, it is also useful to partially or fully generate queries from classes and relations between classes in those ontologies. The exact method depends on the ontology representation and the target query language, but at a very broad level, classes correspond to sets of equivalent terms (e.g. OR's) and relations specify logical combinations of such sets (e.g. AND, NEAR, etc. . . . ). In any event, whether represented directly as queries, or generated off of an ontology, queries are based on data objects found in the knowledge model[1340].

Markers[1255] are the simplest mechanism and need only lists of terms that fall under different categories. Matches for those terms are tagged with the categories the term falls under.

In fact this parsing step is one form of assigning a sequence of feature structure values[2400] to an item's [18000] text content. Several of the modules[1040] described in the system also call for performing such an assignment, for example in the textblock[21030] module. The exact representation used depends on the rules and constraints[1370] entered into the knowledge base[1340]. However, so as to be able to refer to these assignments, the term "mention"[2620] will be used. A possible structure for mentions[2620] used by some embodiments might be:

ParsingContext [
a. content: STR
b. mentions: [
  i. Mention [
  ii. range: (INT, INT)
  iii. markers: <(STR,INT,STR)>
  iv. hits: <Hit>
  v. parses: {Parse}
  vi.]]]

The range denotes a span in the item's[18000] text content that the feature structure values[2670] are associated with. Markers[1255] are represented as (term, X position, X category) triplets. "Hits"[1260] in the above example are a list of hit types appropriate for the query engine instance in use. Normally we expect only one resolved parse[1265] in a mention[2620]. However there may be ambiguity after the parsing stage, so it is represented as a CHOICE value. Any of these representations may become more complex if the representation of items is more complex. For example, if an item[18000] can contain several text content values, then the range feature[2660] will have to be augmented to also record which of those values the range is taken from.

The Semantic Context[1253]

Semantic Interpretations[1270] are formalized representations of meaning. In effect they bind an utterance[2600] to a representation of meaning that later modules[1040] in the processing sequence can work with. In most embodiments, the semantic context[1253] will include semantic interpretations[1270] for mentions[2620] in the parsing context [1254], an indexical context[1275] consisting of possible referents for indexical expressions, and loud talking[1283] scores for mentions[2620]. Loud talking[1283] is included at this level because it is a more complicated measure than just markers[1255] alone. In most embodiments, loud talking[1283] will use a combination of markers[1255] and query hits[1260], plus additional conditions to assign a score to each mention[2620]. In many embodiments, loud talking [1283] will also affect choices made in assigning semantic [2440] and pragmatic interpretations[2450].

As there may be interdependencies between these different structures, the semantic module[1040] must implement a strategy to avoid circularity, i.e. changes in one of these structures triggering changes in another of these structures which in turn triggers changes in the original structure and so on. One approach used by some embodiments will be to stage the construction of these structures, (i.e. wait until all parsing structures have been created, then create the indexical context[1275].) An alternate approach is to treat the construction of each of these structures as an optimization problem, for example minimization or maximization of some measure over the structure. For example, some embodiments may wish to minimize the set of resolved referents[1280] under an assumption that the authors' [250] comments[1215] are coherent, and thus more likely to be focused on a particular set of referents. In essence, this transforms the interpretation stage into a search problem. There are several strategies that could be used at this stage, ideally greedy strategies (e.g. out of all possible alternatives at any decision point, pick the one in which the construction is most optimal) will be used so as to generate the best results.

The indexical context[1275] consists of referents and can be constructed from multiple sources, ranging from the knowledge model[1340] to referents found in other mentions[2620]. A referent is a person or concrete thing that an indexical expression can point to. For example if a survey asks a question, "what is your opinion of the current benefits package?", the semantic representation of "benefits package" should be entered[2420] in the indexical context[1275]. Thus if an author[250] responds with "it's satisfactory", that referent is available as a target for "it". Not all referents are created equal. In this example, the referent provided by the question is more likely to be the correct referent for short answers. The conditions can become complex and will generally be encoded as rules in the knowledge model [1340]. Because of this, the entry for each referent in the indexical context[1275] will be a feature structure[2640] that may contain additional descriptive information to the referent itself. In some embodiments, when attempting to resolve an indexical expression, all currently available referents are scored and the best one is chosen[2430]. If more than one suitable referent is found, the alternatives can be entered as a choice, with the hope of being able to weed out alternatives at a later point[2440]. If, at a later point, new referents are added, then they are scored for all currently resolved indexical expressions. An indexical expression and the resolved referent[1280] set are updated if the new referent is found to be equivalent to or better than the current best referent[2430].

The generation of semantic interpretations is a large and complex topic. The mechanisms described here provide a basis for representing semantic interpretations and a framework for resolving their final form. Typically the semantic form consists of predicate calculus expressions, called logical form. A simple logical form proposition for "salaries are good" might be:

good(salary)

Which could be encoded in a feature structure[2640] as:

[pred: #good arg1: #salary]

This of course begs a lot of questions, for example what are appropriate predicates, what is the correct representation for "salary" and so on. The only thing this example seeks to establish is the general scheme for encoding LF statements in feature structure values[2670]. Logical form typically has to deal with quantification. For example, for "all the salaries are bad", the logical form in many embodiments would look like:

$\forall(X)$ (salary(X) & bad(X))

Encoded as:

ForAll [
 a. var: $^{\$1}$
 b. expr: And [
  i. arg1: [pred: #salary arg1: $^{\$1}$]
  ii. arg2: [pred: #bad arg1: $^{\$}$]]]

Whatever the representation of meaning used, it will be generated during the parsing phase, as a feature of the parse results. Typically it will be underspecified, as the system may need to select referents for indexical expressions and elsewhere. Ideally the semantic representations should be designed so that when unifying a referent into a semantic representation, unification will fail if it is an inappropriate form. For example, predicates may require certain types in their argument slots. In this way, selecting a referent[2430] can winnow down the set of possible parses and semantic representations. This unification should be non-destructive, i.e. the original feature structure values[2670] generated in the parsing context[1254] should not be modified, rather new values[2670] should be placed in the semantic context [1253].

The Pragmatic Context[1252]

The module[1040] associated with this context[1252] is based on a theory of discourse structure for organizational psychology related domains. This theory defines pragmatic intent[25010] as being driven by incentives, and in effect an expression of those incentives. The theory includes definitions of the different incentives, the pragmatic intents [25010] by which they can be expressed, and strategies by which the intent can be signaled. The components of this theory are heavily influenced by both national and organizational cultures as well as language. Therefore, in most embodiments, multiple versions of these theory components will be encoded in the knowledge model[1340] via classes, constraints and rules. Which version or versions of the theory that apply will be determined by pattern matching against demographic data[1225] for the individual author [250]. If there is insufficient data, most embodiments will apply a default version based on factors such as which national culture and language combination are most prevalent in the given dataset. Other embodiments might group actor dossiers[1250] for which there was a clear choice of national culture and language and then for each of the leftover dossiers[1250] find the group to which they are most similar and apply the culture/language theory for that group. The implementation approach in most embodiments will be similar to that of clustering, e.g. define a centroid for the group or select a representative member, and then determine similarity scores against that set of centroids/representatives.

First the semantic interpretations are arranged in discourse chunks. Of course the definition of the form of these chunks is heavily theory-laden itself. For our purposes, chunks will be determined by a combination of recognition of chunking strategies (for example, an author contrasting a positive state of affairs with a negative one to intensify the negativity of the latter), and focus towards a particular topic[1300] or point. Each chunk will be focused around the expression of a topic[1300], and include interpretations that are either relevant to that topic[1300] or can be recognized as part of a chunking strategy. In most embodiments, chunking strategies can use elements from all levels of analysis of the content, from the presence of markers[1255] to sequences of semantic expressions. This reflects human competence in recognizing pragmatic intent, and is based on learning to recognize common patterns and strategies for expressing a point. In most embodiments, the recognition of these elements will be driven by pattern matching over subsequences of feature structure values[2670] ordered by the text ranges that they are anchored to. In most embodiments, the pragmatic interpretations[2450] stored for this context[1252] will consist of at least the elements used in a discourse chunk, and an assigned pragmatic intent. The interpretation structure may also include information that was generated during the phase such as incentives detected and so on.

An example of this could be something like: "I love working here" "the salary is great" "however the hours are too much for me to stay here". A common pragmatic pattern is to attempt to soften the blow, while the actual intent of the comment[1215] is to say that the member[310] is thinking of leaving. In this case, the chunk is built around the "leaving" topic[1300]. The discourse strategy employed is a common pattern, and thus the above can be correctly recognized as a single discourse chunk.

The Analytic Context[1251]

The module or modules[1040] triggered by the analytic context[1251] are responsible for constructing the final belief[1290] objects as well as the results including: perspective[430], suggestions[1325], actionable suggestions [1330], observations[1320] and credibility[410]. In most embodiments, any results that require fully developed semantic/pragmatic interpretations are placed here.

Beliefs[1290] are mapped from pragmatic interpretations, as a function of the contents of the discourse chunk and the pragmatic intent[25010] defined. The discourse strategy chosen by the author[250] will govern how this mapping occurs. In most cases a new version of the central topic sentiment statement will be modified according to the transformation defined by the pragmatic intent. If there are multiple belief[1290] candidates, they will be handled in a manner determined by the discourse strategy. In this way redundant and secondary belief[1290] objects will be left out of the final representation.

The Actor Dossier[1250]

Finally at the level of the actor dossier[1250] the individual level scores are calculated, including: perspective [400], engagement level[1375] and energy level[1380].

Most embodiments will utilize the notions of context both at the medium level and at the immediate discourse level. The former is used as an input to sincerity[3060] scoring in many embodiments, and in certain instances also for sarcasm detection. The latter is often needed in order to make sense of the statement[1215] in the first place.

Situational Context[18100]

Most types of media provide a context that will influence author[250] behavior and/or influence whether the author [250] turns up to comment at all. Some examples of this are indicated in FIG. 3. Different media have different imputed audiences or readers who have different contexts and agendas. This often has the effect of creating quite different incentives in different media. The incentives associated with a given medium inform the author's[250] pragmatic intent [25010].

Most embodiments will thus allow the assigning of either/both incentives and likely pragmatic intents[25010] to specific types of media. For example, a "me" comment in an employee engagement survey[25015] will be interpreted by most embodiments to have the pragmatic intent[25010] of hinting—and, as such, will be further interpreted as having a negative polarity[24000] sentiment[1305] on the relevant topic[1300] (e.g. salary, benefits, career advancement, job security etc.) Likewise, someone who has just completed a job interview for a job they really want may post to social media about how great it was—in the full knowledge that these days, many employers[210] will look at how candidates behave on social media and be appropriately flattered.

Many embodiments will apply a positive weight to an actor's[250] sincerity score[3060] if their commentary on a given media runs counter to the incentive that is the actor's likely target based on the combination of detected sentiment [1305] and topic[1300]—and the media in question. To take a generic example, a blatantly self-promotional statement [25035] such as "I am fabulously handsome and extraordinarily successful" on a dating site profile is less likely to be sincere (in the sense we are using the term in this document) than a more modest statement such as "I am down to earth and am financially stable." In certain very specific cases, a statement that runs clearly counter in sentiment[1305] to the particular media in question will be tagged as an expression of sarcasm—for example "I just love working at [Discount Store Chain]" on a website named "IHateWorkingInRetail.com"

Adjacent Context[18110]

The various data types—survey[25015] responses, comments on the web, comments on forums etc. can be hardly understood if interpreted outside the context in which they occur. This is what we refer to as the adjacent context [18110]. Almost all embodiments therefore employ a discourse processor to interpret the survey response or the review comment.

The adjacent context[18110] includes, but is not limited, to any of the following:

Question about a specific topic: "How would you comment on the organisation's leadership strategies?"

Question containing a specific topic[1300] and a default polarity[24000]: "What leadership decisions do you like best?"

Question that doesn't contain either a topic[1300] or a default polarity[24000]: "Do you have any comments?"

Questions containing a default polarity[24000]: "What do you think Acme Corp should start doing?" or "What are the pros of working at Acme Corp?"

A short field such as "Pros"

Another comment on some kind of forum: e.g., A: "Acme Corp is a great place to work" B: "I don't agree with that".

The sentence(s) within the adjacent context[18110] is passed through the syntactic and semantic parser and the produced logical form is the context necessary for interpreting the response. The logical form can include the topic or the default polarity[24000] or both of them or neither. Pronouns, unrealised arguments are all left underspecified. E.g., the logical form generated from (2) would look like this:

a.   like   (you=?,x=?)   &   polarity=Happy   & topic=leadership_decisions

There are two main pieces of information that are left underspecified—the agent of liking and the theme of liking.

Further, the response itself gets passed through the syntactic and the semantic parser, the output of which gets added to the discourse model. Suppose the answer to (2) was "I like best the environmental decisions", the discourse model gets updated with the theme of liking ("environment decisions") and the agent (here the agent is again an anaphoric reference. This gets mapped to the demographic information about the author, if any). The topic[1300] and the polarity[24000] remain unchanged.

The default polarity[24000] can get overwritten by the subsequent discourse segment. Suppose the answer to (2) was "None", this would update the default polarity[24000] to a negative one.

"Adjacent context"[18110] can also include quantitative information provided by the user. For instance, a comment such as "Because of the product's quality" in response to "Please provide the reason for your score" will be interpreted based on score provided by the author.

The Importance of Insiders[270]

In this invention, the term "insider" has a very different meaning from the legal use of the term, which refers to someone within the sort of inside knowledge that only corporate officers and a small number of other employees possess, such as the likely outcome of a large lawsuit, or the expected earnings results for the quarter. For our purposes, we are interested in identifying people who have significant insight into the organization[200] and its leaders[440] generally, as opposed to having knowledge of specific tightly held pieces of data. Such insight is not only be to found with people at a certain level in the organization[200] but indeed may reside with anyone observant even at the lowest tiers of an organization[200] who has the ability to make direct observations about the organization[200] on an ongoing basis. Further—and somewhat paradoxically—those at the top of an organization[200] do not always have a good understanding of the organization[200] or how it is evolving.

The notion of "insider" should be understood in this context only as an initial filter, specifically to filter out people who do not have the ability to make observations [1332]—and hence also predictions—about a given organization[200] based on direct, ongoing experience with it. Of course, most insiders[270] under this definition will not make good use of the access they have in order to make thoughtful analyses. In order to do so, they must have sufficient perspective[400] to correctly interpret that which they are able to observe. Additionally they must have sufficient interest or motivation—what we will refer to as energy[1380] to state their observation[1332] as well as any conclusions, predictions, or suggestions for improvement [1330]. Thus at least two further levels of filter are applied, though the latter is a de facto one; the unmotivated member [290] may simply stay silent. Further filters, such as apparent objectivity will also be applied by most embodiments, so as to filter out highly emotional statements that are frequently low value.

Thus, the number of what we may term "worthwhile observers" or credible insiders[8010] for any organization [200] will be a fraction of the total number of its insiders [270]. In most embodiments, this is realized by selecting a threshold of credibility[1317] above which the insider[8010] will be deemed credible[1317]. Of the rest, many may make comments, but the informational value[22020] of these comments will generally be limited—for example, it is no surprise that employees[320] would like a higher salary. Likewise, most embodiments will assign an information value[22020] to the actions taken by members[290], such as choosing to stay in the organization[200] or leaving it, the informational value[22020] of these actions[1220] depending at least in part upon the perspectives[400] of the members[290] in question.

Such an approach is necessary to avoid treating all commentary and actions as equivalent when they are anything but. While it may at first blush sound unreasonable to consider a foot soldier or a minimum wage employee as an "insider," such individuals not only have the opportunity to observe, but are directly impacted by—and hence are very interested in—things like supply chain problems, reduced cash flow, and leaders at different levels who are not internally respected. Likewise, for example, certain individuals at partner companies can observe when the payment of their invoices slows, and the behavior of a corporation starts to become erratic.

Figure 18:
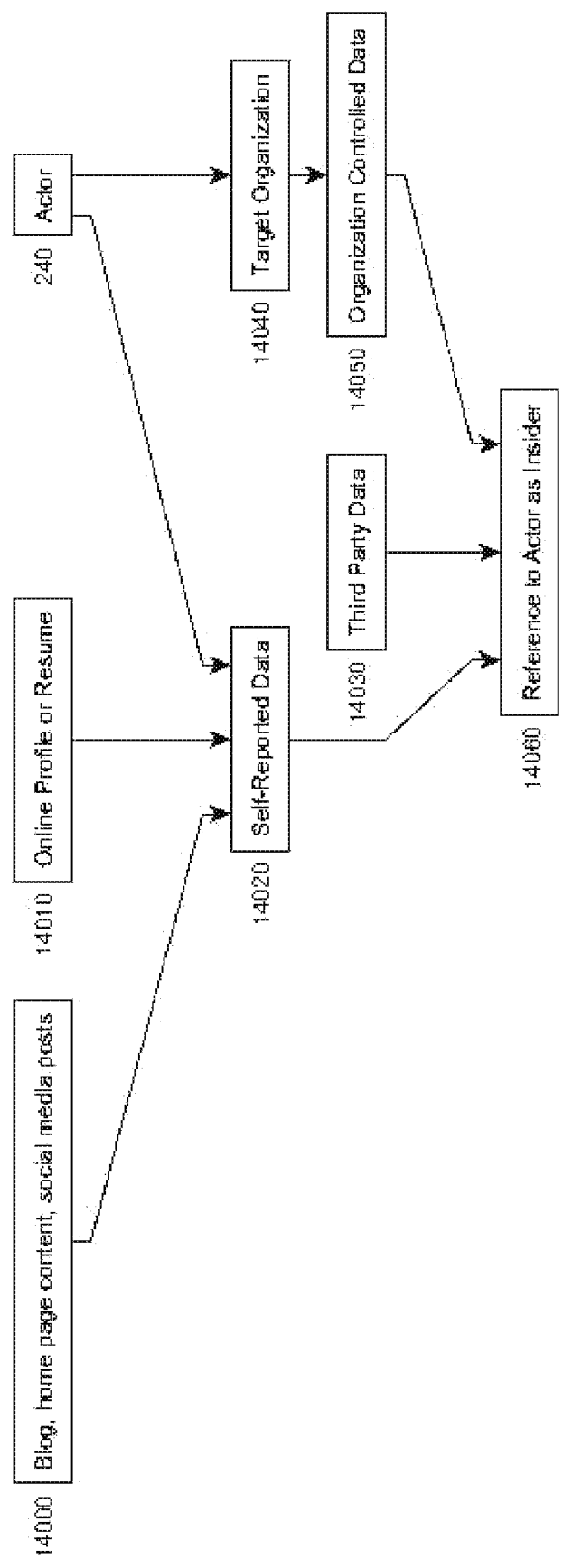
FIG. 18 is a block diagram of one embodiment of a relationship between insider identification data elements.
Figure 19:
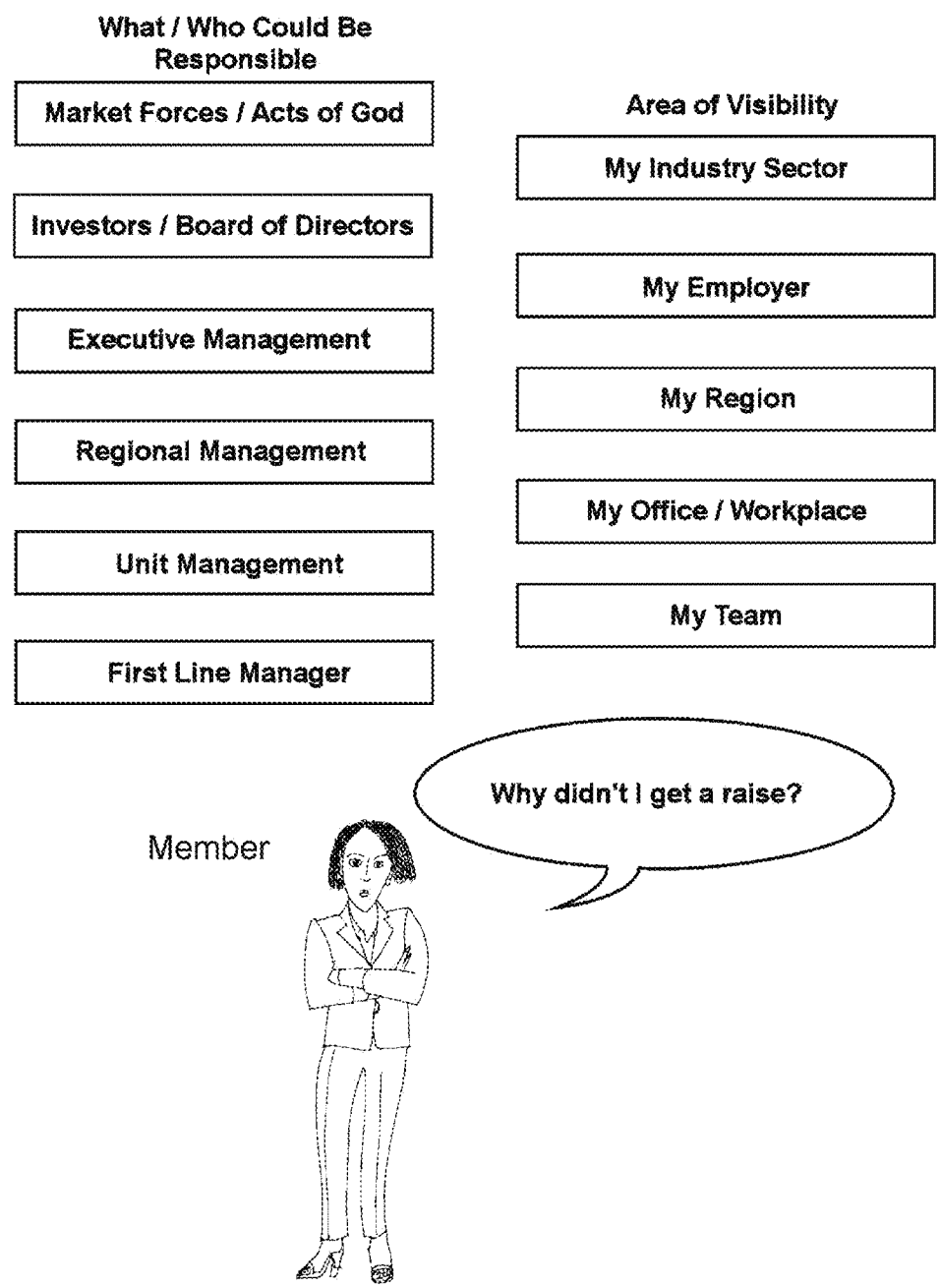
FIG. 19 is an illustration of one embodiment of the visibility an actor has within her organization for an example of perspective.

Insiders[270] are most easily and reliably identified by personnel or other records originating with the target organization[200] such as emails, partner portals and transactional records. However, such records often will not be available—and even if they are, often won't help in the resolution of online user handles—and so most embodiments will use any of the following as well (as illustrated in FIG. 18):

Online profiles that indicate that the actor[240] is, or recently was, a member[290] of the target organization [200].

Online references to a given actor[240] belonging to a target organization[200], such as a tagged photograph of members[290] that include the actor[240] in question.

Likewise, curriculum vitaes, résumés, or other personal documents that indicate organizational affiliations, including non-member insider[300] relationships Any kind of evidence that an outsider[280] socializes or otherwise interacts with members[290], such as references to the actor[240] attending events with members[290], photographs of the actor[240] with members[290] on social media and so on. Some embodiments may require either or both that the members[290] be at or above a certain hierarchical level in the organization[200] and that there be at least N different members[290] with whom the outsider[280] has contact, where N is determined by the user. This includes the case of journalists interviewing leaders[440] or other members[290].

Websites affiliated with the organization[200] which list its current and previous members[290]

Publicly available publications that list the organizational affiliations of the authors[250]

Language used in one or more forums in which the author[250] or actor identity[260] asserts an appropriate type of affiliation with the organization[200], for example "I've worked in manufacturing at the XYZ Corp and I can tell you that . . . ." Most embodiments will allow users to specify which types of affiliations will be considered relevant. For example, by default a "supplier" would be but a "customer" would not be. Some embodiments may raise the bar for this test if the comment comes during a spike[6350] of comments[1215] generally, and the author[250] or actor identity[260] has not already been confirmed to be an insider[270]. This is to help mitigate the "piling on factor" when some major event occurs, for example a company losing a large lawsuit that involves some type of discriminatory practices. This is discussed further in a subsequent section on "bursts"[6350].

Some embodiments will consider the spouses and other household members of insiders[270] as being insiders[270] themselves. Such information is often readily available through social media and other public sources.

However, some embodiments may prefer to require at least one reference to an actor[240] being—or having been—an insider[270] of a target organization[200] that does not come from self-reported data. Generally though, most embodiments will opt to err on the side of giving the benefit of the doubt, endeavoring to filter out phony or bogus authors[250] and posts[3100] in a subsequent step. This is because the cost of doing otherwise would effectively be forfeiting the vast majority of publicly available online content. However, almost all embodiments will linguistically fingerprint insiders[270] who have been identified by means other than verified organization-internal records to see if they match up reasonably with content authored by verified insiders[270] who have the same role or position as the unverified insider[270] is self-reporting.

Some embodiments will consider an actor[240] as a probable insider of a target organization[200] if he uses textblocks[21030] that are extremely statistically rare, apart from within the target organization[200] in which they are at least fairly common, with the thresholds for both rarity and commonness being contained in the internal knowledge model[750] modifiable by the user. This is particularly useful in dealing with clandestine organizations such as terrorist organizations[220] for which most of the above evidence sources are very unlikely to exist.

Almost all such embodiments will assign a probability of truthfulness to an externally provided data, since any of these sources or methods are error-prone to some extent.

In most embodiments, insiders[270] will retain their insider status for a certain period of time in the event that their affiliation with the organization[200] is terminated. In most embodiments, there is a default window of time before the insider[270] status is considered lost. However, almost all of these embodiments allow leaders[440] and others in higher levels of the organizational hierarchy to have longer windows than members[290] in lower tiers of the organization[200]. Some embodiments may also furnish this capability by role or job type.

Most embodiments will have a different, and shorter, default time window for non-member insiders[300]. Almost all embodiments will cause this window to be extended if there is evidence of continued interaction of the former insider[270] with current members[290] or with the organization[200] itself. Likewise most embodiments will extend the window for all insiders[270] for organizations[200] whose character strengths[495] have been assessed as higher than a user-determined threshold. This reflects the fact that organizations[200] with stronger characters[480] change more slowly than those that have less well-defined or weaker characters[480].

Outsiders[280] by contrast by definition either do not have direct access to the organization[200] or have interactions that are very limited, such as a customer of a large company's products. They are experiencing an outside view of the organization[200], one that is largely dictated by information that is publicly available. Such publicly available data is becoming ever more treacherous in terms of its authenticity, as virtually all organizations[200], regardless of their type, are growing far more media savvy.

But paid promoters or detractors are only a portion of the problem. Public posts on an organization[200] are very frequently made by people with little to no direct knowledge of it, but their own personal axes to grind. For example, someone who just interviewed for a job they really want might make a post about the interview talking about how great everyone they met was. However that very same person might issue very negative posts once they learn that they didn't get the job. Standard topic[1300]-sentiment [1305] analysis approaches can capture such data to the extent that it is desirable, and some embodiments may opt to do so. But once an author[250] or actor identity[260] has been identified as an outsider[280], unless its status changes to one of insider[270] according to one or more of the tests employed by the given embodiment, most such embodiments will not try to assign any informational value[22020] to these comments, even if they do otherwise process them.

Perspective[400]

A key problem that must be overcome in order to accurately interpret the statements made by insiders[270] as well as to assess their level of conceptual sophistication—and hence credibility[410] as reliable observers with respect to given topics[1300]—is that of indexicality. Indexicality is the linguistic term to refer to language usage that is inherently tied to the perspective of the speaker, and more broadly to the speaker's time, place, culture, level of understanding, and above all, intended audience.

By correctly interpreting indexical statements, we are able to assess the perspective[400] of each individual. Thus a key aspect of the invention being disclosed is the automated identification of the different perspectives[400] that exist within an organization[200]. Many of these perspectives [400] will be quite limited or worse. Yet, ideally, all must be properly identified, so that the intended scope of comments is captured and any observations[1332] or "facts" are weighted appropriately in terms of their probable real world value. Almost all embodiments will segment the members [290] of an organization[200] into different classes based upon perspective[400]. Many embodiments will use perspective[400] to derive demographic information[420] in cases in which either there is no demographic data[1225] or in which such data[1225] is unreliable and/or unverified.

To take a very simple example of indexicality, to someone who stocks shelves overnight "upper management" may be the shift supervisor, or perhaps the store manager. However, to a professional employee[320], "upper management" likely refers to C-level management. Thus the exact same phrase connotes two entirely different things, based on the point of view of the author[250]. We will hereafter refer to this as perspective[400].

Perspective[400] profoundly limits the conceptual models or theories that are possible for a given actor[240], and hence determines the space of probable comments for any demographic of insider[270]. For example, an unsophisticated employee may honestly believe that if her manager liked her more, she'd be earning twice as much money. Or that she should be making a much higher salary because her cousin—who may have an entirely different job or profession—does. If she blames her manager for this, she will likely complain that the manager is "unfair", "shows favoritism", etc.

By contrast, a more sophisticated employee understands that many factors go into salary, and that very few managers have the ability to just double someone's salary no matter how much they may like them. Any complaints about salary (for example) on the part of more sophisticated authors[250] will thus usually relate to some other factor such as market competitiveness, the inappropriate application of a pay grade to a position, etc. Likewise, any complaints or accusations of mismanagement made by more sophisticated authors[250] are likelier to include supporting information; it would be clear to them that comments blaming the lack of a raise or a promotion on "unfair" or "biased" managers would be taken with at best a grain of salt.

Because authors[250] will not always disclose their logic—in part because to them, it may seem self-evident—individual misapprehensions can often only be guessed at. However, when the analyzed individual corpora[1205] of similarly situated people both in the same organization[200] as well as comparable organizations[200] are aggregated, it becomes possible to make inferences as to how these authors[250] understand the organization[200]. This is valuable for a number of reasons. It allows the separation of such misdirected complaints from legitimate ones that require remedy. It also allows the sophistication level[400] of comparably leveled members[290] in comparable organizations [200] to be compared. Many embodiments will consider the degree to which members[290] at different levels of the organization[200] have perspective[400] of their organization[200] as a dimension[420] of organizational character [480].

The Indexical resolution process analyze text content looking for markers that indicate the author's[250] awareness—and correct understanding—of other environments (e.g. other parts of the organization[200], other comparable organizations[200] either by sector[430] or by region[433]), awareness of the workings of an organization[200] (e.g. chain of command, need to achieve certain objectives, acknowledgement of different types of stakeholders and so on,) and the greater context in which the organization[200] must operate (e.g. in the case of a corporation[210], competitive pressures, government regulation, liability laws, lending rates, public perception, etc.) Even though a complete assessment of authors' [250] knowledge is almost never possible, even a partial assessment can greatly help separate the comments made by more credible insiders [8010] from those who simply lack the knowledge necessary to make valid observations in many areas.

In most embodiments the Indexical resolution process leverages built-in knowledge models[1340] for broad types of organizations[200], including but not limited to corporations[210], terrorist organizations[220], criminal organizations[220], and political groups. These models[1340] can be of different form in different embodiments, however they must be ontological in nature, containing information not just on different objects but the different types of relationships[20050] that exists among objects[610], the forces that one exerts on another—for example, market competition lowers prices which reduces revenue which reduces bonuses. A preferred embodiment expresses these ontological relationships among objects in a knowledge model[1340] (which we will we refer to as "perspective elements"[610]) using frames[1360]. Such models[1340] will generally be of at least moderate complexity, as judged by the number of both objects[610] and relationships[20050] they contain.

An author[250] is considered to have a more complete perspective[400] the more objects[610] and relationships [20050] he not incorrectly references, whether directly or indirectly, collectively in any text[1215] that is associated with him. Some embodiments may opt to weight certain objects[610] and relationships[20050] higher than others. For example, someone referencing "board governance" would be assigned more points than someone mentioning "employees" by most embodiments. To this end, some embodiments will provide specific classes[20000] of object [610] such as "abstract" vs. "concrete" so that weights may be assigned according to class[20000]. However, many embodiments will assign a negative score to uses of such language that are clearly incorrect, to the extent that this is possible to detect via machine learning or other techniques. Similarly, some embodiments may opt to positively score the use of certain metaphors (e.g. likening a business strategy to "tilting at windmills") or phrases (e.g. "reach exceeds grasp") which suggest a certain level of sophistication.

In most embodiments the relationships[20050] defined among perspective elements[20010] will be underspecified in the model[1340]. Often, all that is important for establishing perspective[400] is the knowledge that one perspective element[20010] has a generally positive—or generally negative—impact on another element[610], or that the two go hand in hand. For example, the cost of the raw materials needed to build a product will impact the cost of building the product. However, in certain cases, explicit understanding of a very specific relationship[20060] among perspective elements[20010] may be important, for example that a particular change in the law would have massive impact on a number of existing business practices, whether ultimately good, bad, or indifferent.

Figure 20:
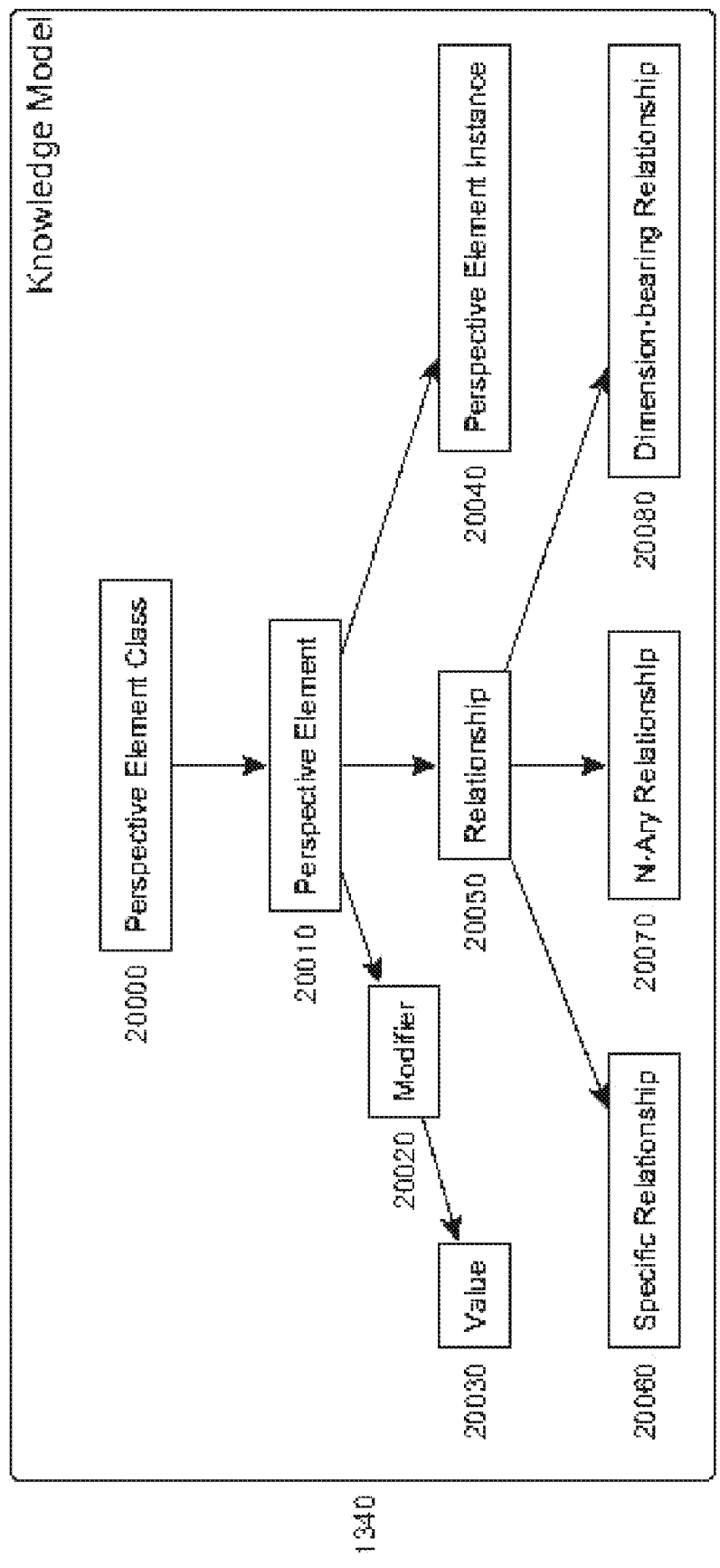
FIG. 20 is a block diagram which illustrates perspective elements in a knowledge model.

Some subset of these various relationships[20070] are critical to having an understanding of the functioning of the target organization[200]. We will call these dimension-bearing relationships[20080], in the sense that the number of them is setting the complexity or dimensionality of the knowledge space. In most embodiments, an author[250] cannot be said to have a complete perspective[400] without demonstrating awareness of each of these key relationships [20070]. For example, a CEO is ultimately responsible to the shareholders; the board of directors can fire the CEO—and is likelier to do so if stock price, revenue, or profitability has been in decline. An author[250] who makes an assertion such as "Our CEO is afraid of the investors" that relates the relevant perspective elements[20010] in even a roughly correct way can be said to understand the point. This is illustrated in FIG. 20.

Many embodiments will by default weight references to perspective elements[20010] in proportion to their centrality in the graph[1340], that is to the number of other perspective elements[20010] to which they have a direct relationship [20050] in the knowledge model[1340]. Note that while a failure of an author[250] to reference a factor does not necessarily suggest that the author[250] is ignorant of it, many embodiments will allow the presence of an attitude [1295], belief[1290] or other statement that is inconsistent with a portion of the knowledge model[1340] to be treated as evidence of a gap (or to be more precise, lack of a dimension) in the author's [250] perspective[400].

For example, most embodiments will include in their knowledge model[1340] a range of low to high value modifiers[20020] of perspective elements[20010]. A modifier[20020] may be a word or one or more phrases, so long as the perspective element[20010] is what is being modified. An example of a "low value modifier[20020]" would be "greedy" or "corrupt" modifying some form of "management." While the management may indeed be greedy or corrupt, such modifiers[20020] on their own contain no real information beyond the expression of a negative sentiment [1305].

Rarely are such low value modifiers[20020] followed with supporting statements of fact with high scores for substance[3040]—though in those case in which they are, most embodiments will interpret the associated low value modifiers[20020] as a matter of objectivity[OBJ105] rather than perspective[400]. However, such low value modifiers [20020] often show up in contexts such as "there were layoffs because management is greedy." In such contexts, most embodiments will treat them as evidence of not understanding that likely reasons for layoffs are cost-cutting to improve profitability, the termination of a product or line of business—or simply not having sufficient cash to continue on as before. Upper management may wish—or need—to please the shareholders, but that's different than them being greedy. The management does not directly make more money for themselves by doing layoffs; they do not simply "take" the salaries of those laid off. They may however receive bonuses if a certain level of profitability is achieved, and they risk being fired if not. So while in a sense, management may be said to benefit from doing layoffs, there is an important level of indirection, or a missing dimension in perspective[400] on the part of those authors[250] who simplistically assert that "management is greedy."

Most embodiments will avail themselves of queries generated from the knowledge model[1340] to detect references to specific perspective elements[20010]. Many embodiments will also look for linguistic constructions that indicate causality related to one or more detected perspective elements[20010] so as to trap domain-specific references to perspective elements[20010] that are not currently included in the knowledge model[1340]. This includes instances [20040] of perspective elements[20010]—for example, instances[20040] of the perspective element[20010] "competitors" would be the names of specific competitors. Some embodiments will use machine learning techniques to expand the model[1340].

Since any more sophisticated model of reality must include comparisons, or the ability to relativize one's situation within a broader context, most embodiments will search for comparative linguistic constructs. For example, if the author's[250] group has low morale and a high desertion rate, he might note that other groups are stronger. Often employees[320] in certain sectors[430] will acknowledge problems with their organization[200], but will note that it is characteristic of the sector[430] at the current time.

Almost all embodiments will interpret comments of this latter kind—specifically those which bind problems to a broader context than the particular organization[200]—as at least partially refuting any negative sentiment[1305] about the specific organization[200]. For example "Our bonuses were crummy this year, but it was like that everywhere this year." would in in most embodiments be interpreted as a neutral statement about bonuses. More importantly, such broader context statements increase the credibility score [410] of the author[250] (assuming that they have not been flagged as being suspicious[3100]/phony[3100].)

Many embodiments will support a knowledge model [1340] of sufficient complexity that it allows users to specify which specific organizations[200]—or parameters which govern the selection of specific organizations[200]—will be considered "comparable." This data is used both for benchmarking calculation purposes, and also to assign positive or negative weights for perspective[400] to authors[250] based upon whether the two organizations[200] are considered to be comparable or not. An inappropriate comparison, such as comparing a large bank to a street gang, will essentially be treated by most embodiments as the equivalent of a low value modifier[20020].

Some of these embodiments will allow the definition of "comparable" to be determined by dimension, whether in a user interface or in interpreting text. For example, if one is comparing organizations[200] by region[433], it might be desirable for different criteria to apply for what counts as "comparable" than if one is comparing by type or industry sector[430].

Note that an author[250] having greater perspective[400] in no way implies objectivity[3050], or even the factual correctness of any opinions or statements. However a more complete perspective[400] does imply that the author[250] at least possesses the theoretical capability to interpret what he sees around him in in a meaningful way.

Credibility[410].

While perspective[400] is a reflection of an insider's[270] understanding, it is only one element in assessing whether statements made by an author[250] should be considered as credible. For example, one can understand, but be insincere—or be so angry for some reason that anger eclipses understanding. Thus additional measures will be provided by almost all embodiments. In many embodiments, perspective[400] often functions as a sub-component of credibility [410].

Most embodiments assign a "credibility" score[410] both to individual authors[250] and to observation[1332] made by one or more authors[250]. For example, if an author[250] asserts that "morale is the worst it has ever been", in order to assess whether or not this is in reality the case one must have an assessment of the credibility[410] of the particular author[250] as well the ability to compare this statement to other contemporaneous statements by members[290] of the organization[200]—and ideally those of similar demographic properties[420].

Some embodiments will require a threshold number of insiders[270], sometimes restricted to certain demographic groups[12060] (for which there may be a separate threshold), to have made the observation[1332] in order for it to be counted in any respect. For example, for highly specialized topics[1300] such as GAAP principles in accounting or complex legal issues, it can be reasonably expected that, for the most part, only those in certain types of job categories would be able to make meaningful observations[1332]. In addition, most embodiments will require either an absolute limit, or that no more than a certain percentage of authors [250] have negated the observation[1332], the exact settings being determined by the user.

In some embodiments, the credibility score[410] for an observation[1332] is a simple calculation such as the average of the credibility scores[410] of the authors[250] who made the observation[1332]. However, in many embodiments, the credibility scores[410] of the authors[250] who directly negate the observation[1332]—if any—and/or their relative number will also be considered. Some embodiments will consider the degree of specificity[22010] of the observation[1332]; in other words, the more specific the assertion that multiple authors[250] agree on, the more likely it is to have at least some basis in fact. In most of these embodiments, the specificity[22010] of a group of observation [1332] that all share the same frames[1360] and slots[22015] will be considered to be that of the most specific. Otherwise put, the greater the number of slots[22015] that are filled in with a highly specific value by any of the authors[250] who are making the observation[1332], the more credible the observation[1332] will be considered by most embodiments to be. Some embodiments will factor in the probability that an author[250] could know or understand a particular thing based on their role in the organization[200] based on either/ both knowledge that is stored in the knowledge model[1340] and/or machine learning techniques.

To take a concrete example, an observation[1332] that accounts payable are being paid at minimally 90 days is an observation[1332] that certain types of insiders[270] are in a good position to make—those in the finance departments of the target organization[200] and its suppliers—but that most insiders[270] would probably have little to no visibility into. If however as many authors[250] are disagreeing with the observation[1332] as agreeing with it, most embodiments will consider the observation[1332] disputed. Different embodiments will choose their own proportions for the bar required to consider an observation[1332] disputed.

Many embodiments will boost the credibility score[410] for observation[1332] that have demonstrable real world support from other data sources, for example databases of customer or supplier complaints that have gone through text processing. Most of these embodiments in turn will boost the credibility scores[410] of authors[250] who make such observation[1332].

Most embodiments will treat actionable suggestions [1330] similarly to observation[1332] despite the difference in linguistic form. This is because many actionable suggestions[1330] either directly contain observation[1332] or have obvious observation[1332] that are inferable from them. For example, "To alleviate the parking problem during peak hours we could supply a shuttle to the larger parking lot on Elm St." contains an observation[1332] that there is a parking problem.

Figure 21:
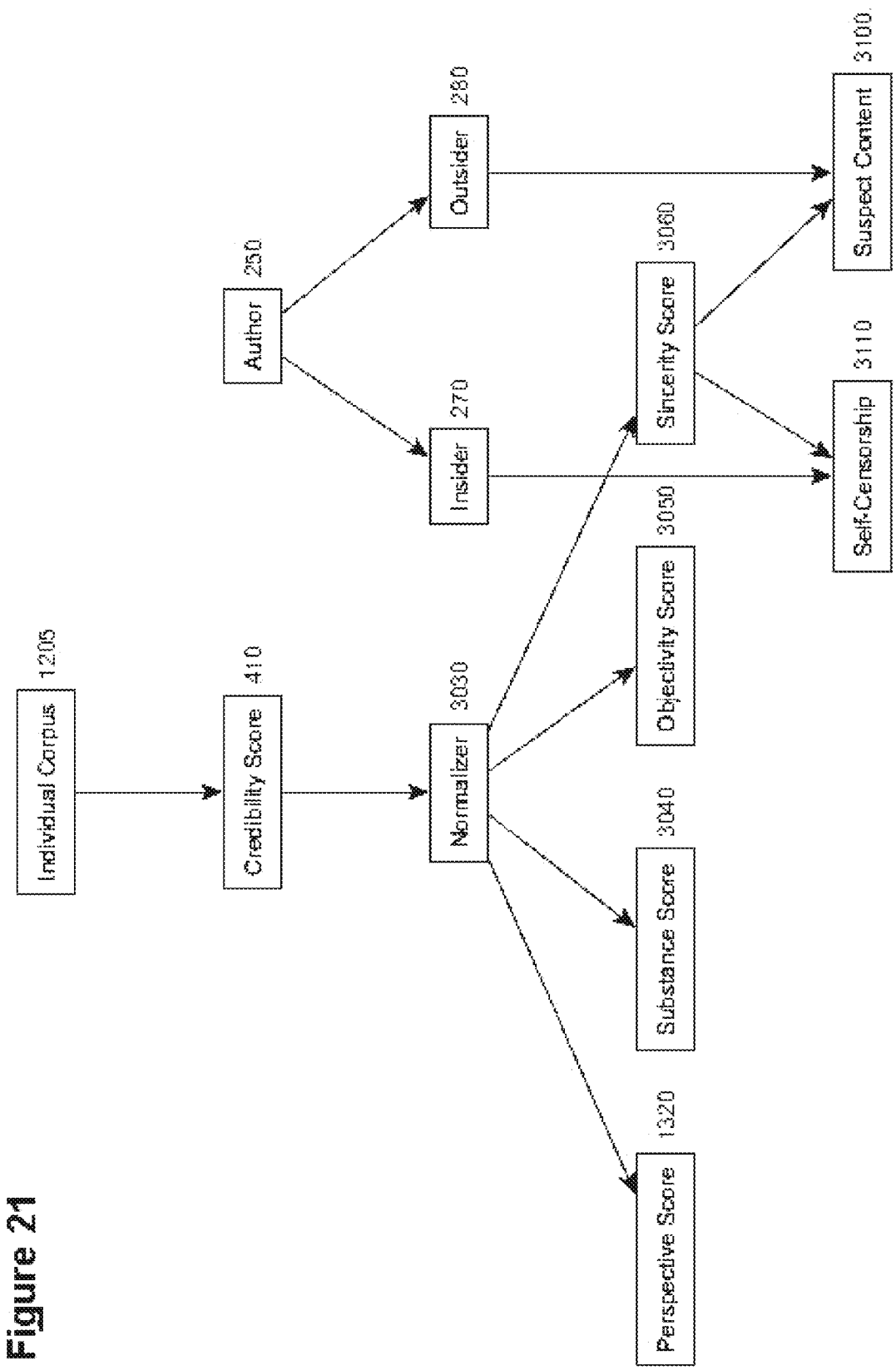
FIG. 21 is a block diagram which illustrates perspective definitions for embodiments of the invention.

In most embodiments, the credibility score[410] for an actor[240] is comprised of the following elements (as depicted in: FIG. 21):
Perspective Score[1320]
Sincerity score[3060] (In some embodiments, this is divided into two separate scores, one for members[290] who are not being fully sincere and one that expresses the probability that the actor[240] is in fact an outsider[280] and only posing as a member[290].)
Objectivity score[3050]
Substance score[3040]

Most embodiments will give significantly greater weight to perspective score[1320] and sincerity score[3060] than to the remaining two scores. This is because these are the two inherent "must-haves." Someone who totally lacks perspective[400] may be completely sincere, but can't reasonably be considered credible; conversely, someone who has all of the sophistication and understanding in the world but who is insincere or worse cannot be considered as reliable. A source who has immense perspective[1320] and is sincere is an extremely high value one in any scenario; a source who has neither attribute is utterly worthless. By contrast, someone could be quite emotional about a given topic[1300] but still maintain his objectivity; likewise, there many situations where the provision of numerous facts is either inappropriate or impossible.

Perspective[1320] and sincerity scores[3060] are discussed in other sections. An objectivity score[3050] in most embodiments is a combination of "loud talking"[1283] (as elsewhere described in this application) intersected with strongly positive or strongly negative polarity[24000] sentiment[1305] expression applied to the text associated with each author[250]. The purpose of this score is to identify cases in which the author[250] is very clearly emotional about one or more topics[1300] to the extent that her views—and hence comments—may be distorted.

In most embodiments a strong negative polarity[24000] sentiment[1305] type—however detected—such as "anger" or "disappointed"[24040] will be required, not just any negative polarity[24000] statement. Likewise, in the strongly positive case, most embodiments will require extremely positive language such as superlatives. Different embodiments may use different metrics to determine the objectivity score[3050] of a given author[250] including, but not limited to, the density of spans tagged in this manner in text created by a given author[250], consistency of the density over time, or even just raw frequency.

Some embodiments will bind objectivity scores[3050] for specific authors[250] to specific topics[1300] only. Thus an author[250] may be seen as objective, with the exception of specific topics[1300] X and Y. Other embodiments will only consider text created by an author[250] in a sliding window of time determined by the user, under the rationale that extreme emotion often fades.

Most embodiments will boost the objectivity score[3050] of an author[250] if the author's[250] corpus[1205] contains a mixture of polarities[24000] as opposed to heavily (or exclusively) all positive polarity[24000], or all negative polarity[24000]. Some embodiments will likewise boost the objectivity score[3050] of authors[250] for whom there is a corpus[1205] that spans a user-determined period of time in the event that at least one shift in sentiment[1305] on some particular topic[1300] is detectable over the course of time, since this demonstrates a willingness to change one's opinions based on new information and/or changing circumstance. Some embodiments will also boost the objectivity score[3050] for authors[250] who over time mention diverse topics[1300],—topics[1300] that are distributed across the topic hierarchy rather than all being subtopics of the same topic[1300], as opposed to sticking primarily to one of a small number of pet topics[1300].

"Substance Score"[3040] refers to whether the author [250] supplies detailed information in support of their statements. Most embodiments will not seek to verify the accuracy of such information (in those cases in which that is possible), though some may choose to do so. Rather, the intention is to assign a higher probability of real world value and accuracy to authors[250] who are providing what appear to be facts. In most embodiments, a "fact" must contain highly specific information such as numbers, dates and proper nouns (which may or may not fill certain pre-specified slots[22015]), not just rarely occurring words. Certain embodiments may however prefer to use specificity [22010]. In some embodiments, reference to at least one perspective element[20010] is also required so as to ensure the relevance of the comment.

Different embodiments may select their own strategy for combining the different components of credibility for scoring purposes, so long as they stay within the guidelines documented in this application. This is necessary flexibility, since certain types of organizations[200] will warrant special treatment. For example, for certain types of organizations, substance[3040] may not be applicable at all (e.g. clandestine organizations[200].) Likewise in organizational types[340] that require a high level of operating discipline, there are likelier to be fewer emotional statements[22005]. In organizations[200] which have the trait[495] of encouraging candor, sincerity is less likely to be a big issue. That said, under most scoring mechanisms, utilizing all of the components will cause no harm (even if they don't all provide value in a given scenario.)

It should also be noted in this context that these components are not strictly orthogonal to one another; rather, they are best thought of as levers with which to emphasize different higher-level aspects of the data. For example, perspective[400], sincerity[3060] and substance[3040] all have some relationship to informational value[22020]/specificity[22010].

Sincerity Score[3060]

There are two broad classes of insincere or dishonest comments: a) those made by authors[250] who are altering their comments either to seek some real world gain—such as to curry favor with their boss—or to avoid some potential real world risk and b) those who are only making comments because they are somehow being compensated for doing so. This last category may be either positive or negative in nature, depending on who is doing the compensating (e.g. an organization[200] paying shills to sabotage a competitor [470].) Identifying insincere statements of the former category is extremely important since the presence of a large number of insincerely positive statements is likely masking a serious problem.

Figure 22:
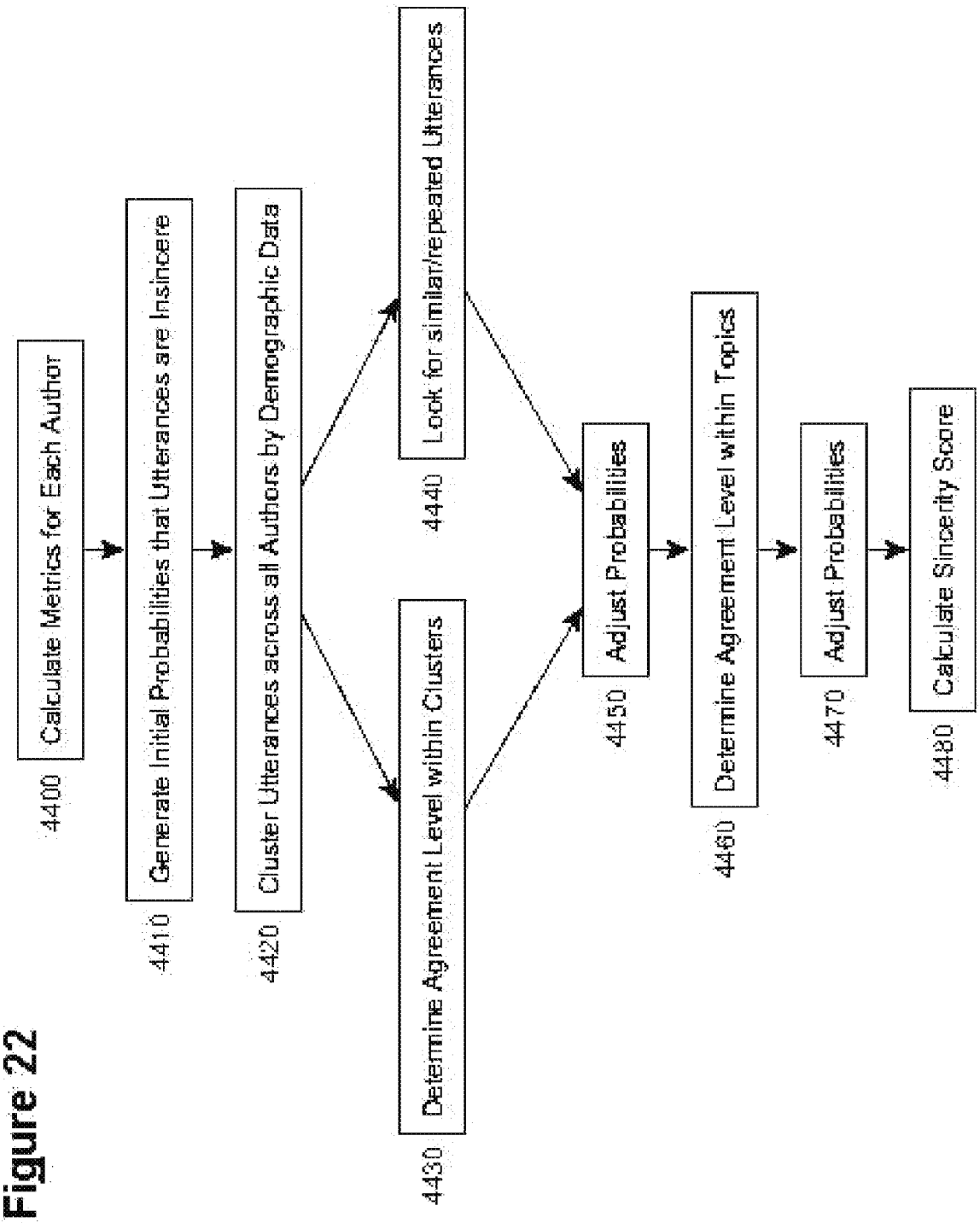
FIG. 22 is a block diagram which illustrates a sincerity process flow for embodiments of the invention.

In most embodiments, the self-censored comments[3110] will be identified in a multiple stage process, as depicted in FIG. 22. It should be noted that the aim of this process is to be generally correct rather than to strive for correctness in each and every instance. Specifically the intent is to identify chunks of probably insincere data, in the sense that the author[250] was at some level aware that she was constraining her response. It should be noted that the situational context[18100] can impact the observed sincerity[3060]. For example, an internal survey[25015] question such as "What can we do to make this an even greater place to work?" suggests certain limitations in the range of expected answers, and will influence behavior accordingly. Worse still, respondents[15050] may be explicitly told what responses to give. Lower than usual sincerity scores[3060] for a given survey[25015] or other specific context can be used to suggest the presence of such skewing factors.

The detection of self-censored comments[3110] is not only useful in determining the credibility[410] of each author[250]; it also plays an important role in assessing organizational character traits[485] and strength[495]. For example, an organization[200] in which there is a large percentage of members[290] across different demographic groups[12060] with self-censored comments[3110] is likely one in which there is a widespread general fear of making any negative statements. An organization[200] in which the density of such comments[3110] is very highly variable by department or other sub-organization[437] is one that has weaker character strength[495]; the individual sub-organization[437] leaders are each establishing their own tones and behavioral norms.

First Pass:

Analysis of the statements associated with each given author[250] that is oriented towards the detection of specific markers. In most embodiments this will include, but is not limited to, the following:

Use of superlatives (e.g. best, smartest, most enjoyable, etc) in a positive context with a boost for modified superlatives (e.g. the very best, the absolute highest quality, the best I've ever seen, etc.) Some embodiments may also opt to include implicitly superlative terms such as "fabulous" and "amazing."

Use of universal quantifiers in a positive context (e.g. "All of the managers here are terrific."), with a boost for reinforcing phrases (e.g. "Without exception, all of the managers here are terrific.")

In either of the above contexts, references to proper nouns (e.g. "Susan White is the best supervisor ever.")

Specificity (apart from the above-referenced proper noun case), as defined in the "Definitions" section. Some embodiments may also score fragments vs. complete sentences, the latter receiving a higher score. A greater degree of specificity [22010] will be considered by most embodiments to generally correlate to higher sincerity[3060] when analyzing statements made by insiders[270].

Absence of hedging terms associated with positive polarity[24000] comments; the things that are good are asserted to be good with no buts, howevers, etc.

"Loud talking"[1283] markers in positive polarity[24000] comments including but not limited to:
  a. Italics, bold, underline or other font treatment
  b. Repetition (e.g. "very, very good")
  c. Punctuation including one or more question marks or exclamation points
  d. Most embodiments will discard this measure if the loud talking[1283] markers are found in approximately equal proportion in comments that are negative or neutral.

Number of negative polarity[24000] comments about the organization[200] or any of its current members[290] made by the author[250]. The lack of any such comments, especially in the case of larger corpora, suggests a fear of expressing any kind of critique and therefore insincerity.

The objective is to measure how positive the positive comments are, whether they are only expressions of sentiment[1305] or whether they sometimes contain factual elements, and whether they are balanced by negative comments. Different embodiments may choose to approach the exact measurement strategy for this somewhat differently.

Different embodiments may choose to use different metrics for each of the above, for example to use the density of superlative use as opposed to raw frequency, or factor in how many different topics[1300] have descriptions that include one or more superlatives. Any approach which ensures that an author[250] who very frequently uses superlatives is dinged on the sincerity score[3060] proportionally is suitable.

Second Pass:

Next these scores are clustered with such demographic information[420] as is available. This is an important step for two reasons. First, a concentration of such suspect comments in some demographic groups[12060], such as the lowest paid employees[320], nearly all making very brief "I love Acme Corp!" comments, only makes the comments that much more suspect in most instances. (Note that many embodiments may allow users to specify certain exceptions to this rule. For example, outward bound marketing people and PR agents may be especially prone to use superlatives because of their vocations.) Second, concentrations of the markers described in the section above in specific demographic groups[12060] in many embodiments will boost or decrease the probability[4450] of sincerity.

In some embodiments, information needed to support the latter case is part of the default knowledge model[1340] while in other embodiments, it may be machine-learned. For example, a statement such as "Susan White is the very best manager I have ever seen" can be considered to have a higher probability of being sincere if the author[250] is 20 years old and/or this is his first job than if the author[250] is 55, has been in the workforce for 3 decades, and has thus had the opportunity to see a great many managers. This is yet another instance in which the Indexical Function[INDEXFUNC140] calculations play a key role. Some embodiments will allow a user to create weights to feed into the Indexical resolution process for each demographic dimension[420].

Third Pass:

To this point, the actual topical[1300] content has been entirely ignored in favor of inspection of various markers. However, in this pass, the specific attitudes[1295] and beliefs[1290] expressed in statements are compared within their demographic groups[12060] in order to understand how much agreement or disagreement there is. For example, a group of statements on specific topics[1300] that might seem so full of hyperbole that they couldn't possibly be sincere could in fact either be real in some cases—or at least genuinely be believed by specific slices[12060] of the population of members[290]. For example, some organizations [200] offer crazily generous internships with the aim of recruiting the better candidates to the organization[200] subsequently. In such a circumstance, one would expect to see a large number of over the top good comments about compensation within the demographic group of interns.

In many embodiments, a textblocking[21030] or similar approach will be used at this stage to identify extreme similarity in the statements made by apparently different authors[250]. For example, many authors[250] including specific language such as "I love this company because we dare to be great." would be suspicious because "dare to be great" is a fairly uncommon 4-gram. The probability of sincerity is reduced[4450] for such repetitive statements in many embodiments because it is unnatural.

While such statements may in fact be sincere, if an example of "Koolaid drinking", especially in conjunction with other markers of insincerity they are likelier to be insincere—or at least not representing genuine conviction. Likewise most embodiments will boost the sincerity score [3060] of authors[250] whose attitudes[1295] or beliefs [1290] are at odds with at least X % of other authors[250] who are similarly situated within the organization[200] under the rationale that outlier viewpoints are more likely to reflect genuine conviction. The value of "X" would be determined by the exact embodiment and the configuration set by the user.

Fourth Pass:

In this final pass, the scope of the data is broadened in an attempt to use the prevalent attitudes[1295] and beliefs [1290] expressed by a variety of organizational stakeholder types (non-member insiders[300]) in order to better guess at the probable sincerity[3060] of particular attitudes[1295] and beliefs[1290].

If there is substantial disagreement in attitudes[1295]— for example ⅔'s are saying that the organization[200] has poor leadership and ⅓ is saying that the leadership is phenomenal, the probability of sincerity of the latter statements is diminished[4470]. In most embodiments it will be further diminished if data from different types of commentators[250] is available and if this data has an even greater level of disagreement. For example, if 85% of former members[330] (who left the organization[200] within a reasonable time window) or other non-employee insiders [300] agree that the management is poor, that makes the positive comments that much more dubious. Most embodiments will prefer to use as many different kinds of non-current-member insiders[300] as possible, since any one class of such person may be skewed in one direction or the other.

Different valid embodiments may handle this fourth stage in quite different ways. The key point is that integrating statements[22005] from a variety of actor[240] types having different vantage points over a relevant time period provides a basis for understanding whether highly positive comments can reasonably be considered sincere.

Some embodiments may opt to also correlate the markers described in the first pass to specific topics[1300], so as to identify those topics[1300] for which such markers are especially prevalent; such topics[1300] are likely to be the sensitive ones to discuss openly. The identity of these topics[1300] is interesting. For example, if "innovation" is such a topic[1300] it suggests a strong organizational insecurity about it.

After the conducting of the previously described steps, the system will have various measurements of conformity of statement[22005] and conformity of attitude[1295]—both globally within the ecosystem of a given organization[200] and within specific demographic groups[12060]—and of the distribution of linguistic markers by individual actor[240] and demographic group[12060] that are suggestive of insincerity. As far as determining the sincerity scores[4480] for individual authors[250], different embodiments may take different tacks. However, most embodiments will avail themselves of both types of measures (e.g. markers and conformity), with almost all embodiments requiring more than one type of marker to be present in addition to some type of evidence of conformity (as previously described.)

As for making an organizational assessment for benchmarking purposes, most embodiments will carry forward the percentage of authors[250] of different demographic groups [12060] who have been identified as having a low sincerity score[3060] above a user-determined threshold and compute the variance. The demographic group[12060], especially the tier of organization[200] and sub-organization[437], are very useful because it is expected that sincerity levels[3060] will decrease somewhat in many organizations[200] as one descends in the hierarchy, and because if there is substantial variance among members[290] in different sub-organizations[437], that is evidence of a weaker organizational character[480].

Phony Posts[3100] and Other Statements

These differ from the self-censored statements[3110] discussed above in two important ways. First they are in theory as likely to be negative as positive; it all depends on what the objective is—to promote or to tarnish. Second, the author [250] of the statements may have no direct situational knowledge of the organization[200], and is simply following talking points or other instructions provided by a third party. Often the intention of the phony statements is to dilute genuine commentary; it may also be to boost a numerical rating on a website that requires accompanying commentary in order to be able to vote.

Most embodiments will seek to identify phony comments [1215] using a combination of the following measures; in some embodiments any one of the following (with the exception of lack of specificity) will be considered sufficient to flag both an author[250] and a particular post as probably phony[3100].

Burstiness[1880] in time of statements that are similar in aspects that include, but are not limited to the following. This is discussed in further detail in a subsequent section.
  a. One or more of the same attitudes[1295] or beliefs [1290] expressed
  b. Shared idiosyncratic spelling, slang, punctuation, or other linguistic markers
  c. Same or similar numerical rating assigned along with the text (if applicable in the given case). For example, a burst[6350] of "5 star" reviews for a company[210] on a career site would be suspect, especially if the average were 3 stars.

d. This case is intended to catch concerted efforts to manipulate public perception within in a narrow window time, perhaps in the aftermath of some very public event.

Lack of specificity[22010], or if specific, is strikingly similar to statements made by ostensibly other authors[250] with an earlier date and time stamp[18090]. Most embodiments will use textblocking[21030] in order to determine this, however others will use other measures of repetitiveness such as TFIDF.

a. Both this measure and that of burstiness[1880] are intended to correctly handle charged situations, such as the breaking of a news story that features serious accusations against a public figure or well-known organization[200]. Such situations tend to bring out many commenters[250], the vast majority of whom have no direct knowledge of the situation, but are echoing others who are expressing outrage or defending the accused. For example, if a large company[210] is sued for grossly discriminatory hiring policies based on race after the breaking of a particular scandal, assertions that the company[210] is racist after the story breaks, but which offer no further detail cannot be assumed to be based on direct experience.

Differ from the full pool of statements in aspects including but not limited to:

a. Syntactic complexity (any known measure)
   b. Semantic complexity (any known measure)
   c. Length (measured in tokens, phrases, or sentences)
   d. Linguistic register, such as the degree of formality. This includes a wide range of things depending on both the national language and the medium. For example, not all media support the use of emoticons or similar non-lexical content.
   e. If appropriate to the given medium, the number of different possible fields in which the author[250] entered text. For example, some career websites have more than a dozen different aspects of a company on which users may offer their comments; very few people enter text for every single one.
   f. % of misspelled words
   g. % of poor grammar instances
   h. In excess of a configurable threshold for the % of n-grams that do not occur in the broader population of statements in the same medium. Some embodiments will loosen this to include all media of comparable kind (e.g. social media.)

Some embodiments will perform this measurement independently of demographic data[1225], while others will compute it only within demographic groups[12060], so as to reduce the possibility that a mixture of educational levels or other demographic issue is incorrectly flagging a statement as suspicious [3100]. This measure is to detect authors[250] who have traits which are outside of the norm for the population of legitimate commenters[250].

A spike[6350] in the % of comments within a sliding time window that end up in the same comment group[1335]. This corresponds to shills creating messages that contain the same set of talking points.

The perspective[400] inferable from the statements [22005] associated with a given actor[240] is extremely unusual for someone of the purported demographic[12060]. For example, it would be unusual for an entry level person in manufacturing to be expressing opinions about how the CEO should deal with activist investors. Any measure that compares the distribution of references to specific perspective elements[20010] in the statements[22005] of the author [250] in question to the aggregate corpora from authors[250] who are verified to be of the demographic[12060] in question will be appropriate. Different embodiments may define demographic groups[12060] differently, both so as to get large enough sample sizes and so as to account for edge-case situations of particular interest in which there are unusual combinations of demographic attributes[420], for example "advanced degree" and "minimum wage earner."

Most embodiments will filter out both statements and authors[250] who are flagged as suspicious[3100]. Authors [250] will be revisited periodically by some embodiments to see if their anomalousness has changed over time and to ensure that any errors made in flagging can be corrected. Some embodiments will only filter out items[6200] which are individually above a pre-configured threshold of suspicion[3100].

Accurately detecting "bursts"[6350] of unusual levels of occurrence in comments on an organization[200] and/or particular aspects of these comments such as their topics [1300] or sentiments[1305], is an important part of identifying phony posts[3100]. In some embodiments, the concept of concurrent bursts[6350] will also be used as an indicator of probable membership in an organization[200].

Burstiness[1880]

Significant real world events, either internal or external to the organization[200], may be associated with a sudden increase of activity in response to the event. This activity may include, but is not limited, to any of the following: repetitions of certain phrases, references in comments to an increase in discussion of a topic[1300], the display of certain attitudes[1295], actions[1220] initiated. The initial event could be anything that a large number of people respond to, or in some cases, anticipate. For the purposes of the method defined below, the system does not need to characterize the nature of the event. However if an event related to a target organization[200] becomes known, we want to be able to provide hints to the system to improve its ability to detect responses to the event.

Figure 23:
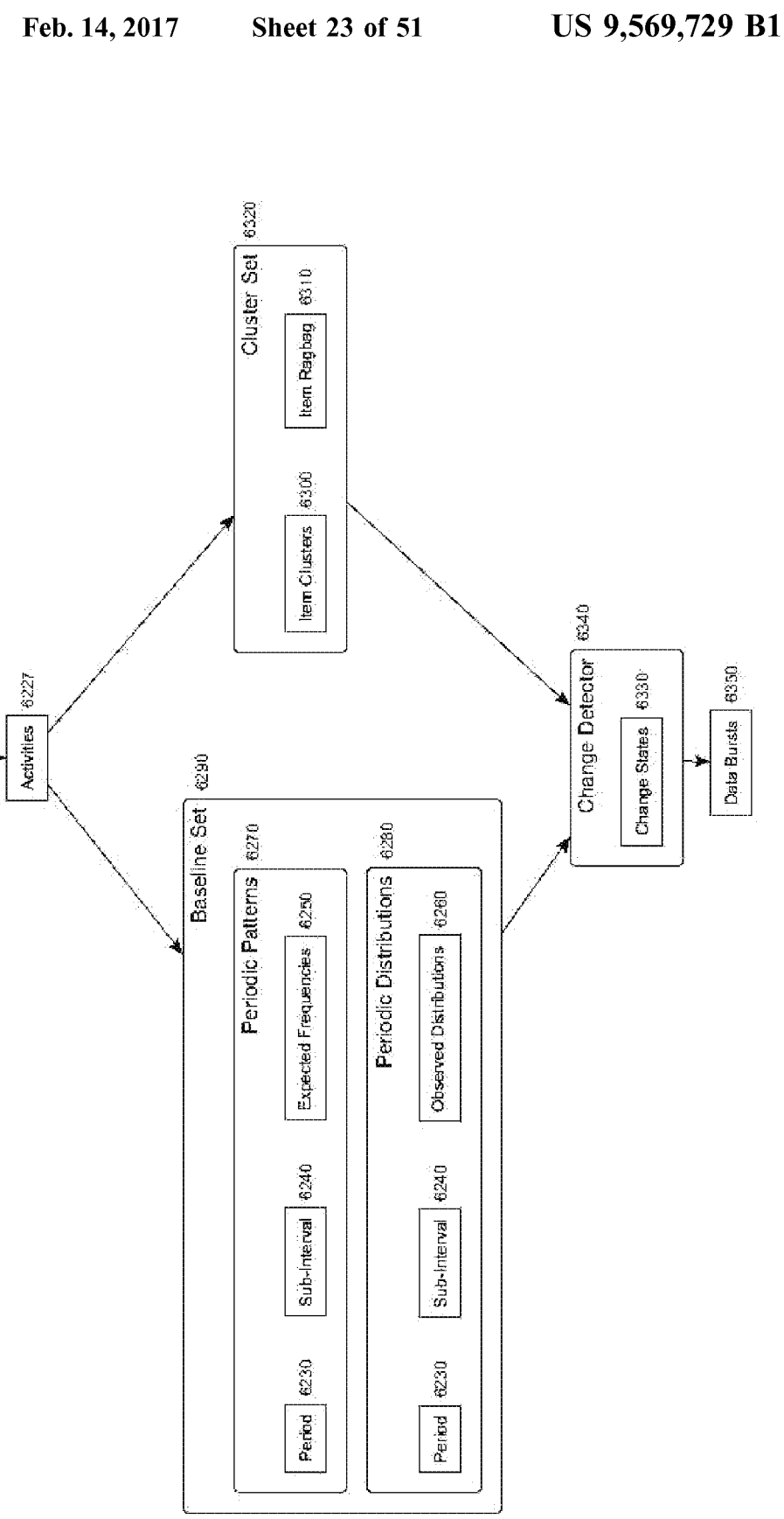
FIG. 23 is a block diagram which illustrates a burstiness model for embodiments of the invention.

Most embodiments will measure activity[6227] via features[2660] extracted from each individual's corpus[1205]. Some embodiments will represent features[2660] as feature structures[2640.] Any result derived via any of the other analytic methods in use in the system may be considered a feature[2660] in addition to features[2660] directly extracted from the text data, demographic data[1225] and any other system data. There will be some particular features [2660] that are more useful for tasks such as detecting phony posts[3100], but in principle, any combination of features [2660] can be considered an activity[6227] subject to further analysis. Features[2660] must additionally be tagged with a time based on the data item(s)[18000] they were derived from, as bursts[6350] will be measured via the rate that items[18000] containing a feature[2660] or combination of features[2660] appear over time. This is illustrated in FIG. 23.

Since in general, neither the events nor the form of the responses to those events, can be anticipated, one subproblem is to determine what combinations of features [2660] are deemed to represent an interesting increase in activity. Some embodiments may simply take any frequently occurring combination of features[2660] to represent such activity, which we will refer to subsequently just as "an activity[6227]." Most embodiments will add a similarity measure in order to group together closely related sets of features[2660]. In many cases only certain combinations of features[2660] will be considered appropriate, which may be handled within the similarity measure or via rules in the internal knowledge base[1340] that impose an extra set of constraints on which combinations may be placed in a group.

The allowed combinations may be represented as rules encoded in the knowledge model[1340]. Note that in embodiments using a typed feature representation, these rules may be quite general, only specifying classes of features[2660]. In some embodiments, combinations of feature structures[2640] will be scored for the likelihood that they represent an activity[6227]. In such embodiments, the rules will in general be encoded in the knowledge model [1340]. In many cases an activity[6227] may be represented by a small number of features[2660] out of a much larger set associated with an item[18000]. Therefore an approach based on overall similarity of items[18000] is in most cases not useful.

For example if an item[18000] were to be represented via a feature vector[6210], standard similarity measures would fare very poorly. If a large number of shared demographic features[420] caused items[18000] to be put in a group, the group may be interesting for other reasons but it does not affect any particular activity[6227]. A related problem is that there may be ambiguity. For example, if items[18000] containing a combination of 2 features showed a sudden increase, but a superset of items[18000] containing combinations with 1 or 2 additional features[2660] showed a less sharp, but still significant, increase, then an additional decision has to be made about which of the possible groups to use.

Some embodiments may split the data into consecutive intervals called buckets, which allows us to describe the activity[6227] as a sequence of frequency counts. In these embodiments it will often be useful to consider change at several different time scales, in which case an activity[6227] will be measured via a set of frequency sequences each generated using a different bucket size. Other embodiments may consider just the rate, usually measured as the time difference between successive instances of the activity [6227]. Making these embodiments sensitive to different time scales tends to be more complex, ranging from manipulating parameters such as a decay rate used in computations to placing constraints on the size and run length of the differences in a burst[6350]. However in either case, the central problem for detecting bursts[6350] is how much change in frequency/rate is required to recognize that a burst[6350] has started, and similarly how to decide when a burst[6350] is ending.

The problem is further complicated in that data sources may have their own characteristic patterns of posting frequency/rate; for example an internal company forum will likely have a much lower overall posting rate on weekends versus the normal weekday. In this case we do not want the change in rate observed between the weekend and the beginning of the work week to be falsely detected as a burst[6350] of activity. Posting rates may also systematically vary throughout a day if the participants are from approximately the same geographic region. The problem gets worse still when using multiple data sources that may each have differing characteristic patterns or no consistent/predictable patterns at all.

The variance in posting rates will be measured in most embodiments in at least two ways, calculated separately for each data source. The rates will be calculated using sub-intervals of a period, for example the frequency of posts per hour over the course of a day. The data should occur over multiple iterations of the period, typically a large number of iterations, otherwise there is not much sense to measuring the variance. However these rates also tend to change over time, usually increasing. Therefore some embodiments will include some sort of bias or heavier weighting to the most recently observed periods in their calculations.

First, baseline rates will be calculated relative to some period, based on the usage patterns of the given media. A baseline rate will consist of a sequence of expected frequencies for each sub-interval in the period. When measuring the rate for burst[6350] detection, this baseline rate may be used to offset the observed rate. However note that the baseline will be measured against the overall rates observed for the data source, so some embodiments may take the approach that no adjustment is necessary, or the adjustment to an activity rate will be some function of the activity rate, the observed rate and the expected baseline rate.

A simple calculation used by some embodiments would be to adjust the observed activity rate according to the ratio of expected to observed overall rates. Other embodiments may calculate one or more baseline rates based on subsets of the overall items in order to better predict the adjustment for a particular activity[6227]. In the case where we are looking for a burst[6350] of novel activity[6227], rather than in increase of an activity[6227] that is present at some level normally, adjusting against a baseline rate may be skipped.

Discovering periodic patterns[6270] can be a complicated problem itself, especially if trying to find a period at which a repeated pattern does show up. Valid embodiments may use any of the above-mentioned methods. Some embodiments may only look at a fixed set of periods with a simplified calculation method to determine the baselines. In general we only want to establish a baseline if there is consistency of behavior over repeated periods, i.e. the posting rate on a forum always increases on a Monday, and decreases on a Friday. However in one embodiment we may simply take the observed rate from the prior period (or a combination of the last-n periods) and assume that to be predictive of the current period.

The other measure of variance is to collect a statistical distribution for each sub-interval in the period[6230]. Given a distribution[6280] we can determine what level of variance is outside of what is normally expected and therefore set minimum thresholds for burst[6350] detection. The same sorts of considerations apply as those noted above for baseline patterns[6270]. Once again, in the case where we are looking only for novel activities[6227], some embodiments may dispense with this calculation as we are looking for the change from absence of the activity[6227] to presence of the activity[6227]. Some embodiments may also dispense with or limit the weight given to the use of these measures when looking for a burst[6350] in response to a known event. If the system knows when an event occurred, then any relative change in activity in response to that event is more likely to be considered a burst[6350].

The method we present therefore intertwines three processes: detecting activities[6227], detecting baseline patterns[6270] and distributions[6280] in frequency of items, and detecting bursts[6350] of activities[6227] that vary significantly from expected rates.

Figure 24:
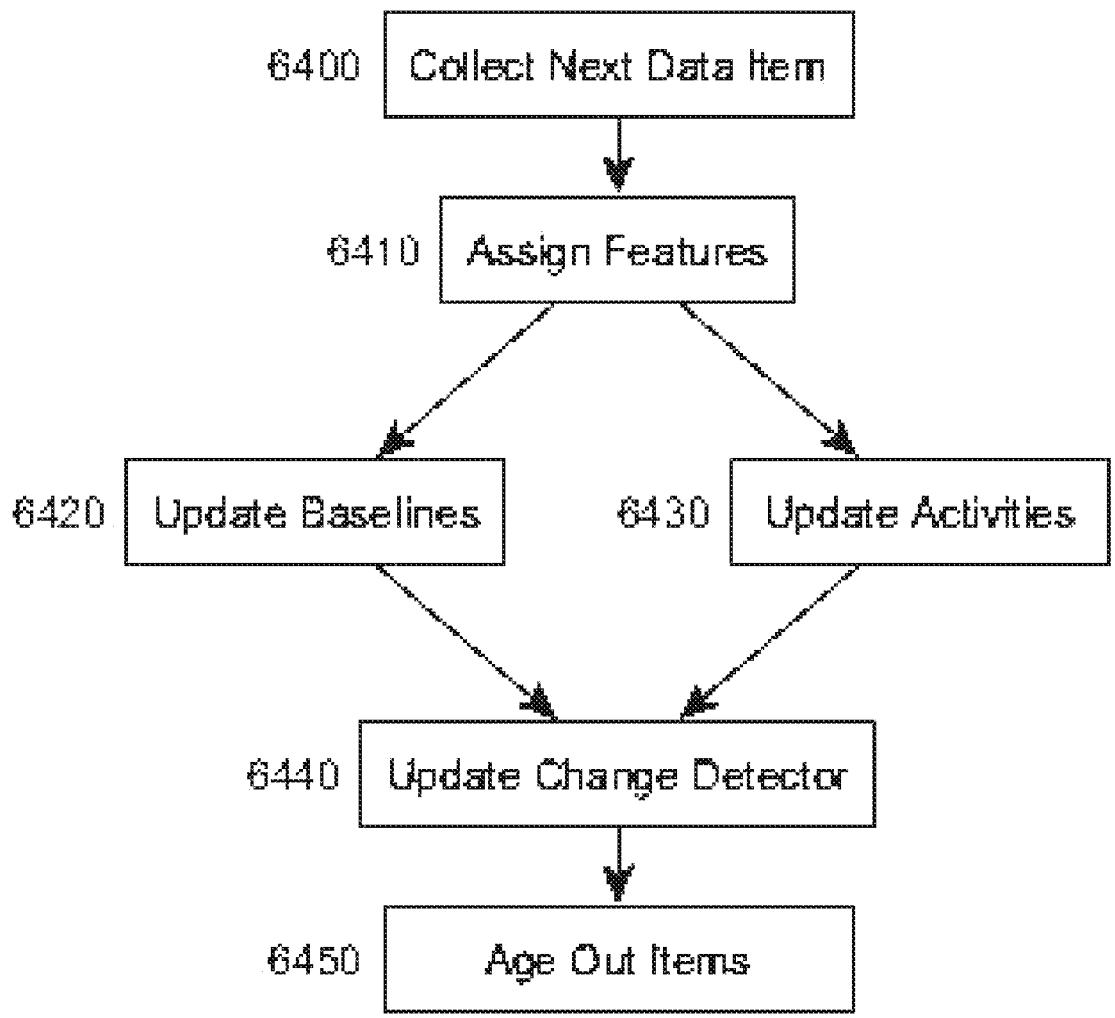
FIG. 24 is a block diagram which illustrates a burstiness process flow for embodiments of the invention.

The overall flow of the method used by many embodiments, as illustrated in FIG. 24 is as follows:

Collect Next Item[6400]: Items[18000] will be processed by adding them to an active working set one at a time in date order. Each item[18000] will remain active while further items[18000] are added[6400] to the active set until an aging function determines that the item[18000] should be removed [6450]. In its simplest form such a function specified a fixed length sliding window over the time series, i.e. when the next item[6400] is added to the active set, the end of the window is updated to the time stamp[18090] of that item [18000], and the start of the window is moved forward by the same increment and any currently active items[18000] that now occur before the start of the window are aged out[6450]. Different embodiments are free to implement any number of schemes, including but not limited to the use of multiple windows, windows of non-fixed length, limiting the active pool to a maximum size, specifying a duration specific to each item, and combinations of these. Some of these variations will be discussed below. Using this approach therefore makes the method suitable for use on streaming data, as collected in an ongoing process such as real time monitoring. In streaming implementations embodiments are likely to limit the size of the active set due to time and space limits.

Assign Feature Values[2670]: When an item[18000] is added to the active pool, it is assigned a set of feature values[2670]. Embodiments may choose any number of representations for feature values[2670], but we will focus here on embodiments using feature structures[2640] and unification. As described earlier feature structures[2640] may be drawn from multiple sources and may potentially be large and composed of heterogeneous data types. Therefore in some embodiments these feature structures[2640] may be converted into a simpler set of structures that are more suited for determining similarity and/or equivalence of different feature values[2670]. The assigned feature values[2660] then must be sorted if the subsequence or substring approaches described below will be used.

Most embodiments will identify activities by repetition of a subset of feature values[2670] (for example mentions of a specific topic[1300]/sentiment[1305] pair, or use of specific phrases or vocabulary) rather than through a similarity metric over the whole feature value[2670] set. However, this depends on factors including what is considered an activity [6227] of interest, how complex the description of an activity[6227] is, and the data values involved (for example are the values discrete or continuous). In light of this, the conversion step may perform operations such as replacing features[2660] with the equivalence class they fall into, removing features[2660] where it's not possible to form a valid combination representing an activity[6227], and so on. This conversion step is an opportunity to pre-cache computations, so as not to repeat them during comparison of features during activity[6227] discovery.

In some embodiments, the set of feature structures[2640] is mapped into a vector of quantitative or enumerated values, particularly if activity discovery is accomplished through a data clustering approach. Clustering will tend to be used when "open" features are used. Open features are features [2660] with value[2670] sets that are not known ahead of time as when, for example, representative terms are taken from the text of a comment. Clustering may also be more useful when activities[6227] are more complex and may be considered equivalent even when some proportion of features[2660] are different or missing. For example authors [250] may only refer to one aspect of a news story or one out of multiple sides of an issue.

Update Baselines[6430]: Both baseline patterns[6270] and periodic distributions[6280] require a period (i.e. a duration of time) and sub-intervals that partition that duration. Baseline patterns[6270] denote the pattern with a list of frequencies representing the expected frequency for each sub-interval[6240]. Similarly, periodic distributions[6230] store a statistical model for each sub-interval[6240].

As discussed above, it may be desirable to calculate baselines over subsets of items[18000], or even for subsets of features[2660] and/or feature values[2670] as they occur in items[18000]. As an example all features[2660] representing demographic data[420] could be placed in one subset. In this case, the system will then count the rate at which items containing any of these features[2660] appear. In the general case, this subsetting can be specified by a set of characteristic functions, one per subset. A characteristic function takes as input an item[18000] and the features [2660] assigned to it and returns a value indicating whether the item is a member of the set the characteristic function defines. Under this scheme, set membership can be based on whether features[2660] are present, or specific ranges of feature values[2670], or complex combinations of feature values[2670], items[18000] may fall into multiple subsets or not, and so on. Most embodiments will implement one selection function rather than multiple characteristic functions for efficiency and other practical reasons; those can be considered optimizations of the general framework.

The periodic distributions[6280] are intended to characterize variance in each sub-interval. In most embodiments bursts[6270] are identified when the change in the rate of an activity falls outside of "normal" variance. In order to determine this, both the baseline rate and the size of the "normal" variance are needed. There are multiple ways that normality can be defined in valid embodiments, one example being the standard deviation. Different embodiments may choose to calculate these variables using a sliding window or an incremental approach. The sliding window can be updated in the obvious way; when an item[18000] ages out it is removed[6450] from any of the windows it is a part of. Other embodiments may choose to update variance and any related measures incrementally. There are also well known online algorithms that can be used to calculate variance and related values incrementally and continuously (for example see "Chan, Tony F.; Golub, Gene H.; LeVeque, Randall J. (1983). *Algorithms for Computing the Sample Variance: Analysis and Recommendations. The American Statistician* 37, 242-247"). Some embodiments will weight these distributions to more recent data. Sliding window approaches all do this. Incremental approaches can use a rolling variance algorithm.

Update Activities[6227]: The base problem in activity [6227] discovery, detecting frequently occurring combinations of features[2660], is known as the frequent common subsequence problem. This problem is well studied in data mining, particularly in the area of learning/finding association rules. Some embodiments will use algorithms from this field, for example the Apriori algorithm, to enumerate all frequent common subsequences of feature values[2670]. A large number of algorithms and approaches to this problem, including online (i.e. incremental and continuous) implementations are known. However, this set only contains candidates for possible activities[6227]; it still needs to be pruned down to find what will be considered valid activities [6227]. As a general rule, if a subsequence is shorter it will occur at a higher rate than will longer subsequences. Care must be taken so that overly short subsequences are not erroneously detected as bursts[6350]. Similarly, care must be taken not to choose overly long common subsequences that will cause actual activity bursts[6350] to be missed.

Several elements of the overall method interact with the generation of the frequent common subsequence set. The total amount of processing time and memory usage can be controlled via the aging function on items[18000], by limiting the size of the active set. If an embodiment assigns a simplified feature set[6210], the search space for sequences will be reduced. If an embodiment uses sub-setting of the feature set[6210], this effectively places constraints on valid sequences (e.g. a subsequence is only valid if all feature values[2670] are in the same subset). Additional constraints on valid feature[2660] combinations from the knowledge model[1340] further reduce the set. It should be noted that sub-setting can likely be inserted in the enumeration algorithm, whereas constraints from the knowledge model[1340] would generally be applied on the final sequence set (as there could be many such constraints, which are likely to be more complex and thus take more computational resources). This set of mechanisms is intended to capture specific tradecraft and if well chosen may reduce the candidate set to the point that additional measures are not needed.

In some embodiments and additional data structure, a lattice, is used to further refine the set of potential activities [6227]. A lattice consists of a partially ordered set in which every pair of elements has a unique supremum (also called a least upper bound or join) and a unique infimum (also called a greatest lower bound or meet). As a data structure, the lattice can be realized as a graph where the elements are nodes, and edges are placed between any two nodes comparable in the partial order. The methods described below actually use the transitive reduction of the lattice, i.e. a graph with the fewest possible edges that has the same reachability relation as the original graph. Another way of describing this is the graph with the smallest number of edges that can be formed by removing redundant edges from the original graph. Visually this is equivalent to the Hasse Diagram of the lattice.

In this case the partial order is defined by set containment over the remaining potential activities[6227], ordered so that an activity[6227] is "less" than another activity[6227] if it is a proper subset of that activity[6227]. The least element is the empty set. There are several ways this structure can be used in the selection of activities[6227]. In general the goal is to generate distinct subsequences, i.e. sequences that are dissimilar from the other frequent subsequences chosen.

Methods for selecting elements from the lattice are usually based on a depth first or breadth first traversal of the lattice, starting at the least element and descending to greater elements. There are two types of decisions to be made during the traversal, which paths should be ignored and at what point to select an element and stop following a downward paths through its children (generally once an activity is selected, it is not desirable to select any of its children). Additionally, the elements of the lattice will store a frequency, which is based on how many items[18000] are matched by the activity[6227] stored at that element.

A simple method for selecting activities to use is to choose at most one activity[6227] from each of the immediate children of the top element of the lattice. In other embodiments a more realistic method will only traverse child nodes of the current node when they have a significantly higher frequency than their siblings. If no children of the current node have a significantly higher frequency then the current node is selected. The selection procedure is often composed of heuristics of this sort. For example, another such heuristic would select an activity when its children have markedly lower frequencies than their parent and/or the children of that sequence have evenly distributed frequencies. Some embodiments may choose to pass candidate activities to the change detector[6340] first, and then use the lattice to implement filters on only those candidates that show burstiness.

In some embodiments there may be predefined activities [6227] and/or activities[6227] that are added to the system in response to a particular kind of real world event. If an embodiment is using the frequent common subsequence strategy described above, this can be implemented simply by adding these activities[6227] to the candidate set remaining after pruning the results of the enumeration algorithm. Note predefined activities[6227] may also be historically based. This approach may be particularly useful with the CLCS (constrained longest common subsequence) approach discussed in the next paragraph.

The CLCS approach finds longest common subsequences that contain a constraining subsequence. This might be another approach to using pre-specified activities[6227] where a minimal definition is given, but there may be additional features[2660] based on their occurrence in the data. Another alternative used by some embodiments may be to use the standard dynamic programming approach to find similar strings to the predefined activities[6227]; these are also potential modifiers on any of the candidates.

Yet another alternative used by some embodiments, which is likely to be more efficient, is to use suffix trees to find frequent common sub strings. This has the advantage of linear time and space bounds (using suffix arrays). The trick is to use several copies of the assigned feature set[6210], each with a randomized order. Given that the feature set [6210] is probably not all that large—dozens to hundreds, and probably dozens in most cases—most embodiments will be able to try a large number of shuffled orders. In fact, they may come up with a set of different orders, random or not, make every item[18000] use those orders, and then do the simpler faster suffix tree solution; all the other factors are the same, as the substring is just a stricter subsequence.

Yet another alternate method that will be preferred by some embodiments is to treat this as a clustering problem. These embodiments will use an online clustering method such as the C2ICM algorithm. The basic idea is to base on distance from a seed/mean vector for each cluster, activities [6227] that don't come close enough to seed are put in a "ragbag"[6250]. Then as activities[6227] are removed, if removal makes a big change in a cluster then remove the cluster, put the activities[6227] back into the ragbag[6250], and then attempt to make a new cluster(s) from the ragbag [6250]. In almost all embodiments, the aging function will take into account whether activities[6227] are in a cluster associated with a burst[6350] or not. Once a cluster associated with a burst[6350], its activities[6227] stay active until the burst[6350] is ending. This has the effect of giving a sequence momentum.

Update Change Detector[6440]: The activity[6227] set is reported to the change detector. If an item[18000] contains one of the activities[6227], then a change state[6260] associated with the candidate is updated. Note that the number of candidates should not be especially large by this point; the calculation scales well because it is a few simple operations per activity[6227] per item[18000].

The simple approach is to just keep a sum for each sub-interval, and at end of the sub-interval take the difference with the prior sub-interval. This is the change in rate. When the change in rate is proportionally higher than the change in baseline modified by variance, we have detected a burst.

Existing approaches such as the CUSUM algorithm can be used to detect bursts, however these approaches would have to be modified to incorporate the baseline and variance data. For example the CUSUM algorithm detects positive and negative changes in a series when a cumulative sum goes above a positive value or below a negative value, respectively. The baseline and variance information could be used to set this value.

Age Out Items[6450]: There is not much to add here other than to note that some activities may be triggered because an item[18000] has been aged out. For example if online clustering is being used to detect activities, removal of the item[18000] may prompt breaking up a cluster and reclustering.

Measures/Output

Most embodiments will provide the following data objects to their visualizations, and/or alternately third party software:
Organization Character[480] & Culture[500] Measures
Actionable Suggestions[1330] & Observations[1332]
Aggregate Attitudes[1295] & Beliefs[1290]
Overall Engagement Score[460]
Overall Energy Score[465]
Stability[450]

As well as aggregate information about member[290] and/or insider[270] characteristics including but not limited to credibility score[410], perspective[400], and any metrics derived from these and the above-referenced data objects.

Organizational Character[480] & Culture[500]

We define an organization's character[480] as the set of abstract traits[490] that are its governing principles, its defining characteristics. The collection of these traits[490] will largely dictate how an organization[200] will react to major change. Examples of such abstract traits[490] include, but certainly are not limited to:
Belief in transparency
Resistance to change
Willingness to make decisions based on general principle in preference to specific outcomes; ideological rather than short-term pragmatic
Long-term orientation
Candor
Discipline
Mission-orientation
Discourages diversity of thought[13060]
Believes that having more knowledgeable members[290] will improve the functioning of the organization[200]
Outcome-oriented (as opposed to process-oriented)
Hierarchical
Arrogance
Image-oriented
and their opposites. Different embodiments will provide their own set of abstract traits[490] according to specific models of organizational psychology theory. Each dimension must have some well-defined means of assessment which will be specified in the knowledge model[1340]. In many cases, the measurement technique will be defined on a per-trait[490] basis. Generically, the strength[495] of an individual trait[490] will be some combination of the percentage of members[290] who manifest evidence of the trait[490], weighed by the extent to which they do, and the variance among different parts of the organization[200]. Most embodiments will rely on user-defined thresholds against strength[495] to say that a particular organization[200] has, or doesn't have, a given trait[485], to a given degree. Different embodiments may also define their own point scales on a per-trait[490] basis (e.g. not at all transparent, not very transparent, somewhat transparent, very transparent) with clear measurement criteria for each level.

Different embodiments will likewise establish how many traits[485] must change, and to what degree, before signaling a change in character[480]. However most embodiments will prefer a low threshold in terms of the number of traits[485] (e.g. 1 or 2 traits[490]) under the rationale that no set of character traits[485] will be complete, and further that no set of observations[1332] is complete. Most embodiments will assign scores to express the extent of any changes in character[480]. Some embodiments may choose to assign unequal weights to the traits[485] that they define, and/or set different thresholds for what is required to signal a change in that trait[485].

Just as strength of a given trait[495] was defined above as being combined of three elements, strength of character[497] overall is defined similarly by most embodiments by evaluating the traits[485] that are considered to be strongly held according to the per-trait[490] scoring system that is imposed by the particular embodiment. Traits[485] which are evaluated to be only weakly present will be ignored for a strength[497] calculation by most embodiments. The rationale is that in almost any real world organization[200] there will be variance in most observable traits[510]—but not so much the ones that are essentially a survival requirement. Otherwise put, the strength[497] of character calculation is implemented by most embodiments as a measurement of how widespread and strongly manifested the strongest traits[485] in the organization[200] are. By contrast, an organization[200] whose members[290] manifested no common shared traits[485] would by definition be said to have no discernible organizational character[480] at all. However some of these embodiments may make an exception for any trait[485] that is rapidly becoming more prevalent in the organization[200] according to the measurement scheme of the given embodiment.

Because character traits[485] are by their nature abstract, they can only be measured indirectly, through insider[270] comments[1215] on the culture[500], relevant actions and their fluctuations over a meaningful period of time. Actual actions[1220] are weighted more heavily than comments[1215] in the vast majority of embodiments. For example, if a corpus[1200] of internal communication data is available and reveals a pattern of leaders telling their subordinates that they "really don't need more information about X" or "mind your own business" in response to requests from their subordinates, that is in fact a better indication of secrecy or lack of transparency than direct comments[1215] to that effect. Note that because the use of language differs between contemporaneous action and after the fact commentary on events, the knowledge bases[1340] of embodiments that handle such organization-internal data must contain both classes of language.

Other dimensions, such as "candor" turn on overall linguistic properties of the available text rather than mentions of any specific topics[1300] or phrases. For example, an organization[200] in which straight talk or honest feedback is discouraged will have excessive politeness and lots of hedging language of the following form:

a. "Your report is great, but it would be even better if you added X"

b. "Possibly you might want to add X to your report"

whereas in an organization[200] in which being direct is the norm, the same thing would simply be expressed as "You need to add X to your report." Many embodiments will opt to weigh content according to the organizational level of the author[250] under the rationale that those who are promoted to leadership[440] positions both have greater influence on the organization[200] and were selected for promotion on the basis of being a good personality fit with it. For similar reasons, many embodiments will likewise assign a higher weight to members[290] for whom there is some kind of evidence that the organization[200] especially values them, if such data is made available to the system. Such evidence may include, but is not limited to, employee performance reviews, advancement history, and level of influence.

It is important to note that not all assessment of organizational character[480] involves text, at least in most embodiments. For example, in the case of the dimension of "discipline," the constancy with which scheduled meetings actually occur either over a long period of time or specifically during periods of significant upheaval is one measure of organizational discipline. What types of events count as "significant upheaval" will be determined by the contents of the internal knowledge model[1340]. However, common examples will include, but are not limited to the following: layoffs, change of control, departure of CEO or leader, loss of a significant lawsuit, other types of material events, terrorist attack, or any story primarily involving the organization[200] that makes headlines. Many embodiments will not measure a given dimension, or component of a dimension, if sufficient data to do so is not available, in the case of this example, internal calendar data.

Some embodiments will implement the notion of different sub-organizations[437] having at least somewhat different character traits[485], or possessing these traits[485] to varying degrees, rather than forcing all organizations[200] to be considered as monolithic regardless of their size and geographic or functional diversity. For example, in the face of a lack of data from some sub-organizations[437] in other countries, certain embodiments may choose to infer that sub-organizations[437] in different regions[433] will be influenced to some extent by the culture of the local country. Hofstede's notion of "Power Distance", or the extent to which the lower ranking individuals of a society accept and expect that power is distributed unequally, is an example of a national culture difference that could be expected to impact the character[480] of local sub-organizations[437].

Calculation Note:

Because, as elsewhere noted, most embodiments will give actors[240] claiming to be insiders[270] the benefit of the doubt—though many will separately assess claims as to specific role—calculations of organizational traits[485] that in any way rely on the number of members[290] or insiders [270] who manifest a given trait[490] have a problem: some fraction of the people are not what they claim. Many embodiments will simply handle this by weighing the probability of truthfulness that the actor[240] has (or had) the role they claim. Other embodiments will opt to threshold out actors[240] with a probability of truthfulness of less than a pre-configured value.

With respect to the question of former members[330] and insiders[270], most embodiments will count their data, so long as it intersects with the current time window of analysis. Certain embodiments will analyze former member[330] data so as to compare it to the data of current members[290] with similar demographic attributes[420] within the same time window, as any meaningful differences may be useful for specific trait[490] calculations. For example, if the proportion of departing members[330] who manifest the "ideological" trait is much higher than in the remaining population of comparable people and/or the population of recently arrived comparable members[290] that could be considered evidence both that the "ideological" trait[490] is weakening at the particular organization[200] and that the degree of diversity of personality tolerated in the organization[200] was lessening.

Organizational Culture[500]

Organizational culture[500] is the projection of organizational character[480] onto a specific set of real world circumstances[530]. Culture[500] is what members[290] and other insiders[270] actually experience day-to-day in dealing with the organization[200]—essentially a combination of the organization's character[480] and the real world circumstances[530] surrounding it at any given time. In most embodiments, these circumstances[530] can be specified by a time window in the past, or as a set of circumstances[530] that could be posited to exist at a theoretical future point in time.

If, for example, there is no set of circumstances[530] observed under which an organization[200] deviates from a policy of secrecy, it can safely be assumed that a preference for secrecy rather than transparency is an abstract trait[490] of the organization[200]. On the other hand, if an organization[200] becomes less transparent prior to an M&A or other material event, the change is purely situational in nature, and it is likely that the organization[200] will revert to prior form afterwards. Likewise, during a period of abnormal financial constraint, an organization[200] may appear to be less safety-oriented, or less interested in investing in their members' [290] development, when in fact it is simply a matter of reduced spending ability for a given period of time.

In most embodiments, circumstances[530] must be specified according to their impact on elements[610]—and themselves represented in—the knowledge model[1340], for example a large reduction in revenue (assuming that "revenue" is an element[610] defined in the knowledge model [1340]). Such an approach allows an analyst to input her predictions on the probability of various circumstances[530] and have the system respond with the likely impact on different organizations[200] based on their respective characters[480]. For example, a company[210] that is very strongly mission-oriented will suffer less due to a revenue shortfall that causes some belt-tightening measures[540] than one in which the majority of employees[320] are chiefly motivated by the company's[210] image or short-term individual financial rewards. While obviously character [480] is not the only issue that determines organizational performance in a given set of circumstances[530], it is an important and currently overlooked one.

One of the reasons that it is important to distinguish between character[480] and culture[500] is that for many organizations[200], the vast majority of the comments [1215] actually refer to culture[500]—and hence to a large extent, current circumstances[530]—rather than character [480]. For example, one sees many comments[1215] during tougher economic periods to the effect that "this company used to be generous to its employees—it has really changed" when in fact one must wait until a better economic period to know whether or not the company's[210] generosity has altered[540]. That said, for rare organizations[200] for whom very little changes in circumstances[530] over the course of time, character[480] and culture[500] will be indistinguishable from one another.

Most embodiments will by default consider certain classes of statement[1215] to refer to character[480] rather than culture[500]. For example, many embodiments will consider statements[1215] that are absolute and/or oriented towards an indefinite stretch of future to be referencing character[480], since by definition one cannot apply a set of circumstances[530] to statements[1215] of this construction (e.g. "Company X will never abandon market Y.")

Culture[500] and character[480] may appear to differ substantially based on the current real world circumstances [530] at hand. For example, from a character[480] perspective, an organization[200] may be resistant to change or risk-taking. Yet, without losing this abstract trait[490], that organization[200] may be forced by circumstance[530] to incur risk and rapidly implement change[540]. Otherwise put, the fact that they have to do it in a given instance does not mean that they have changed their orientation[540] in this regard more generally.

The fact that intrinsic character[480] runs counter to the actions being taken will impact the way the organization [200] behaves in the situation. For example, it will create more stress—and more members[290] complaining of "culture change." There will likewise be more friction or pushback in emails and other types of media to the effect that "this is not how we do things" that serve to slow progress in the desired direction. This is one reason that organizations [200] whose members[290] have higher perspective scores [1320] are more stable; members[290] with a higher degree of sophistication will be in a far better position to understand the influence of outside factors during a given time period on the actions of an organization[200].

Because of the dependence on a set of circumstances [530], culture[500] is far faster to change than is character [480]—though character[480] can also change, especially in the aftermath of a large change in senior leadership[440], change of control or similar event. A change in character [480] would be assessed by observing different cultural behavior in the same real world circumstances[530] as have been observed previously. For example, consider a street gang who has been confronted with new competition for selling drugs in the past and is again faced with a similar threat. If on the first occasion, they responded by shooting as many of the other gang's members as possible but on the second they responded by trying to change the pricing and packaging of their drugs, that would be indicative of character[480] change.

Note that because it may be difficult from the outside to establish whether two sets of circumstances[530] are truly equivalent—or are perceived by the organization's[200] leadership[440] as being so—some embodiments will support a probabilistic model instead of a Boolean one; most of these embodiments will require a higher threshold to consider that there has been a change in character[480], for example requiring more dimensions of change, or changes during another equivalent period.

Because there are potentially many different dimensions of character[480], and different embodiments are free to define their own sets and implementations, we will provide an example of one such dimension in the following section.
Diversity[13060]/Conformity of Thought[13050]

Most embodiments will measure this dimension of organizational character[480], as it is an especially critical one for those types[340] of organizations for which it is measured; arguably it is tantamount to organizational self-confidence. We thus present it as a more detailed example of how a character trait[485] is assessed. By "conformity of thought" we mean that dissenting views are not only not welcomed, but may actually be dangerous for insiders[270] to express. Because by its very definition, conformity of thought means that many views won't be expressed in the first place, in most cases indirect means must be used to measure it.

Figure 25:
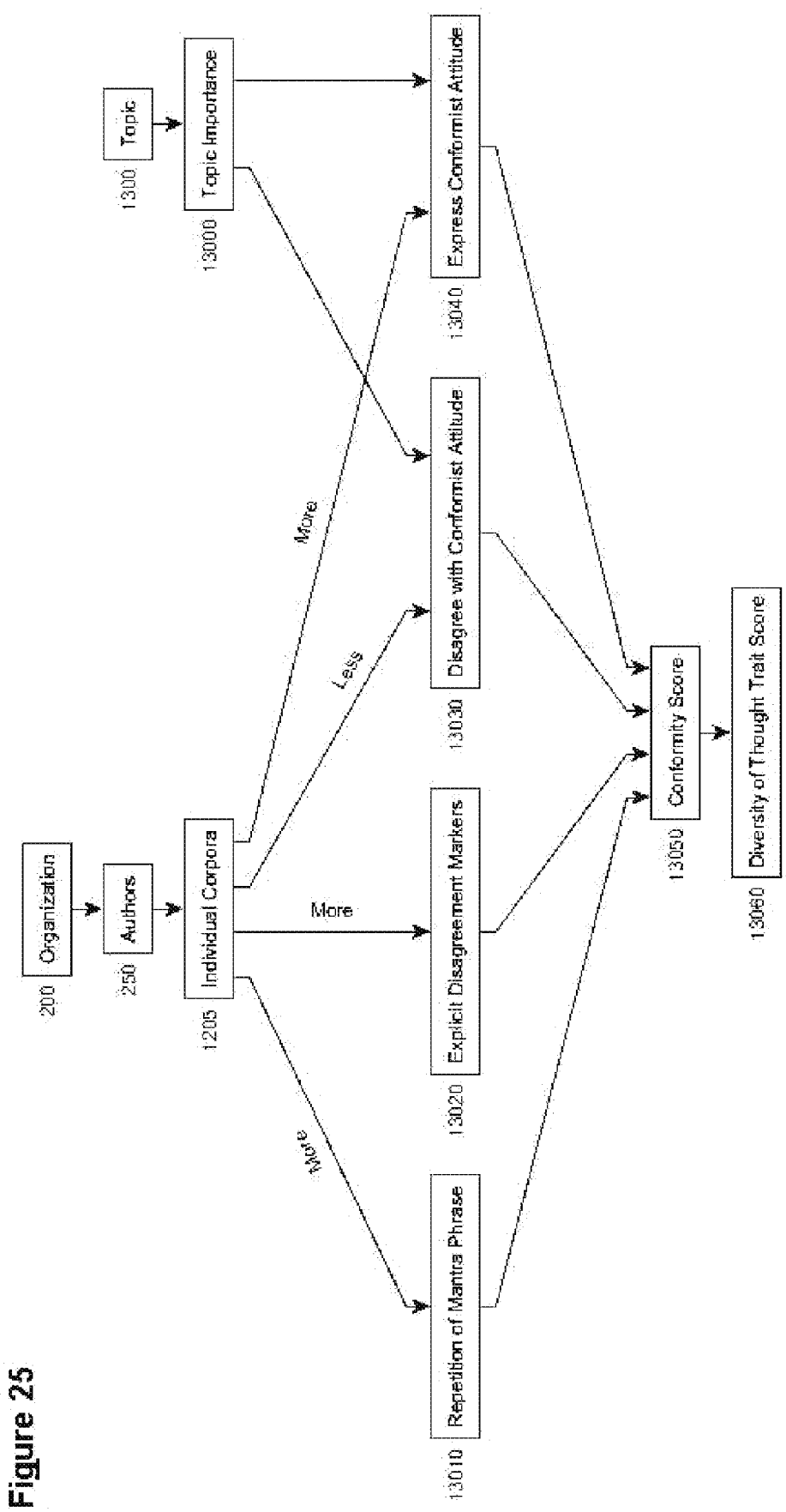
FIG. 25 is a block diagram of one embodiment of a process of determining the level of diversity of thought in an organization.

In many embodiments, one or more of the following avenues will be attempted to measure this organizational character[480] dimension (as depicted in FIG. 25):

Literal Repetition of Text Snippets:

Identification of a pattern of extremely similar statements [1215] made by apparently different authors[250], as identified by textblocking[21030] or similar methods. The prevalence of such patterns across different demographic groups [12060] is an indicator of a conformist culture. This includes both attributed and unattributed quotes. Many embodiments may require the presence of at least 2 distinct patterns so as to exclude the case in which a single especially catchy phrase or mantra is repeated with high frequency. As noted in the section on "Sincerity"[3060], such statements[1215] may or may not be sincere, but even if they are, the need to express them with very specific language may point to an organization[200] in which saying the expected thing is not just expected, but is indeed all but required.

Expression of Conformist Attitudes [1295] or Beliefs [1290] on Important[13000] Topics[1300]:

For each frequently expressed attitude[1295] down to a user-configurable threshold, most embodiments will calculate the occurrence of the reverse polarity[24000] attitude [1295] relative to the dominant attitude[1295]. This is because many embodiments will exponentially weight disagreement according to the prevalence of the dominant attitude[1295]. This is because disagreement with more frequent or fundamental propositions is a vastly bigger deal than disagreement on fringe issues. Thus many embodiments will stop at a certain threshold of percent of occurrence of the attitude[1295], while others will use more sophisticated statistical means.

Some embodiments will filter out reverse polarity[24000] statements[1215] if made by either former members[330] or current members[290] who are in some way known to not be in good standing (e.g. had been demoted) if such data is available. This is because such authors[250] likely have little to lose by not conforming. As such, counting their contrarian comments[1215] could provide a false picture of the actual diversity of thought[13060] within the organization[200].

Some embodiments will additionally weigh full beliefs [1290] being expressed that are likewise extremely similar. Note that most embodiments will not use this measure unless the adjacent context[18110] of the comments[1215] is topic[1300]-neutral. For example, if a high percentage of the comments[1215] are responses to narrow questions in a survey[25015] about specific topics[1300], this measure is much less reliable. This is because there may be little to no correspondence between the questions being asked and the topics[1300] that are considered core to the organization's [200] sense of self.

Explicit Reference:

The presence of language that explicitly expresses disagreement (e.g. "I disagree with our strategy in . . . ") or criticism of one or more organizational leader individually or by reference. Or conversely an explicit reference to being afraid to voice any kind of disagreement. Most embodiments' internal knowledge models[1340] will contain many ways of expressing both disagreement and fear of disagreement.

Some embodiments may opt to additionally perform these analyses within demographic groups[12060], insofar as it is possible in some organizations[200] that the level of conformity varies significantly by level in the hierarchy or location. Some embodiments may allow users to exclude certain topics[1300] from the second measure on the basis that they are largely objective in nature and so likely to be the subject of very little disagreement.

Different embodiments may choose to weigh these different measures differently. For example, in some embodiments, the measure will be as simple as determining the percentage of members[290] who manifest at least one—or two—of the three conformity behaviors above at least N times, where N is user-determined. Other embodiments will not consider conformity an organizational trait[485] as opposed as to a sub-organizational one if there is significance variance in the percentage of members[290] manifesting conformism behaviors among different sub-organizations[437].

"Fear-based culture" is a close, if broader, cousin that some embodiments will opt to use in preference to diversity of thought[13060] as one of the abstract character traits[520] to measure. It will typically include the tests for diversity of thought[13060] while usually adding restrictions on the expression of any negative polarity[24000] beliefs[1290]. Many embodiments will also use parsing approaches to detect unusually large numbers of indirect references to uncomfortable events, for example "the events of 2008" or "the difficult period" rather than explicitly saying "when the big layoffs happened" or referencing some other subject—known or otherwise—about which discourse may be constrained.

In the event that the organization[200] or its leadership [440] becomes put under significant stress, for example a terrorist group[220] that is losing territory or affiliates, indicators of fear-based culture or conformity of thought [13050] will likely jump. Some embodiments may thus be set up to infer the presence of particular circumstances[530] in the event of such a jump.

Stability[450]

In some embodiments, stability[450] is a measure of whether character[480] as defined in the previous section remains reasonably constant over time; different embodiments may use different statistical methods in order to evaluate this. In other embodiments, stability[450] is defined as the strength or staying power of the leadership[440]. These embodiments will measure bursts[6350] in the number of insider[270] comments[1215] that relate to the incapacity of the organization[200] or its leadership[440]. In many of these embodiments, the comments[1215] are weighted by the credibility score[410] of the insider[270] who is making them. Some of these embodiments will consider a burst[6350] in all comments[1215] about the capacity of leadership[440] rather than just the negative polarity[24000] ones, under the rationale that even a spike in positive polarity[24000] comments[1215] of this nature may be suspicious—especially in organizations[200] in which low sincerity scores[3060] are common.

By 'relate to incapacity', we mean any comment[1215] whose discernible pragmatic intent[25010] is to question, express concern or otherwise make negative assertions regarding the competence of the leadership[440] or the organization[200]. National culture often plays a significant role in how such statements[1215] about superiors are made, even in a context that is ostensibly anonymous, so the number of variations is significant including but not limited to:

If[leader] had/could/would
[Leader] should have
A better[leader] would/could
. . . whether[leaders] understands/realizes
We need a[leader] that/who
[negation] leader has the capability/ability/experience
I am concerned that [leader] doesn't realize Most embodiments will therefore opt to cast a fairly wide net, including any negative polarity[24000] statement[1215] on core competence leadership[440]-related topics[1300] as defined by the internal knowledge model[1340].

Other embodiments will consider statistically significant increases in the number of insider[270] mentions of any kind relating to the leadership[440] as a marker of instability [450], even if the mention in no way related to the competence of the management. Some of these embodiments will limit this to only negative polarity[24000] references to leadership[440]. Such embodiments employ the rationale that to the vast majority of insiders[270] in most organizations[200], leaders[440] are largely stewards, often effectively faceless; otherwise put, most members[290] think of their organization[200] choosing to do X rather than their leaders[440] doing so. Thus in many organizations[200], direct references to senior leadership[440] are fairly rare. Exception cases of organizations[200] with big personality leaders—Steve Jobs for example—will always have a high baseline threshold for the number of mentions of leaders [440]. Where the mentions of leaders[440] are markedly increasing, it is a fairly reliable indicator of change—and hence instability[450]—regardless of the polarity[24000] or topic[1300] of the comments[1215].

Still other embodiments will consider evidence of increasing insider[270] polarization of views on leaders[440] as a marker of instability[450], under the rationale that a leader [440] who is internally divisive will promote instability [450]. The majority of these embodiments will heavily weigh the credibility score[410]—or at least the perspective score[1320] of the insiders[270] who are expressing attitudes[1295] or beliefs[1290] involving the organization's [200] leaders[440].

Figure 26:
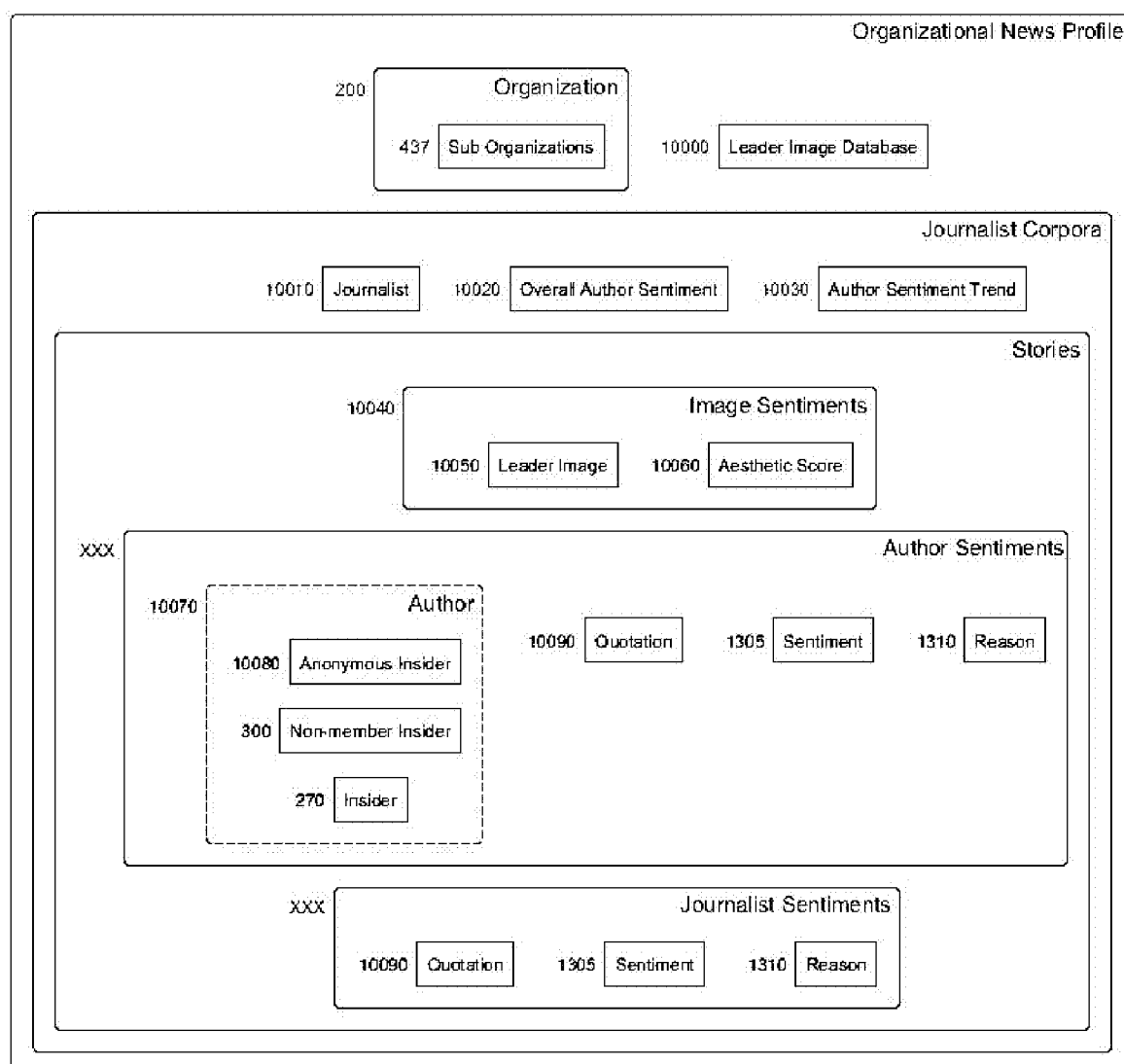
FIG. 26 is a block diagram of one embodiment of a relationship between data elements comprising a news organization and their stories regarding an actor of interest.

Many embodiments will have content in their knowledge models[1340] specifically for comments[1215] made by different types of insiders[270] so that they may treated in an author[250]-type-specific manner. An example of this in a default embodiment is depicted in FIG. 26. For example, comments[1215] made by journalists who have enough access to an organization[200] so as to legitimately be considered insiders[270] may use "code" words or phrases to describe a leader[440] including but certainly not limited to "troubled," "embattled" or "It will be challenging for [leader] to." They may likewise discuss potential replacements for the CEO, the probability that the CEO will be replaced, or the possibility of the company[210]- or significant portions of it or its assets—being sold. (In the case of terrorist organizations[220], it is no different; journalists might speculate that a smaller or weaker group may declare allegiance or join with a larger group.) However it would not be appropriate to generally consider such verbiage relevant when used by members[290]—if it were to be found at all. Most embodiments will provide support by default for several such specific classes of non-member insiders[300], including but not limited to financial analysts, military or intelligence analysts, and journalists.

Figure 27:
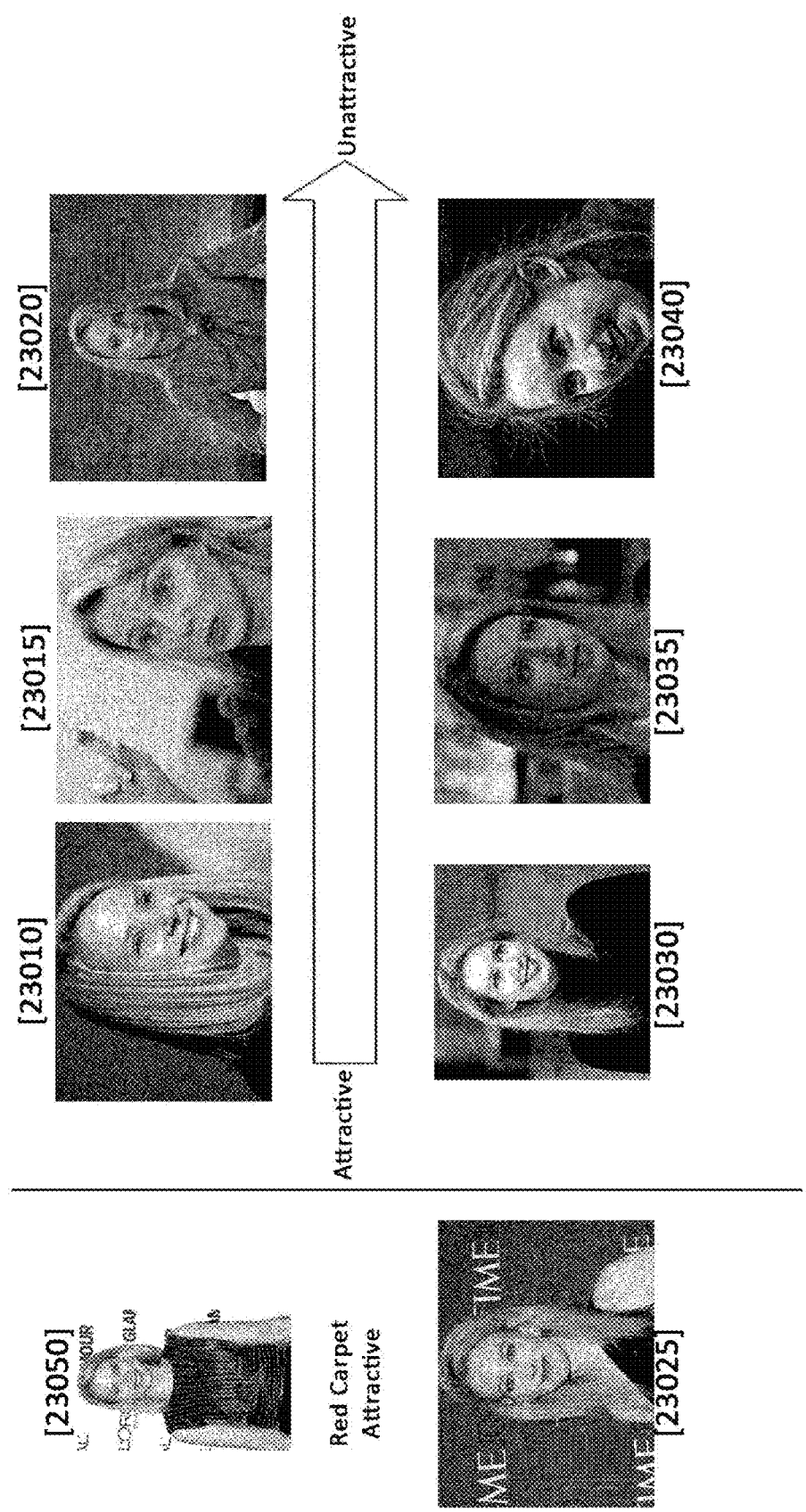
FIG. 27 is an illustration of how sentiment can be expressed through images when an author has chosen to publish one emphasizing certain qualities instead of another image emphasizing other qualities.

Some embodiments may broaden the scope from just text to images[10050] of the leader used in the journalists' articles, as the image selected to represent someone is often implicitly expressing a sentiment[1305]. Even someone who is very physically attractive can have a picture taken in which his face appears shadowed, wrinkled, or appear more asymmetric; anyone can have a picture taken in which his eyes are mostly closed, his mouth is open, and so on. This is illustrated in FIG. 27. For anyone who has a media persona, there are always multiple images[10050] available to choose from, even if the time period is quite constrained, such as the CEO giving a talk at a particular conference. Thus the choice of image[10050] used is telling.

Figure 28:
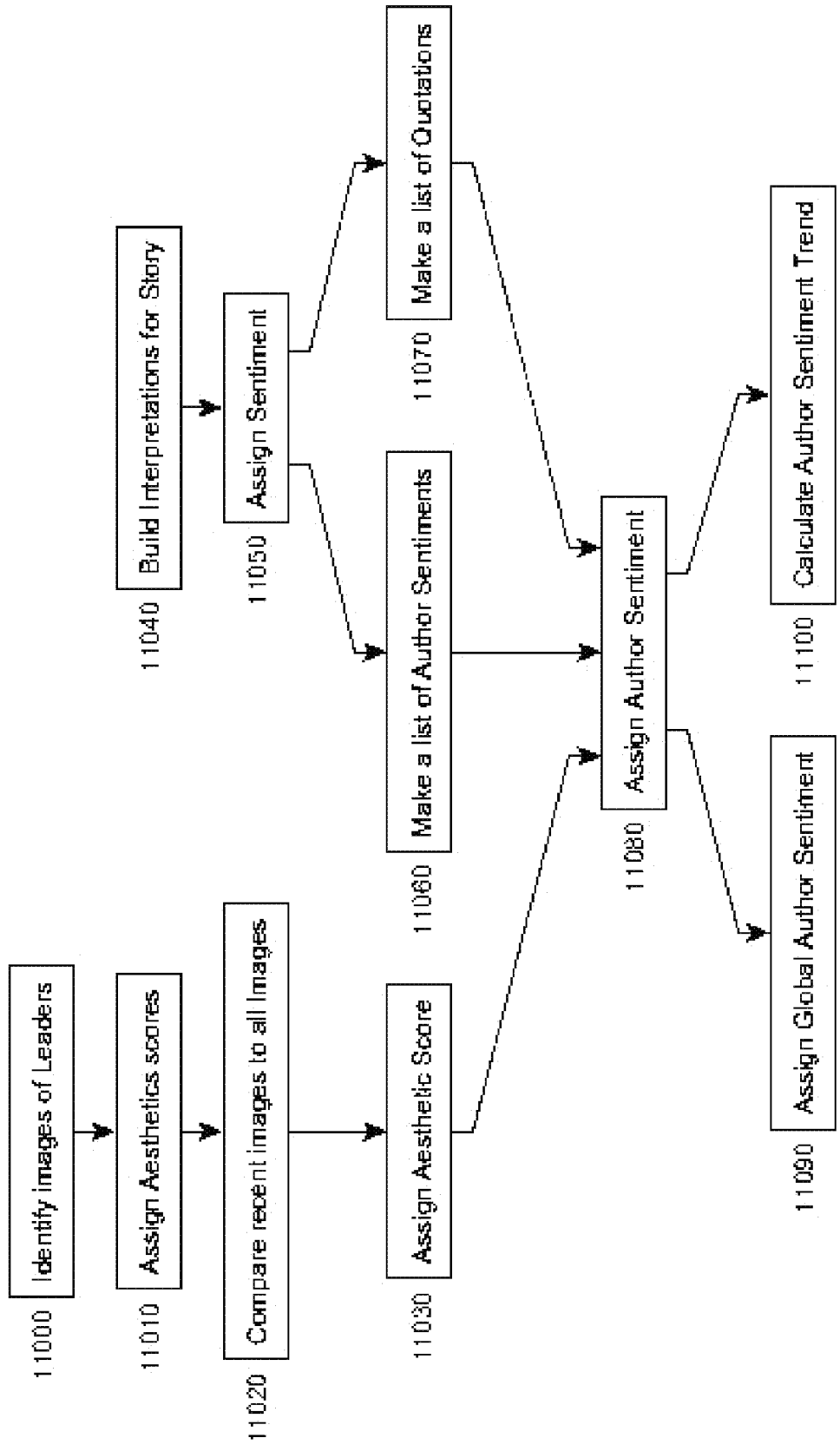
FIG. 28 is a block diagram of one embodiment of a process of determining sentiment and sentiment trend of an actor of interest on the basis of appearance and associated quotes over time.

Those embodiments that avail themselves of images [10050] in this manner will use existing techniques of aesthetics for facial and other images of humans to score each image. Most of them will perform the diligence of comparing the score of each image of a leader[440] to the established baseline score of images[10050] for that leader [440] over a significant period of time (e.g. a small number of years); most will also take the further step of comparing the images[10050] of the leader[440] that are published within a short time window by different media sources. The latter is to avoid the false positives that would be caused if, for example, the leader[440] in question simply has the flu, and so objectively looks less good for a few days than they usually do. Both time windows will have default values [2670] specified in the knowledge base[1340] which can be modified by the user if desired. This is illustrated in FIG. 28.

Virtually all embodiments will assign a strong negative weight to an increase in public statements[1215] made by insiders[270] that contain one or more observations[1332] or actionable suggestions[1330] in the context of a statement [1215] whose overall polarity[24000] is negative. Different embodiments may determine overall polarity[24000] in different ways including but not limited to counting the number of negative vs. positive polarity[24000] markers present, and counting dominant polarity[24000] by chunk. Most embodiments will similarly treat negative polarity[24000] attitudes [1295] or beliefs[1290] expressed publicly by insiders[270].

The number of such observations[1332] will rarely be large; most embodiments will assign a weight to even small absolute upticks (e.g. 10 such observations[1332] instead of 2.) The insider[270] need not be named in most embodiments. For example, in big media publications it is common to see references to "someone familiar with the matter." The fact that the journalist at a reputable media outlet is assigning credence to the source will be considered sufficient proof by most embodiments. In the event that the purported insiders[270] are anonymous, most embodiments will make some attempt to determine whether it is one or more such people at issue.

Most embodiments will textblock[21030] the article to see if it is case of one journalist or news service "borrowing" content from another, and will interpret any quoted statements[1215] to see if they are logically equivalent according to the definitions in the knowledge model[1340]; many will also avail themselves of linguistic fingerprinting techniques. Many embodiments will extend this to former insiders[270] as well, usually making an exception in any cases in which both a) the insider[270] is named rather than anonymous and b) has previously exhibited the same behavior over a long time period, the window being specified in the internal knowledge model[1340]. Note that many embodiments will make an exception for court or other compulsory testimony that is reported on by media outlets.

Many of these embodiments will treat the content from a journalist who has been qualified as an insider[270] as individual corpora[1205] in a parallel manner to how member[290] commentary is handled, and so will assess an energy level[1380] on an ongoing basis for this particular class of insider[270] based upon the number of negative or positive polarity[24000] markers[1255] detected, and, in some embodiments, the number of quotes[11070] contained in the articles and their polarities[24000], and the assigned sentiment[1305] scores for any images[10050] of the CEO or other leader that are contained in the article. Some of these embodiments will score the quotes selected higher than unquoted content, under the rationale that, much as is the case with the images, the journalist very likely has N quotes available, and will only use a small subset of them. Many embodiments will either require the quotes to be explicitly attributed to other insiders[270] even if anonymous, or weigh quotes purporting to be from insiders[270] higher than those from outsiders[280] (e.g. an analyst with general domain knowledge, but who has little to no connection to the target organization[200].)

Some embodiments will opt to expand the scope from senior leadership[440] to a broader set of internal influencers, for example to further tiers of management, those on rapid advancement paths, those with high employee review ratings, and any other group that can be identified on the basis of personnel records, or through other means such as various types of social network analysis that indicates influence.

Most embodiments will measure stability[450] according to sliding time windows. Many embodiments will opt to discount—and in some cases, even entirely remove—bursts [6350] of activity from the calculation.

Actionable Suggestions[1330] & Observations[1332]

In many embodiments, actionable suggestions[1330] play a fairly central role in assessing the members' [290] state of mind by their presence or absence, their diversity, their detail, and their scope. Such suggestions[1330] indicate things that members[290] want to be the case that currently aren't. They indicate not just individual aspirations but aspirations for the organization[200]. In organization-internal data, they indirectly indicate the boundaries of what can and can't be safely talked about. Lastly, they indicate a certain motivation level when present, both to conceive of and to take the time to write, especially when thoughtful and detailed in nature.

Figure 29:
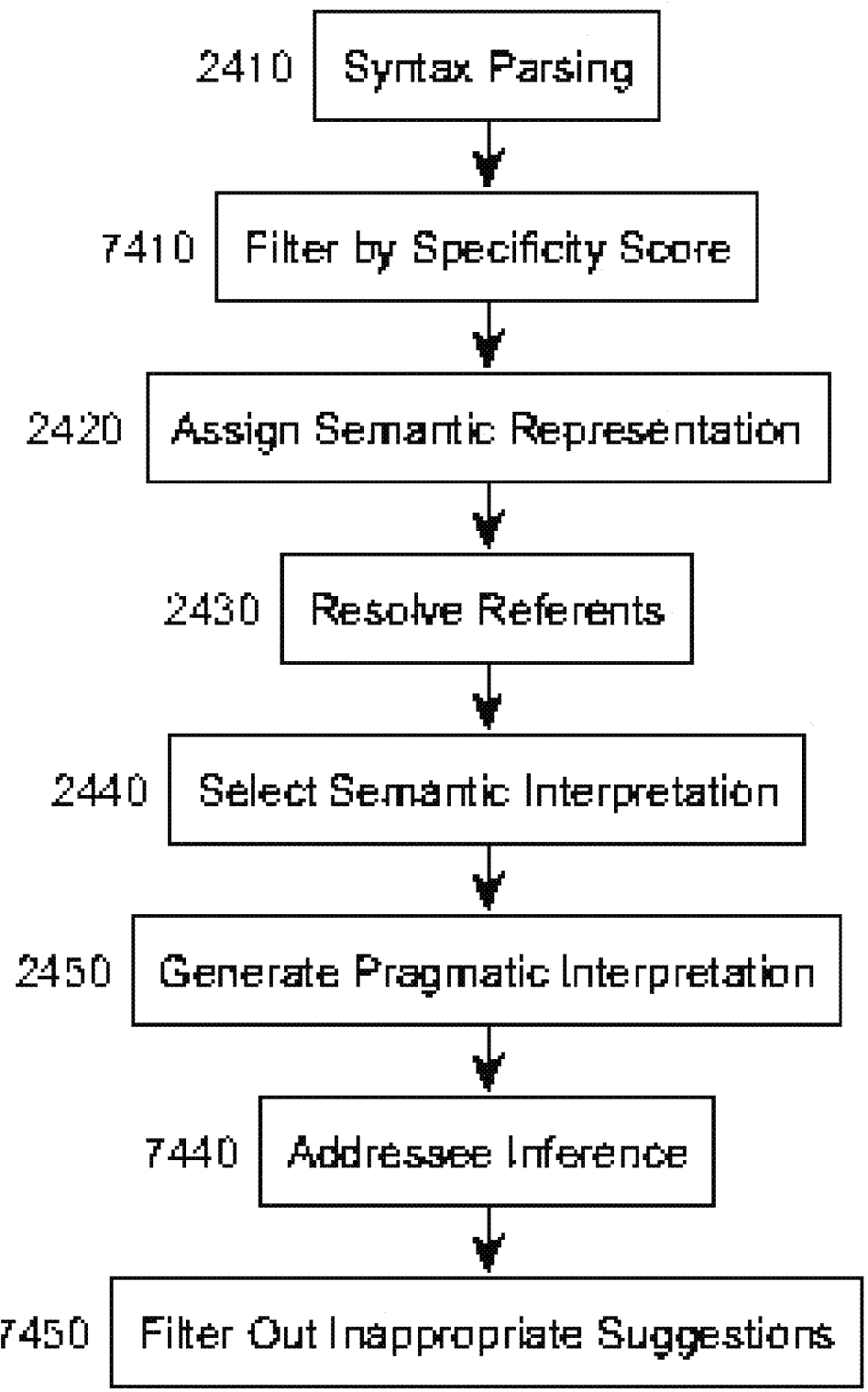
FIG. 29 is a block diagram which illustrates actionable suggestion process flow for embodiments of the invention.

However extracting such genuine suggestions[1330] is a non-trivial problem. In most real world cases, the majority of sentences that are structured linguistically as suggestions are either far too vague to be actionable (e.g. "Start treating us with respect!") and/or are in fact expressions of sarcasm or implicit complaint (e.g. "Stop laying people off.") In most embodiments, actionable suggestions[1330] are extracting in a five step process, which is illustrated in FIG. 29.

First Pass: Syntactic Processing[7400]

Most embodiments will begin the extraction of actionable suggestions[1330] with a syntactic processing[7400] pass. This step involves part-of-speech tagging, syntactic parsing [2410] and lexical look-up to extract only those comments [1215] that are consistent with the surface form of a suggestion[1325]. Most embodiments will use off-the-shelf rule-based or statistical taggers. In most embodiments, the syntactic parsing[2410] will be based on a dependency parser, enhanced with unification-based constraints. In this step, comments[1215] are extracted which start with an imperative or a gerund, sentences headed by a modal verb ('could', 'should', 'must' etc), sentences headed by a verb from the synonym set of 'suggest' (e.g., 'suggest', 'propose', 'advise', 'recommend', 'urge', 'prompt', 'encourage', 'discourage'). Other markers of a suggestion[1325] include, but are not limited to: 'how about', 'why not', and 'if . . . then' constructions.

Second Pass: Filtering Based on Specificity Score[12030]

The next step employed by virtually all embodiments is to filter out suggestions[1325] which lack the necessary degree of specificity so as to truly be considered actionable. For the purpose, the system assigns a specificity score[12030] to each sentence equipped with syntactic information (as output from the preceding step). Many embodiments will use a combination of the following features to calculate a specificity score[12030]:

Frequency distribution: the sentence contains one or more content word and/or syntactic argument that are not typical for the corpus[1200] associated with the target organization [200]. Some embodiments may choose to extend this to data from other organizations[200] in the same sector[430] or region[433] so as to expand the available data set. The frequency distribution is assigned on a list of token-tag tuples. Grammatical words have no direct relationship with specificity[12030] in most embodiments. This step assures that the word exists in any large lexicon of English (or other languages as appropriate) words. This prevents assigning a specificity point to misspellings which will generally be at the low end of the frequency distribution. In most embodiments, the associated threshold for cut-off is configurable. Note that the specificity[12030] point assigned to the non-typical words/phrases will be a sliding scale as determined by the individual embodiment. The invention uses this as a proxy for the continuum of specificity[12030].

Leverage the knowledge model[1340] to provide a specificity level. Terminal nodes, subtypes and domain-specific vocabulary are assigned a specificity point. Abstract, top-level classes[1350], inherited by all domains from the knowledge model[1340] are not assigned a specificity [12030] point. For instance, in "We should get higher salaries", "salary" is in the synonym set of generic words and phrases associated with rewards; "higher" is a generic adjective describing rewards. In contrast, in "We should get iPads for the crew members to better coordinate during trips", "crew members" is a specific type of an employee, an iPad is an instance of equipment.

Sentence length: short comments[1215] are more likely to be generic (e.g., "More training", "We should build better products", "Acme Corp should start innovating." This can be explained with the fact that longer sentences provide more context and thus contain more descriptive and explanatory language (often rendered via relative clauses, subordinate clauses, complex phrases). Some embodiments will prefer to parse and score clauses instead of simply length. Note that actionable suggestions[1330] which span multiple sentences are handled later in the discourse processing step.

Use of any standard named entity recognizer to assign a specificity[12030] point to statements[1215] containing named entities such as location, persons, expressions of quantities and times, including words of uppercase letters and acronyms, foreign and unknown words. This allows the capture of information that lies outwith the knowledge model[1340], but can still reasonably be presumed to be actionable. It also highlights the underlying definition of specificity[12030] as comments[1215] contributing novel, different information to the existing data set. Note that many embodiments will opt to score rarer actionable suggestions [1330] more highly than commonly occurring ones in an engagement[1375] calculation under the rationale that the very rare (or unique) ones required more thought.

Third Pass: Semantic Processing[2440]

The next step involves semantic processing of the sentences. Most embodiments employ a shallow semantic parser which, leveraging the knowledge model[1340], labels the semantic roles of the predicate (the head in the sentence). For instance, "We should give out more fresh food, like apples or bananas" invokes the following frame[1360]: [provide: SUPPLIER Target Organization; THEME food]; "Economy customers should be provided with a hot meal on flights between New York and Dallas", invokes the following frame[1360] [provide: RECIPIENT economy customers; THEME food; TIME during flights]. The frames[1360] operate by inheritance with the higher level frame[1360] being [provide: THEME food]. By inheritance, it can be inferred that both suggestions[1325] map to the same frame [1360]: "bananas" are a type of a fresh food, "hot meal" is a type of food, "give out" and "provide" belong to the same synonym set; not all frame slots[1360] are obligatory. It should be noted that even though the surface realization is different (the syntax and the expressed semantic slots), both comments[1215] are of the same high-level topic[1300], namely that the provided food should be improved.

Further, this approach allows for both the handling of specific instances and subclasses[1350] that are outside the current knowledge base[1340] and for words and phrases that are totally unrecognizable altogether. For example, if the knowledge base[1340] does not contain explicit knowledge of what Laguiole is in the comment[1215] "It would be nice to offer some Laguiole to all passengers on Transatlantic flights", the unknown word "Laguiole" could nonetheless be mapped to an abstract entity, supertype of "food" and "beverage". This is because the predicate's semantics imposes restrictions on the items that can be offered to passengers on the plane: food, beverage, etc. If the system is presented with a suggestion[1325] such as "Replace the X45's with the Z67's" with no knowledge of what either an X45 or a Z67 might be, most embodiments will consider the statement[1215] an actionable suggestion[1330] with a category of "Misc" or similar. Importantly, it is not necessary for the system to have this knowledge because the statement [1215] passes all of the tests for being classed as an actionable suggestion[1330] anyway.

Addressee Inference[7440]

In most cases, actionable suggestions[1330] lack a specific addressee. So if one is desirable, some embodiments provide a mechanism for inferring whom the actionable suggestion[1330] is intended for. The knowledge model [1340] incorporates information about the organizational hierarchy. By tracing up the nodes in the internal knowledge model[1340] starting from the theme of the suggestion [1330], the division/part of the organization[200] in charge of the theme, can be established. For example, consider the suggestion[1330]: "New flight deck crew members should be trained not for 2 weeks but for at least 4 weeks". The theme here is about flight deck crew and one important attribute: their training. From the knowledge model[1340], one can know that flight deck crew are directly linked with Flight Operations Training Department, which is part of Flight Operations department. Whether the first level division manager should be inferred as the addressee or someone else higher up in the hierarchy is configurable.

In absence of domain-specific knowledge about the structure of the specific organization[200], the system will use the demographic information[420] associated with the corpus [1200], (for example, the division/unit where the author [250] works), and/or the core component of its internal knowledge base[1340] that encodes generally-applicable information.

Fourth Pass: Discourse Processing[2450]

Most embodiments allow for actionable suggestions [1330] spanning multiple sentences. Even though the suggestive segment is very often contained within one sentence, additional context, including the reason[1310] is provided within other parts of the discourse. For instance, in the following example:

a. "I am concerned there are no recycling bins at the office. We should request them from the City Council. This will have a positive impact on the morale amongst the employees."

the system has to correctly resolve "them" to "recycling bins" and "this" to the event of requesting recycling bins. This is performed in most embodiments by standard methods of supervised learning that employ a combination of syntactic features, semantic features and salience. Likewise, direct reference to nouns and noun phrases in subsequent sentences will be considered to be part of the actionable suggestion[1330].

Some embodiments will present actionable suggestions [1330] that are supported with explicit reasons[1310] separately from those lacking such support. Likewise, some embodiments will score such suggestions[1330] higher in an engagement[1375] calculation.

Fifth Pass: Low-Value and Inappropriateness Filtering [12010]

Most embodiments will have the additional step of filtering out suggestions[1330], which although sufficiently specific, are of low—or zero—informational value[22020] and/or are inappropriate. This is a necessity for the extracted actionable suggestions[1330] to be real-world useful, since frequently the vast majority of suggestions[1330], even after the first 4 passes, would not rise to the level of warranting human review. These are often suggestions[1330] that are primarily oriented towards the benefit the author[250] rather the organization[200]. For instance, "My manager should give me a raise to $15.50/hr" is in the form of a suggestion [1325], and it would receive a high specificity score. However, in absence of further discussion about salaries paid by competitors for comparable positions that would add value to the suggestion[1330], most embodiments will allow for this to be filtered out on the basis of "salary" being a "me" topic[7020]. The pragmatic intent[25010] of such a statement[1215] is less that of a genuine suggestion and more one of a hint. Most embodiments will by default designate certain topics[1300] as "me" topics[7020], so that they can be filtered out, or at least isolated from other comments [1215] at this stage.

Other types of low value suggestions[1325] are those that are understood by the author[250] to be wholly impractical and whose pragmatic intent[25010] is essentially complaint. For example, suggestions such "Stop offshoring and outsourcing our jobs to India" or "If you take the CEO's $58M bonus and divided it among the employees, it would be great for morale." may reflect genuinely negative sentiment[1305] about the related topics[1300] on the part of the author[250], but do not belong in an extracted collection of suggestions deemed to be actionable[1330] such as efficiency-improving changes to a manufacturing process. These can likewise be filtered out for the most part by designating topic[1300] classes in addition to "me" topics[7020] that should by default be isolated from the set of extracted actionable suggestions[1330].

Almost all embodiments will support the notion of inappropriate comments[1215], and will isolate any comments [1215] that fall into this category. What exactly will be deemed inappropriate will vary both with the embodiment and the particular user, but common examples include comments[1215] such as the following:

"Fire that backstabbing bitch Susan White"—both the suggested action and the language are inappropriate for most suggestion forums.

"Stop the discriminatory behavior in the shipping department"—a complaint or accusation, but certainly not a suggestion[1325] in the sense intended here.

"Replace our manager with that hot guy from international procurement"

Such comments[1215] can likewise be isolated using a combination of topic[1300] and sentiment[1305] analysis; any existing standard method will do. Most embodiments will provide users a way to view such comments[1215] should they wish to do so as they may have other value (e.g. identifying possible risks and HR issues.)

Finally, many embodiments will treat actionable suggestions[1330] that contain a significant amount of negative polarity[24000] loud talking[1283] or whose sentiment [1305] is strongly negative such as anger, frustration, etc as essentially falling into the inappropriate comments[1215] bucket. This is just playing the probabilities: an emotional comment[1215] is less likely to be a genuinely valuable one. Some of these embodiments will set user-modifiable thresholds to this end, for example determining the number of loud talking[1283] markers found in the text of the suggestion [1330] before the suggestion[1330] is filtered out on the basis of inappropriateness. Alternately, other embodiments will set the scope to be either the entire comment[1215] in which the suggestion[1330] is contained, or the set of comments[1215] from the same respondent within a limited time window (e.g. all of the responses provided in the same survey[25015] or interview.)

It should be noted that just as actionable suggestions [1330] are considered a positive polarity[24000] marker in various contexts, such as engagement[1375], those that are trapped as inappropriate in this fifth step will be considered as negative polarity[24000] markers in each of these scenarios by most embodiments. This is because the inferable pragmatic intent[25010] of the author[250] in this case is less that of making a constructive suggestions[25050] as opposed to asserting a complaint.

When assessing the positive contribution to engagement scores[1375] of specific actionable suggestions[1330], some embodiments will boost the score of actionable suggestions [1330] which demonstrably correspond to comments[1215] made by non-member insiders[300] and outsiders[280]—assuming that such data is available for analysis. For example, if many customers complain that support people seem more concerned about keeping a call short than providing adequate assistance, and workers at the call center suggest that the time allocated per call before they get dinged be increased, these suggestions[1330] are given a higher score towards engagement[1375] because the suggestion[1330] has some clear, real-world evidence supporting it.

Observations[1332]

Most embodiments offer the construct of observations [1332] as distinct from actionable suggestions[1330] and reasons[1310] so as to capture author[250] statements[1215] which have high informational value[22020] but are neither in the linguistic packaging of a suggestion[1325] nor offered as a reason[1310] for a particular attitude[1295]. Note that both actionable suggestions[1330] and reasons[1310] may contain observations[1332]. For example:

a. "We should stop providing the fruit plate that the vast majority of customers don't eat!"
b. "We should have more security guards at night again; since we reduced the number of guards, the theft of merchandise has gone up by 18%"

where the bolded font indicates the observation[1332].

When an observation[1332] appears in neither of these contexts, the inferable pragmatic intent[25010] is that the author[250] wants to make the imputed reader of their text[1215] aware of the content of the observation[1332], which may be either positive or negative polarity[24000]. In this way observations[1332] are similar to actionable suggestions[1330]; the author's[250] pragmatic intent[25010] is assumed to be constructive in both instances.

Figure 30:
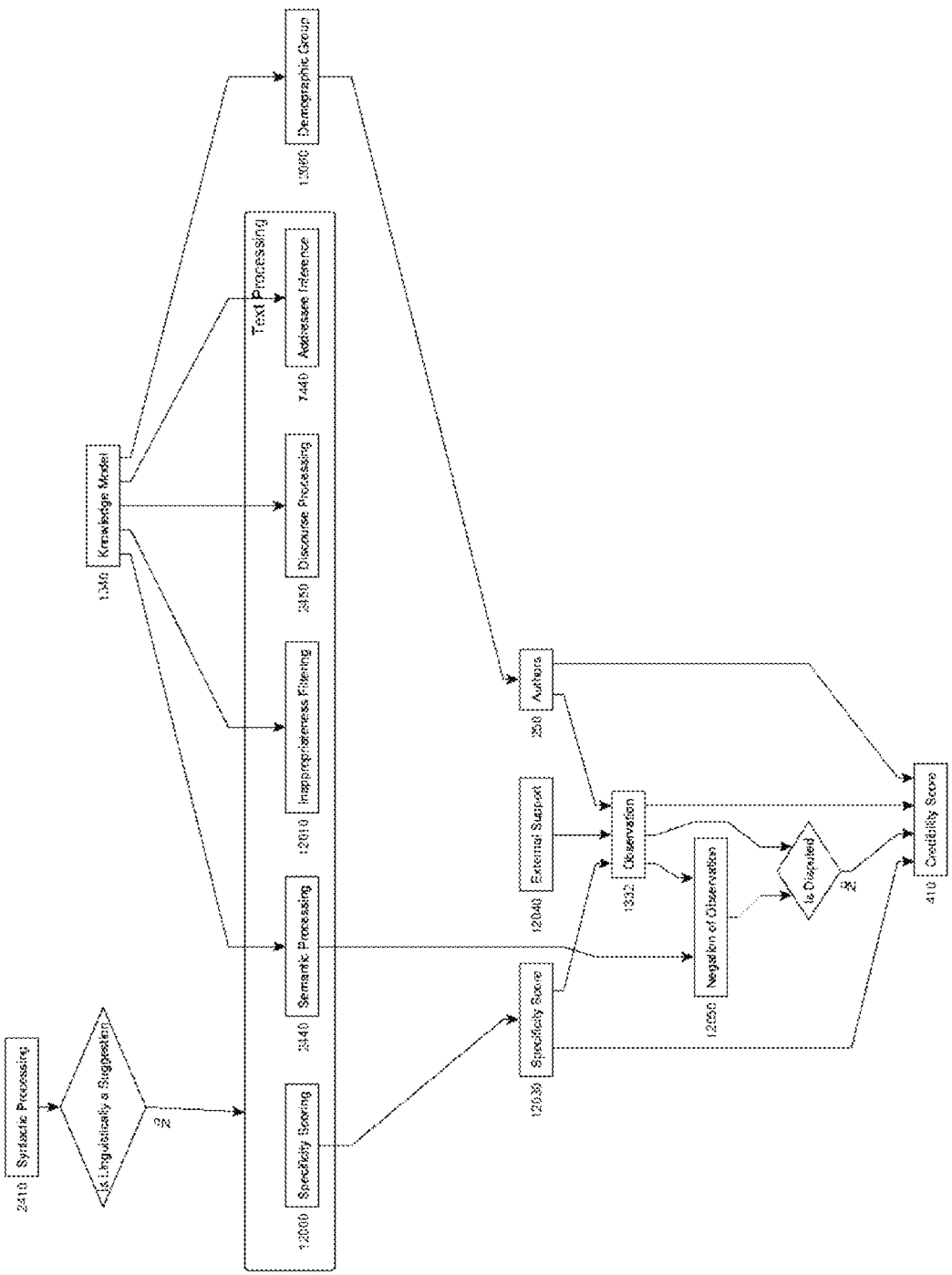
FIG. 30 is a block diagram of one embodiment of a process of determining the level of credibility of an observation reported by an author.

Observations[1332] are extracted and interpreted in most embodiments using a subset of the processing steps that are used to identify actionable suggestions[1330]. Specifically, the syntactic processing[7400] to identify a linguistic suggestion[1325] will be omitted. This is illustrated in FIG. 30.

Presentation & Prioritization

Because there can be large numbers of actionable suggestions[1330] and observations[1332], most embodiments will provide a means of prioritizing these suggestions[1330] and observations[1332]. Most embodiments will roll up subtopics[1300] to higher level topics[1300] so as to be able to bucket these statements[1215] together topically. To this end, most embodiments will support a "desired bucket size" parameter, much as is done with clustering algorithms. For example, to achieve the desired bucket size, "vision care" may be rolled into "benefits", or the even higher level topic[1300] of "rewards."

Most embodiments will then score the buckets. Almost all embodiments will either apply a weight for the informational value[22020] or the mean specificity score[12030] of the items in the bucket. Even though by definition, all of the bucketed items are at least reasonably specific, there will be some range and that range will be factored in, creating a weak weight if the specificity score[12030] is the weight. Informational value[22020] will be used in preference to just specificity score[12030] alone in usages in which novel utterances[2600] and variance with common attitudes[1295] are of primary interest; using informational value[22020] as opposed to specificity score[12030] will boost the scores of buckets with more heterogeneous content.

Likewise, many embodiments will apply weights including but not limited to the median perspective score[1320] and the median credibility score[410] of the authors[250] of the items in each bucket as a weight to adjust the display or output order of the buckets. The buckets can then be presented in descending order of score to users in a tabular display in a user interface, or be outputted to third party software.

Lastly, most embodiments will treat observations[1332] that have an extremely high informational value[22020] and a high credibility score[410] as special cases because their real world value may be very high. Different embodiments will set their own thresholds for what will count as "high." This may include sending alerts, or assigning a special display bucket for them.

Aggregate Attitudes[1295] & Beliefs[1290]

Almost all embodiments will output aggregate counts for attitudes[1295] and beliefs[1290] about topics[1300] which are expressed in the internal knowledge model[1340]; some embodiments may additionally output attitudes[1295] and beliefs[1290] even about unknown objects—so long as the utterance[2600] in question can be parsed adequately to identify an unknown noun phrase. Most embodiments will aggregate for individual target organizations[200], as well by organization type[340], sector[430], region[433], and for any set of organizations[200] that have been specified in the knowledge model[1340] as being "comparable" to one another, including organizations[200] that share similar organizational character traits[485] with one another (as determined by clustering or any other accepted measure of identifying self-similarity.)

In addition to tabulating them by raw frequency for display or export to third party software, a preferred embodiment will segment the attitudes[1295] and beliefs[1290] by the mean perspective score[1320] of the authors[250] of the relevant utterances[2600] in tranches, the exact nature of the tranches being left up to the individual embodiment (e.g. quartiles, according to a selected distribution, etc.) Other embodiments may prefer to instead use credibility score[410]. In either event, this has two impacts:

It allows the attitudes[1295] and beliefs[1290] of the more sophisticated members[290] to be isolated for review. As these are very often the leaders or influencers in an organization[200], a higher de facto value can be assigned to their comments[1215], independent of the value of the comments[1215] themselves. Similarly, by highlighting the attitudes[1295] and beliefs[1290] of the least sophisticated members[290], opportunities for important internal education may be identified.

By highlighting the contrast between what is understood or believed by more sophisticated vs. less sophisticated members[290], the cost of having uninformed members[290] may be better understood by leadership.

Some embodiments will also provide a mechanism for users to specify thresholds such that if greater than X % of members[290]—or insiders[270]—who have a perspective score[1320] greater than Y have a negative polarity[24000] attitude[1295] on a given topic[1300], the topic[1300] in question should be flagged as an objective problem, one worthy of serious consideration. Some embodiments will again opt to use credibility score[410] rather than perspective score[1320] for this purpose.

Engagement[1375]

Overview

The objective of the system is to consider a member[290] as being "engaged" if there is evidence that he/she appears to meet most of the following high level tests—or in some embodiments all—as judged by analysis of their individual corpus[1205] and actions[1220].

He really cares about the organization[200], has a sense of pride or even of ownership of it, wants any perceived problems and weak spots remedied regardless of whether or not they directly relate to him.

He thinks about how to help safeguard the organization's[200] (or some portion of it) future as well as how to improve things on a day-to-day basis in his immediate area and/or his own job performance.

He has feelings of loyalty towards either/both the organization[200] and the people in it; in some cases, loyalty to the mission.

He believes that what he does matters, that success at some level, if only a personal one, is both possible and achievable.

He tries to understand both the organization[200] and the environment in which it operates.

Some embodiments may use somewhat different tests; most embodiments will allow the addition of further tests as are warranted by specific scenarios. Some embodiments will choose to extend the concept of engagement[1375] to some classes of non-member insiders[300], though not all tests will apply to non-members that will to members[290].

By contrast, a "disengaged" member[290] is one who meets most—or depending on the embodiment all, of the following tests:

Expresses little to no sense of making any difference whatsoever in his job.

Expresses little to no hope that the situation will improve.

Projects a sense of hopelessness, passivity, disappointment or anger.

These tests represent more of a classical counter-intelligence viewpoint than a traditional HR one, in which engagement levels[1375] are often measured via multiple choice surveys. In counter-intelligence, recruiters look for exploitable weaknesses in a target recruit. Someone who is fully contented can't be "turned" since they already have everything that they want by definition. This invention transfers that thinking to HR analytics with the result that an employee-employer relationship in which there are few or no weaknesses is unlikely not only to be recruited away, but to become disengaged, passive, or otherwise create mischief. They are however likely to be good, conscientious workers. Note that while we may use the term "employees," we intend the same logic to apply to other types of organizations[200] beyond corporations[210].

Under these definitions, the engaged employee[320] needn't—and often won't—comment on how happy he is, or compliment the management[440] or the company[210]; he is too busy thinking about his work. Likewise a disengaged employee[320] may not make any classically negative comment[1215] about the organization[200]. Instead, their commentary is likely to very much center on their own personal experience rather than on the organization[200] more broadly. For example, such a person is far likelier to say "It doesn't matter how well I do my job" as opposed to "Acme Widget Company is a horrible employer." In fact, an "engaged" employee[320] may make more critical statements[1215] than a "disengaged" or neutral employee[320], simply because anything that she sees as not being up to the standards or potential of the organization[200] upsets her. And because she is paying more attention.

Components of Engagement[1375]

The high-level tests mentioned above are attempts to assess common areas of potential strength or weakness in a member[290]<-> organization[200] relationship. Most embodiments will use methods including but not limited to the following in order to implement these tests:

The greater the number of distinct topics[1300] mentioned, the higher the score for this vector, unless each of the topics[1300] has only a negative sentiment[1305] associated with it. In this last case, the comment[1215] is considered to be a tirade. However, a mixture of expressed sentiments[1305] is very often just a sign of objective commentary, and so boosts the authors' [250] Objectivity Score[3050]. Some embodiments will also weigh the informational value[22020] of the text that is associated with each topic[1300], the greater the informational value[22020] the better.

Where there are negative attitudes[1295] expressed, most embodiments will treat as evidence of positive engagement[1375] the presence of one or more mitigating statements[1215]. For example "The hours are long and the customers sometimes difficult, but I couldn't imagine doing anything else." Mitigating statements[1215], also known as hedging terms, are those that start with words such as despite, still, nonetheless, however, and but followed by some expression of a positive sentiment[1305] that is directed towards the organization[200] or a proxy for it.

The presence of actionable suggestions[1330] or observations[1332] is treated as a positive marker for engagement[1375] by most embodiments as it suggests that the author[250] is sufficiently engaged to come up with at least reasonably meaningful suggestions[1330] and observations[1332]. The higher the number of such suggestions[1330] and observations[1332], the higher the score for this dimension. However, some embodiments may slightly discount suggestions[1330] and observations[1332] that were actively solicited (for example, where the adjacent context [18110] was specifically asking for a suggestion.) Many embodiments will not consider other types of suggestions[1325] as a positive marker. As previously noted, some embodiments may in fact opt to consider suggestions[1325] that are not actionable suggestions[1330] as evidence of disengagement[ENGAGE117]. "Pay us more!" for example is unlikely to have been offered by the author[250] as a serious suggestion, and accordingly will be treated by most embodiments as an expression of negative sentiment[1305] on the topic[1300] of salary.

Evidence of a more complex perspective[400]—or just the resultant score[1320], depending on the particular embodiment—than is usual for the given role or job level relative to others who are similarly situated in the same sub-organization[437] is a positive marker for engagement[1375] as it likewise suggests effort spent in trying to understand the organization[200] beyond that of their comparably situated colleagues.

Unusual amounts of use of first person usage is a negative marker for engagement[1375]; it suggests that the person thinks more about their immediate wants and needs than they do about the organization[200] as a whole. For example "I am frustrated by the outdated equipment." focuses at least as much on the personal frustration as on the actual problem. Otherwise put, while "problem"[2145] statements[1215] may even be positive indicators for engagement[1375]—as actionable suggestions[1330]—"disappointed"[2140] statements[1215] are considered as negative indicators for engagement[1375] by most embodiments.

However many embodiments will go further than the boundary of disappointment[2140] in this regard, and will consider the density of first person pronouns independent of sentiment[1305] context (though excluding ancillary uses of first person such as "I believe", "I think" etc, which do not add semantic content to the sentence.) Some of these embodiments may further restrict this to the use of first person singular, while other embodiments will take the position that "we" is often just a more political fashion of saying "I".

Similarly, the proportion of "me" comments[1215], whether explicit or implicit, in relation to actionable suggestions[1330] and other types of organization[200]-focused comments[1215] will be treated by most embodiments as an engagement[1375] marker, the smaller the proportion of "me" comments[1215], the more positive. An implicit "me" comment[1215] is one in which the pragmatic intent[25010] of the comment[1215] relates to something that directly benefits the author[250]. In many embodiments this determination will be made on the basis of topics[1300]. For example, "salary" is by default a "me" topic[7020] unless the comment[1215] relates to someone else's salary other than the author's[250]—or that of a group which contains the author[250].

Certain surface markers are per se negative or positive because of the state of mind that they suggest. For example, 'greedy', 'bloodsucking', 'soulless' can safely be considered negative markers in almost every real world context. Most embodiments allow lists of these surface markers to be modified by users with appropriate privileges. Likewise, in many embodiments, the knowledge base[1340] will contain pop culture references that if used in metaphors or analogies in authors' [250] text[1215] will be considered as having a per se polarity[24000]. This includes, but is not limited to, references taken from movies, TV shows, books, sports, news stories, popular songs and historical references, for example likening the organization[200] to the Titanic.

Mentions of specific personal workplace achievements are a strong marker of positive engagement[1375] in almost all embodiments. This is the case whether or not the outcome has already been accomplished or is a future goal. Note that by "workplace achievement" we do not mean a promotion or a raise but rather an accomplishment from the organizational point of view (for example, the winning of a large contract, an increase in sales in a given region, etc.)

Explicit statements[1215] that are consistent with any of the engagement[1375] tests being used in the particular embodiment, for example "I don't feel that what I do makes any difference." or "I feel a tremendous sense of pride in that that our research saves lives." However, most embodiments will heavily weigh positive polarity[24000] statements [1215] according to their sincerity score[3060].

An author[250] noting his credentials in the context of a comment[1215] about the organization[200] will be considered a negative marker for engagement[1375] in almost all embodiments.

Changes in observed action baseline behavior[1830], as detailed elsewhere in this document, if such data is available.

References to the actual performance of specific actions [1910] according to what is specified in the knowledge model[1340], or an explicit statement[1215] of a decision not to take such an action. For example, in the context of a terrorist organization[220], someone explicitly saying on an extremist forum that he "has taken a trip to meet up with my brothers" would be specified in a knowledge model[1340] as a positive engagement[1375] signal, since making a voyage suggests a certain level of commitment. Most embodiments will only consider actions[1910] that are asserted to have already occurred or are in the process of occurring. A negative polarity[24000] example would be that of an employee[320] mentioning that she "is interviewing for positions elsewhere."

Many embodiments will consider energy[1380] as separate from engagement[1375] however some may opt to consider energy[1380] as a component of engagement [1375]. Energy[1380] is discussed in detail in the following section.

Some embodiments, especially those that do not treat energy[1380] as a component of engagement[1375], will consider the concentration of comments[1215] in different tiers of the Maslow Pyramid of Needs-style model[26000] described elsewhere in this document. Note that in many cases there will be a spread of comments[1215] across the various tiers in the pyramid even on the part of the same individual, unlike with the original Maslow Pyramid of Needs. This is because in our context, one arguably never has enough compensation for example, whereas one can have enough oxygen, food, etc. Yet, in organizations[200] in which the majority of members[290] are engaged, the delta between the salary that one has and that one could potentially have elsewhere will seem less important—at least for those who already have a certain amount. This is a dimension that will vary considerably by job level, region[433], and sector[430].

Most embodiments will assign a weight proportional to the author's[250] sincerity score[3060]; a low sincerity score[3060] suggests that the positive statements[1215] made do not in fact signal engagement. Similarly, if a non-zero "fear score"[15110] is detected for an insider[270] based on the automated prompter[15140], most embodiments will either feed that information into the author's sincerity score[3060], decrementing it as they see fit, or else employ it as separate negative weight.

Behavioral Baseline [1830] Calculation

Almost all embodiments will prefer to have baseline-able data, which is to say data that can be harvested and analyzed on a continuous basis. If such data is available only for some subset of insiders[270]—as will usually be the case in real-world scenarios—almost all embodiments will take what they can get and leverage the use of archetypes[310] to build more complete/continuous individual corpora[1205] and behavioral metrics for a greater number of insiders[270] than there is continuously available data for.

As usual, different embodiments are free to take somewhat different approaches to the calculation. However, virtually all valid embodiments will score a sustained increase in positive engagement[1375] activities as positive and a sustained decrease in these activities as negative. Likewise, a sustained increase in "exit" behavior will be scored negatively, and a sustained decrease, positive. (Note that in many instances, the same behavior is an exit behavior[1860] or a positive engagement[1375] signal depending on whether it is increasing or decreasing, or vice-versa.) In most embodiments, an observed increase in exit behaviors [1860] trumps all else, because these behaviors are the least ambiguous—assuming that sufficient data was collected to have a sound statistical observation.

As previously noted, many embodiment will support classes of exception, most of which fall under the category of "explainable, finite term distraction" after which there will be a return to something approximating the prior state. Similarly, most embodiments will baseline not just on an individual basis, but on a collective one across one or more comparable organizations[200]. While most embodiments will have knowledge bases[1340] that contain knowledge about common holidays for example, few embodiments will choose to rely upon this mechanism alone and so will try to identify what events and anomalous periods they can by data mining and/or various statistical approaches. Likewise for events that are specific to the given organization[200] that will cause temporary perturbations including bursts of activity[6350]. However, if there is no general return to the prior state within a finite term, the observed anomalies will be considered as changes in behavior.

As previously noted, the polarities[24000] of the signals derived from the individual corpora[1205] and those derived from the behavioral baselining[1830] will not always align. In this event, most embodiments will rely on the negative polarity[24000] signals from a statistically significant amount of behavioral baseline data over positive polarity [24000] ones from the textual data. Apart from this one special case, most embodiments will treat the action[1910] data as another vector in the engagement[1375] calculation, and choose its own weighting and thresholding strategy for each.

Energy[1380]

A member[290] may have many reasons for showing unwavering support for his organization[200] from sheer pragmatism (e.g. leaving the organization[200] is not practical) to sentimental attachment, to honest belief in it, to loyalty or just plain stubbornness. Likewise, a member[290] may decide to de-commit or depart from an organization [200] despite the organization[200] apparently being successful. Thus energy[1380] is regarded by many embodiments as a distinct concept from engagement[1375] because it reflects how the member[290] views the organization[200] and its place in the world as opposed to how committed they are to it. Many embodiments will assign energy[1380] scores to classes of non-member insiders[300]. This is under the rationale that while such external actors[240] may not normally be expected have an intense commitment to the organization[200], for example if important non-member insiders[300] do not think that the organization's[200] future prospects are strong, it is likely to change their behavior in ways harmful to the organization[200]. For example, suppliers may decide to stop supplying the organization[200] in a preferred way—or at all.

Most embodiments will measure energy[1380] on the basis of the members' [290] aspirations and fears for their organization[200]. These may be expressed directly, for example "I hope this organization still exists in another 5 years", or indirectly "Career growth opportunities seem more limited than previously." or "If Widget Corp enters our market, we are going to be in real trouble."

Figure 31:
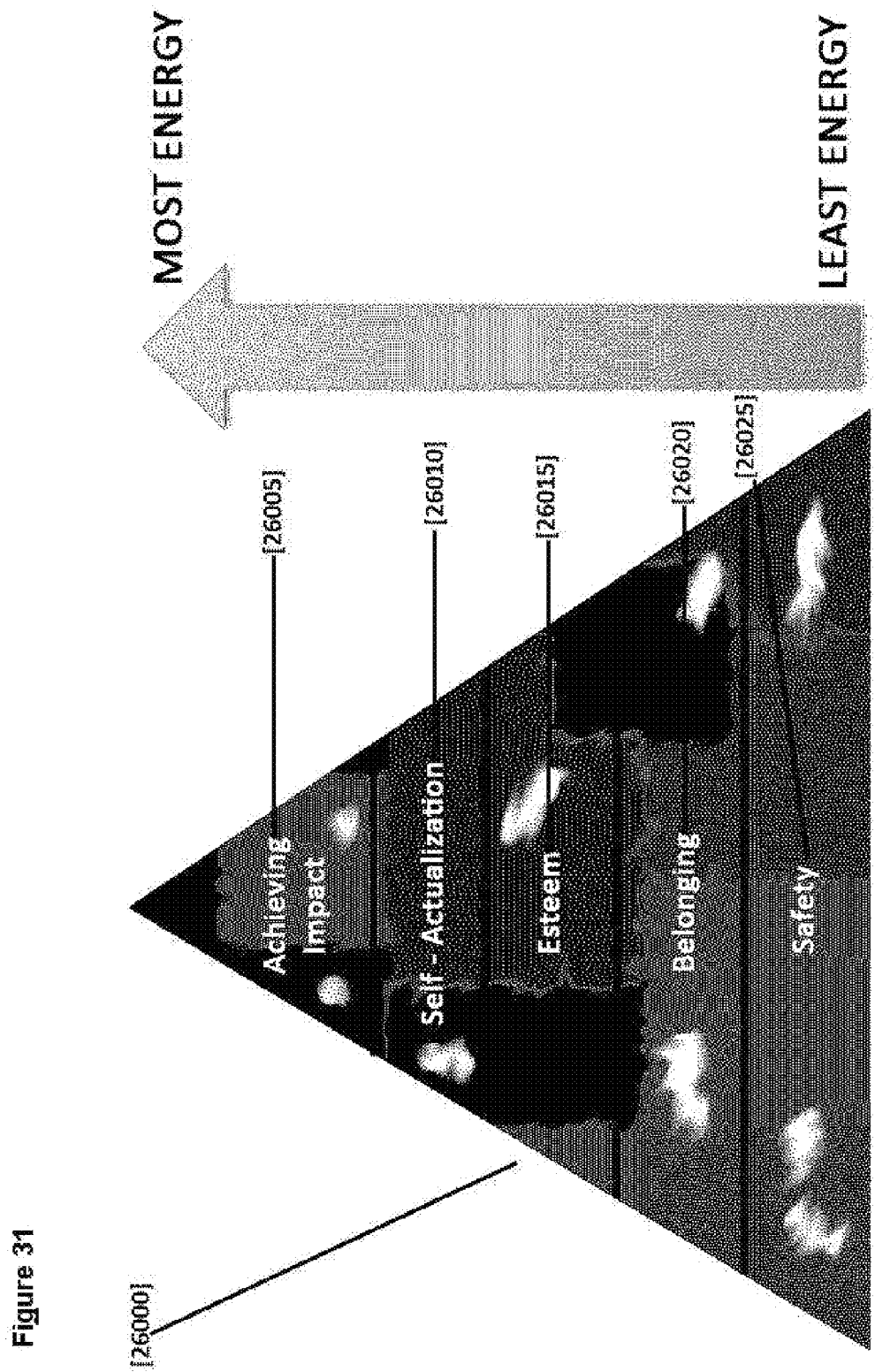
FIG. 31 is a Maslow Pyramid of Needs-type categorization for organizations.

Many embodiments will make use of a Maslow Pyramid of Needs-type categorization[26000] for organizations[200] as part of analyzing energy[1380]. This is treated by the engine essentially as a topic[1300] categorization exercise that is performed on the corpus[1200] of items[1215] for the given organization(s)[200]. One such example of this with the following "needs" levels in descending order is illustrated in FIG. 31:

a. Achieving Impact[26005]: using one's position within an organization[200] to achieve a measurable impact on at least some part of that organization[200], its members[290] and/or the world more broadly, the opportunity to take things and reshape them as one wishes.

b. Self-Actualization[26010]: the opportunity to stretch one's skills and abilities, to display creativity, to learn and develop, to expand one's reach c. Esteem [26015]: Specific achievements, material recognition, respect of colleagues, achieving professional standing.

d. Belonging[26020]: A sense of being part of a goal-oriented group, of having a purpose, of having attained a social position within that group e. Safety[26025]: Job security, financial security, gross stability[450] of the organization[200], certainty of not falling outside of societal norms by not having an expected organizational affiliation such as employment.

The rationale is that members' [290] comments[1215] will center around the level at which they are currently focused, whether out of fear or aspiration. For example, an employee[320] who is genuinely worried about his paycheck is likely putting much of his energy into that worry as opposed to his ability to impact the future of the organization [200]. Some embodiments will make a distinction between the fear (e.g. "I'm afraid that these new changes will reduce the ability to be creative.") and aspiration (e.g. "I hope to be able to expand what I am able to do creatively") cases, with most embodiments scoring the latter case higher.

More broadly, which levels of the pyramid[26000] are occupying the attention of the preponderance of members [290] at different levels of the organization[200], offers an excellent index of how these members[290] are viewing the organization's[200] future prospects insofar as they are adjusting their own personal prospects accordingly. For example, in an organization[200] which is enjoying success and expanding, it would be expected that noticeably more members[290] are aspiring to self-actualization[26010] than would be the case in an organization[200] which is shrinking and in general decline. Some embodiments may apply a filter based on perspective[1320] or credibility score[410] so as to try to eliminate low value outlier statements[1215].

Most embodiments will employ one or more of the following tests for energy[1380]. Note that as is the case with engagement[1375] any score must be interpreted in the context of either prior time periods for the given organization[200] or other comparable organizations[200].

Proportion of relevant comments[1215] that reference a prior state of the organization[200] v.s. a present or future state. Positive energy[1380] corresponds to more future and present-oriented statements[1215] than past ones. This includes references to prior leaders[440]. Most embodiments may opt to filter out statements[1215] that offer a positive polarity[24000] comparison between the current or expected future state and a past state (with the past state being asserted as superior.) Some embodiments may opt to weight comments[1215] on certain topics[1300] higher than others, as defined in the internal knowledge base[1340]. Some embodiments may likewise opt to weight comments [1215] made by members[290] according to their perspective score[1320] or their credibility score[410]. Almost all embodiments will disregard future-oriented "me" comments [1215] according to an internal knowledge base[1340], for example "I hope I get a promotion next year." Such comments[1215] are really hints in terms of pragmatic intent [25010], and will be treated as such by most embodiments.

Likewise, almost all embodiments will consider statements[1215] of concern about the organization's[200] future as a negative energy[1380] marker (e.g. "I hope we won't lose more market share this year"), rather than as a positive indicator. For similar reasons, most embodiments will further boost the weight of future-oriented comments[1215] that explicitly express confidence about some aspect of the organization's[200] future.

Proportion of relevant comments[1215] that reference the organization[200] or some aspect of it as opposed to comments[1215] that reference competitors[470]. Most embodiments will assign additional weight to comments[1215] that indicate fear of competitors[470], or express a positive polarity[24000] sentiment[1305] such as confidence w.r.t. one or more competitors[470], or contain explicit comparisons to competitors[470] in which the competitors[470] are asserted to be superior. Many embodiments will norm this to the job type or role of the member[290] under the rationale that, for example, it is more normal for a salesman to discuss competitors[470] at length than it would be for someone in accounting. Likewise, many embodiments will norm it to the organization type[340] or sector[430]; obsessive analysis of competitors may be more common in highly competitive sectors for example. The energy[1380] score is higher if the large majority of comments[1215] are focused on the members' [290] own organization[200] than on comments[1215] that involve competitors[470].

Whether the member[290] references the organization [200] or its leaders[440] as active actors[240] as opposed to passive ones[240]—that is, describes them[240] as subjects (e.g. "the company did this") rather than objects (e.g. "after this happened to the company . . . ") Active references carry a positive polarity[24000], while passive ones carry a negative polarity[24000] in virtually all embodiments.

Statement[1215] distribution according to a Maslow Pyramid of Needs type model[26000]. For example, if in Company X, many employees[320] express concern as to the safety of their jobs but in comparable Company Y, the most frequent complaint is that the work life balance is not as good as previously, or that there's not a sufficient amount of variety in the work, it can reasonably be inferred that Company Y's employees[320] feel more secure about their organization[200] that the Company X ones do about theirs. Almost all embodiments will norm this to at least the gross level of the author's[250] hierarchical position in the organization[200], since it can be expected that people with higher level positions will generally have much greater opportunity to experience the higher pyramid tiers of "self-actualization" [26010] and "impact"[26005] than those in lower level positions. In other words, middle managers in Company X can only be compared to middle managers in Company Y rather than comparing the set of all employees [320] of Companies X and Y. This is done to avoid apples-to-oranges comparisons between organizations[200] who have very different proportions of employees[320] at different levels. For example, some organizations[200] have a large proportion of their members[290] with only a high school education or less performing largely menial functions, while in other organizations[200], such members[290] may account for only a small minority.

Different embodiments may opt for their own scoring systems, including whether to threshold the measures that involve proportions, and whether the different measures used to assess energy[1380] are used in conjunction with one another to score individual authors' [250] energy levels [1380], which are then rolled up to an overall energy[465] level for the organization[200] or whether each measure is assessed over the entire organization[200]. Likewise, different embodiments may opt to assign different coefficients to different tiers in the Needs Pyramid[26000]. Some embodiments may opt to use somewhat different strategies for different national cultures.

Benchmarking[8030]

Figure 32:
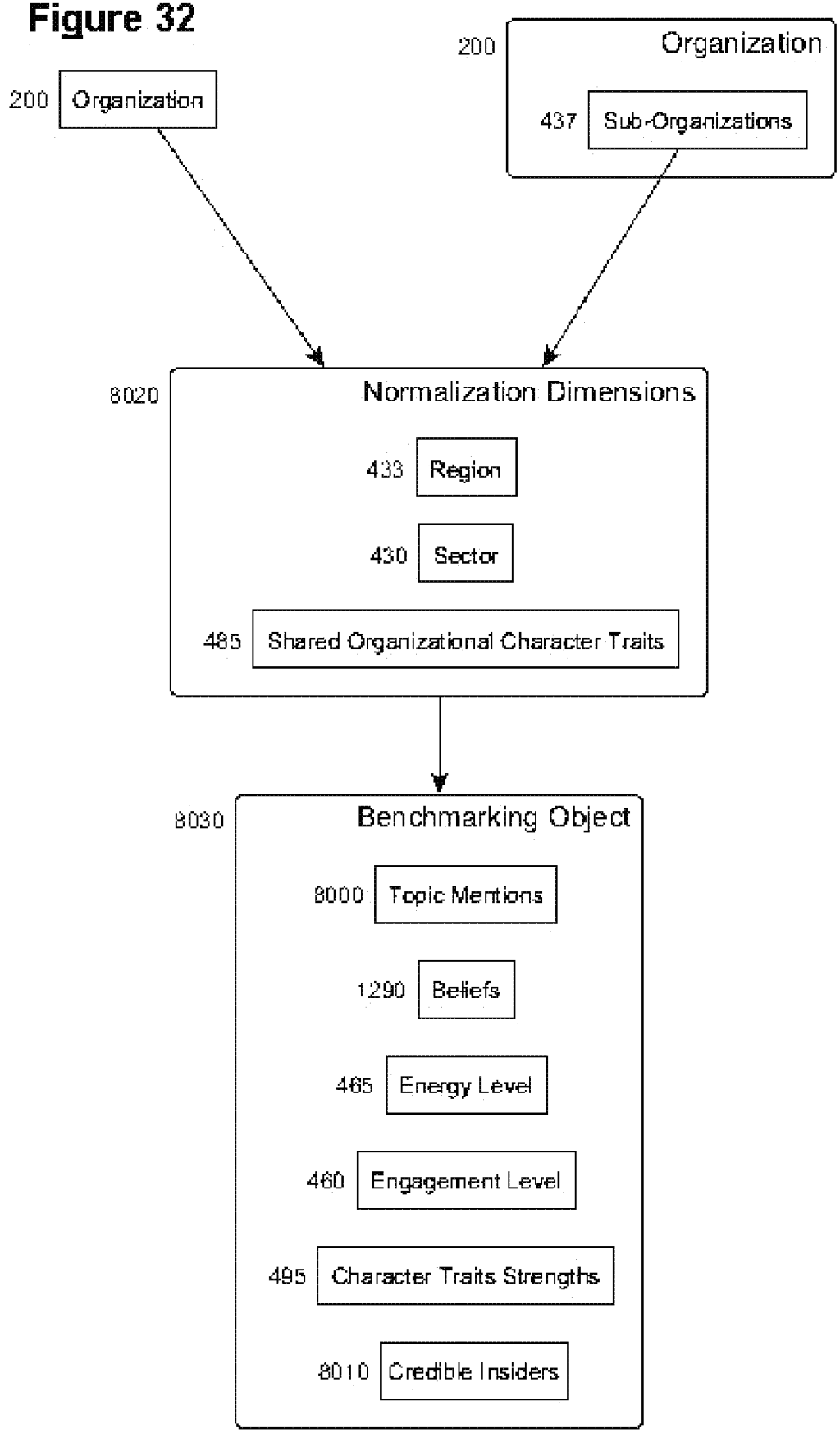
FIG. 32 is a block diagram of one embodiment of a relationship between benchmarking data elements.

Most embodiments will offer means of comparing a target organization[200] to other organizations[200] that can reasonably be considered comparable to it, and/or specifying a set of comparable organizations[200]. Most embodiments will solicit a timeframe for which to benchmark—in other words, how far in time to go back. Virtually all embodiments will perform some normalization steps prior to benchmarking with the aim of achieving as much of an apples-to-apples comparison as possible. This is illustrated in FIG. 32.

International & Other Regional[433] Issues

Mentions of certain topics[8000] will be far more prevalent in some countries than others for reasons ranging from culture and history to local laws and regulations. For example, French employees are significantly more prone to complain about the quality of food in the company cafeteria than are their American counterparts. However this should not be taken to mean that the food in the French cafeterias is objectively worse than it is in the U.S., only that it is being perceived as worse. Similarly, some cultures may discourage complaining at all as a character flaw to such a degree that it will deter many from complaining, even on anonymous forums. There may likewise be noticeable deltas in the reasons[1310] provided for the same phenomena in different countries. For example, if one country has extraordinarily high taxes on businesses, tax-related issues are very likely to be mentioned more frequently by authors[250] in that country as a result.

Even within the same country, region[433] can greatly influence behavior. For example, employees[320] of sub-organizations[437] that are located in rural or remote areas likely have few local employment opportunities. This "only game in town" fact will temper many complaints, and cause employees[320] to be more vested in the success of the sub-organization[437].

For these kinds of reasons, most embodiments will normalize by country or other more granular region[433], either according to what information has been specified in the internal knowledge model[1340] or simply on an empirical basis if there is sufficient data available to do so (e.g. if in a large data set that spans many different organizations[200], French employees always complain at least eight times more about the quality of food than do their American counterparts, the system can account for this without any particular built-in knowledge.)

Sector[430] Issues

Similarly, almost all embodiments will normalize by sector[430]. This will generally be deemed necessary because organizations[200] (or sub-organizations[437]) in different sectors[430] may have markedly different characteristics from one another. For example, in the financial services sector, variable compensation or different types of bonuses are extremely important, while in many sectors meaningful bonuses barely exist. The expectation of large bonuses for a significant number of employees[320], which won't consistently be given, is thus a driver for sentiment [1305] on the topic[1300] of compensation that exists in the financial services sector but not retail for example. Furthermore, organizations[200] operating in certain sectors[430] may frequently share character traits[485] with one another. For example, certain types of technology companies may have trade secrets that are worth enormous sums of money, and so may be prone to being secrecy-oriented.

Thus if one is comparing organizations[200] by region [433], most embodiments will seek to normalize away such sector[430] differences to the extent possible. However most of these embodiments will also offer a non-normalized view and/or visually annotate graph elements (e.g. different kinds of display charts) in the user interface that users can click on to see a summary of what kinds of data were normalized away and to what degree.

Different embodiments may opt to benchmark comparable organizations[200] according to different dimensions and combinations of dimensions. However, some embodiments may opt to combine all of the measures they use into a single "organizational health" measure. Virtually all embodiments will benchmark on the basis of overall engagement level[460] and energy level[465], if separately broken out from engagement[460] in that embodiment. However many embodiments may also opt to benchmark on sub-components of these measures and/or other types of measures as well, instead of just comparing simple scores.

For example, in one default embodiment, the following additional dimensions will be utilized.

Transmission of Operating Knowledge

Many embodiments will opt to offer a comparison among the perspectives[400] or perspective scores[1320] of members[290] at comparable levels in organizations[200] that have been deemed to be comparable. The presumption is that when there are noticeable differences between such organizations[200], superior training, internal education or senior leadership communication is largely responsible for it, rather than simply a higher intrinsic quality of member [290]. This dimension of educating and aligning members [290] in turn is important because it enhances both the sense of belonging and the sense of advancement that correlate to high level of engagement[1375]. Further, in many sectors [430], not just the engagement level[1375] but also the day-to-day operating knowledge of even the lowest level members[290] can make a large overall difference in the performance of the organization[200].

"Me" Comments[1215] Vs. Actionable Suggestions[1330]

This is an implicit measure of the commitment or engagement level[1375] of members[290] that many embodiments will opt to use for its simplicity. It reflects the extent to which members[290] either naturally think of the organization's[200] good before their own, or think of the two as intertwined. For example, if provided the opportunity to give feedback to the organization[200] through an open-ended question in a survey[25015] (e.g. "If you could change one thing, what would it be?") do most members[290] bring up something that they think could benefit the organization[200] or which mostly—or totally—just benefits them personally?

The user interfaces of most embodiments will provide icons next to each graph element displaying topic[1300] information which will allow the user to see a representative sample (and subsequently all) actionable suggestions[1330]. In most embodiments, the "me" comments[1215] will first be presented as a graph elements according to the high level topic[1300] of the comment[1215] (e.g. salary, career advancement, etc) because the typically very repetitive nature of such comments[1215].

Proportion of Insiders[270] Who are Credible Insiders [8010]

This is a measure that could be said to roughly correspond to identifying individuals of a certain overall quality in their capacity as members[290]; they make actionable suggestions[1330] and observations[1332], they have a good understanding of their environment (e.g. good perspective [400]), and appear to be objective and sincere.

Comparisons Based on the Maslow Pyramid of Needs-Style Model

Benchmarking[8030] will be done by most embodiments treating the different tiers in the pyramid as the x axis, and the frequency of comments[1215] corresponding to a given tier in the pyramid[26000] as they axis. Most embodiments will consider not just the average but also the distribution as a whole. Many embodiments will seek to do apples to apples comparisons of members[290] at the same or similar levels to one another in their respective organizations[200], rather than just throwing all members[290] into one giant bucket.

Some embodiments' user interfaces may opt to display a pyramid[26000] with a heat map to indicate the proportion of comments[1215] (or alternately, of authors[250], depending on the configuration), that fall into the different tiers of the pyramid[26000]. An example of this is illustrated in FIG. 31.

"Bounce-Back"

Certain sectors[430] are known for their swings or boom-bust cycles. Such large fluctuations generally harm—or help—all organizations[200] operating in the sector[430], even if to varying degrees. Likewise, certain events or conditions in a given region[433] such as natural disasters can have very broad impact on all organizations[200] operating in the region[433].

Comparison of organizations[200] in such anomalous time periods—particular the adverse ones—provide a sense of their character[480], in particular how adversity-resistant the organization[200] is. Specifically, most embodiments will perform a comparison among organizations[200] that will include but is not limited to, stability[450], the initial and peak deviations in their energy[465], engagement[460] and various sub-components of these measures, the percentage of members[290] at different organization levels for whom there is observable fluctuation in these measures (if that information is available) when such a period starts—for example, a precipitous drop in the stock market in the case of financial services firms—as well the length of time it takes for these measures to return to their previous "normal" values (assuming that they do.) For example, if the market remains down for an extended period of time, many employees in many firms will have to lower their short-medium term compensation and advancement expectations. The extent to which this dynamic impacts measures, such as energy[1380], engagement[1375], and individual sub-components of these will vary noticeably by organization[200].

While circumstances[530] that are deemed adverse pose an obvious character test to an organization[200], circumstances[530] that are of a highly positive nature are also very interesting to analyze. While energy levels[465] should logically go up in such favorable conditions, if engagement levels[460] rise by an unusual amount (relative to what would usually be observed in similar situations), many embodiments will negative weigh the delta in any calculation of organizational character strength[497], since this suggests a higher than usual degree of bellwether-ness. Otherwise put, if the current favorable circumstances[530] should change, it is reasonable to believe that the overall engagement level[460] will sink back to its previous level.

Many embodiments will also benchmark on attitudes[1295] and beliefs[1290], both in aggregate by organization[200] and broken down by comparable demographic group[12060] (e.g. middle managers to middle managers.)

Many embodiments may also benchmark on the strength of character traits[495] that are shared among the organizations[200] being benchmarked against. For example, while many biotech companies may be secretive, one that is extremely secretive even relative to other companies in the biotech sector is worth throwing a red flag on from an investment perspective (e.g. the scandal-ridden company Theranos becoming more secretive internally as their failures to produce the expected results mounted.)

Most embodiments will allow for sub-organizations[437] to be analyzed separately and then rolled into the parent organization[200], in most embodiments weighed by the number of members[290] in each. Whether or not sub-organizations[437] have been broken out, most embodiments will try to factor in region[433] information based on the available demographic data[420]. Otherwise put, there needn't be a separate sub-organization[437] defined for the region[433] of France; so long as there are members[290] whose demographic data[420] indicates that they are in France, for most embodiments that will functionally be the same thing.

Most embodiments will also calculate and display scores for a theoretical comparable organization[200] that reflects the median or average for all organizations[200] in the current benchmark for a given period of time.

Predictions[9020]

Most embodiments will use the data they have collected and analyzed on various organizations[200] to make predictions[9020]. In most instances, the predictions[9020] will require input from the user as to both the circumstances[530] that are posited to occur and the timeframe during which these circumstances[530] are posited to hold. Most embodiments will allow the separate entry of a timeframe for which predictions[9020] are to be made; that is, more than one set of circumstances[530] may be specified within the specified timeframe. If no circumstances[530] have been specified for a given time interval, most embodiments will take the currently true circumstances[530] as a default. All circumstances[530] must be described in—or added to—the system's internal knowledge model[1340]. Most embodiments will stick to the domain of "organizational health" rather than try to make predictions about things like macroeconomic or military issues.

While most embodiments will avail themselves of well-understood existing statistical techniques for extrapolating trend lines for user convenience, the higher value predictions[9020] are those that factor in the impact of posited circumstances[530] on the particular organizations[200] of interest. In making predictions[9020] about a particular organization [200], most embodiments will use not only past and present data from the organization[200] in question, but also data from other organizations[200] that have been assessed to share some character traits[485] as well as other "comparable" organizations[200] as defined in the internal knowledge base[1340], which will often include user inputted data. For example, even if they happen to be in different regions[433] and sectors[430], corporations[210] who share the character traits[485] of arrogance, weak mission-orientation, and being very highly image conscious, are likely to behave in similar fashion to one another if met with significant, very public adverse events.

Although the system provides a variety of metrics upon which predictions[9020] could be made, most embodiments will make predictions[9020] on the subset of these metrics that have the closest correlation to real-world outcomes. For example, as noted in the "Overview" section, engagement level[460] has been repeatedly shown in different studies to impact the financial performance of corporations[210].

Figure 33:
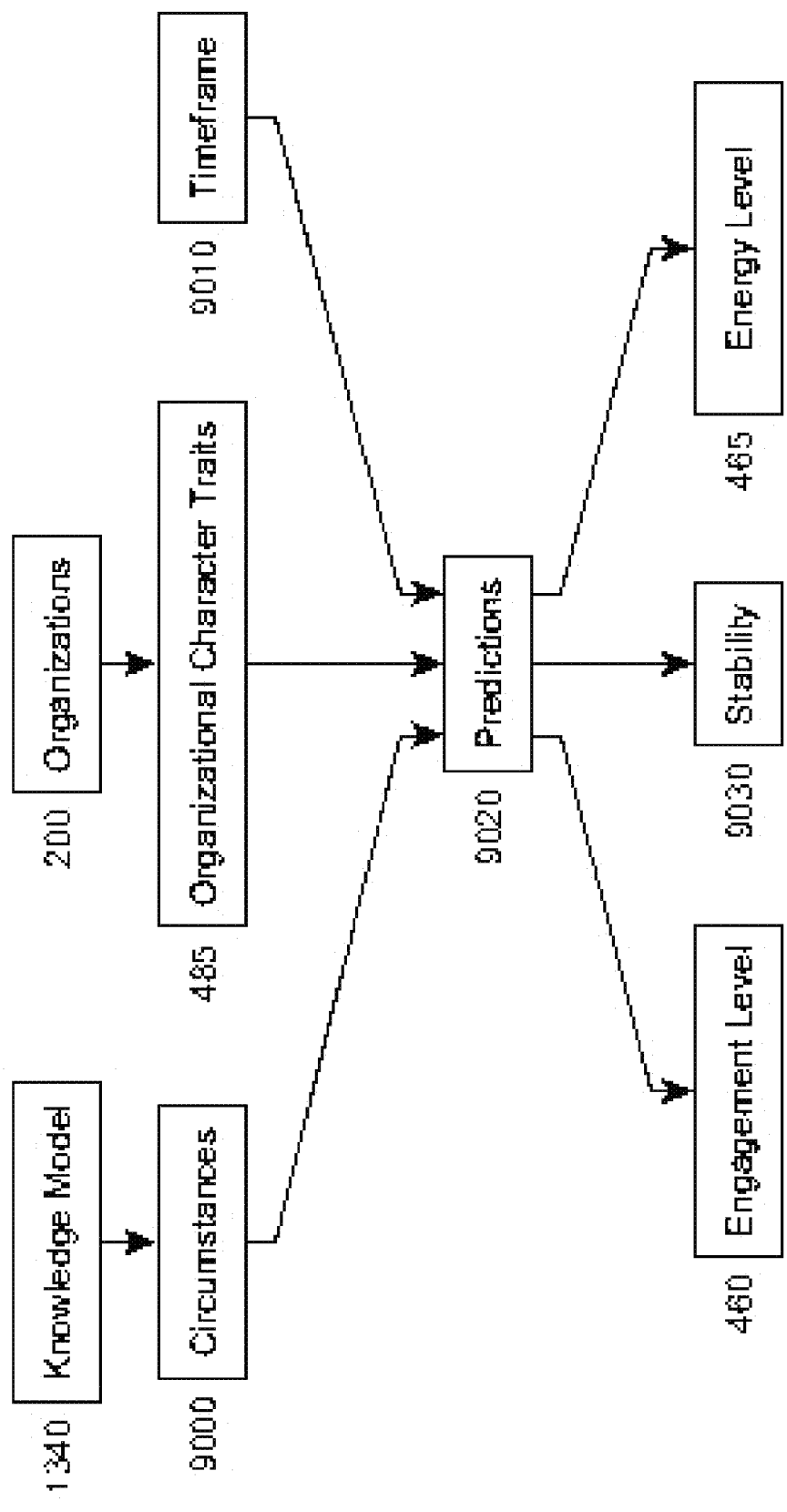
FIG. 33 is a block diagram of one embodiment of a relationship between prediction data elements.

In a default embodiment, as indicated in FIG. 33, predictions[9020] will be made on the following metrics:
Engagement Level[460]
Energy Level[465]
Stability[9030] (in the sense of character[480] stability [450])
Strength of Current Leadership[440]
as these are the main levers for most organizations[200]. Some embodiments will collapse these into only two metrics, engagement[460] and stability[9030]. Frequently, these metrics will be exported to a third party system that will incorporate the metric into its own predictions for whatever it is trying to predict, such as the stock price of a corporation [210], or the objectives and strength of a terrorist group [220].

While some embodiments may choose to avail themselves of heuristics (either encoded in the knowledge model[1340] or separately inputted by the user), the preferred embodiments will rely as much as possible on the analysis of empirical data within the conceptual framework of the system described in this application. For example, while it may be common sense that a company[210] who has a large data breach involving personnel records and other employee [320] data will be harmed by it, the effects of such a breach would be vastly worse for an organization[200] that was highly secrecy-oriented rather than transparency-oriented—for example, concealing the pay scales for different job types. Thus prior empirical data will be needed not just for the specific circumstance[530], but also for organizations [200] with the relevant trait[485] in that circumstance[530]. With sufficient data for the given circumstances[530] organization-with-specific traits[485] pair—ideally a statistically significant amount—most embodiments will rely on standard machine learning or statistically-oriented approaches to make predictions[9020].

Almost any prediction[9020] involving metrics will have a time factor associated with it. For example, generically speaking, a single large adverse event can be expected to have a negative impact on energy level[465] or engagement [460] that will grow to a peak over days and weeks as the event becomes understood among the insiders[270] and self-reinforces, but will then start to fade somewhat, assuming that there is no domino effect of other adverse events. Thus most embodiments will express a prediction[9020] on metrics either as a function whose values range over the relevant time window, or as discrete values at discrete points in time. Otherwise put, in the case of adverse circumstances [530], this is the shape of the "bounce back" curve.

It should be noted that the above metrics are not orthogonal to one another. For example, a decrease in stability[450] will likely impact energy[465] and engagement[460]; if engagement[460] and energy[465] really drop, they will eventually exert a downward force on stability[450]. Organizational character traits[485] play a large part in determining how these interactions will play out in a given case. For example, if a particular organization[200] is highly change resistant, most of its individual members[290] probably are too, and so stability[450] will be far less impacted by a drop in energy[465] or engagement[460] than would be the case with more fluid organizations[200].

Figure 34:
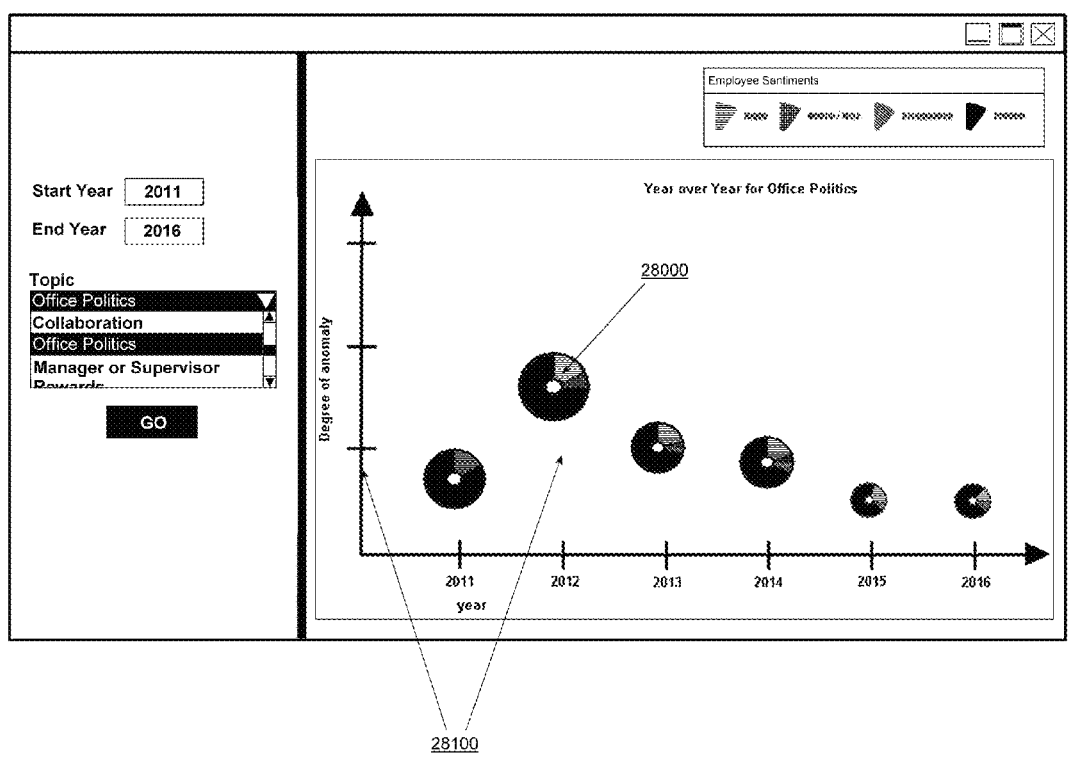
FIG. 34 is an illustration of one embodiment of a Year-Over-Year Summary for an example of an organization's attitudes and beliefs associated with a topic changing over time.

Some embodiments will visualize their predictions[9020] with a visualization such as the "Year Over Year"[FIG. 34] one described in a subsequent section, with future time periods having graph elements or icons that have a different visual treatment than those for already existing data. In many embodiments, the future graph elements or icons will have a slightly fuzzy or faded out look.

International Issues
Interpretation

National cultures very significantly impact how members [290] express concerns by constraining what is considered acceptable behavior in this regard. This is especially true of issues that carry great importance and so emotional charge. For example, all 6 statements[1215] below are very likely conveying the exact same idea: the authors[250] feel that they deserve a higher salary. Yet the strategies for conveying this idea differ fairly significantly.

Prescriptive: "Perhaps salary levels should be reconsidered"
Hint: "In the past, generous salary increases have helped us with retention."
If-then: "If the company wants to be competitive, it will have to provide attractive salaries."
First person: "I am disappointed with my salary."
Comparison: "Other companies pay more."
As Question: "Would giving raises help?"

Note that among all of the 6 examples above, there is only one overtly negative word: "disappointed." A more extreme example popularized by Malcolm Gladwell in his book "Outliers," in the Korean culture, the statement[1215] "Captain, the weather radar has helped us a lot" was a desperate co-pilot's way of trying to communicate to his captain that he really needed to look at the weather radar. Now. Or else the plane might crash—which in fact it did.

An English-language-centric embodiment of the presented invention would, out of necessity, interpret the above statement[1215] as some kind of positive polarity[24000] feedback relating to "weather radar." In point of fact however, given its Korean language/cultural context, such a comment[1215] must be interpreted as a negative polarity [24000] comment[1215]—that a job isn't being done right or a process isn't effective because a key resource, "weather radar," is being under-utilized. Many embodiments will in fact consider the national cultural context as trumping the language one. In other words, were the pilots in the above scenario speaking in English, the fact that they were culturally Korean would trump in the interpretation in most embodiments. Most embodiments will allow a user with appropriate access to the knowledge model[1340] to specify which strategies for communication are most common in a given national culture, so that the system can apply this knowledge when analyzing data across cultures.

As noted in a prior section, in most embodiments, the excessive use of first-person pronouns is a marker for disappointment[2140] and also a negative indicator for engagement[1375]. However, in Chinese cultures, first person pronouns are used considerably less than in the United States, largely rendering this marker useless for the given culture.

Thus, in virtually all embodiments, the interpretation of textual data that is tuned to the particular language and national culture is very strongly preferred, regardless of the exact methods used. Indeed, a key motivation to benchmark organizations[200] of the same type across different geographic regions[433] is to help ensure that interpretations of text are reasonably correct across different languages and cultures. Otherwise put, if the system is almost never picking up any negative polarity[24000] statements[1215] in a given language, even when there is a large sample of data in the language in question, it is likely that there are fundamental errors in interpretation occurring.

It should be noted that this kind of nuance and indirection handling is not just a machine translation limitation, since a human looking at even high quality machine translation without the necessary socio-linguistic knowledge would make the exact same mistake in interpretation as would an English-language-centric version of the presented invention.

Language Swapping

One benefit offered by the invention is that full, automated translation of the text is not necessary in order to assess attitudes[1295], beliefs[1290], actionable suggestions[1330] and observations[1332] with a reasonable amount of accuracy. All that is required in the target languages are basic grammars or other mechanisms to capture certain categories of expressions of causality (for example, assertions of causality, prescriptive statements, predictions, etc), ontologies in an internal knowledge model[1340] that describe the key topics[1300], and adjectives and adverbs which are commonly associated with the expressions of sentiment[1305].

To take a concrete example, the observation[1332] "There is no money for raises for the worker bees because management pays themselves so much" is a common one across countries. This can be structured as: ((((NEGATION(raise (lower-level-worker)) BECAUSE ((compensation)management))). The exact wording matters little; if negative adjectives are modifying "management" that simply tacks an attitude[1295] onto the observation[1332].

The invention also relies somewhat on the inference that text which appears to discuss the same topics[1300] in the same relationship to one another, and with approximately the same sentiments[1305], and whose authors[250] share similar attributes (e.g. job title, tenure) can reasonably be inferred to be equivalent. Otherwise put, the authors[250] are considered to belong to the same archetype[310], regardless of the language difference.

This allows the swapping, for example, of a French language comment[1215] for an equivalent English language one in reports and visualizations—or vice-versa. If no logically equivalent comment[1215] happens to be available in the desired language, most embodiments will try to create a synthetic comment by selecting portions of comments [1215] that contain as many of the beliefs[1290] contained in the target comment[1215] as possible (if there were more than one belief[1290] expressed in the target comment [1215].) Some embodiments may go as far as trying to generate an appropriate comment[1215] out of whole cloth based on the knowledge stored in the knowledge base [1340]. If the swapped comment contains additional attitudes[1295] and beliefs[1290], some embodiments will nonetheless display the full comment, but bold the portions that overlap with the original comment[1215]. Other embodiments will prefer to truncate the swapped content instead. If only attitudes[1295] are expressed rather than full beliefs[1290], most embodiments will take the same strategy.

In this way, the authenticity of the authors'[250] voices is not compromised through bad machine translation. Many embodiments may nonetheless provide a button that makes a translation request to a human translator—or which sends the text off to an automated translator. However, the expectation is that users would feel the need for such manual intervention only in unusual situations.

This type of approach also offers the advantage for conducting surveys[25015] that it helps encourage people to be surveyed in their native language, assuming that that is their preference. If people who don't normally generate non-pro-forma text in a given language are asked to do so, it is highly likely that they will provide only the most minimal response that they can get away with. This is especially true when it comes to expressing difficult or complex topics[1300], as these by definition require greater pragmatic language skills. Such behavior does not reflect a lack of interest, but rather embarrassment over poor language skills.

As a result, some embodiments will separately analyze text[1215] created by people whose geographic location, nationality, or linguistic markers suggest that they writing in a language other than their primary one. Some embodiments may also infer difficulty with the language based on a score of grammatical and spelling errors in the comment[1215]. This "non-native speaker" collection of texts[1215] is then compared to the collection of texts[1215] created by authors [250] writing in what is presumably their native language, according to a number of different metrics. These metrics include, but are not limited to, calculating averages, means and medians for the following: number of topics[1300] expressed per comment[1215], number of beliefs[1290] expressed per comment[1215], and number of actionable suggestions[1330] or observations[1332] per comment [1215]. In addition, differences in overall polarity[24000] are measured by most embodiments.

If the differences in many of these metrics are statistically significant between the two comment[1215] collections, it is evidence of that significant feedback is often not being communicated because of linguistic barriers. In this event, most embodiments will seek to normalize the data appropriately so as to compensate.

Considerations for Different Types of Organizations[340]

While the basic principles and techniques described in this document apply broadly to any type of organization [340], the nature of certain types of organizations[340] requires special treatment in certain respects. For example, for dealing with organizations[200] whose missions or operations require secrecy, most embodiments will provide for individual data sources to be kept out of any calculations involving specificity[12030]. This is because such specificity[12030] is not allowed on data channels that are not fully secured. Thus, for example, a lack of actionable suggestions [1330] would not decrease engagement scores[460]. Likewise, in military[230] and other organizations[200] in which a high degree of conformity is required by protocol and/or pragmatic necessity, measures that would otherwise involve conformity in any respect, such as the calculation for sincerity[3060], will drop this dimension.

Figure 35:
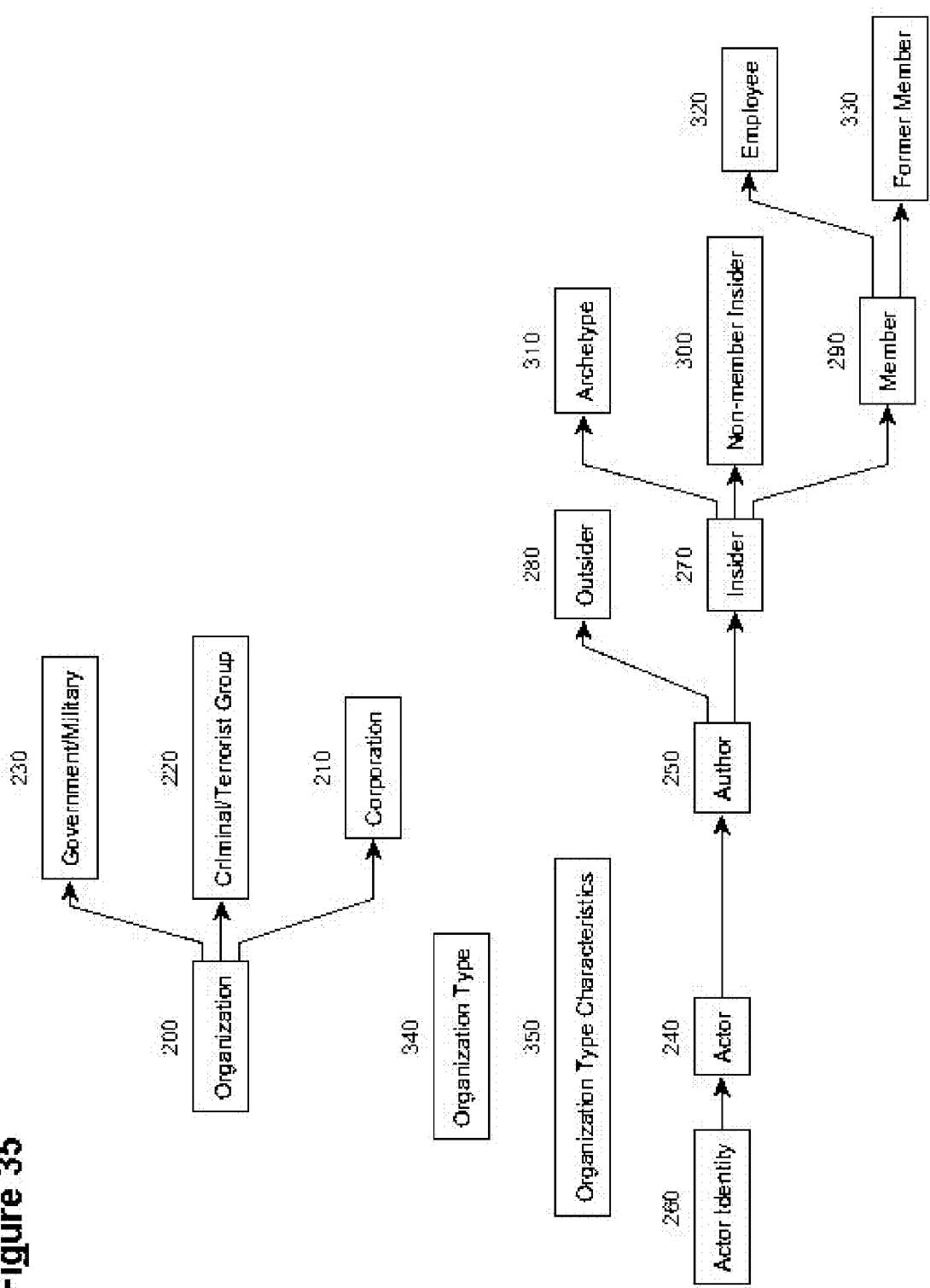
FIG. 35 is a block diagram which breaks down a concept of an organization, which may be assessed under embodiments of the invention.

More specifically, almost all embodiments will support the notion of different types of organizations[340]. In a default embodiment, as noted in FIG. 35, these are: corporation[210], government/military[230] and criminal/terrorist

[220]. Some embodiments may prefer to instead provide the capability to attach characteristics[350] to individual organizations[200], since some organizations[200] may blend elements of more than one type[340]. In most embodiments, these characteristics[350] will be restricted to those things that have a clear, measurable influence on the types and characteristics of data that will be generated by the population of insiders[270] affiliated with the particular organization[200]. Common characteristics include, but are not at all limited to the following:

Clandestine—operations, member[290] identities and other kinds of data will be either concealed or purposely obfuscated from public view. In clandestine organizations [200] there is no expectation of comments[1215] on transparency for example.

Strict hierarchical—leaders[440] may not be second-guessed or argued with. In most embodiments this will cause any measures involving actionable suggestions[1330] or observations[1332] with respect to leaders to be disregarded. Likewise for attitudes[1295] expressed by current members [290] about their leaders. Many embodiments may release these constraints in the case of former members[330].

Subject to specific constraints[1370] of topic[1300] and/or tone[1302]—certain kinds of expression are off-limits for reasons of liability or other taboo. For example, any reference to race, or admitting in writing that the company's[210] products are dangerous. Thus in such cases, any kind of analyses that would rely on the verboten things must be disallowed. For example, observations[1332] about a product being dangerous being absent from data that comes from current members[290] of the organization[200] will not be considered evidence that the members[290] don't believe that the product is dangerous, assuming that "product liability" is marked as a constrained[1370] topic[1300] in the knowledge base[1340]. The user interfaces of different embodiments may choose to handle this issue in different ways. For example, if "concern" or "worry" is defined as a sentiment[1305] in a given embodiment, in a matrix view in which "products" is a topic[1300], a question mark will replace whatever visual element(s) would normally be rendered in the cell at the intersection of "worry" and "products."

Many embodiments will come with default knowledge [1340] about the mapping between these organizational type characteristics[350] and appropriate system behavior. However, most embodiments will permit knowledgeable users to map these characteristics[350] to changes in system behavior and interpretation.

Most embodiments will also offer support for non-Boolean characteristics[350] at the organizational type[340] level. For example, while all virtually all organizations [200], regardless of type[340], care about their image with some subset of the public, some organizational types[340] as well as specific instances of organizations[200] will make vastly more effort than others to curate or promote their public image. This in turn adversely impacts the probability that publicly available comments[1215] about the organization[200] are sincere. Embodiments that provide this support will allow users to specify numerical values according to a range of their choosing for these sliding scale characteristics [350].

Visualizations

Most embodiments that have UI's will offer visualizations which combine key system objects such as archetypes[310], attitudes[1295], beliefs[1290], actionable suggestions [1330], observations[1332] and related objects so as emphasize salient points in the data.

General Note:

All of the visualizations that display text in most embodiments will have the option of displaying any sentiment [1305] with which given words or phrases are tagged by coloring the text. In a default embodiment for example, "happy" text[2120] will be colored green, "problem" text [2145], neutral text[2110] black, and "disappointed" text [2140] orange.

In any of the visualizations referenced hereafter, there is a display conundrum in the case of displaying text whose sentiment[1305] is largely determined by its adjacent context[18110]. For example, it would understandably seem odd to most users to see the phrase "Excellent training for support people" displayed in red so as to indicate that it is negative polarity[24000]. Yet that designation would be accurate in the event that the adjacent context[18110] was "What do we most need to focus on?" Different embodiments may adopt different strategies for dealing with this not uncommon edge case. In a default embodiment, the approach will be to modify the phrase so that it is clearly consistent with its assigned polarity[24000] by borrowing the frame from the adjacent context[18110] and inserting the noun phrase in the correct slot[2660]—for example "We need to focus on having excellent training." Other embodiments may prefer to instead decorate such instances with a small "?" icon. Still other embodiments will choose to "hide" such instances by combining them with a phrase that is free of the problem, for example "We had inadequate training."

Most embodiments will likewise have their visualizations offer the ability for the user to filter out data from specific data sources, or types of data sources. For example, there will often be a sharp contrast in tone[1302] and other linguistic registers such as formality between data that is internal to the organization[200] and that which is obtained from public sources—especially anonymous ones.

Matrix View[30400] Visualizations

Figure 36:
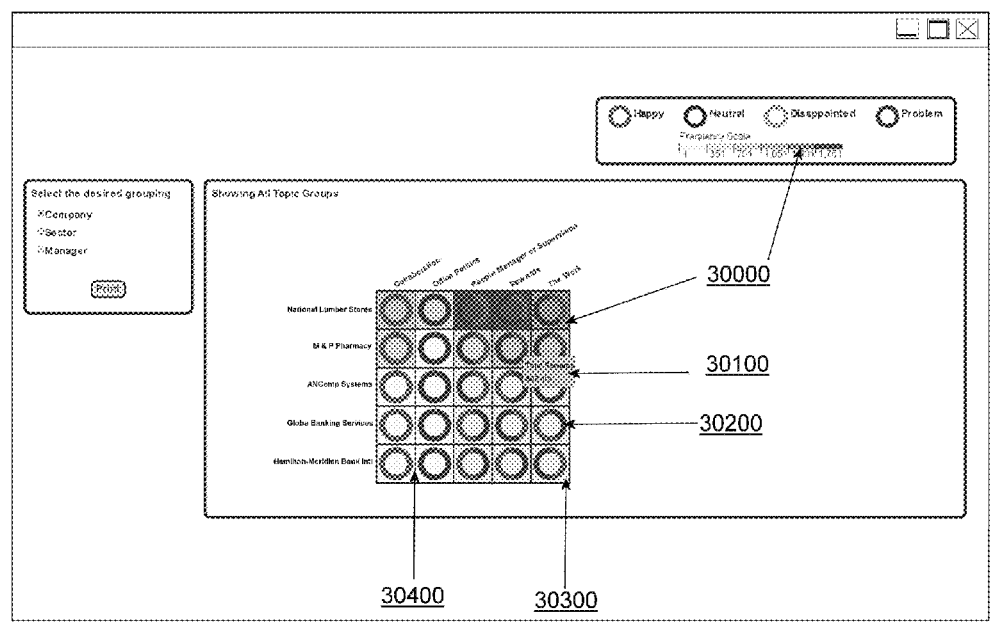
FIG. 36 is an illustration of one embodiment of matrix view for an example in which circle graphs are used to reflect member sentiments regarding certain topics.

Most embodiments will offer a matrix[30400] display in which each matrix[30400] instance provides data for a user-selected demographic dimension such as location or seniority. This is pictured in FIG. 36. Each row then corresponds to a specific value, such as "Chicago." Each column corresponds to a particular topic[1300] or topic area on which member[290] statements[1215] may be available, such as "senior leadership", "culture", or "communication."

Figure 37:
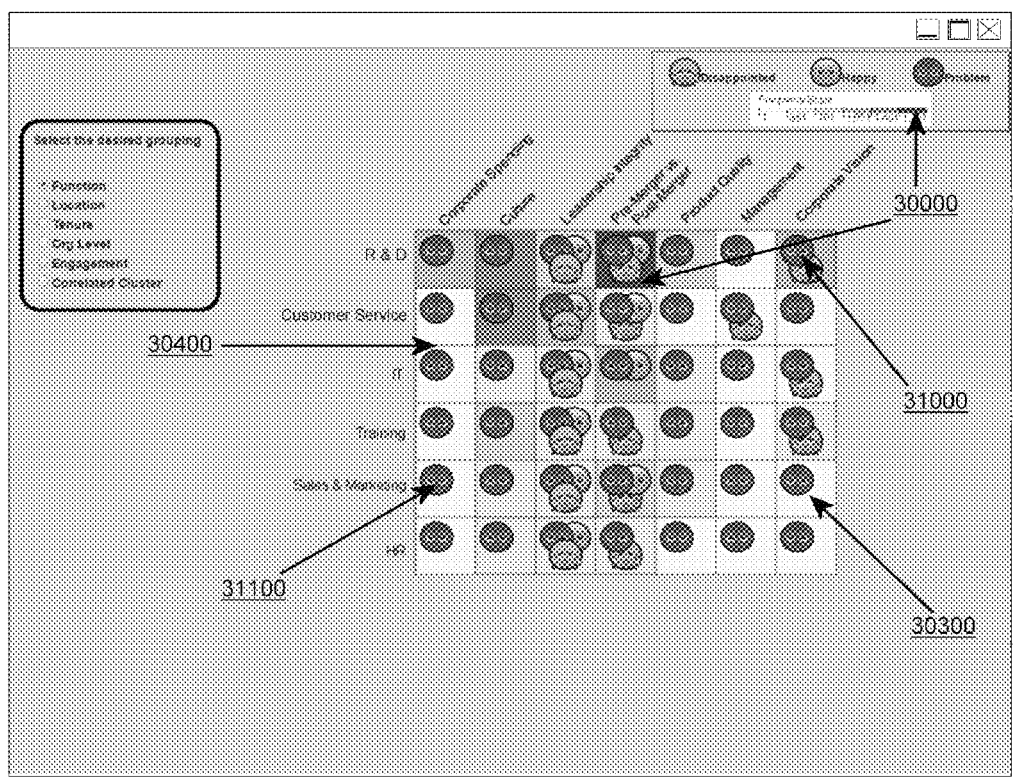
FIG. 37 is an illustration of one embodiment of matrix view for an example in which emoticons are used to reflect member sentiments regarding certain topics.

Each cell[30300] in a matrix[30400] thus corresponds to statements[1215] made on a given topics[1300] by members [290] who share a given demographic trait[420] in common. Different embodiments may make very different uses of the contents of the cell[30300]. As pictured in FIG. 37, some embodiments will use emoticons or other icons[31100] to reflect the sentiments[1305] expressed in the comments [1215] associated with the given cell[30300]. Other embodiments will instead use some type of graph, chart[30200], gauge, or other direct visual cue as to the number[30100] or percentage of comments[1215] on different topics[1300] with different sentiments[1305]. In most embodiments, the different sentiments[1305] will be indicated by different by different colors of chart element[28000], such as a green bar for "happy."

In most embodiments, if there is more than one icon [31100] per cell[30300], they will be layered[31000] according to which sentiment[1305] is expressed the most frequently, with the most prevalent being placed on top. In some embodiments, there is additionally a size cue. If, for example, a sentiment[1305] of "disappointment"[2140] occurs 200 times in the relevant portion of the data set but "frustration" appeared only 40 times, the icon[31100] for disappointment[2140] would be proportionally larger to reflect the frequency difference (though there will typically be maximum and minimum icon[31100] sizes for readability reasons.) Some embodiments may also color the cell[30300] background[30000] so as to indicate the overall density of comments[1215] in that cell[30300]. Some of these embodiments may opt to include comments[1215] with either unascertainable or neutral sentiment[24010] in setting the cell background[30000] color.

Figure 38:
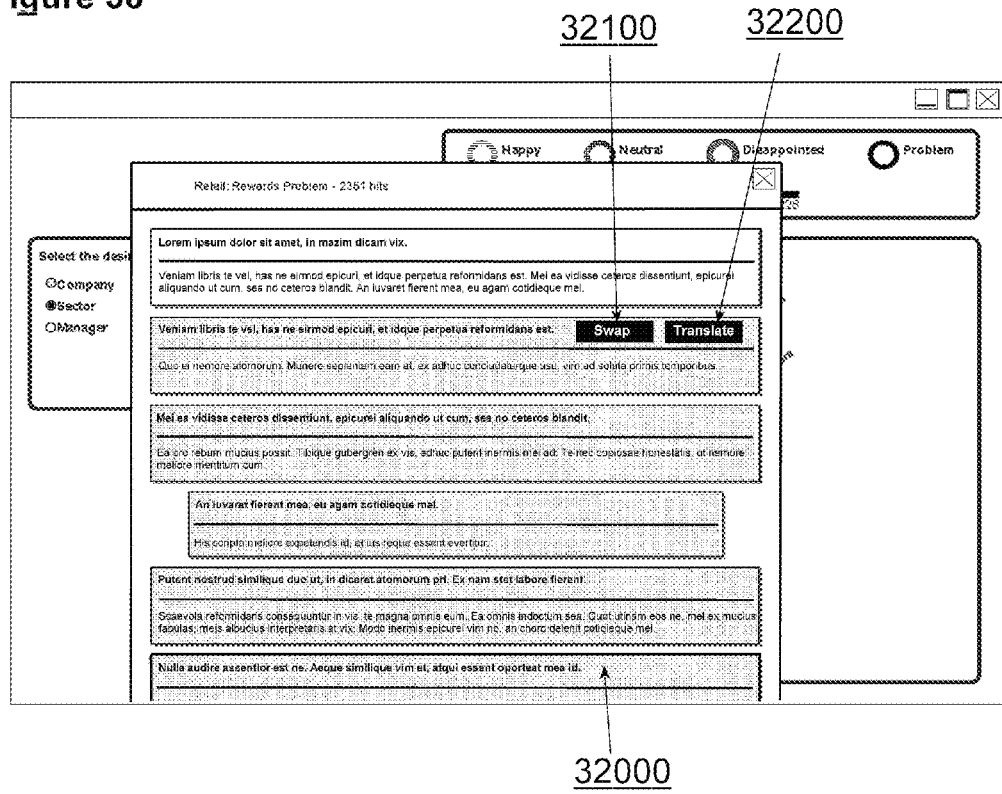
FIG. 38 is an illustration of one embodiment of the View of Comments associated with an icon representing an example sentiment in a matrix.

In many embodiments, the user can mouse over an icon[31100] to see the frequency counts[30100] while in others the count appears either in the icon[31100] or adjacent to it. In some embodiments, other types of information may be included as well, for example, what percentage of commenters[250] mentioned the topic[1300] at all, how this has changed from previous measurement periods, etc. In most embodiments, clicking on an icon[31100] brings up a view of all of the comments[32000] that are associated with that icon[31100]. An example of this is shown in FIG. 38. In many embodiments, these comments[1215] will also be displayed in comment groups[1335], assuming of course that there are sets of similar comments[1215] in the data which permit the formation of comment groups[1335].

Figure 39:
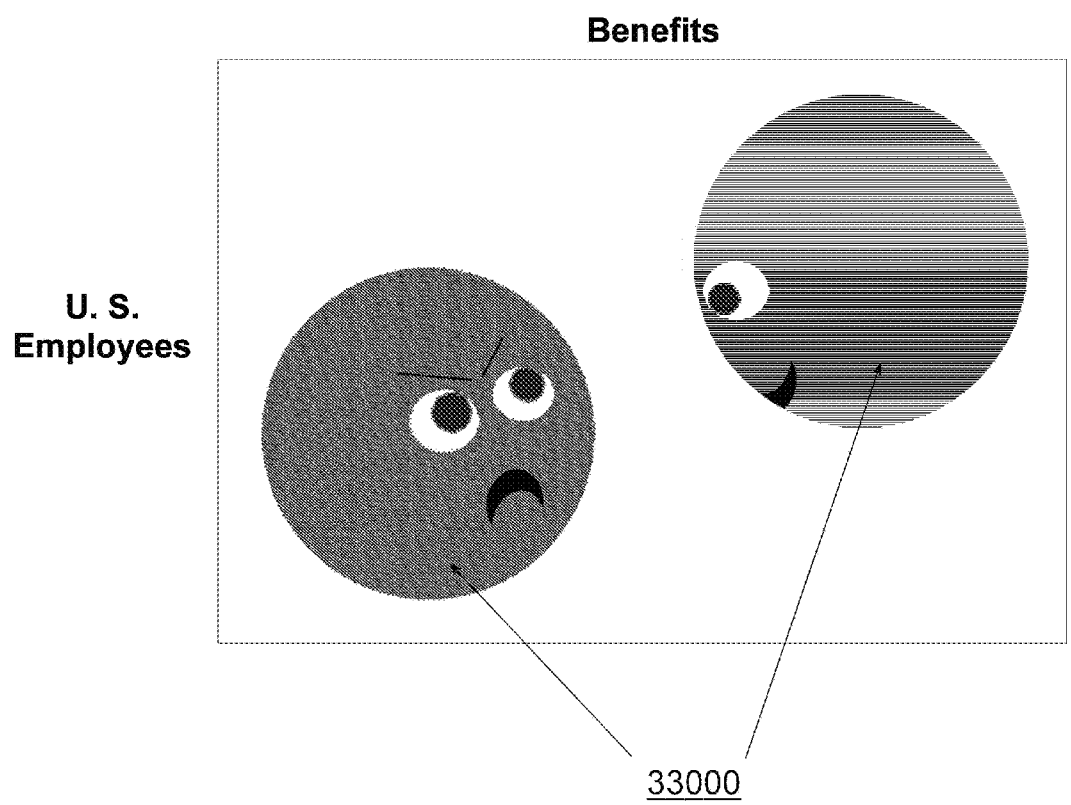
FIG. 39 is an illustration of one embodiment of a cell in a matrix from a matrix view for an example in which emoticons depict conflicting member attitudes or beliefs.

In some embodiments, if the attitudes[1295] or beliefs [1290] being expressed are directly contradictory in nature, the icons[31100] representing the opposing states will be altered to reflect a disagreement. For example, in some embodiments, the position of the two contradicting emoticons[33000] is altered so that they are facing each other (see FIG. 39); in others arms may be added to the emoticons [33000] in question so that they can be shaking their fingers or fists at one another. The former is depicted in FIG. 39. In some embodiments, the icons[33000] will also be pushed apart from one another, at least as far as the boundaries of the cell[30300] allow, so as to provide a visual cue as to the degree of the disagreement. A direct contradiction in this context is literally X and −X. For example, if half of the employees[320] who take a survey[25015] say that their employer's[210] health benefits are horrible and the other half say they are wonderful, absent any further commentary this is a direct contradiction. However, if there are one set of comments[1215] noting that their employer's[210] health benefits are lousy because coverage for dependents are expensive and another set of comments[1215] that applaud the health benefits because they include gym memberships the two sets of comments[1215] will not be considered directly contradictory.

This is because while the respondents are indeed expressing reverse sentiments[1305] about a high level topic[1300], "benefits," at a lower level they are talking about very different things. In factual terms, indeed there may be no disagreement at all, since both groups might very well agree on both points, even if they are implicitly disagreeing on their relative importance. Note that for this reason some embodiments will allow the option of imputing lower level motivations from the lengthier, more detailed comments [1215] to the terser comments[1215] within the same archetype[310] if there is sufficient consistency in the lengthier comments[1215] to do so.

In some embodiments, clicking on the background of the cell[30300] (as opposed to on one of the icons[31100]) will bring up an expanded view of the cell[30300]. In some of these embodiments, the icons[31100] representing a given sentiment[1305] will be further subdivided so as to represent lower level topics[1300] as appropriate. Using the "health benefits" example above, a happy icon instance would be labeled "gym membership"; if other employees[320] expressed contentment because of vision benefits, a second happy icon would be labeled "vision." In some embodiments, the icons[31100] may be grouped by demographic characteristics[420] of the respondents rather than the relationships among the different opinions being expressed. For example, if the selected population is the accounting department, and the accounting department is geographically distributed over 20 different locations, if the sentiments [1305] being expressed differed significantly by location, the icons[31100] would be grouped and labeled accordingly. In some embodiments, the matrix[30400] itself can be drilled down to whatever desired level of subtopic[1300].

Most embodiments support a method to filter out comments[1215] which are written in languages that the user cannot read according to their user preferences. Many embodiments offer a "swap language" button[32100]. This button will be enabled for any comment[1215] in a language that was not specified in the user's profile. It is used to replace a comment[1215] in a language that the user can't read with an at least roughly comparable comment[1215] expressed in a language that the user can read.

Because these matrices[30400] may be of arbitrary size, most embodiments by default will sort the columns such that those with the most data are sorted to the left (at least in languages in which one reads from left to right) and likewise that rows which contain the most data are sorted to the top of the matrix[30400]. In determining how to perform this sort, some embodiments will consider the number of different sentiment[1305] types expressed, while others will consider only the total number of comments[1215].

Most embodiments allow for the filtering out of topics [1300] that are mentioned below a threshold number of times, and likewise for groups of people who rarely express opinions, or who are below a certain size threshold specified by the user.

Rubik's Cube Matrix

Some embodiments may offer support for a variation on the Matrix View[30400] as follows:

Effectively displaying an array of matrices[30400] for a number of dimensions k is often impractical since k is in most cases too large, therefore this visualization will only show one matrix[30400] at a time and let the user flip through dimensions either by switching the row field or by switching the column field. It is analogous to playing with a Rubik's cube. In practice, the user will not need to go through the k(k−1) combinations, since many demographic dimensions[420] are naturally independent. Thus once the user has flipped through rows of a matrix and ends up with an interesting pattern (e.g. most of the weight in one or two columns, or some other kind of anomaly) he will then flip through columns and see if he can land on an even more interesting pattern, hence would only go through the order of 2k views.

Figure 40:
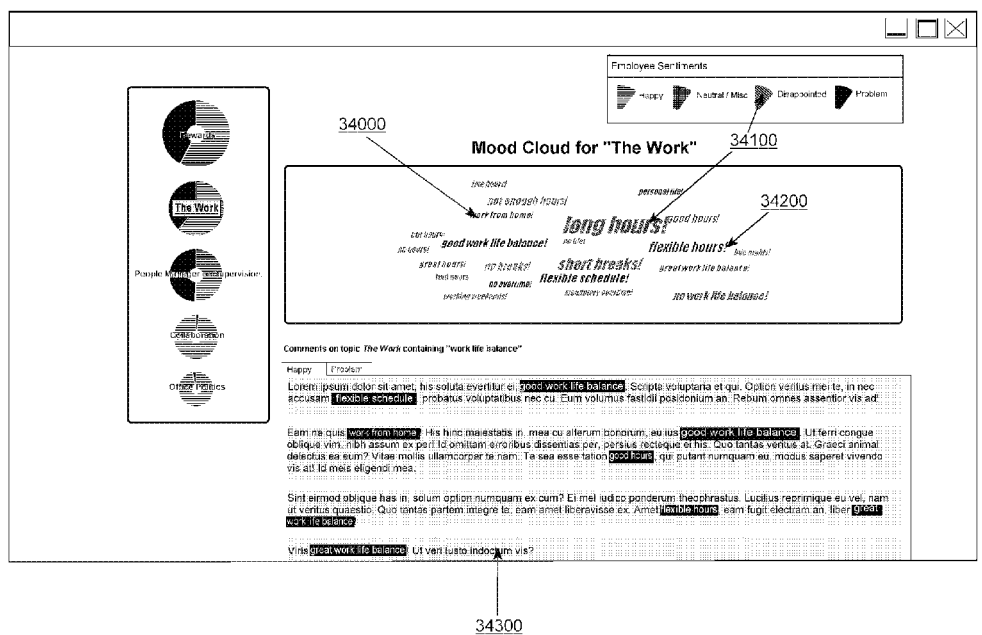
FIG. 40 is an illustration of one embodiment of a Mood Cloud for an example topic and sentiment.

Mood Cloud[FIG. 40] Visualizations

Some embodiments offer a variation on the standard "word cloud" in which the words and phrases most frequently used in descriptions of a selected topic[1300] are color coded by the sentiment[1305] context in which they appear. This is illustrated in FIG. 40.

The sentiment[1305] context is determined by the tag assigned by the engine to the clause or sentence or passage in which the word or phrase appears. This means that the exact same text can be tagged with more than one sentiment [1305] if it appears more than once in a given data set. Most embodiments will use color blending to deal with cases in which the same words or phrases are commonly associated with more than one sentiment[1305]. This scenario is not uncommon. For example, if 75% of the people think that the "onboarding training" is good, and the 25% believe that it is horrible, the resulting color of "onboarding training" would be 75/25, red/green.

Most embodiments will offer Mood Clouds[34000] filtered by a variety of dimensions including but not limited to demographic group[12060], archetype[310], comment group[1335], sentiment[1305], statement[1215] type (e.g. attitude[1295]/belief[1290]/suggestion[1330]/observation [1332]), or combinations of these as the user wishes.

While some embodiments will feed the words and phrases into a standard word cloud layout, other embodiments will opt to weigh the credibility[410] of the author[250] rather just using straight frequency of occurrence. Still other embodiments will weigh time in some fashion, with individual words or phrases being boosted for more recent mentions. Other embodiments will prefer to have a mode in which the mood cloud can be "played" so that words and phrases come and go, expand or shrink, and change color according to their frequencies—weighted or not according to the embodiment—over time.

Selection of Phrases to Render

Most embodiments will perform morphological and syntactic expansion on the words and phrases that would be displayed in the mood cloud so as to group like terms together. For example, it would be desirable to have only one of the following phrases show up in a mood cloud instance:
  Be accountable
  Hold accountable
  Accountability
  Have accountability Most embodiments will select the most frequently occurring word or phrase in such a set for display. However, some embodiments will find it useful to treat tenses differently. For example:
  Used to struggle
  Has been a continued struggle
  Have been struggling
  Can be importantly different in situations in which the measurement of change over time is important.

The set of phrases displayed in the Mood Cloud view and in other visualizations embedding that visualization is computed from the text found to express attitudes[1295] and beliefs[1290]. In some embodiments, those text snippets are normalized in order to reduce the number of quasi-duplicates that do not differ in their interpretation, but also stripped as appropriate of any superfluous words that may have been used in detecting the match, and lastly augmented with any meaningful or even necessary context. For example, on the topic[1300] of "office politics", the word "backstabbing" does not require any additional terms to express negativity, whereas on the topic[1300] of "quality" within an auto manufacturing company[210], the phrase "recall issues" would be displayed (as "recall" is by itself ambiguous, even though "issues" may appear superfluous in the context of expressing negative sentiment[1305]).

The following paragraphs describe in more detail the computation of those phrases, using a simple sequence of steps:
  Starting with all text matches, some contextual words are introduced for semantic and pragmatic disambiguation as well as to facilitate interpretation of the text match.
  The resulting phrases are then submitted to a normalization step
  Optionally a clustering step helps reduce dimensionality of the set of phrases as appropriate.

Phrase Contextualization

Phrases in the Mood Cloud do not merely consist of the head phrase of the text match, but also include sufficient surrounding text for the purposes of disambiguation and semantic clarity. Such additions are necessary in order to further qualify the topic[1300], or to determine the targeted of the voiced sentiment[1305], or when that object is itself too vague or not sufficiently discriminating, to further qualify the object.

Each of these three types is illustrated by the following examples.

Topic[1300] qualifiers: some modifiers of the head identifying the topic[1300] of interest may prove useful to pinpoint the exact (sub-)topic[1300] about which sentiment [1305] is expressed, for example on the topic[1300] of "rewards", a comment[1215] such as "the level of 2015 bonuses was perceived as unfair".

Sentiment[1305] target: this is useful both when the topic[1300] itself does not explicitly refer to the target of the sentiment[1305] expressed, or when that target is a collective concept that needs to be refined. An example of the former on the topic[1300] of top-down communication is "no warning about the layoffs", while an example of the latter on the topic[1300] of "employer reputation" pertaining to products would be "our SUVs have gained recognition".

Sentiment[1305] target qualifiers: on the topic[1300] of the quality of resources made available to each employee [320], many complaints will be directed at obsolete or poor-quality equipment, so in this case the system will retain additional qualifiers for those objects, such as "laptops too old" or "back-breaking chairs".

Phrase Normalization

Some normalization is also necessary in order to reduce semantically identical phrases: the match head (i.e. the infix part, not the prefix or the suffix of the matched text) is normalized in order to group together variants (whether derivational, syntactical, or maybe even spelling errors).

In one embodiment this is done by simple techniques such as stopword removal, stemming each word, and substituting terms identified as synonymous. The most commonly encountered variant is displayed in the cloud.

Phrase Clustering

Optionally, in some embodiments, clustering is performed following normalization so as to group synonymous, hyponymous, and semantically equivalent or proximate phrases. In one embodiment this consists of two phases. First, connected components are computed on the set of all normalized phrases in order to capture synonymy and hyponymy relationships: synonyms can be determined based on a lexicon customized for a given topic[1300], or on synonym relationships inferred from the entire corpus of available data using a technique such as distributional similarity, or by a combination of both; hypernym relationships can be determined via the detection of pairs of noun phrases where one is subsumed by the other through the addition or the substitution of a modifier term. In a second step, a hierarchical clustering method is applied in order to capture semantic proximity relationships, where each step works by computing a similarity matrix among normalized phrases then doing an average link clustering pass, where the similarity matrix values are based on pairs of noun phrases where only the head term has been substituted, weighed by the distributional similarity of those head terms.

In most embodiments, specific font treatments are applied to the phrases in the Mood Cloud[34000] to further characterize the text within which they occur, including but not limited to loud talking[1283], text used in reference to a different organization[200] (often a competitor[470] of some kind,) and text that is part of a fully expressed belief[1290].

Many embodiments will allow text which appears in a loud talking[1283] context to be indicated by a different font treatment such as italics, "comic book" style font treatment, and/or an accompanying embellishment such as a stylized "!!!" or "@#!$." Some embodiments may choose other visual treatments to designate loud talking[1283], such as the text shaking, or otherwise animating. The scoping of context may vary by embodiment, however the default embodiment will consider any intersection of the selected text with a loud talking[1283] sentence as well as a sentence just before or just after the intersection.

Figure 41:
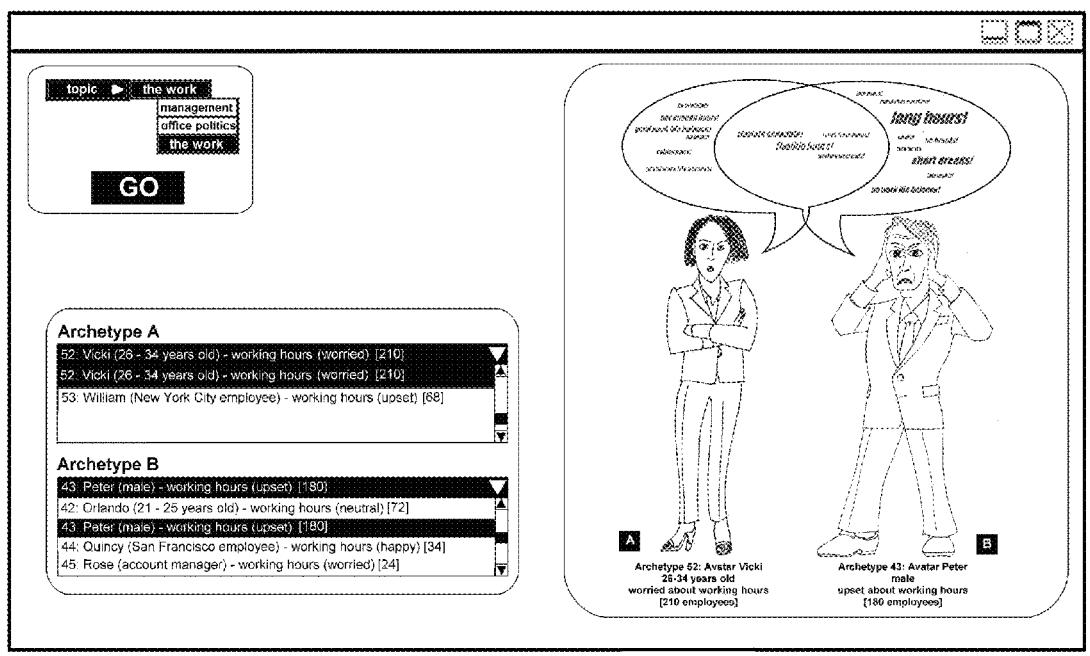
FIG. 41 is an illustration of one embodiment of avatar-related view of two avatars associated with two intersecting Mood Clouds.

Some embodiments will offer views that include multiple Mood Clouds[34000], an example of which is depicted in FIG. 41. This will usually be to contrast different groups of authors[250] or to contrast different periods of time, such as the periods before and after a major event of some kind. The handling of differences in the intersection—for example perhaps two distinct groups of authors[250] have mostly opposing sentiments[1305] associated with given phrases— varies by embodiment and is discussed in the section on archetype[310]-related visualizations.

Interactions

When the user clicks on a phrase inside the Mood Cloud[34000], in most embodiments, a contextual menu shows different actions:

Display snippets containing the matched phrase. Unlike the phrases displayed in the mood cloud[34000], when the matching snippet is shown, neither of the three components (prefix, suffix and infix parts of the matched text) is changed in most embodiments; in other words the original text is shown.

Display the reasons[1310] associated with the sentiment [1305] in question. For example, on the topic[1300] of management issues, when the phrase "bad manager" is clicked in the mood cloud[34000], the most frequent justifications provided for this opinion are shown as a list, starting with (for example) "poor listener", "micromanagement", "favoritism", etc. In one embodiment, the system also provides links to mood cloud[34000] instances pertaining to those beliefs[1290], thus allowing the user to navigate the causal relationships linked to a general issue and to more reliably and accurately diagnose organizational issues: in the previous example, "poor listener" may link to the topic [1300] of internal communication, while "favoritism" may link to the topic[1300] of fairness towards employees[320].

Display related actionable suggestions[1330]

Displayed related observations[1332]

Display full text of each item[1215] that contains the phrase,

Many embodiments will allow the user to double click on a word or phrase to see the situational contexts[18100] and the adjacent contexts[18110] in which it appears, also presented in a word cloud-like layout. In addition, this display helps the user better understand the impact that different data sources are having on the visualization. Most embodiments will provide the user the capability to adjust the relative weights of different data sources, including to just zero out a data source. Many will provide the same capability at a more granular level, for example allowing the text in a given field to be weighted separately.

Multi-Language Issues

Most embodiments offer the option that allows foreign language comments[1215]—that is, comments[1215] which are not in the default language currently configured by the user—to be displayed in the Mood Cloud[FIG. 40] as separate words/phrases; each individual language may also be displayed separately—or be folded in with their default language equivalents. Many embodiments will also offer the user the option to have phrases displayed in the Mood Cloud[FIG. 40] according to their density in the data in the relevant language. In this way, languages for which there is less data in a particular data set don't get thresholded out of the Mood Cloud[FIG. 40].

Some of the former embodiments may present the different languages in a slideshow-like manner (e.g. English fades to French, etc.), or may be displayed by toggling a "display all languages" button. Each mode offers advantages. Displaying phrases in different languages helps emphasize the global nature of a topic[1300], plus some words in other languages may be recognizable even to people with very limited proficiency in the languages in question. Further, in most embodiments, If the user mouses over a phrase that is not in a language she understands, the attitude[1295] or belief[1290] tags will appear in the mouse-over in the default language for the given user. Displaying each language separately facilitates comparison of both topic[1300] frequency and sentiment[1305] by language—if the users happen to be multilingual. On the other hand, folding together all the references to specific topics[1300] in different languages allows the correct tallying of the words and phrases globally.

Many embodiments will use different fonts to represent different languages. This serves both to help distinguish similar-sounding words in related languages (e.g. nepotismo, népotisme) and to provide an additional visual cue to the user that, for example, Italian is being displayed rather than Portuguese.

Many embodiments may opt to lay out the phrases in smaller word cloud structures within a Mood Cloud[34000] boundary such that each smaller structure corresponds to a comment group[1335] or other self-similarity measure. This helps users more readily understand how to interpret a clump of phrases in a language that they don't understand, since they will be visually grouped together with comparable phrases in other languages.

Archetype[310]-Related Visualizations

Most embodiments will offer a variety of views that allow users to compare and contrast different archetypes[310] as well as to probe their composition. Many visualizations of this style will by default display individual comments[1215] in comment groups[1335]. Comment groups[1335] can be thought of as clusters formed by shared tag pairs (topic [1300], sentiment[1305]) or triplets (topic[1300], sentiment [1305], reason[1310]). Note that the lowest level topic [1300] present will be used by most embodiments. Some embodiments will also support other types of data objects such as actionable suggestions[1330] and observations [1332]—or even analyzed images[10050]. In some embodiments, comment groups[1335] will be automatically named using existing summarization-related techniques.

Some embodiments may provide the ability to compare the same archetypes[310] over different periods of time, in terms of aspects which include, but are not limited to, of the number of members[290] that fall into the archetype[310], the demographic properties[420] of these members[290], any differences in expressions of the shared attitudes[1295], beliefs[1290] and observations[1332].

Avatars[35000]

An avatar[35000] is the visual representation of the group of insiders[270] who match a particular archetype[310]. Archetypes[310] are represented by one or more avatars [35000] with accompanying descriptive labels[35300].

While the avatars[35000] could be just static images in some embodiments, in most embodiment, each archetype[310] is represented by a "Chernoff face"[35200]-inspired avatar [35000] in which the characteristics of different features (eyes, hair, nose, arm position etc.) are used to synthetically display characteristics of the archetype[310] (whether demographic attributes[420], psychological ones, or both.)

Figure 42:
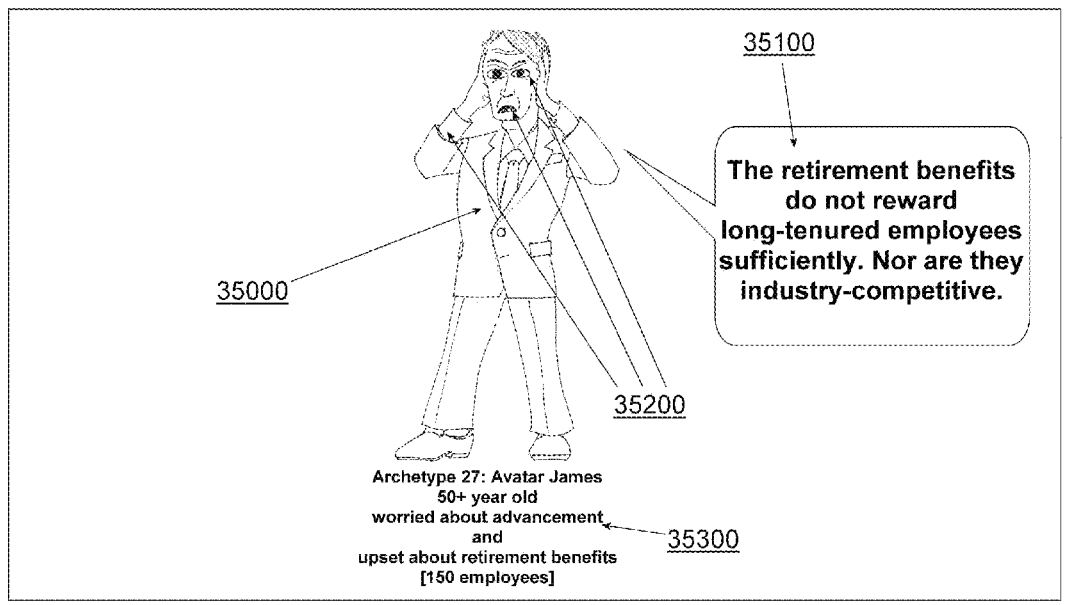
FIG. 42 is an illustration of one embodiment of avatar-related view for an example archetype.

For example, employees[320] over the age of 55 who are unhappy about a cutback in retirement benefits might have a gray-haired avatar[35000] with his arms clutching at his head in anger. This is illustrated in FIG. 42. Some embodiments will instead opt to only offer archetype[310]-style views based solely on demographic properties[420] of the commenters[250]. Each avatar[35000] typically is accompanied by a label with the number of members[290] corresponding to this archetype[310].

Some embodiments may opt to display avatars[35000] against a backdrop[36000] that provides further demographic[420] or other information about the relevant archetype[310]. For example, to indicate the demographic property[420] of being in a company[210] in the retail sector, a sales floor might be displayed behind the avatar[35000]. This strategy is a means of not overloading the avatar itself with too many features to be readily interpretable; it is also useful for displaying a shared attribute among multiple archetypes[310] in situations in which many avatars[35000] are being rendered in the same view. Such embodiments will have an extensible library of images for this purpose.

Most embodiments will use avatars[35000] in conjunction with the visual metaphor of call-out bubbles[35100] to illustrate the archetype[310]'s attitudes[1295] and beliefs [1290]. Different embodiments may handle this very differently; approaches include but are not limited to:

Display of a mood cloud[34000] per visualized archetype [310]

Display of comment groups[1335]

Display of the most common phrases, textblocks[21030] (if present) or alternately a summarization associated with each visualized archetype[310]. Many embodiments will use existing summarization methods.

Display of the statements[1215] associated with the given archetype[310] that most fit a user's specified criteria—for example, the angriest statements[1215], actionable suggestions[1330] and so on Most embodiments will offer more than one option, allowing the user to select a preference for a default or offering a contextual menu. In virtually all embodiments, regardless of the option selected above, there will be a way for the user to drill down to see all of the individual comments[1215]. Likewise, in most embodiments, there will be a way for the user to view other attributes of the members of the given archetype[310]. These include, but are not limited to: credibility[410], perspective[400], observations[1332], actionable suggestions[1330] and any demographic information[420].

Some embodiments may even offer a synthetic speech functionality by clicking on or mousing over an avatar [35000] which launches an audio version of the selected content, with aspects of the voice being appropriate to the selected demographic traits[420] but also of the detected sentiments[1305] and any other pattern detected (e.g. language containing loud talking[1283] patterns would be stated in an upset tone[1302] when the loud talking[1283] corresponds to an angry attitude[1295], and in an incredulous or sarcastic tone[1302] when it contains question marks, etc.)

Some embodiments when an avatar[35000] has been selected will display all of the items[1215] associated with the attitudes[1295] and beliefs[1290] of that avatar[35000]'s archetype[310] in a scrolling box below the display of avatar[35000] or adjacent to it. In most embodiments, if there are a large number of such items[1215] they will be broken into different tabs. In some embodiments, this will be done by creating one tab per specific attitude[1295] or belief[1290], while others will prefer to associate tabs with different demographic subgroups[12060] that are associated with the given archetype[310].

Many embodiments will support two types of avatar [35000]-related views. The first seeks to suppress demographic differences within the members of an archetype [310]. In this style of visualization, demographic[420] or other properties that do not strongly correlate to the archetype[310] simply are not visualized at all in the avatar [35000] that is rendered to represent the archetype[310]. For example, if age doesn't seem to have any relevance to membership in the archetype[310], but the archetype[310] correlates largely to women, the avatar[35000] would be rendered to reflect a woman with no signals as to age.

If however a particular archetype[310] simply doesn't correspond to any combination of the available demographic data[1225], some embodiments may animate the avatar [35000] display so that it morphs continuously to indicate all demographics (e.g. from older Caucasian female to younger Asian male, etc.) Other embodiments may simply opt to render a stylized avatar[35000] which lacks clear gender, age, or race. Still other embodiments will render a group of small avatars[35000] in preference to a single avatar[35000] in this situation.

Figure 43:
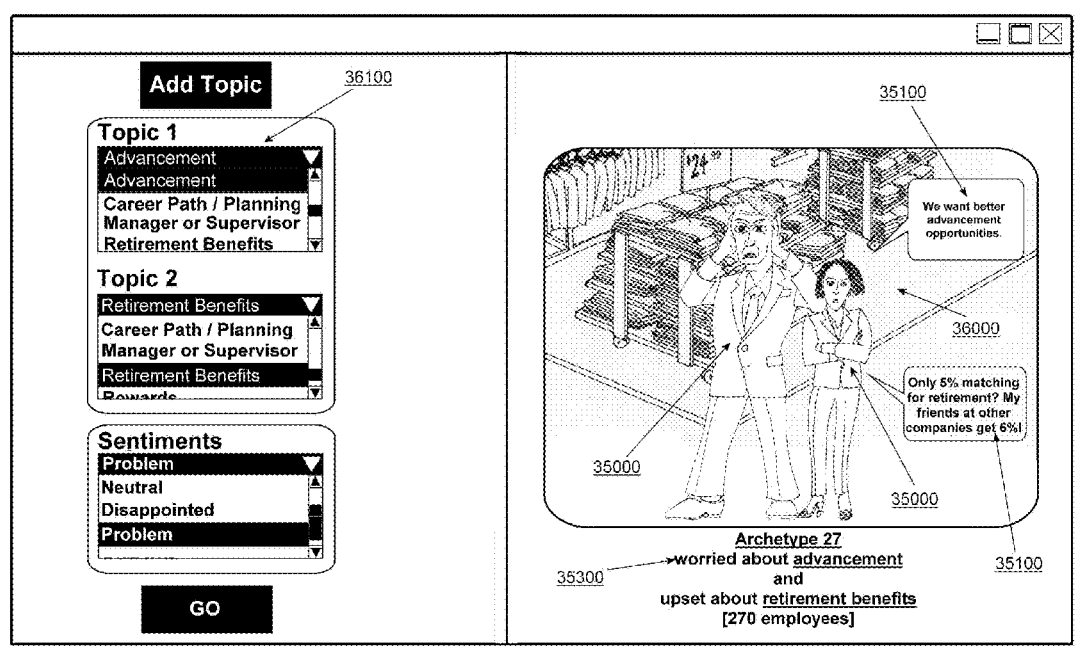
FIG. 43 is an illustration of one embodiment of avatar-related view for two example demographics within an archetype are depicted against a backdrop indicating their industry sector in sizes suggesting their relative populations.

In the second type of visualization, instead of one avatar [35000] being drawn in the generated image, as many avatars[35000] are drawn as are necessary to indicate different demographic characteristics[420] that occur frequently in the members of this archetype[310]. This is illustrated in FIG. 43.

The purpose of this second type of visualization is to highlight the role of demographics in mindset within the given archetype[310]. To take a simple example, if there are three times as many male members as female members in a given archetype[310] class, a male avatar[35000] would be drawn alongside a female one[35000] such that there is roughly a 3:1 size differential between the two. If the women who belong to the archetype[310] in question share an additional attitude[1295] or belief[1290], this will be highlighted in the avatar's[35000] title text. By default, the avatar[35000] representing the largest demographic category[12060] will be selected initially. In most embodiments, only the call-out bubble[35100] (or other content visualization) associated with the selected avatar[35000] will be shown.

Note that whether demographics have any correlation with an archetype[310] depends very much on the particular scenario in question. Certain types of topics[1300] are very likely to correlate strongly with one or more demographic dimensions[420]—for example, age and retirement benefits. However, other topics[1300] may have little or no such correlation; for example, like or dislike of a company name change might not correlate to any set of demographic dimensions[420]. Thus most embodiments will profit from offering both styles of view.

Figure 44:
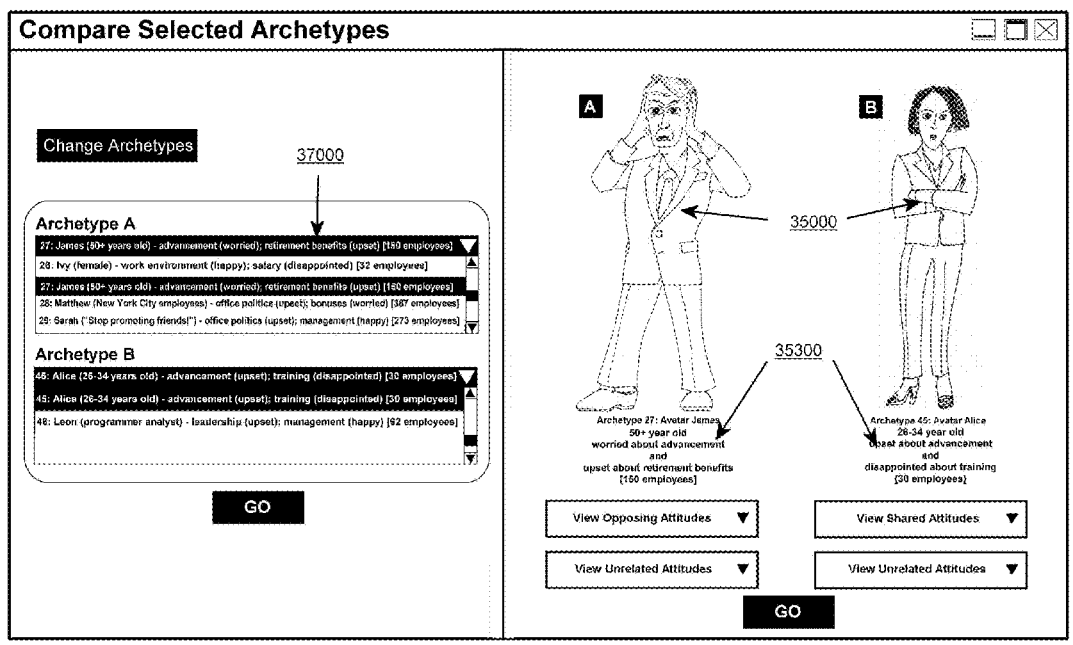
FIG. 44 is an illustration of one embodiment of avatar-related view for an example where different demographic groups' attitudes, beliefs, or suggestions can be compared and contrasted.

Most embodiments will allow the user to select one or more avatars[35000], or equivalent demographic subgroups [12060] from a list of checkboxes[36100] or similar construct like the dropdown menu in the figure, for the purpose of comparing and contrasting differences in attitudes[1295], beliefs[1290] or suggestions[1325] among the different demographic groups[12060]. This is illustrated by FIG. 44. While by definition, there must be significant similarities in thought among all members of the archetype[310], this is not to say that there also sometimes won't be meaningful and interesting differences as well.

Most embodiments will likewise offer the ability to compare and contrast different archetypes[310]. Some of these embodiments will display intersecting call out bubbles [35100] so as to capture the similarities—and differences—among the selected archetypes[310], an example of which is illustrated in FIG. 41. In most of these embodiments, if there are statistically meaningful differences in the sentiment [1305] associated with given text being displayed, such text will not be rendered inside the intersection of the bubbles [35100]. However in other embodiments, such differences will be handled through font treatment, such as text that has a "crack" running all the way through it and/or an accompanying icon such as a stylized exclamation point "!".

Figure 45:
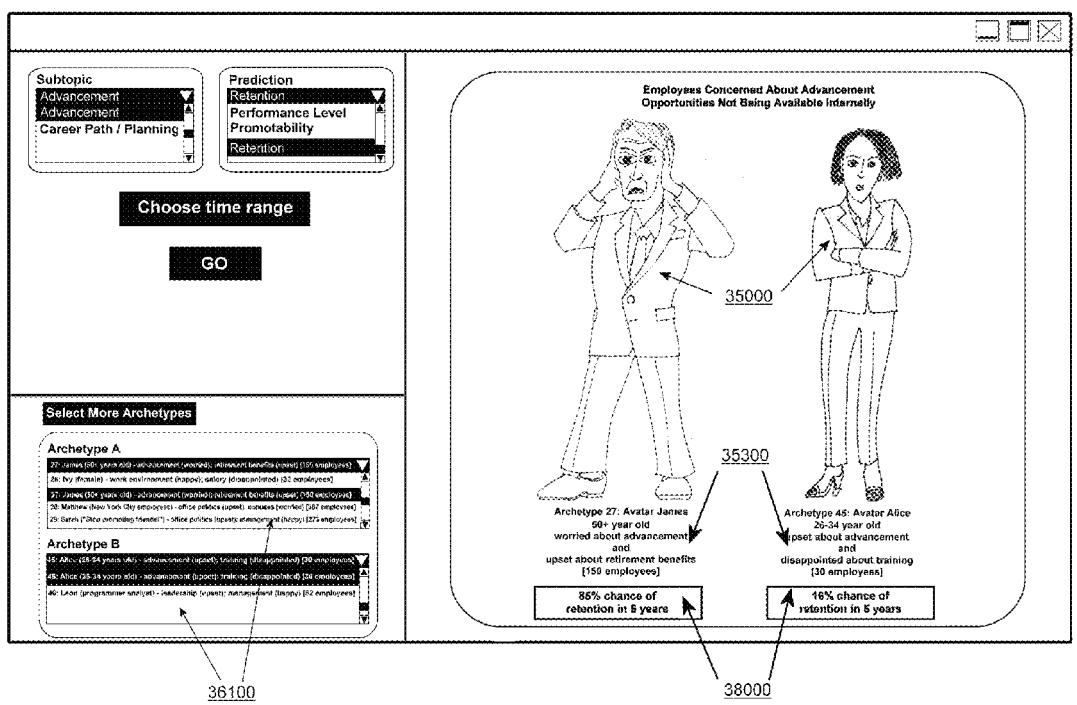
FIG. 45 is an illustration of one embodiment of avatar-related view for an example in which multiple years of data for a given organization can be used to offer predictive capability based on archetypes.

Some embodiments will, when supplied with multiple years of data for a given organization[200], as shown in FIG. 45, offer a predictive capability[38000] based on archetypes [310] with respect to questions including but not limited to retention, performance level, and future promotability. In most embodiments this will just be done via usual statistical methods once the archetypes[310] have been calculated.

Most embodiments will offer a button or single-click menu option that allows users to copy/paste the full visual display of avatars[35000] with their backdrops[36000] (if present) and their call-out bubbles[35100] and/or text-to-speech renderings of the content of the call-out bubbles [35100] into other media, such as a slide presentation or website.

Figure 46:
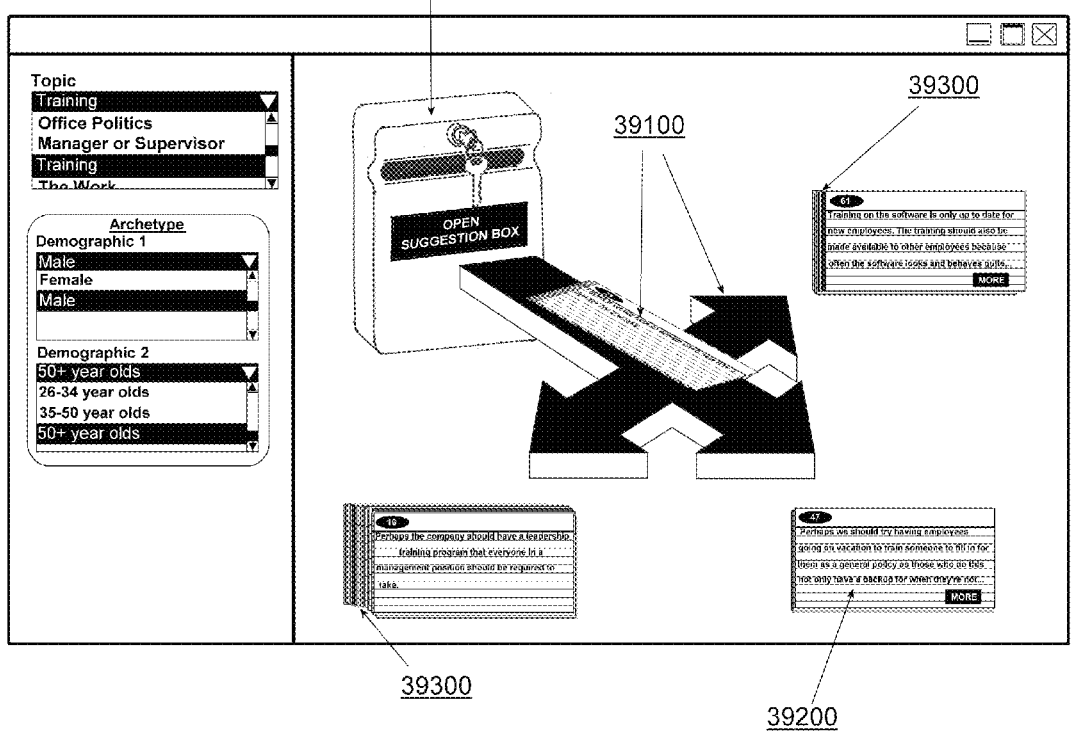
FIG. 46 is an illustration of one embodiment of a Suggestion Box view for an example view of actionable suggestions by archetypes for certain topics.

Suggestion View [FIG. 46]

The Suggestion View[FIG. 46] in most embodiments contains a literal image of an old fashioned suggestion box[39000], as pictured in FIG. 46. The user may select one or more topics[1300] and, if desired, one or more demographic attributes[420] or archetypes[310] and then click on the icon to "open" the suggestion box[39000]. Almost all embodiments will opt to use only actionable suggestions [1330] rather than all sentences which are linguistically constructed as suggestions in order to avoid sarcastic and other low informational value[22020] comments[1215]. Some embodiments may opt to offer filtering of the suggestions[1330] by the credibility[410] level of the authors[250].

Some embodiments will present each suggestion[1330] on a separate "suggestion card,"[39200] while others will display them on one virtual sheet of paper, but with different font treatments and/or in separated horizontal sections so as to further distinguish between authors[250]. In some embodiments, the "cards"[39200] or "paper" will animate [39100] out of the suggestion box[39000]. If multiple topic [1300] areas are selected, the cards[39200] will animate out of the suggestion box[39000] into visual stacks of cards [39300] the relative sizes of which provide a visual cue as to the relative number of suggestions[1330] that are associated with each.

In most embodiments, the user can configure which demographic information[420] is shown in relation to each suggestion[1330]. In the former type of embodiment, very similar comments[1215] can be optionally combined, with a number reflecting the number of individual suggestions [1330] reflected on the card[39200]. If the user clicks on this number he can see the individual suggestions[1330] and their associated demographics[420]. In some embodiments, this number will be color-coded as a visual cue to its frequency, with a color legend being provided at the top of the view. In other embodiments, the whole card will instead be color-coded. Most embodiments will set user-modifiable thresholds for when to divide suggestions[1330] on a particular topic[1300] into subtopics[1300] based on the number of suggestions[1330] found.

Year-Over-Year Summary [FIG. 34]

How the system's data objects such as attitudes[1295] and beliefs[1290] change over time is often quite interesting. A simple but effective means of capturing this can be achieved by using pie charts, circle graphs or similar representations [28000]. An example of this is illustrated in FIG. 34. Each circle graph's[28000] size represents frequency of occurrence of the topic[1300] (or whatever it is illustrating.) If appropriate, it will be partitioned according to sentiment [1305]. However, when doing year-over-year (or other time-based units) comparisons, both of these dimensions in isolation can be misleading. For example, perhaps a company-wide survey[25015] was done this year but not the year before. Or perhaps there was some polarizing one-time event that drew a lot of unusual comment[1215] activity online but which then quickly faded away.

In some embodiments, if the comments[1215] in aggregate are meaningfully different from what could be extrapolated from prior years' results using standard statistical methods, the chart or graph element[28000] that represents the particular topic[1300] or other thing in question will be raised above the x-axis in proportion to the degree of the anomaly[28100]. If, for example, there is a particular anomaly such as a large negative cluster of comments[1215] on a given topic[1300] within a short timeframe, most embodiments will also render an icon such as a flag or an asterisk next to the relevant graph element[28000] or chart. If the user clicks on this icon, a panel will come up that displays information about the anomaly. For example, the anomaly may be linkable to an external event of which the system is aware; even if not, other information such as common N-grams or textblocks[21030] in the data in question can be displayed.

Some embodiments will use this style of visualization for benchmarking purposes. In this case, the raising of a circle graph[28000] above—or below—the x-axis will be proportional to how the relevant data from the target organization [200] compares to other comparable organizations[200] for the same periods of time.

Figure 47:
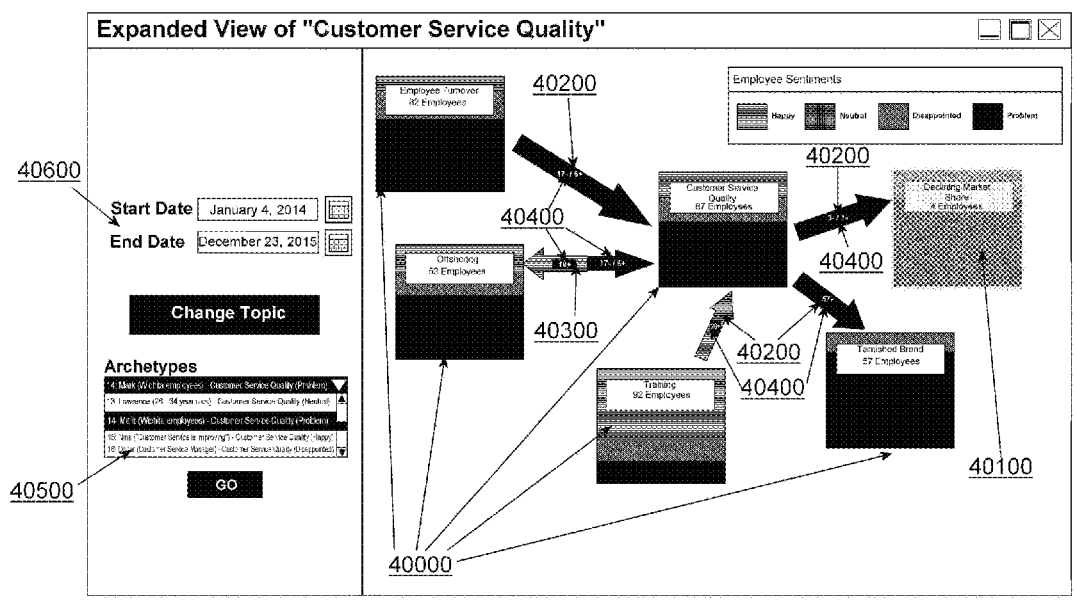
FIG. 47 is an illustration of one embodiment of a Perspective View for an example view of an insider's understanding of the relationship among factors related to a topic of interest to the insider.

Perspective View [FIG. 47]

In scenarios in which it is especially important to understand the perspectives[400] of insiders[270], it can be helpful to see an aggregate visualization that illustrates both which perspective elements[20010] are being commonly referenced by different classes of insiders[270], with what polarities[24000], and what is understood about the relationships[20050] among these elements[20010]. For example, there may be differing views about what factors most impact the quality of customer service, including training, staff turnover, specific policy decisions such as desired call length, and offshoring. Likewise, there may be differing views about whether the quality of customer service is good or bad—and on whether different elements like training are influencing the quality for better or worse.

Some embodiments will thus offer a visualization of the perspective elements[20010] with the following characteristics:

Each perspective element[20010] that is referenced more than N times will be rendered as a shape[40000] in the view, and colored according to the sentiments[1305] expressed about it. Different embodiments may accomplish this by different means including but not limited to color blending, partitioning the shape[40000] into different colored pieces proportional to the sentiments[1305] being expressed, and using a gradient fill.

Each perspective element[20010] that is referenced more than zero but less than N times[40100] will either be rendered in gray scale rather than in color or as partially transparent, depending on the embodiment.

Any perspective element[20010] that isn't referenced at all will either not be rendered at all, or will be rendered only if directly connected to an element[20010] that is referenced more than N times in which event it will be rendered by most embodiments as in the second case for purposes of providing context, but usually with reduced size so as to emphasize the saliency of the elements[20010] that are referenced.

The lines[40200] that depict the relationships[20050] between elements[20010] will likewise be drawn in most embodiments with colored fills to indicate either a direction of polarity[24000] transmission (e.g. the training negatively impacting customer service quality) or a patterned line to represent correlation between two elements[20010]. Most embodiments will provide numerical information at the center point of the line[40400], for example that 324 members asserted the relationship[20050], 200 asserting a positive one from training to customer service quality and 124 asserting a negative one. Most embodiments will support the notion of bi-directional relationships[40300] in which, for example, Element A is asserted to have a positive influence on Element B, while Element B is asserted to have a negative influence on Element A. Most of these embodiments will visualize such cases with colored arrows pointing in the appropriate direction; these arrows may lie adjacent to the line or inside it.

This is illustrated in FIG. 47. Clicking on a shape[40000] or a line[40200, 40400] will bring up a window with the comments[1215] that pertain to the element[20010] or relationship[20050]; in most embodiments, the user clicks on the shape[40000] or line[40200, 40400] title to see all comments[1215] on the element[20010] or the relationship [20050], and on a colored portion or arrow to see only comments[1215] with the polarity[24000] that matches the color of the region in which the user clicked. Most embodiments will provide a summary of the comments[1215] at the top of this window.

Most embodiments will allow this view to be filtered by demographic group[12060] including by archetype[310]. Most embodiments will also allow the user to set a time window[40600] for the view, so that (for example) comments[1215] older than a certain date may be excluded.

Benchmarking View [41100]

Figure 48:
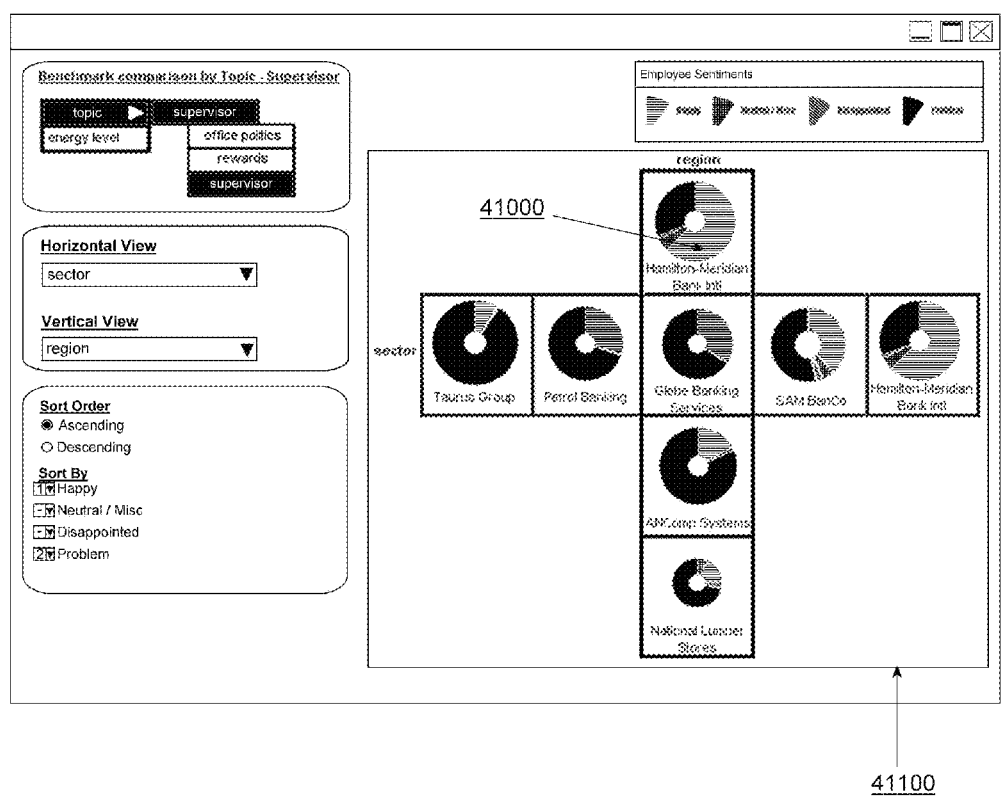
FIG. 48 is an illustration of one embodiment of a Benchmark View for an example depiction of an organization and its members' sentiments associated with a topic compared to other organizations in its sector and region.

In cases in which sufficient data is available with which to compare organizations[200] to one another by region[433] or sector[430], some embodiments will offer a view in which selecting a graph element[28000] (a circle graph or other graphical or chart-based representation of data) for a given measure will display the graph elements[28000] for the same measure for other organizations[200]. In some embodiments, the graph elements[28000] for other organizations[200] in the same sector[430] will be displayed horizontally; the circle graphs[28000] for other organizations[200] in the same region[433] will be displayed vertically. The circle graph[28000] for the initial organization [200] will be placed in the row or column with the circle graph[28000] for other organizations[200] according to the sort order selected by the user, for example ascending vs. descending, and for something compound like topic[1300] mentions, whether to sort on the total number of mentions, or the percentage or raw number of negative vs positive polarity[24000] statements[1215]. An example of this is illustrated in FIG. 48.

Interactive Prompting for Surveys[25015]

For a variety of reasons, respondents[15050] often do not provide as much information as would be desired when directly solicited for it in various types of surveys[25015], forums or other similar contexts. The result is that often sentiment[1305] on different topics[1300] is captured, but little more.

In at least some percentage of these cases, actively eliciting information from respondents[15050] automatically via natural language generation techniques would yield noticeably more specific, and hence actionable data. In addition, we will show that such an approach will help separate the respondents[15050] who have something further to express and are willing to do so from those who either are fearful of saying more or do not really have anything deeper to say. For example, some respondents[15050] might opine that the management is lousy, but really have absolutely no idea why. Thus, additional metrics of interest are generated in addition to the supplying of more specific textual data.

Some embodiments will thus provide an interactive prompter[15140] that can be integrated with things including, but not limited to, online surveying[25015], interviewing applications, and online forums, so that they are able to offer up prompts to a respondent[15050] who has not provided the desired level of data w.r.t. its informational value[22020] and/or whose inputs contain at least one slot[2660] that is either empty or underspecified.

In most embodiments, the basic prompts are generated given three types of data:

An respondent's[15050] textual or, depending on the embodiment, speech input (e.g. a response to a question in some application).

Demographic information[1225] about the respondents [15050] to the extent it is available Keystroke data, if available, such as deleting words or the amount of hesitation between subsequent words. Alternately speech data such as pauses between words, and requests to strike a prior answer.

In most embodiments, the prompter[15040] will rely on standard natural language processing tools, as well as on the system's internal knowledge base[1340], to parse and analyze the inputted text[6200] in order to identify any slots [2660] that are either empty or whose contents are underspecified. These can be expressed as three different cases:

A suggestion[1325] or observation[1332] is identified, but in which one or more slots[2660] are empty, including the "why", or reason[1310]

No causality markers are detected; for example, an attitude[1295] is expressed but not a full belief[1290]

The input contains one or more instances of vagueness, including but not limited to the use of universal quantifiers (e.g. "all", "every"), and words of the form "someone", "something." In other words, the slot[2660] is underspecified.

Figure 49:
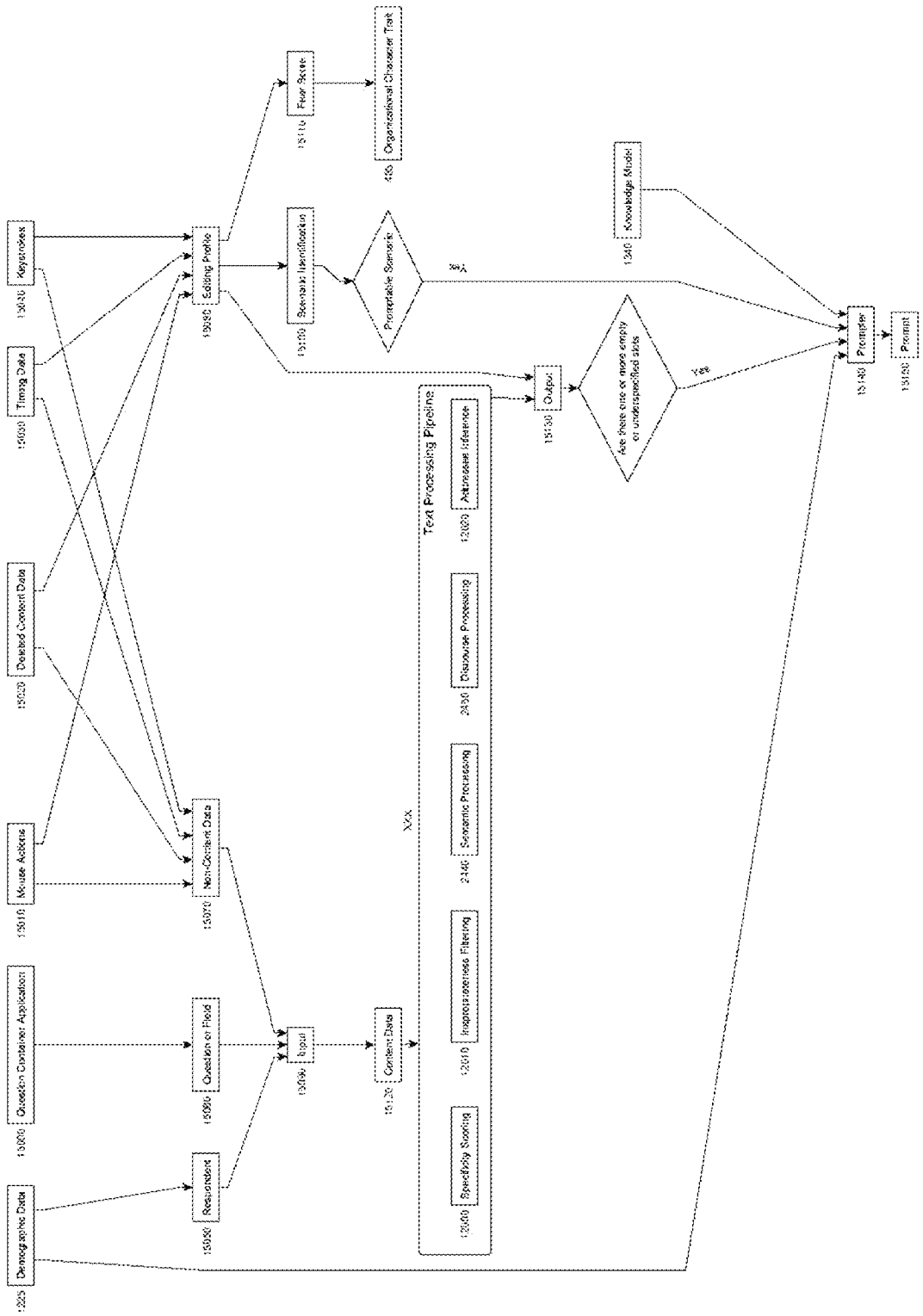
FIG. 49 is a flowchart of one embodiment of processing the act of a respondent replying to a prompt into its metadata characteristics.

As is the case for actionable suggestions[1330], the elicited respondents[15050] input is processed in 4 passes: syntactic processing[7400], specificity scoring[7410], semantic processing[2420], and discourse processing[2450]. Note that many embodiments will then perform discourse chunking across the responses to different questions so as to capture cases in which the respondent[15050] references the answer to a previously answered question X in the response for question Y. This is illustrated in FIG. 49.

Many embodiments will also perform the optional step of inferring an addressee, and also categorize the respondents'[15050] texts[6200] for appropriateness[12010]. The latter is to allow the prompter[15140] to change its behavior on this basis. For example, some users might decide that as a matter of principle, they do not wish any respondent[15050] to be prompted further if he has made comments[1215] that fail the appropriateness test[12010].

Most embodiments will allow causality markers within a chunk to be either explicit or implicit. Explicit causality in manifest is the form of causal subordinate clauses (e.g. " . . . , because") or causal adverbials (e.g. "due to . . . "). Implicit causality will be identified by different embodiments by the number of clauses and/or the degree of discourse cohesion. The latter is obtained after discourse processing[2450] if anaphora resolution reveals that the same entity is mentioned in one or more adjacent clauses and at least one of the clauses expresses a polarity[24000]-bearing statement[1215] about the entity. Note that a comment[1215] may contain an actionable suggestion[1330] without providing a motivation for it. Likewise, it may contain the expression of an attitude[1295] rather than a belief[1290]. Moreover, while actionable suggestions[1330] are required to be specific, it may nonetheless be the case that a even an actionable suggestion[1330] may have an empty or underspecified slot[2660]; non-actionable suggestions[1325] by definition usually have more than one. In the ideal case, the prompter will convert many of these suggestions[1325] to actionable suggestions[1330].

For example, consider the comment[1215] "Additional training for all associates on all skills required for their job is needed" Most embodiments would trigger on any one of 3 aspects of this particular response[6200]:

It is an observation[1332] that has underspecified slots [2660] (e.g. which skills exactly?)

Absence of causality markers (e.g. there's no support or reason[1310] offered for the observation[1332])

Presence of vagueness markers as described above (e.g. "all associates")

Most embodiments will allow the user to specify whether to elicit reasons[1310] from respondents[15050] prior to eliciting more specifics on information already provided—or vice-versa. This would determine, for example, in which order the following two questions would be asked of the respondent[15050]

a. "Which Associates do you have in mind?"
b. "Which skills required for their job in particular?"

To produce this output, the prompter[15140] looks for patterns such as "all Noun Phrase (NP)" These are mapped onto a list of relevant interrogative patterns such as "which NP in particular?" or "which NP do you have in mind?", which are inserted randomly by the system, in most embodiments, so as to have some variety. The subsequent input from the respondent[15050]—if there is one—is expected to have a higher specificity score[12030]. Alternatively, the prompter may also produce an output enquiring about the topicalized entity in the input, such as "Additional training" in the example above, if the input[6200] is deemed too short. Based on the information contained in the internal knowledge base[1340], specific entities can be preferred over others to solicit more data about, if multiple entities are referenced in the same chunk of text.

If no entities are mentioned in the input, for example, the prompter may ask questions making direct reference to entities in increasing lower nodes of the knowledge base [1340] (i.e. of increasing specificity). A common example of a vague comment[1215] is "Communication needs to improve". The knowledge base[1340] allows the prompter to know that the semantic frame of "communication" relates it to a specific set of entities ("people"). Picking subsets from this set, the prompter may ask "Is it communication with your superiors?". This allows the extraction information about specific entities.

Much as was the case with actionable suggestions[1330], even if certain words or concepts in the respondents' [15050] response are totally absent from the internal knowledge base[1340], that needn't get in the way. For example, if a respondent[15050] said "We must stop flibberflabbing", the prompter[15140] can still respond with "Why must we stop flibberflabbing?"

Time is also a relevant aspect of the input's semantics in most embodiments. Time may be treated as an entity, meaning that we may wish to extract information about the past, present, or future. Most embodiments will thus extract time information by simply analyzing verb morphology and temporal adverbials in the input. Demographic data[420] often is required to properly interpret such information. For example, a former employee[330] is likely to speak of the company[210] in the past tense simply because she/he is no longer associated with it, but this may still represent an opinion about the present. The same does not apply for a current employee[320]; if a respondent[15050] consistently speaks of the past, in most embodiments the prompter [15140] will identify that and investigate by eliciting information about the present or future. This can be done with either entity-specific prompts[15150] (e.g. "Do you think [NP] is better now?") or generic ones (e.g. "What do you think the future holds for the organization?").

Note that in most embodiments, the prompts[15150] consist exclusively of interrogative sentences. These are divided into two patterns: eliciting specificity or eliciting causality. Semantic processing[2440] allows patterns to be further categorized according to sentiment[1305] polarity [24000] and to output prompts[15150] that are specific to individual semantic frames. Positive polarity[24000] statements[1215] expressing the respondents'[15050] emotive relation to an entity (e.g. "I enjoyed NP") can not only lead to outputs like the above-mentioned, but may also be used by some embodiments to elicit opposite polarity[24000] information about the same entity, were it absent from the input, e.g. "What did you not enjoy about NP?" or "What did you dislike about NP?". Note that in some embodiments, the syntactic subjects need not be 1st person pronouns mapped onto 2nd person pronouns, but may also be 3rd person entities, e.g. "many of my coworkers". In this case, demographic data[420] such as the respondent's[15050] position in the organization[200] will render further prompts about the identity of such entities unnecessary, given the knowledge base[1340] defining the organizational hierarchy.

In many embodiments, the prompts will be enriched to capture the tone[1302] of the respondents[15050] and react in kind—for example, adding expressions of concern for negative comments[1215] or excitement for positive ones emulates empathic behavior in the interaction with the respondents[15050] The prompt given a negative input may be prefaced by expressions such as "I'm sorry to hear you [VP]" or "It's great you enjoyed [NP]!" Here again, the natural language generation consists of filling in empty slots[2660] in predetermined syntactic constructions with constituents from the input. Most embodiments will tailor the prompt to the specific traits[485] of the organization [200] and the demographic groups[12060] within it. This is achieved in most embodiments by storing several forms of patterns used in the same function, but varying in their level of formality. In many embodiments, the appropriate level of formality for a given organization[200] will be specified by the user. However some embodiments will prefer to assess the appropriate formality level from the language-specific aspects of the inputs themselves, including but not limited to the use of contracted forms, colloquialisms, consistency of using accents and capitalization, the formality of verb forms, or honorifics. Note that the use of slots[2660] filled from the input may already implicitly emulate the tone[1302] of the respondents[15050].

Furthermore, in many embodiments, formal aspects of the input will also be emulated by the prompter[15140] to improve the odds of eliciting a response from the respondent [15050]. If, for example, a respondent[15050] makes use of emoticons or interjections, the prompter may choose to include these in the prompt[15150]. Formal features may also be used to calibrate a response by some embodiments.

Some embodiments will not limit the function of the prompter[15140] to being interactive, but will also provide a "follow-up" mode version in which the prompter[15140] sends follow up messages to respondents[15050] at some point after the last session during which the respondent [15050] interacted with the application that is doing the soliciting. Any messaging platform that is available to contact the respondents[15050] may be utilized for this purpose, the more interactive, the better.

Most embodiments will provide the respondent[15050] a straightforward way to terminate the prompter[15140]; if the prompter[15140] is annoying the respondent[15050], it really has no further useful function.

Whether to Prompt

Respondents may hesitate when entering text input or speaking, either initially or when additionally prompted, for a number of different reasons:

They are not often asked to write or otherwise given an opinion, and so are a bit hesitant when asked to do so (for this reason only)[16020]

They have no real opinion and/or no knowledge about what is being asked[16020]

They are engaging in self-censorship behavior out of fear[16020]

Figure 50:
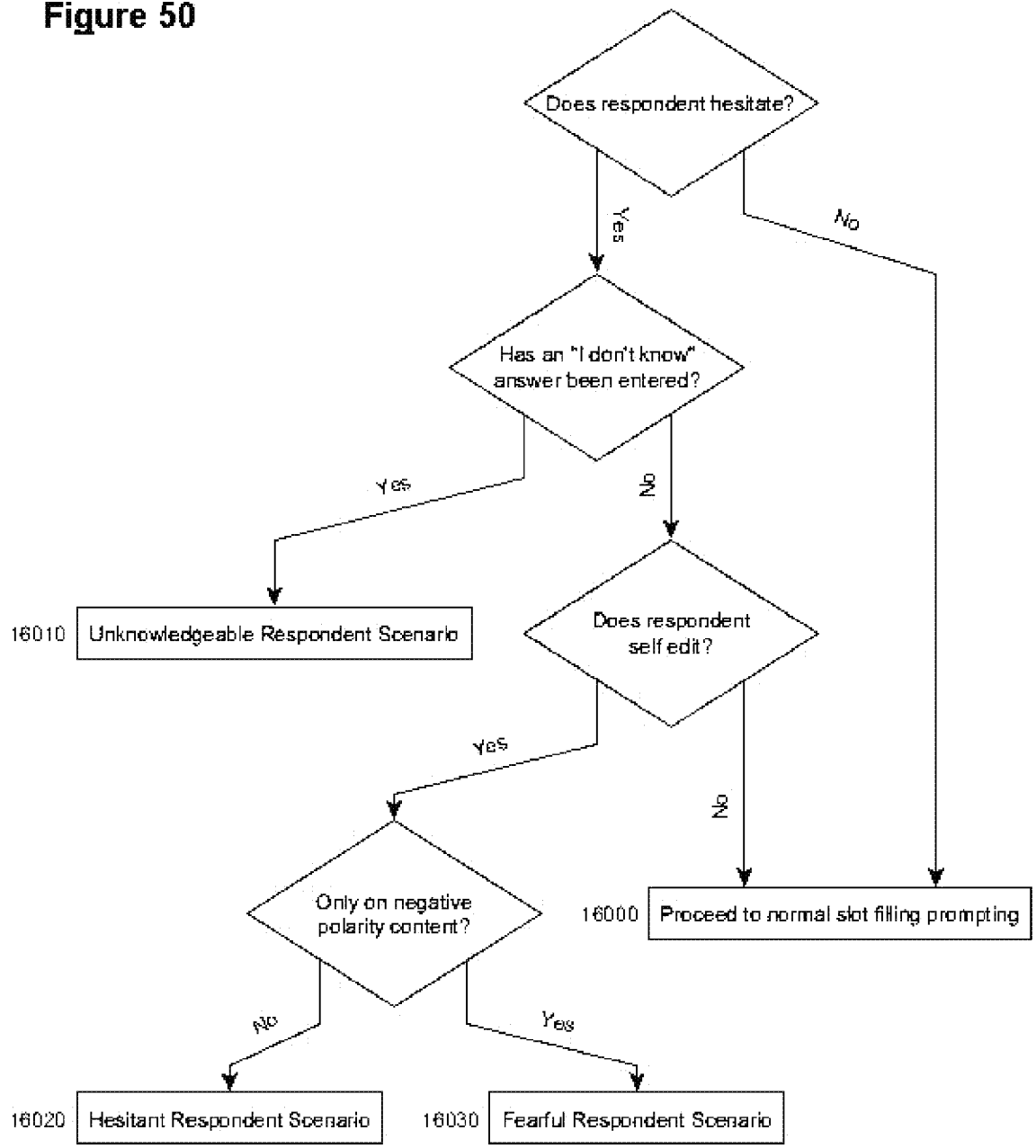
FIG. 50 is a flowchart of one embodiment of a process of characterizing a respondent's state while replying to a prompt.

Most embodiments will seek to identify these different cases so that the prompter[15140] behaves appropriately to the circumstance. A flowchart of this process in one embodiment is depicted in: FIG. 50. For example, prompting someone who is genuinely unable to respond to a question in an informed way can be counterproductive; consider a junior employee[320] who knows absolutely nothing about retirement benefits being prompted with a menu offering different aspects of the retirement benefits from which he is asked to select one as being most important. In such situations, the respondent[15050] is likely to just pick something at random so as to get rid of the prompt.

Respondents[15050] in the last category can be expected to hesitate[K-020] both before and after typing (or speaking) a negative polarity[24000] attitude[1295], especially on an important[7050] topic[1300], and likewise to erase and reword such text at least once, for example to damp down the tone[1302]. However the same respondents[15050] would not be expected to demonstrate the same hesitation [16020] or self-editing behavior when making positive or neutral polarity[24000] statements[1215]—or possibly when discussing minor/infrequent topics[1300], regardless of polarity[24000]. If they are naturally hesitant, they will be noticeably more so in the negative polarity[24000] case. In this case, the prompt should acknowledge the negative polarity[24000] and express something to the effect "that we know X needs improvement. With your feedback, we'll be able to make the most useful changes." Most embodiments will offer only such a prompt[15150] once per respondent.

Respondents[15050] who have no real opinion on the given topic[1300], but who may nonetheless try to come up with something to say anyway, are very likely to reference something very minimal and generic (as opposed to highly specific) and are somewhat likely to hedge (e.g. "I don't really know") or provide a response like "N/A" or just "?"—even if they later erase it. Prompting such respondents [15050] for specifics in this case is generally not that worthwhile, and could annoy respondents. Thus most embodiments, if they do choose to prompt in this case, will take a tack such as "It's okay not to have a strong opinion about X But even if you don't, is there anything you want to talk about regarding X"?

Alternately, for a "?" or similar response, in some embodiments, the prompt will offer a definition of X. Note that most embodiments will consider this case to apply on a per-topic [1300] basis. Otherwise put, that someone has no opinion about Topic A does not necessarily mean that he has none about Topic B. If the respondent does provide input when prompted, most embodiments will engage in the slot[2660]-filling behavior described at the start of this section, and only stop when the respondent[15050] has signaled that he wishes to disengage, for example by going on to the next question.

Respondents[15050] in the first category are likely to be slow generally (independent of the polarity[24000] of the content), edit themselves multiple times, but may ultimately be specific and provide a long response—especially with prompting. These are the main class of respondents[15050] for whom the automated prompting is likely to be the most valuable. That's because these respondents[15050] actually do have something that they want to say, and are not particularly afraid to respond. In this scenario, most embodiments will prompt with the basic prompts[15150] according to the description earlier in this section. They will stop once all relevant slots[2660] have been filled or the user has left the textbox or otherwise indicated that they are no longer responding.

To handle this scenario, some embodiments will either include in their prompt[15150] possible values for the missing or underspecified slots[2660] or will provide a context-sensitive menu allowing the respondent[15050] to select one from a list. These values are taken from the internal knowledge base[1340], which includes prior text provided by other respondents[15050] associated with either the given organization[200], or depending on configuration, any organization[200] in the same sector[430] and/or region [433].

Because the appropriate action for the prompter[15140] to take depends heavily on which of the above cases is the operative one, many embodiments will choose not to prompt solely on the basis of initial hesitation[16020] on the part of the respondents[15050] as such initial hesitation[16020] provides no hint as to which of the three cases is at hand. However, in some embodiments this only applies to the first interaction—or, depending on the embodiment, first small number of interactions with the respondent[15050]—since once there is enough data for the system to categorize the scenario, there is no reason not to create a prompt[15150]. (By 'interaction', we mean response to a question.)

Furthermore, such delays may not be hesitation at all but either a signal that the person is never going to respond to the question, or (for example) has gone off to lunch. Thus in most embodiments, if there is an absence of keystrokes or the equivalent for more than a user-specified number of seconds, in many embodiments the prompt[15150] will be removed from the screen; the prompt[15150] can be re-launched when/if the user returns to the screen.

Demographic data[420] about the respondents[15050], including system-derived data such as perspective[1320] and sincerity[3060], will be used to adjust the behavior of the prompter[15140] by virtually all embodiments. For example, a member[290] who has been with the organization[200] for a very long time could be presented with a customized prompt[15150] that references this fact such as "You've been with us for a long time, so your opinion on this is really important." Further, it is virtually certain that respondents[15050] in certain positions and/or who have a certain level of seniority in the organization[200] will have knowledge—and hence in many cases, opinions on—certain things. For example, in a corporate environment, both managers and HR people will necessarily have knowledge of the employee performance review and salary administration processes (unless they have only been there for a very short period of time.) The vast majority of them will very likely have opinions on these topics[1300]; the only question is their willingness to express their opinions. In such cases, some embodiments may choose to construct prompts accordingly, for example: "You must have some thoughts on how you'd like to see the review processed improved" Thus a "one size fits all" approach would be far from optimal.

When to Prompt

Figure 51:
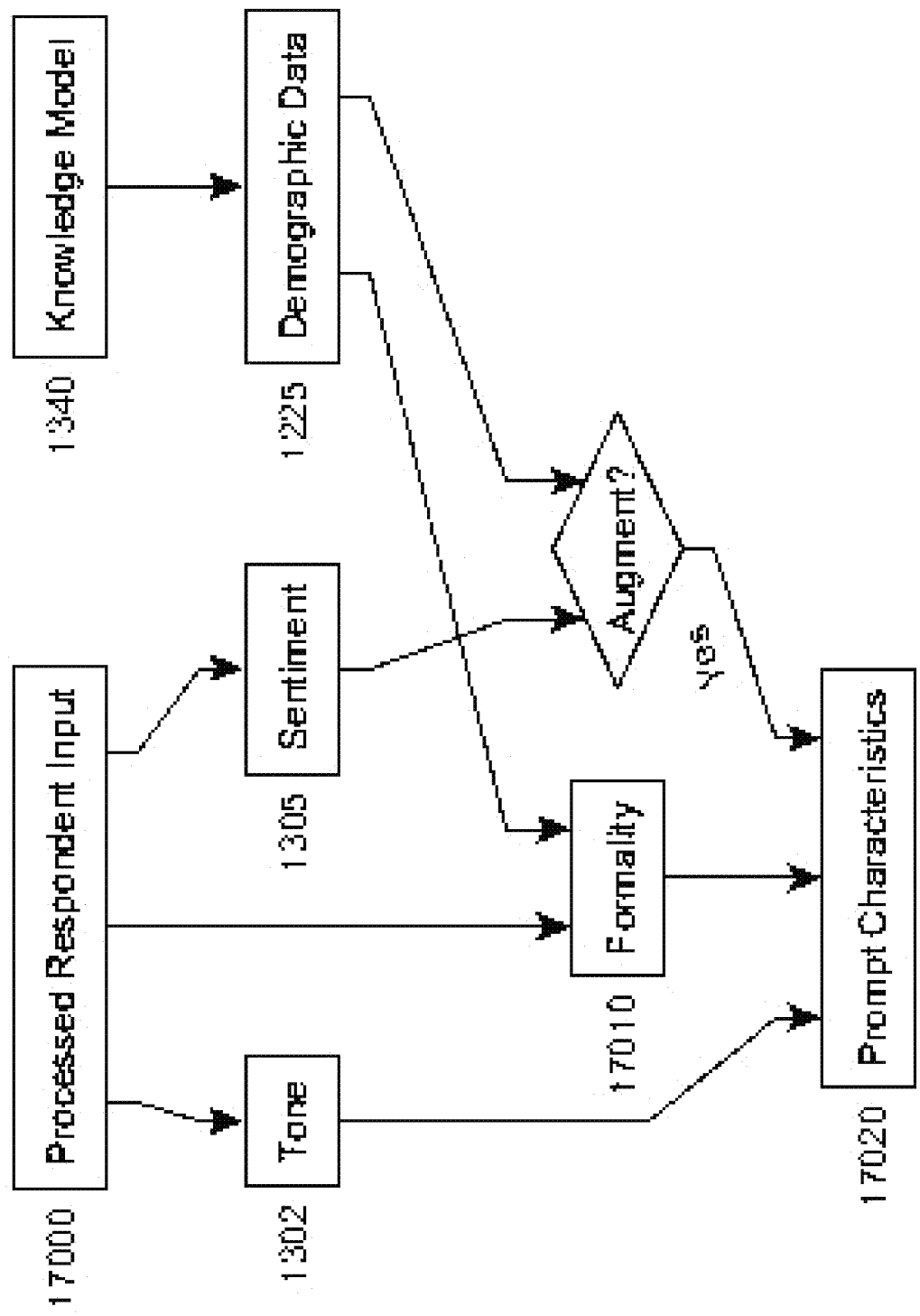
FIG. 51 is a flowchart of one embodiment of the process of characterizing the nature of a respondent's act of replying to a prompt.

In terms of when exactly to prompt once a decision has been made to prompt, most embodiments will prompt when there is an indication that the user is leaving the textbox (or other user interface widget where the text for the current question is to be entered) but not before so as to avoid seeming overly intrusive; some embodiments will make an exception if the user returns the cursor to the textbox for a prior question. Indications that the user is leaving the textbox include proceeding past it, (for example, by continuing on to answer the subsequent question,) and removing the cursor from the active textbox. A simple decision tree for this is provided in FIG. 51.

In addition, in the self-censorship scenario, most embodiments will issue a prompt when at least one negative polarity[24000] word, or a series of contiguous words containing one or more negative polarity[24000] words, has been erased and either retyped or substituted with an alternate word two or more times, depending on the configuration. Almost all embodiments will exclude the correction of spelling or grammatical errors.

In this kind of deletion scenario, many embodiments will avail themselves of the opportunity to measure a "fear" score[15110] with which they will update the value of any relevant organizational character traits[485] (e.g. "fear-based management.") Specifically, most of these embodiments will flag cases including but not limited to the following:

Negative polarity[24000] word or phrase at least partially entered, but then deleted altogether Likewise negative tone[1302] marker entered, but then deleted (e.g. "very very bad" replaced with just "bad"

Strongly negative polarity[24000] word or phrase substituted with a less negative word or phrase (e.g. "horrible idea" replaced by "questionable idea")

Any other deletion or substitution in which the newer version dilutes the negativity of the prior version, including but not limited to: removal of superlatives, and insertion of any kind of hedging language.

Most embodiments will count the number of edits as part of the "fear" score[15110], where a substitution counts as a single edit rather than a deletion followed by an addition. The greater the number of edits, the greater the trepidation of the respondents[15050] so the higher the "fear" score [15110]. Further, most of these embodiments will weigh such deletion behavior according to the importance[7050] of the topic[1300] being commented on as defined in the knowledge model[1340], with more important[20050] topics[1300] being assigned a higher weight.

In the "no opinion" scenario, the prompt will occur immediately after a response whose pragmatic intent[25010] has been identified as "I don't know", or a low informational value[22020] response (e.g. "This place sucks.") However, in the case of the hesitant respondent[15050], most embodiments will follow a similar strategy to this last, though some may opt to prompt after at least one coherent chunk of text has been entered by the respondent[15050]. In addition, some embodiments will apply the above-referenced deletion test, but without the constraint on negative polarity[24000]

It is to be understood that since the exemplary systems and methods described herein can be implemented in software, the actual method steps may differ depending upon the manner in which the present invention is programmed. Given the teachings herein, one of ordinary skill in the related art will be able to contemplate these and similar implementations or configurations of the present invention. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed; the intention is to cover all modifications, equivalents, and, alternatives falling within the spirit and scope of the invention as defined by the appended claims.

The invention claimed is:

1. A non-transient computer readable medium for causing a computer to perform the method of:
    allowing the computer to receive an at least one body of data associated with an organization,
    where the at least one body of data is comprised of being an at least one of the group of application data, databases, personnel records, survey and interview data, publicly and quasi-publicly available web data including logs, email communications, text communications, audio recordings, video recordings, images, electronic records, news articles, and records' contextual data;
    where the application of the analytics engine is further comprised of the step of labeling elements of the at least one body of data with tags and other types of metadata;
    determining with an analytics engine, for an author of data, an at least one property from the group of insider/outsider status, perspective, credibility score, sincerity, objectivity, actions, and demographic attributes;
    applying the analytics engine for assessing properties being an at least one from the group of credibility, sincerity, objectivity, and knowledgeableness of authors;
    determining with the analytics engine an at least one of the group of stability level, engagement levels, energy levels, organizational character, and culture properties;
    determining the informational value property of data items;

applying the analytics engine for determining engagement and energy levels,
where the determination of engagement and energy levels comprises assessing an at least one of the group of attitudes, beliefs, sentiment, tone, observations, and actionable suggestions;
assessing organizational culture and character,
assessing an at least one abstract trait;
where the analytics engine further determines, for the organization, an assessment of an at least one from the group of future behavior, bases for past behavior, organizational character, organizational opportunities, benchmarking, and organizational adversities.

2. The computer readable medium of claim 1 where the method is further comprised of the step of allowing the medium to collect the at least one body of data.

3. The computer readable medium of claim 1 where the analytics engine is further comprised of the step of making predictions being an at least one of the organization's stability, general psychological health, and trajectory; and further comprising the step of applying the analytics engine to identify insiders relative to a target organization, and assessing an at least one of the group of organizational character, culture, engagement level, energy level and stability, by increasing the importance of insider data properties, filtering the importance of non-insider data in an assessment, and increasing the importance of more credible insiders.

4. The computer readable medium of claim 1 where the method is further comprised of the step of determining an at least one of the group of credibility, perspective, sincerity, objectivity, and substance.

5. The computer readable medium of claim 4 where the analytics engine normalizes an at least one of the group of credibility, perspective, sincerity, objectivity, and substance.

6. The computer readable medium of claim 1 where the method is further comprised of a step of assessing informational value properties to determine actionable suggestions and determine observations of the organization.

7. The computer readable medium of claim 1 where the analytics engine assesses the body of data for evidence of burstiness, comprised of the steps of
detecting activity, where activity is a frequent group of features,
determining baseline statistics,
assessing bursts of an activity that fall outside of the statistical model of the baseline.

8. The computer readable medium of claim 1 where the method is further comprised of analyzing textblocks and detecting for transmissions of information.

9. The computer readable medium of claim 1 where the method is further comprised of a step of providing interactive prompting to a user.

10. The computer readable medium of claim 1 further comprising assessing an at least one exit behavior.

11. The computer readable medium of claim 1 where a credibility score for an actor is comprised of assessing an at least one of the group of perspective score, sincerity score, objectivity score, and substance score.

12. The computer readable medium of claim 11 where assessing the sincerity score is comprised of assessing sincerity and assessing a probability that the actor is an outsider posing as a member.

13. The computer readable medium of claim 1 further comprising producing results for an interface to receive a matrix display.

14. The computer readable medium of claim 13 where the matrix display provides for displaying a user-selected demographic dimension being an at least one of the group of location, seniority, mood, topic, and topic area.

15. The computer readable medium of claim 14, where the dimensions further comprise an at least one icon per cell, layered according to frequency of sentiment.

16. The computer readable medium of claim 1, further comprising the step of providing data for displaying a mood cloud, where the mood cloud is comprised of font treatments to characterize the text for emphasizing an at least one characteristic selected from the group of loud talking, reference to a different organization, and reference of a fully expressed belief.

17. The computer readable medium of claim 1, further comprising the step of providing data for displaying a suggestion view, comprised of providing a suggestion box, and selection of an at least one of the group of topics, demographic attributes, and archetypes.

18. The computer readable medium of claim 17, further comprising the step of limiting the display of a specific suggestion to actionable suggestions.

19. The computer readable medium of claim 1, further comprising providing data for displaying archetypes by an avatar-display being an at least one of the group of an avatar, a static-image avatar, an avatar and a label, a demographically-distinguishing avatar, a psychologically-distinguishable avatar, and an avatar accompanied by a number of members corresponding to the archetype.

20. The computer readable medium of claim 1, further comprising the step of integrating different modalities from an at least one data source into an at least one parse tree, and mapping to an at least one unified meaning representation.

21. A system for analyzing and reporting on behavior of organizations, the system comprising:
input data of an at least one body of data associated with an organization,
where the at least one body of data is comprised of an at least one of the group of application data, databases, personnel records, survey and interview data, publicly and quasi-publicly available web data including logs, email communications, text communications, audio recordings, video recordings, images, electronic records, news articles, and records' contextual data;
an analytics engine, where the analytics engine labels elements of the at least one body of data with tags and other types of metadata;
the analytics engine determines, for an author of data, an at least one property from the group of insider/outsider status, perspective, credibility score, sincerity, objectivity, actions, and demographic attributes;
the analytics engine assesses an at least one additional property of authors selected from the group of credibility, sincerity, objectivity, and knowledgeableness;
the analytics engine assesses an at least one of the group of stability level, engagement levels, energy levels, organizational character, culture properties;
the analytics engine assesses informational value property of data items;
the analytics engine determines engagement and energy levels,
where the determination of engagement and energy levels comprises assessing an at least one of the group of attitudes, beliefs, sentiment, tone, observations, and actionable suggestions;
the analytics engine assesses organizational culture and character, the analytics engine assesses an at least one abstract trait;
where the analytics engine further determines, for the organization, an assessment of an at least one from the group of future behavior, bases for past behavior, organizational character, organizational opportunities, benchmarking, and organizational adversities;
an interface for receiving comment groups and findings.

22. The system of claim 21, further comprising identification of sentiment context.

23. The system of claim 21 further comprising an interface for engaging results to bring up a display of comments correlated with an output analysis within a selected data set from the data source.

24. The system of claim 21, further comprising identification of archetypes in the analytics engine.

25. The system of claim 21 where the analytic engine comprises an elimination of data polluting the data source through statistical outlier analysis, and segregation of questionable data for removal of the user-adjudication queue.

26. The system of claim 21 further comprising an engine for considering bursts of data in a data set.

27. The system of claim 21, where the engine further comprises assessment of perspective and credibility based on written commentary, and measuring factors of pride or ownership in an organization.

28. The system of claim 21, further comprising: a data store, where items are produced without modifying or updating existing data records, comprised of references that point to the data items derived from are also stored, and in which environment the store will be periodically scanned to compact data that has aged and remove data that is no longer reachable.

29. The system of claim 21, where the engine further comprises an analysis of textblocks and detecting for transmissions of information.

30. A non-transient computer readable medium for causing a computer to perform the method of:
allowing the computer to receive an at least one body of data associated with an organization,
assessing burstiness, comprised of the steps of
detecting activity, where activity is a frequent group of features,
determining baseline statistics,
assessing bursts of an activity that fall outside of the statistical model of the baseline.

* * * * *

UNITED STATES PATENT AND TRADEMARK OFFICE
CERTIFICATE OF CORRECTION

| | |
|---|---|
| PATENT NO. | : 9,569,729 B1 |
| APPLICATION NO. | : 15/215570 |
| DATED | : February 14, 2017 |
| INVENTOR(S) | : Richard Oehrle et al. |

It is certified that error appears in the above-identified patent and that said Letters Patent is hereby corrected as shown below:

In the Specification (1) In Column 1, Lines 6-7, delete "Jun. 20, 2015" and insert -- July 20, 2015 --, therefor.

Signed and Sealed this
Nineteenth Day of July, 2022

Katherine Kelly Vidal
*Director of the United States Patent and Trademark Office*